United States Patent
Seki et al.

(10) Patent No.: US 7,907,199 B2
(45) Date of Patent: Mar. 15, 2011

(54) IMAGE INPUT APPARATUS, PROGRAM EXECUTED BY COMPUTER, AND METHOD FOR PREPARING DOCUMENT WITH IMAGE

(75) Inventors: Kazuyuki Seki, Kanagawa (JP); Keiichi Suzuki, Tokyo (JP); Takaho Koshiishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 506 days.

(21) Appl. No.: 11/555,997

(22) Filed: Nov. 2, 2006

(65) Prior Publication Data
US 2007/0061857 A1 Mar. 15, 2007

Related U.S. Application Data

(62) Division of application No. 09/821,248, filed on Mar. 30, 2001, now Pat. No. 7,154,534.

(30) Foreign Application Priority Data

| Mar. 31, 2000 | (JP) | 2000-100126 |
|---|---|---|
| Mar. 31, 2000 | (JP) | 2000-100137 |
| Mar. 31, 2000 | (JP) | 2000-136406 |
| Apr. 11, 2000 | (JP) | 2000-109973 |
| Apr. 11, 2000 | (JP) | 2000-109974 |
| Apr. 11, 2000 | (JP) | 2000-109975 |
| Sep. 5, 2000 | (JP) | 2000-269419 |
| Sep. 5, 2000 | (JP) | 2000-269420 |
| Sep. 5, 2000 | (JP) | 2000-269421 |
| Mar. 14, 2001 | (JP) | 2001-073153 |

(51) Int. Cl.
*H04N 5/222* (2006.01)
*H04N 5/225* (2006.01)

(52) U.S. Cl. ................ 348/333.01; 348/207.1
(58) Field of Classification Search .......... 348/135, 348/231.99, 232–234, 207.1, 239, 333.1, 348/552, 333.01; 709/201, 217
See application file for complete search history.

(56) References Cited

U.S. PATENT DOCUMENTS

| 5,633,678 A * | 5/1997 | Parulski et al. ............ 348/231.5 |
| 5,812,736 A | 9/1998 | Anderson |
| 5,828,969 A | 10/1998 | Chamney et al. |
| 5,963,964 A | 10/1999 | Nielsen |
| 5,970,506 A | 10/1999 | Kiyan et al. |
| 6,005,613 A | 12/1999 | Endsley et al. |

(Continued)

FOREIGN PATENT DOCUMENTS
EP 0 905 679 3/1999
(Continued)

OTHER PUBLICATIONS

Tim Larimer, "Take a Picture that can fly", Time Magazine, Dec. 4, 2000, vol. 156, No. 22, pp. 42-44.

(Continued)

*Primary Examiner* — Lin Ye
*Assistant Examiner* — Trung Diep
(74) *Attorney, Agent, or Firm* — Oblon, Spivak, McClelland, Maier & Neustadt, L.L.P.

(57) ABSTRACT

A digital camera inputs an image capture guide list including at least one of image titles as targets to be recorded, and displays the image title(s) included in the image capture guide list on its display part. User takes a picture or pictures while checking the image title(s) in the image capture guide list.

38 Claims, 81 Drawing Sheets

U.S. PATENT DOCUMENTS

| | | | |
|---|---|---|---|
| 6,035,323 A | 3/2000 | Narayen et al. | |
| 6,226,449 B1 * | 5/2001 | Inoue et al. | 386/120 |
| 6,313,877 B1 | 11/2001 | Anderson | |
| 6,504,571 B1 | 1/2003 | Narayanaswami et al. | |
| 6,525,768 B2 * | 2/2003 | Obradovich | 348/231.99 |
| 6,532,039 B2 | 3/2003 | Anderson | |
| 6,567,122 B1 * | 5/2003 | Anderson et al. | 348/211.3 |
| 6,698,021 B1 | 2/2004 | Amini et al. | |
| 6,721,001 B1 | 4/2004 | Berstis | |
| 6,795,116 B1 | 9/2004 | Akasawa | |
| 6,801,251 B1 * | 10/2004 | Kawaoka et al. | 348/231.3 |
| 6,859,909 B1 * | 2/2005 | Lerner et al. | 715/203 |
| 6,862,038 B1 * | 3/2005 | Anderson | 348/207.99 |
| 6,877,031 B2 | 4/2005 | Watanabe et al. | |
| 7,012,636 B2 * | 3/2006 | Hatanaka | 348/211.99 |
| 7,019,778 B1 * | 3/2006 | Prabhu et al. | 348/333.01 |
| 7,053,938 B1 | 5/2006 | Sherry | |
| 2003/0123696 A1 | 7/2003 | Matsumoto et al. | |
| 2003/0177448 A1 | 9/2003 | Levine et al. | |
| 2005/0181774 A1 | 8/2005 | Miyata | |

FOREIGN PATENT DOCUMENTS

| | | |
|---|---|---|
| EP | 0 974 916 | 1/2000 |
| JP | 10-304290 | 11/1998 |
| JP | 10-320546 | 12/1998 |
| JP | 10-341396 | 12/1998 |
| JP | 11-224228 | 8/1999 |
| JP | 11-232440 | 8/1999 |
| JP | 2000-078518 | 3/2000 |
| WO | WO 99/44166 | 9/1999 |
| WO | WO 99/48276 | 9/1999 |

OTHER PUBLICATIONS

"RDC-i700 Image Capturing Device", "Camera Operation Manual", Ricoh Company, 2000, pp. 7, 25, 97.

"RDC-i700 Image Capturing Device", "Communication/Internet Operation Manual", Ricoh Company, 2000, pp. 101.

"RDC-i700 Image Capturing Device", "Connecting to a Personal Computer Operation Manual", Ricoh Company, 2000, pp. 31, 98, 102.

* cited by examiner

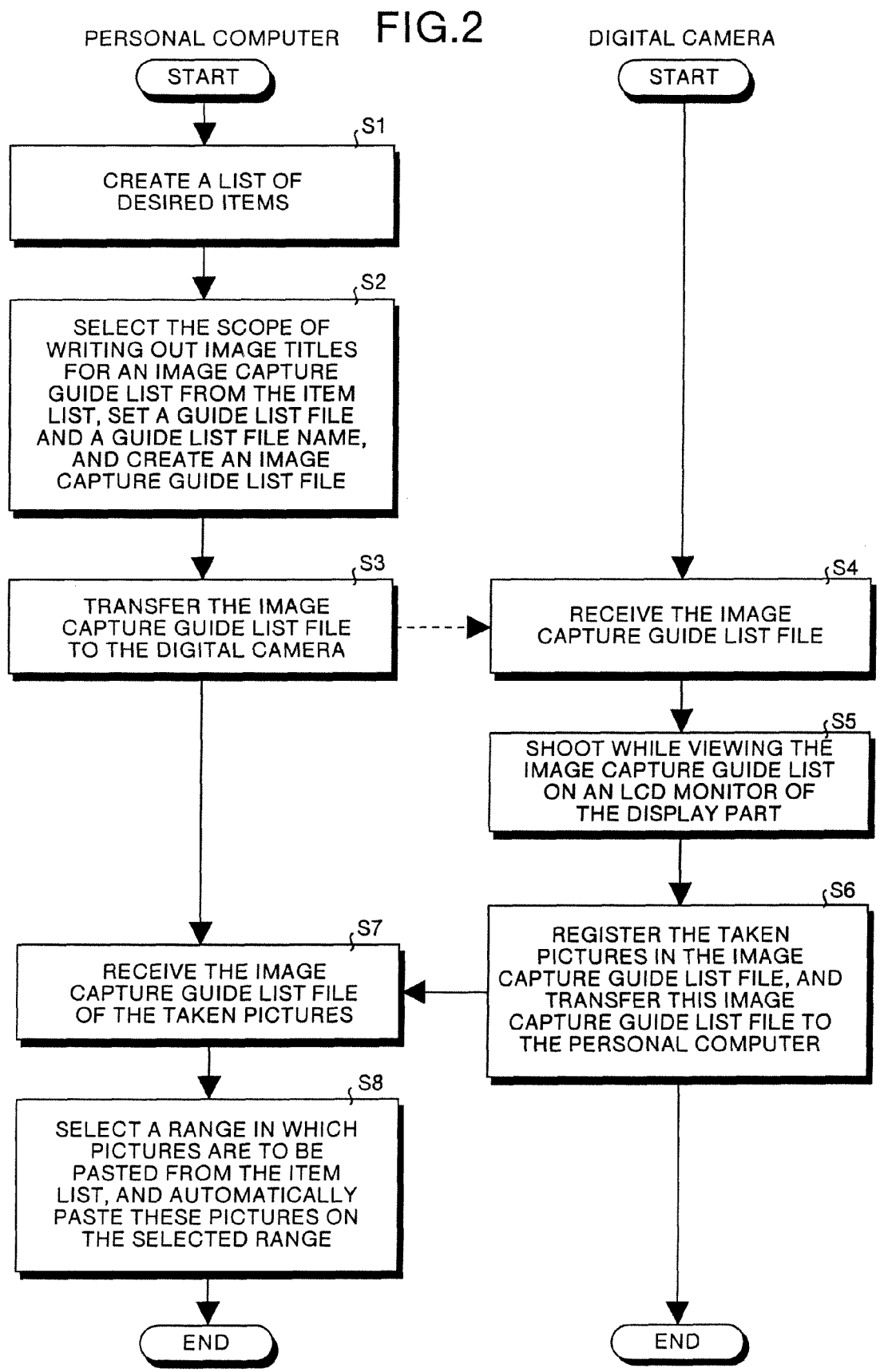

FIG.3A
| A | B | C | D |
|---|---|---|---|
| 1 | NO   ITEM | PRICE | PICTURE |
| 2 | 1  BAG | 72000 | |
| 3 | 2  BAG | 98000 | |
| 4 | 3  LADY'S MINI BAG | 39000 | |
| 5 | 4  HANDBAG | 118000 | |
| 6 | 5  CARD CASE | 7000 | |
| 7 | 6  PEN TRAY | 16000 | |
| 8 | 7  WALLET | 15000 | |
| 9 | 8  PEN CASE | 14000 | |
| 10 | 9  PASS CASE | 4900 | |
| 11 | 10  WALLET | 10000 | |
| 12 | 11  BRIEFCASE | 15000 | |
| 13 | 12  TOTO BAG | 49000 | |
| 14 | 13  LADY'S MINI BAG | 32000 | |
| 15 | 14  PERSONAL ORGANIZER | 45000 | |
| 16 | | | |
| 17 | | | |
| 18 | | | |
Sheet1 / Sheet1
FIG.3B
| A | B | C | D |
|---|---|---|---|
| 1 | NO   ITEM | PRICE | PRICE |
| 2 | 1  BAG | 72000 |  |
| 3 | 2  BAG | 98000 |  |
| 4 | 3  LADY'S MINI BAG | 39000 |  |
| 5 | 4  HANDBAG | 118000 |  |
Sheet1 / Sheet2 / S

```
[LIST TITLE]
TITLE=CAMERA SHOW '99
[RICOH]
[CAMON]
[XELOX]
[CAMIO]
[MINOLOTA]
[SOMY]
[KOTAK]
```

FIG.24

[LIST TITLE]
TITLE=CAMERA SHOW '99
[RICOH]
RIMG0001.JPG
RIMG0005.JPG
[CAMON]
[XELOX]
RIMG0002.JPG
[CAMIO]
RIMG0003.JPG
[MINOLOTA]
[SOMY]
[KOTAK]
RIMG0004.JPG

[BAG NO. 1]/B/"ENTER THE NAME OF A PHOTOGRAPHER AS MEMO INFORMATION"

[BAG NO. 2]/A/"SHOOT THE SUBJECT WITH A SOPHISTICATED FEELING"

FIG.41

| COMMAND | NO |
|---|---|
| RENAME | 3 |
| PASTE | 4 |
| MAIL | 6 |
| MAIL THUMBNAIL | 7 |
| MAIL RESIZE | 8 |
| WEBUPLOAD | 9 |
| WEBUPLOAD SEND | 10 |
| REPORT JOBEND | 11 |
| REPORT MAIL JOBEND | 12 |
| REPORT WHEN | 13 |
| MEMO | 14 |
| MEMO MIXED | 15 |
| MEMO*.WAV | 16 |
| ARCHIVE | 17 |
| SAVE | 18 |
| STITCH | 19 |
| ADJUSTE | 20 |
| COLOR | 21 |
| DISTORTION | 22 |
| STAMP DATA | 30 |
| STAMP | 31 |
| PIXELS | 32 |
| PICTURES | 33 |
| EXPOSURE | 34 |
| SPEED | 35 |
| FLASH | 36 |
| SIZE | 37 |
| RATIO | 38 |
| SECURE | 39 |
| WATERMARK | 40 |
| BINARYDATA | 41 |
| MOVIE | 42 |
| SOUND | 43 |

FIG.43

EXAMPLE OF COMMAND TO SEND THE IMAGE BY E-MAIL AS
THE PROCESSING FOR POST-RECORDING

```
MAIL <DESTINATION>,<DESTINATION>, · · ,<DESTINATION>OPTION
    OPTION:THUMBNAIL    SEND THUMBNAILS
        RESIZE<SIZE>         CHANGE THE SIZE OF THE IMAGE TO
                             THE SPECIFIED SIZE TO SEND IT
        ARCHIVE<FILE NAME>   CONVERT THE DATA TO THAT IN THE
                             SPECIFIED FILE FORMAT
                             FOR EXAMPLE, .LZH, .ZIP, .TAR, .SIT
```

FIG.47

EXAMPLE OF COMMAND TO UPLOAD THE
IMAGE THE WEB SERVER AS THE
PROCESSING FOR POST-RECORDING

```
webupload   <UPLOADING ADDRESS>option
    option:sendURL        CREATE MAIL TO NOTIFY OF UPLOADING
                          URL (SAVE IT AS THE MAIL DRAFT)
          resize<SIZE>    CHANGE THE SIZE OF THE IMAGE TO
                          THE SPECIFIED SIZE TO SEND IT
```

FIG.55

100RLIST(FOLDER NAME)
      CAMERA_SHOW99.1st(GUIDE LIST TITLE)
      RIMG001.jpg
      RIMG005.jpg
      RIMG002.jpg
      RIMG003.jpg
      RIMG004.jpg

[LIST TITLE]
title=CAMERA SHOW '99
[RICOH] ／comp:{(pair=a),(base=0)}
[ CAMON]
[XELOX]
[CAMIO]
[MINOLOTA] ／
comp:{(pair=a),(base=1),(size=340x170),(position=70,30)}
[SOMY]
[KOTAK]

FIG.79

|   | A | B | C | D | E |   |
|---|---|---|---|---|---|---|
| 1 |   |   |   |   |   |   |
| 2 |   |   |   |   |   |   |
| 3 |   | ITEM NO. 1 |   |   |   |   |
| 4 |   | ITEM NO. 2 |   |   |   |   |
| 5 |   | ITEM NO. 3 |   |   |   |   |
| 6 |   | ITEM NO. 4 |   |   |   |   |
| 7 |   | ITEM NO. 5 |   |   |   |   |
| 8 |   |   |   |   |   |   |

FIG.82

| | A | B | C | D | E |
|---|---|---|---|---|---|
| 1 | | | | | |
| 2 | | | | | |
| 3 | | ITEM NO. 1 | PICTURE OF PERSON A | | |
| 4 | | ITEM NO. 2 | PICTURE OF PERSON B | | |
| 5 | | ITEM NO. 3 | PICTURE OF PERSON C | | |
| 6 | | ITEM NO. 4 | PICTURE OF PERSON D | | |
| 7 | | ITEM NO. 5 | PICTURE OF PERSON E | | |
| 8 | | | | | |

FIG.84

|   | A | B | C | D |   |
|---|---|---|---|---|---|
| 1 |   |   |   |   |   |
| 2 |   |   |   |   |   |
| 3 |   |   |   |   |   |
| 4 |   | ITEM NO. 1 |   |   |   |
| 5 |   | ITEM NO. 2 |   |   |   |
| 6 |   | ITEM NO. 3 |   |   |   |
| 7 |   | ITEM NO. 4 |   |   |   |

FIG.86

|   | A | B | C | D |   |
|---|---|---|---|---|---|
| 1 |   |   |   |   |   |
| 2 |   |   |   |   |   |
| 3 |   |   |   |   |   |
| 4 |   | ITEM NO. 1 | DUMMY IMAGE NO. 1 |   |   |
| 5 |   | ITEM NO. 2 | DUMMY IMAGE NO. 2 |   |   |
| 6 |   | ITEM NO. 3 | DUMMY IMAGE NO. 3 |   |   |
| 7 |   | ITEM NO. 4 | DUMMY IMAGE NO. 4 |   |   |
|   |   |   |   |   |   |

FIG.88

|   | A | B | C | D |   |
|---|---|---|---|---|---|
| 1 |   |   |   |   |   |
| 2 |   |   |   |   |   |
| 3 |   |   |   |   |   |
| 4 |   | ITEM NO. 1 | IMAGE NO. 1 |   |   |
| 5 |   | ITEM NO. 2 | IMAGE NO. 2 |   |   |
| 6 |   | ITEM NO. 3 | IMAGE NO. 3 |   |   |
| 7 |   | ITEM NO. 4 | IMAGE NO. 4 |   |   |

FIG.89

| No. | ITEM | SHOOTING INSTRUCTION |
|---|---|---|
| 1 | BAG | |
| 2 | BAG | "K" OF THE BRAND SHOULD BE CLEAR |
| 3 | LADY'S MINI BAG | WITH LIGHT AND SOPHISTICATED FEELING |
| 4 | HANDBAG | BE SURE THE POCKET FOR A CELL PHONE IS CLEARLY SEEN |
| 5 | CARD CASE | DISPLAY TWO: ONE WITH ITS TOP SIDE AND THE OTHER WITH ITS BACK SIDE |
| 6 | PEN TRAY | PLACE A PEN ON THE PEN TRAY |
| 7 | WALLET | DISPLAY THREE DIFFERENT COLORS OF IT |
| 8 | PEN CASE | DISPLAY A PACKET OF CIGARETTES WITH THE PEN CASE TO MAKE ITS SIZE CLEAR |

FIG.90

MODEL TABLE

| | | MODEL CODE | | |
|---|---|---|---|---|
| MODEL ABILITY ITEM | | i 700 | i 800 | i 900 |
| RECORDING FORMAT | STILL PICTURE | — | — | — |
| | BINARY IMAGE | — | — | — |
| | MOTION PICTURE | — | — | — |
| | VOICE MEMO | — | — | — |
| IMAGE PICKUP DEVICE | | — | — | — |
| RESOLUTION | STILL PICTURE | — | — | — |
| | BINARY IMAGE | — | — | — |
| | MOTION PICTURE | — | — | — |
| RECORDING MODE | | — | — | — |
| NUMBER OF RECORDINGS | STILL PICTURE | — | — | — |
| RECORDING TIME | MOTION PICTURE | — | — | — |
| | VOICE MEMO | — | — | — |
| LENS | | — | — | — |
| ZOOM | | 3 TIMES | 6 TIMES | 3 TIMES |
| SHUTTER | | — | — | — |
| SHOOTING DISTANCE | | — | — | — |
| ISO SENSITIVITY | | — | — | — |
| VIEWFINDER | | — | — | — |
| FLASH | | — | — | — |
| FOCUS | | — | — | — |
| EXPOSURE ADJUSTMENT | | — | — | — |
| EXPOSURE COMPENSATION | | — | — | — |
| WHITE BALANCE | | — | — | — |
| SELF-TIMER | | — | — | — |
| LCD MONITOR | | — | — | — |
| EXPANSION SLOT | | — | — | — |
| I/O TERMINALS | | — | — | — |
| VIDEO SIGNAL MODE | | — | — | — |

— : DATA IS SUPPOSED TO BE ENTERED IN THE ACTUAL CASE

IMAGE INPUT APPARATUS, PROGRAM EXECUTED BY COMPUTER, AND METHOD FOR PREPARING DOCUMENT WITH IMAGE

CROSS-REFERENCE TO RELATED APPLICATIONS

This application is a divisional of U.S. application Ser. No. 09/821,248, filed Mar. 30, 2001, and is based upon and claims the benefit of priority from the prior Japanese Patent Application Nos. 2000-100126, filed Mar. 31, 2000, 2000-100137, filed Mar. 31, 2000, 2000-136406, filed Mar. 31, 2000, 2000-109973, filed Apr. 11, 2000, 2000-109974, filed Apr. 11, 2000, 2000-109975, filed Apr. 11, 2000, 2000-269419, filed Sep. 5, 2000, 2000-269420, filed Sep. 5, 2000, 2000-269421, filed Sep. 5, 2000, and 2001-073153, filed Mar. 14, 2001, the entire contents of each of which are incorporated herein by reference.

FIELD OF THE INVENTION

The present invention relates to an image input apparatus, a program executed by a computer, and a method for preparing a document with an image. More particularly, this invention relates to the image input apparatus using an image capture guide list, the program executed by a computer, and the method for preparing a document with an image.

BACKGROUND OF THE INVENTION

The original model of a digital camera is the electronic still camera, and Sony's Mavica put on sale in about 1981 is the first to be practically used. Since then, CCDs as image pickup devices have been becoming highly accurate and reducing cost, and memory cards as recording media have been gaining larger capacity and their miniaturization. Further, semiconductor chips based on JPEG as the still picture compression/coding system have appeared on the market. In association with these advanced technologies, the current digital cameras are progressing in their minimization, reduction of cost, and high performance.

Rapid spread of mobile telephones, minimized portable personal computers, and common use of PDAs represented by Sharp s Zaurus make the environments, under which the equipment is used during movement, get much better. Under such environments, the digital camera becoming widespread as an image input unit is connected to a personal computer and a network. Further, the digital camera is becoming one of the most important elements in the multimedia system as a capture device for capturing not only images but also any image information such as voice memos and motion pictures.

The digital camera has also been expected as a candidate of a wearable computer, that is, a computer that a person puts on, in addition to the feature as the capture device. This aspect of this digital camera has been more actively developed in recent years together with the mobile telephones, PDAs, and pad-form personal computers. Further, the digital camera has been desired to be provided with more advanced functions such as the function of connecting to the Internet, the function of managing personal information, and the function of making a presentation. In particular, a simple method for preparing a document with images using the digital camera has been demanded. There have also been needs to simplify data processing and data management of Web information with the digital camera that has the connecting function to the Internet. This simplification is realized by handling the Web information for a Web page in the same manner as that of handling data for a picked-up image.

There is a disclosure, for example, "Function-adding method for digital camera" disclosed in JP, HEI10-341396A. In this method, such technology that a program can be introduced from the outside in order to add desired functions to the digital camera by being provided with two processes as follows. One of them is a first process for receiving a program stored in an external recording medium and recording the program in a storage medium of the digital camera. The other is a second process for reading out the program from the recording medium of the camera at any time to execute it.

However, this Function-adding Method for Digital Camera in JP, HEI10-341396A has a problem such that forgetting to take the picture of a required subject or omitting doing some jobs can not be prevented.

SUMMARY OF THE INVENTION

It is an object of this invention to provide an image input apparatus that can prevent forgetting to take the picture of a required subject or omitting doing some job, and to provide a program executed by a computer.

It is another object of this invention to provide an image input apparatus that can simplify data processing and data management of Web information by handling the Web information in a Web page in the same manner as that of handling data for a picked-up image.

It is a still another object of this invention to provide a method for preparing a document with an image, in which a document with an image can simply be prepared.

In order to achieve the above objects, according to one aspect of this invention, an optical system forms an image of a subject, and an image pickup unit converts the formed subject image to image data. An image capture guide list input unit inputs image capture guide lists each including at least one of image titles representing targets to be recorded. A storage unit stores the image capture guide lists input through the image capture guide list input unit. An image title display unit displays the image title (s) included in one of the image capture guide lists stored in the storage unit on the screen of a display device.

Further, an image capture guide list display unit displays the image capture guide lists stored in the storage unit in list form on the screen of the display device, and an image capture guide list selection unit selects one from the image capture guide lists displayed on the screen. The image title display unit displays the image title(s) included in the image capture guide list selected by the image capture guide list selection unit.

Further, the image capture guide list is input from an information processing device.

Further, the image capture guide list is downloaded from a home page of a Web server.

Further, an image title selection unit selects one of the image titles displayed on the screen, and when one of the image titles is selected by the image title selection unit, the mode is switched to a recording mode.

Further, still images, binary images and motion pictures as targets to be recorded, and voice memos are also recordable.

Further, an HTML file conversion unit converts the data recorded in the recording mode to an HTML file.

Further, an uploading unit uploads the HTML file converted by the HTML file conversion unit to the home page in the Web server.

Further, the image title selected by the image title selection unit is added to parameters in a recorded file for the data recorded in the recording mode.

Further, the recorded file for the data recorded in the recording mode is stored in correlation with the image title selected by the image title selection unit.

Further, the name of the recorded file includes the image title selected by the image title selection unit.

Further, the image title selected by the image title selection unit is superposed on the image data recorded in the recording mode.

Further, when an image title is selected from the image capture guide list by the image title selection unit and recorded data relating to this image title is recorded, the image title display unit displays a message to the effect that recording corresponding to this image title has been performed.

Further, the image title display unit displays the number of recordings on the screen of the display device for each image title.

Further, when shooting for all the image titles in the image capture guide list has been finished, a message to the effect, that the shooting for the image capture guide list has been finished, is sent to a specified destination.

Further, when one of the image titles is selected by the image title selection unit, the mode is switched to a recording mode, and the image title selected by the image title selection unit is displayed together with a monitoring image of the subject on the screen of the display device.

Further, when one of the image titles is selected by the image title selection unit, a recording control unit shifts to the recording mode, records data to be recorded for any of still images, binary images, motion pictures of subjects, and voice memos according to the operation of the specific button, and stores the data in the storage unit as a recorded file. A grouping unit groups the recorded files for each image capture guide list.

Further, the grouping unit registers the recorded files in a folder or folders for each image capture guide list to group the files.

Further, the image capture guide list further includes shooting instruction information that corresponds to each image title and provides an instruction to a user, and when one of the image titles is selected by the image title selection unit, the contents of the shooting instruction information for the selected image capture guide list is notified.

Further, the contents of the shooting instruction information are a shooting procedure or an instruction for operations to be carried out after shooting.

Further, the attribute of the shooting instruction information is any of text, graphics, a voice memo, and a motion picture.

Further, the image capture guide list further includes automatic processing instruction information that corresponds to each image title and provides instructions for automatic settings of setting conditions when recording a target to be recorded, and/or for automatic processing to be executed after the recording. When an image title is selected by the image title selection unit, the mode is switched to the recording mode to execute the automatic settings of the setting conditions when recording the target to be recorded and/or the automatic processing. More specifically, this setting is required when the target is to be recorded, and this automatic processing is required to be executed after the recorded data is recorded. Both operations are executed based on the contents of the automatic processing instruction information for the image title selected by the image title selection unit.

Further, when the contents of the automatic processing instruction information for an image title selected by the image title selection unit indicate an instruction to send data as an attachment after the data is recorded, the data recorded in the recording mode is attached to e-mail to be sent to a specified destination through the communication means.

Further, when the contents of the automatic processing instruction information for an image title selected by the image title selection unit indicate an instruction to send thumbnail data as an attachment after the data is recorded, thumbnail images for the image data recorded in the recording mode are attached to e-mail to be sent to a specified destination through the communication means.

Further, when the contents of the automatic processing instruction information for an image title selected by the image title selection unit indicate an instruction to send zoomed image data as an attachment after the data is recorded, the image data recorded in the recording mode is changed to a specified size to be attached to e-mail, and the e-mail is sent to a specified destination through the communication means.

Further, when the contents of the automatic processing instruction information for an image title selected by the image title selection unit indicate an instruction to upload data to a home page after the data is recorded, the image data recorded in the recording mode is converted to an HTML file, which is uploaded to a specified home page through the communication means.

Further, when the contents of the automatic processing instruction information for an image title selected by the image title selection unit indicate an instruction to upload data to a home page after the data is recorded and notify of a URL address of this home page, the image data recorded in the recording mode is converted to an HTML file, which is uploaded to a specified home page through the communication means, and the URL address of this home page is also sent to a specified destination through the communication means.

Further, when the contents of the automatic processing instruction information for an image title selected by the image title selection unit indicate an instruction to input memo information after related data is recorded, the mode is switched to a memo input mode after the data is recorded in the recording mode, and a file of the memo information input through a memo input unit is stored in correlation with the recorded file of the data recorded in the recording mode.

Further, when the contents of the automatic processing instruction information for an image title selected by the image title selection unit indicate an instruction to input memo information after related data is recorded, the mode is switched to the memo input mode after the data is recorded in the recording mode, and the memo information input through the memo input unit is superposed on the image data recorded in the recording mode.

Further, the memo information is provided with text or freehand characters.

Further, a superposing position of the memo information with respect to the recorded image can freely be set.

Further, when the contents of the automatic processing instruction information for an image title selected by the image title selection unit indicate an instruction to input voice memo after related data is recorded, the mode is switched to a voice memo input mode after the data is recorded in the recording mode, and a file of the voice memo input through a voice memo input unit is stored in correlation with the recorded file of the image data recorded in the recording mode.

Further, when the contents of the automatic processing instruction information for an image title selected by the image title selection unit indicate an instruction to imprint a date on an image to be recorded, the image data is recorded in the recording mode, and then the date is imprinted on this image data.

Further, when the contents of the automatic processing instruction information for an image title selected by the image title selection unit indicate an instruction to set resolution of an image to be recorded, the resolution for shooting is set according to the setting instruction.

Further, the image capture guide list includes at least one of image titles as targets to be recorded and information to be superposed for this image title. When one of the image titles is selected by the image title selection unit, the mode is switched to the recording mode, and the information to be superposed for the image title, that is selected from the image capture guide list by the selection unit, is superposed on the image recorded in this recording mode.

Further, a combining position of the information to be superposed with respect to the recorded image can freely be set.

Further, the image capture guide list includes automatic processing instruction information that provides an instruction for automatic processing to be executed after data is recorded, and when an image title is selected by the image title selection unit, the mode is switched to the recording mode, shooting is performed for each of the image titles according to the operation of a specific button, and the recorded image data is processed based on the automatic processing instruction information in the image capture guide list.

Further, when the automatic processing instruction information indicates an instruction to combine a plurality of images, the plurality of images recorded for each of the image titles are combined into one.

Further, when the automatic processing instruction information indicates an instruction to correct a plurality of images, the plurality of images recorded for each of the image titles are corrected.

Further, the image capture guide list further includes model name information. The automatic processing instruction information is the contents adequate for the model. A determination unit reads out the model name information from the image capture guide list input through the image capture guide list input unit, and determines whether the model name of its own and the model name in the image capture guide list match with each other. When it is determined by the determination unit that these two match with each other, shooting is performed based on the image capture guide list.

According to another aspect of this invention, an optical system forms an image of a subject, an image pickup unit converts the formed subject image to image data. A memory temporarily stores the image data output from the image pickup unit, and a storage control unit stores the image data stored in the memory in a recording medium in a predetermined file format. A Web browsing unit captures Web information for a Web page of a Web server, stores the information in the memory as display data, and records the display data stored in the memory, in the recording medium in the predetermined file format.

Further, the Web browsing unit enlarges or reduces the size of the display data stored in the memory according to the operation of a zoom lever to change a range of the Web information to be captured.

Further, the display data stored in the memory is recorded in the recording medium in the predetermined file format according to the operation of a shutter release button.

Further, the Web browsing unit periodically accesses a particular URL for an image to be browsed, and captures the Web information.

Further, the freehand memo information input through a freehand memo information input unit and the Web information captured from the Web server are combined into one.

Further, voice memo information is added to the Web information captured from the Web server.

Further, a position on the Web information, which has been browsed, is specified, and the memo information input through a memo information input unit or previously stored in a memo information storage unit is superposed on the specified position of the Web information.

Further, when the display data stored in the memory is recorded in the recording medium in the predetermined file format, the corresponding URL or e-mail address is written in the header of the file.

Further, the files in the predetermined file format are classified into those for respective folders according to the contents of the URLs.

According to still another aspect of this invention, a program is executed by a computer to create an image capture guide list, which are displayed on the screen of the display device for an image input apparatus and includes at least one of image titles that represents targets to be recorded and are used for shooting.

Further, the program is executed by a computer to read out the model name information from an image input apparatus connected to the computer and create the image capture guide list adequate for the model.

Further, the program is executed by a computer to read out the model name information from the header of the recorded file stored in the image input apparatus and create the image capture guide list adequate for the model.

Further, the program is executed by a computer to create the image capture guide list adequate for each model using a table in which model ability information for each model of plural image input apparatuses is registered.

Further, the program is executed by a computer to create an image capture guide list. This image capture guide list is created by displaying a spreadsheet type input screen consisting of a plurality of cells, inputting an image title in one of the cells on the input screen, specifying at least one of the cell positions where image titles have been input, and including the image title on the specified cell position.

Further, the program is executed by a computer to create an image capture guide list. This image capture guide list is created by displaying a spreadsheet type input screen consisting of a plurality of cells, inputting an image title and a shooting instruction item relating to this image title in respective cells on the input screen, specifying at least one of the cell positions where image titles have been input, and including the image title and the shooting instruction item relating to the image title on the specified cell position.

Further, the program is executed by a computer to create an image capture guide list. This image capture guide list is created by displaying a spreadsheet type input screen consisting of a plurality of cells; inputting an image title in one of the cells on the input screen; changing the size of at least a part of the cells on the input screen; specifying at least one of the cell positions where image titles have been input; specifying a cell position, in which an image is to be pasted, for each image title; and including the image title on the specified cell position and the size of the specified cell.

Further, the program is executed by a computer to create an image capture guide list. This image capture guide list is created by displaying a spreadsheet type input screen consisting of a plurality of cells; inputting an image title in one of the cells on the input screen; changing the size of at least a part of the cells on the input screen; pasting an image on one of the cells; specifying at least one of the cell positions where image titles have been input; specifying a cell position, in which an image has been pasted, for each image title; and including the image title on the specified cell position and the size of the image pasted on the specified cell.

Further, the program is executed by a computer to input the image captured by the image input apparatus based on the image capture guide list and also input the image capture guide list, display a spreadsheet type input screen consisting of a plurality of cells, display an image title in the image capture guide list on one of the cells, read out the size of a target cell in which the image captured corresponding to the image title is to be pasted, change the size of the recorded image to the size of the read-out cell, and paste the recorded image in the target cell.

Further, the program is executed by a computer to change the size of an image to the changed size of a cell if the size of the cell, in which the image has been pasted, is changed.

The method according to still another aspect of this invention is realized by creating an item list, that includes at least an item indicating a title of a subject desired to be recorded, on a first screen; selecting the scope of writing out at least one of image titles from the item list; and creating an image capture guide list including the image title. This method is also realized by displaying the image title in the image capture guide list on a second screen; shooting a subject for each image title; selecting the range, in which the recorded image (s) is pasted, from the item list on the first screen; and pasting the recorded image (s) in the selected range.

Other objects and features of this invention will become understood from the following description with reference to the accompanying drawings.

BRIEF DESCRIPTION OF THE DRAWINGS

FIG. 2 is a flow chart for explaining the outline of the basic operations of the digital camera system shown in FIG. 1;

FIG. 3A and FIG. 3B show examples of an item list;

FIG. 24 shows an example of how the format of the image capture guide list in FIG. 21, which shows before shooting, has been changed after shooting;

FIG. 41 shows an example of commands to instruct operations;

FIG. 43 shows an example of commands used for sending an image by e-mail as post-processing of shooting;

FIG. 47 shows an example of commands to upload an image to a Web server as an instruction after recorded;

FIG. 55 shows an example of a folder structure of a recorded image;

FIG. 79 shows an example of the spreadsheet type screen;

FIG. 82 shows another example of the spreadsheet type screen;

FIG. 84 shows another example of the spreadsheet type screen;

FIG. 86 shows another example of the spreadsheet type screen;

FIG. 88 shows another example of the spreadsheet type screen;

FIG. 89 shows another example of the item list; and

FIG. 90 shows an example of the model table.

DESCRIPTION OF THE PREFERRED EMBODIMENT

A preferred embodiment of the image input apparatus, the program executed by a computer, and the method for preparing a document with an image according to this invention will be explained in detail below. The explanation will be carried out in the order of [Structure of a digital camera system according to this embodiment], [Configuration of the digital camera according to this embodiment], [Configuration of the personal computer according to this embodiment], [Examples of the recording operation in the digital camera according to this embodiment], [Examples of the image capture guide list for the digital camera according to this embodiment], [Examples of the browser function of the digital camera according to this embodiment], and [Examples of the personal computer according to this embodiment].

Structure of the Digital Camera System According to this Embodiment

Figure 1:
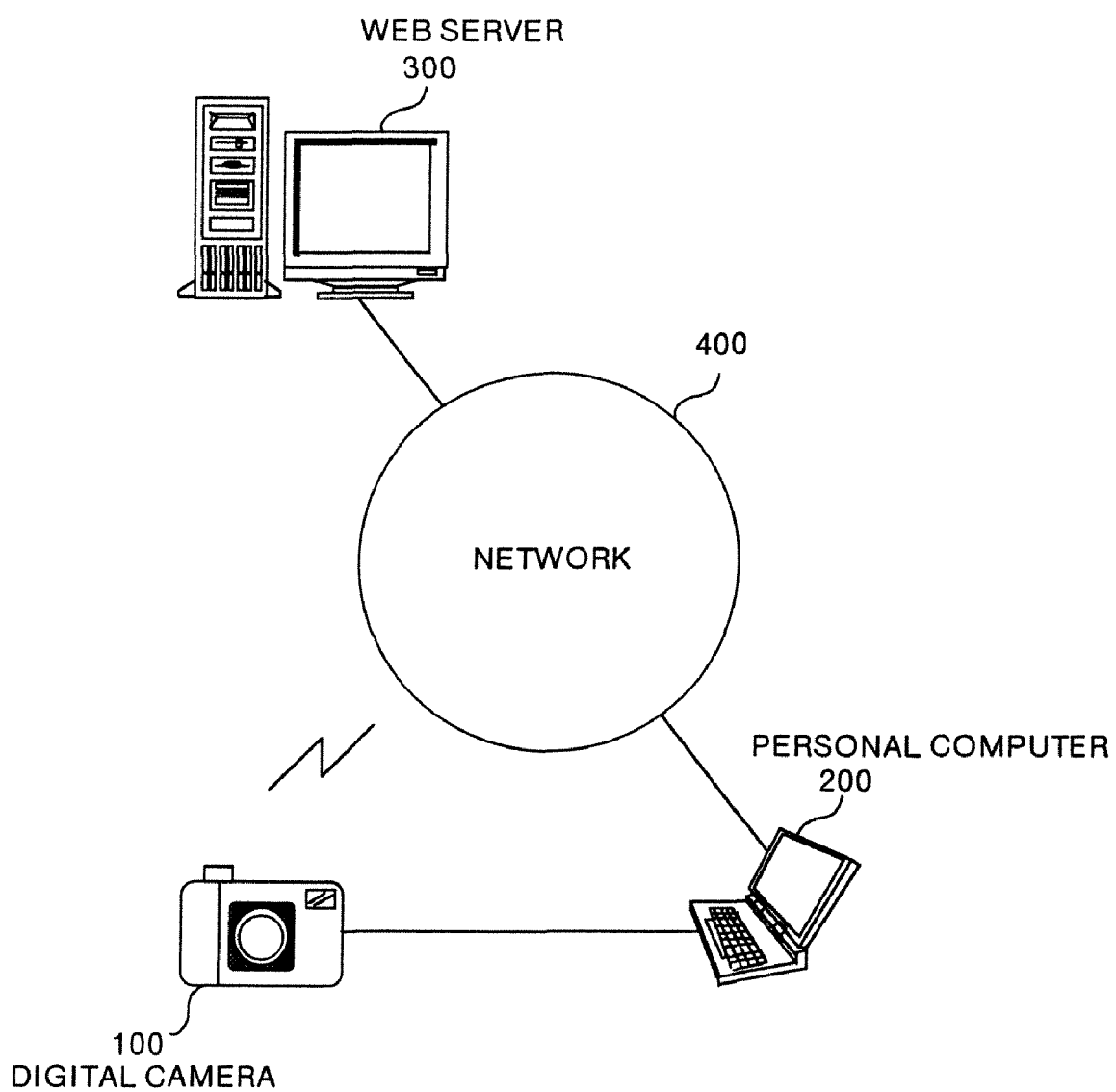
FIG. 1 shows an example of schematic structure of a digital camera system according to an embodiment of this invention.

FIG. 1 shows an example of schematic structure of the digital camera system according to this embodiment. Legend 100 represents the digital camera (image input apparatus), legend 200 represents the personal computer, and legend 300 represents the Web server. The digital camera 100 is connected to the personal computer 200 directly or through a network 400. The digital camera 100 is also connected to the Web server 300 through the network (e.g., the Internet) 400.

In the personal computer 200, an image capture guide list is created, and this list is transferred to the digital camera 100 as an image capture guide list file. In the digital camera 100, shooting is performed by using the image capture guide list file. The digital camera 100 transfers a recorded image to the personal computer 200, or uploads the image to the Web server 300. The digital camera 100 downloads an image capture guide list file on a home page of the Web server 300, and shooting is perform using this image capture guide list file.

The outline of the basic operations of the digital camera system will be explained with reference to FIG. 2, FIG. 3A and FIG. 3B. FIG. 2 shows a flow chart for explaining the outline of the basic operations of the digital camera system. FIG. 3A and FIG. 3B show examples of an item list. In FIG. 2, in the personal computer 200, a user creates an item list of desired pictures (step S1). FIG. 3A shows the specific example of the item list. This item list consists of items such as Item name, Price, and Picture. The user selects the scope of items to be written out as image titles in an image capture guide list from the item list, and sets a title and a file name of this image capture guide list to create an image capture guide list file on the personal computer 200 (step S2). For example, of the item list in FIG. 3A, the user selects the cells of the items B3 to B15 ("Bag" to "Personal organizer") as the scope of the items to be written out as image titles in an image capture guide list. That is, these image titles indicate the titles as targets to be recorded in the digital camera. The user enters "Item catalog", for example, as a title of the image capture guide list, and further enters "Exlist", for example, as a file name of this image capture guide list to create an image capture guide list file. In other words, this file has "Exlist" as the file name of the image capture guide list, "Item catalog" as the title of the image capture guide list, and "Bag" to "Personal organizer" as the image titles. The personal computer 200 then transfers this image capture guide list file to the digital camera 100 (step S3).

The digital camera 100 receives the image capture guide list file from the personal computer 200 (step S4). Shooting is performed for each image title with the digital camera 100 while viewing the image titles in the image capture guide list on an LCD monitor of the display part (step S5). The digital camera 100 registers the taken pictures in the image capture guide list file and transfers this guide list file of the taken pictures to the personal computer 200 (step S6). The personal computer 200 receives this guide list file of the taken pictures (step S7). In the selected scope, the scope in which these pictures are to be pasted is selected from the item list, and these pictures are automatically pasted (step S8). In the item list in FIG. 3A, for example, when the user selects D2 to D15 as the scope in which the pictures are to be pasted on the personal computer 200, these pictures are automatically pasted on D2 to D15 as shown in FIG. 3B.

The personal computer 200 stores the image capture guide list file in a memory card inserted into its card slot part. In the digital camera 100, on the other hand, this memory card with the image capture guide list file recorded is inserted into a card slot part of its own, so that the image capture guide list file can be read out.

Figure 4:
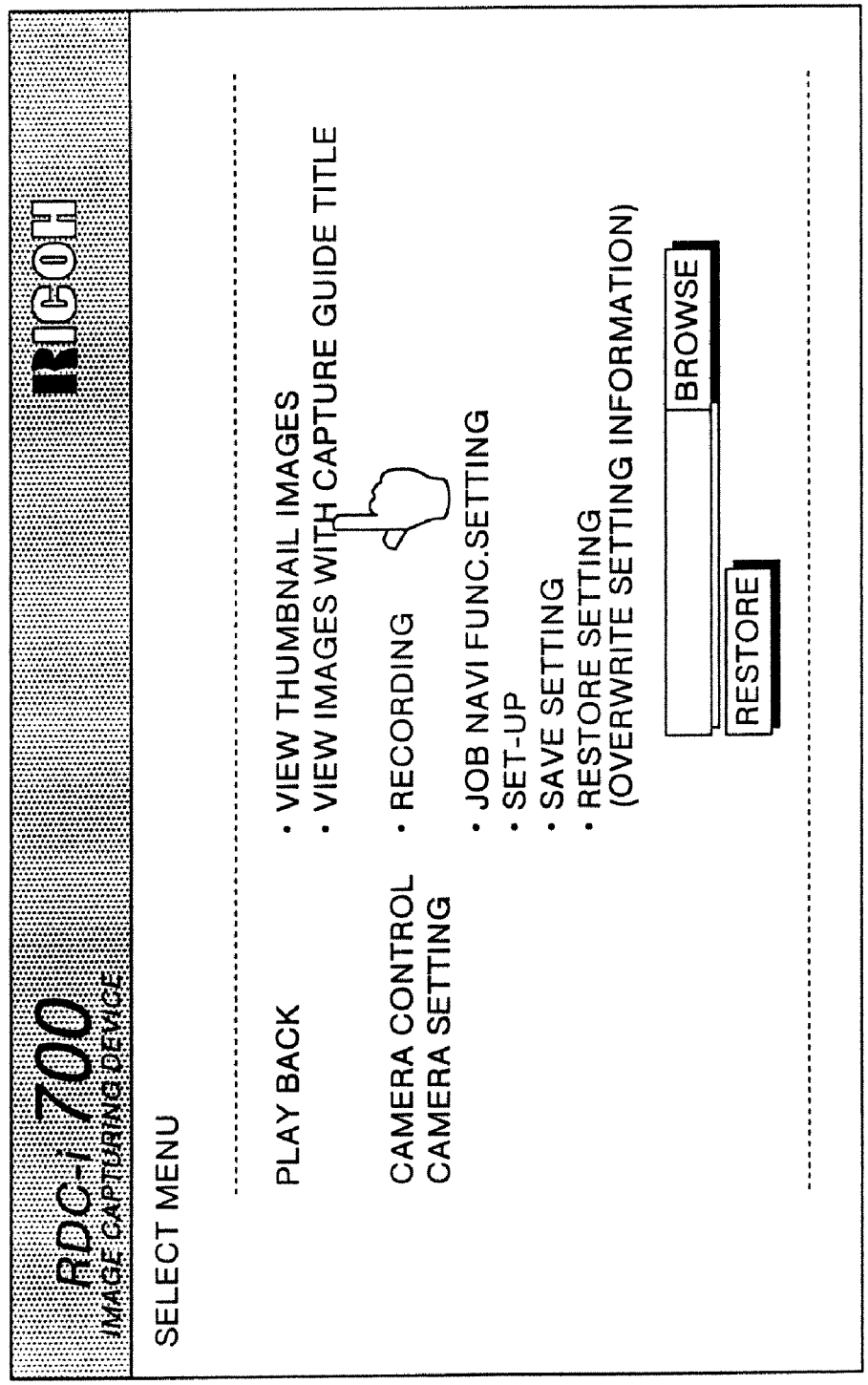
FIG. 4 shows another example of the item list.

In the personal computer 200, it is possible to create an image capture guide list file on the home page of the digital camera 100 and register this guide list file to the digital camera 100. Further, the personal computer 200 can download the image capture guide list file, in which the taken pictures have been registered, from the digital camera's home page. FIG. 4 shows an example of the front screen of this home page of the digital camera 100.

The digital camera 100 can also input the image capture guide list file by being downloaded through the home page in the Web server, or receive the image capture guide list file attached to e-mail from equipment connected to the digital camera 100 directly or through the network 400.

Configuration of the Digital Camera According to this Embodiment

Figure 5:
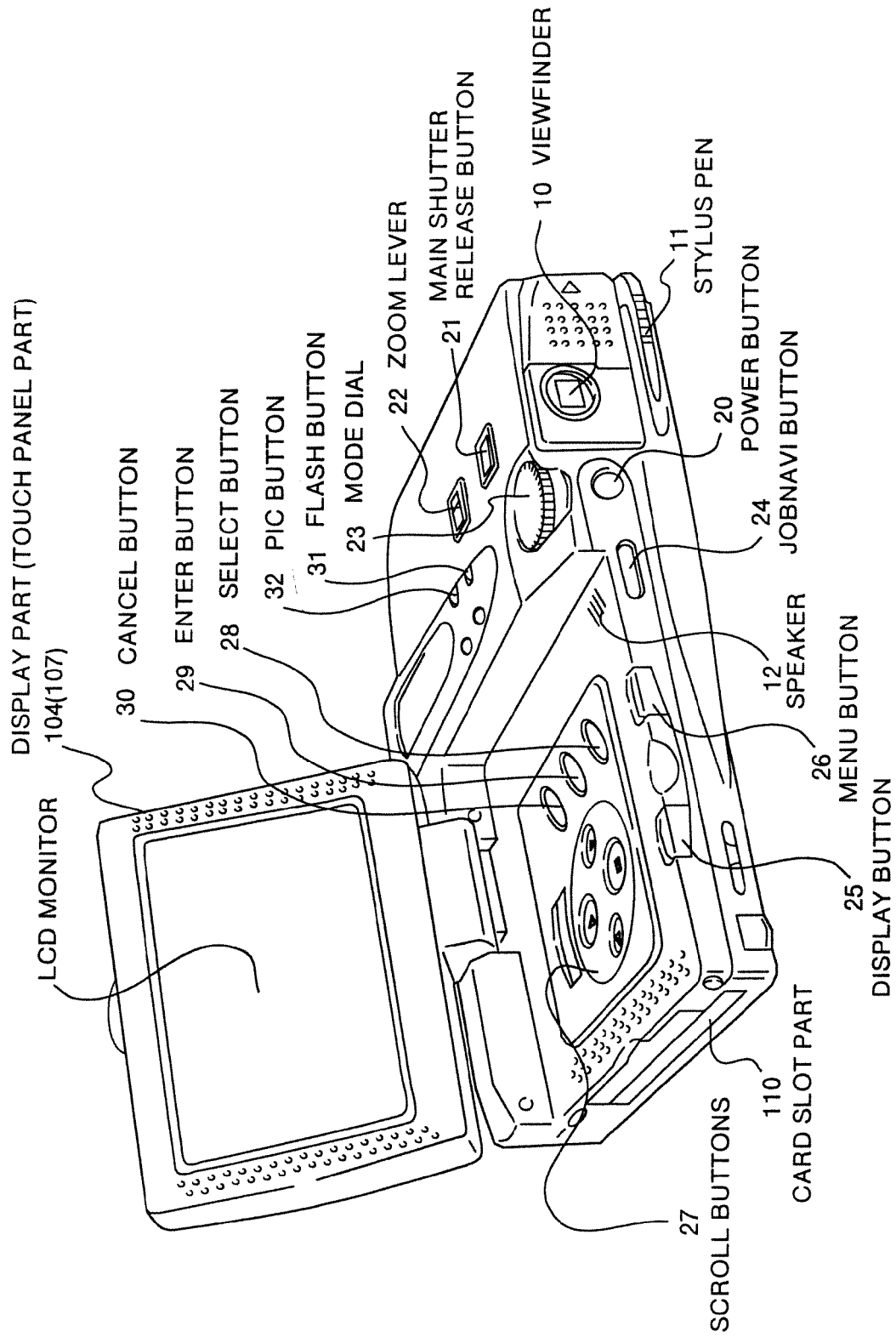
FIG. 5 shows an external structure of the digital camera in FIG. 1.

FIG. 5 shows the external structure of the digital camera. This digital camera has a rotatable display section 104, which can be rotated at an angle of 360 degrees. Legend 10 represents a viewfinder, legend 11 a stylus pen, legend 12 a speaker, and legend 110 the card slot part. Legend 20 represents a power button, legend 21 a main shutter release button through which a shooting (recording) instruction is given to the camera, and legend 22 a zoom lever with which a magnification of a zoom lens is set. Legend 23 represents a mode dial used for selecting a mode, legend 24 a JOBNABI [J] button used for selecting an image capture guide list, and legend 25 a DISPLAY button. Legend 26 represents a MENU button, legend 27 scroll buttons, legend 28 a SELECT button, and legend 29 an ENTER button. Legend 30 represents a CANCEL button, legend 31 a flash button, and legend 32 a PIC button used for setting the quality of shooting. Further, a lens and a microphone, not shown, are provided on the rear side of the digital camera shown in FIG. 5.

The mode dial 23 is used for selecting any of the modes as follows. (1) SETUP mode used for changing and verifying camera settings. (2) Motion picture mode used for recording motion pictures. (3) Continuous shooting mode used for performing continuous shooting while the shutter release button 21 is pressed. (4) Text mode used for shooting text, and recording in black and white by eliminating gradations. (5) Voice memo mode used for recording sound. (6) Play mode used for playing back recorded files. (7) PC mode used for connecting the camera to a PC, transmitting files from the camera to the PC, and operating the camera from the PC. (8) Communication mode used for transmitting recorded images and using Internet functions.

Figure 6:
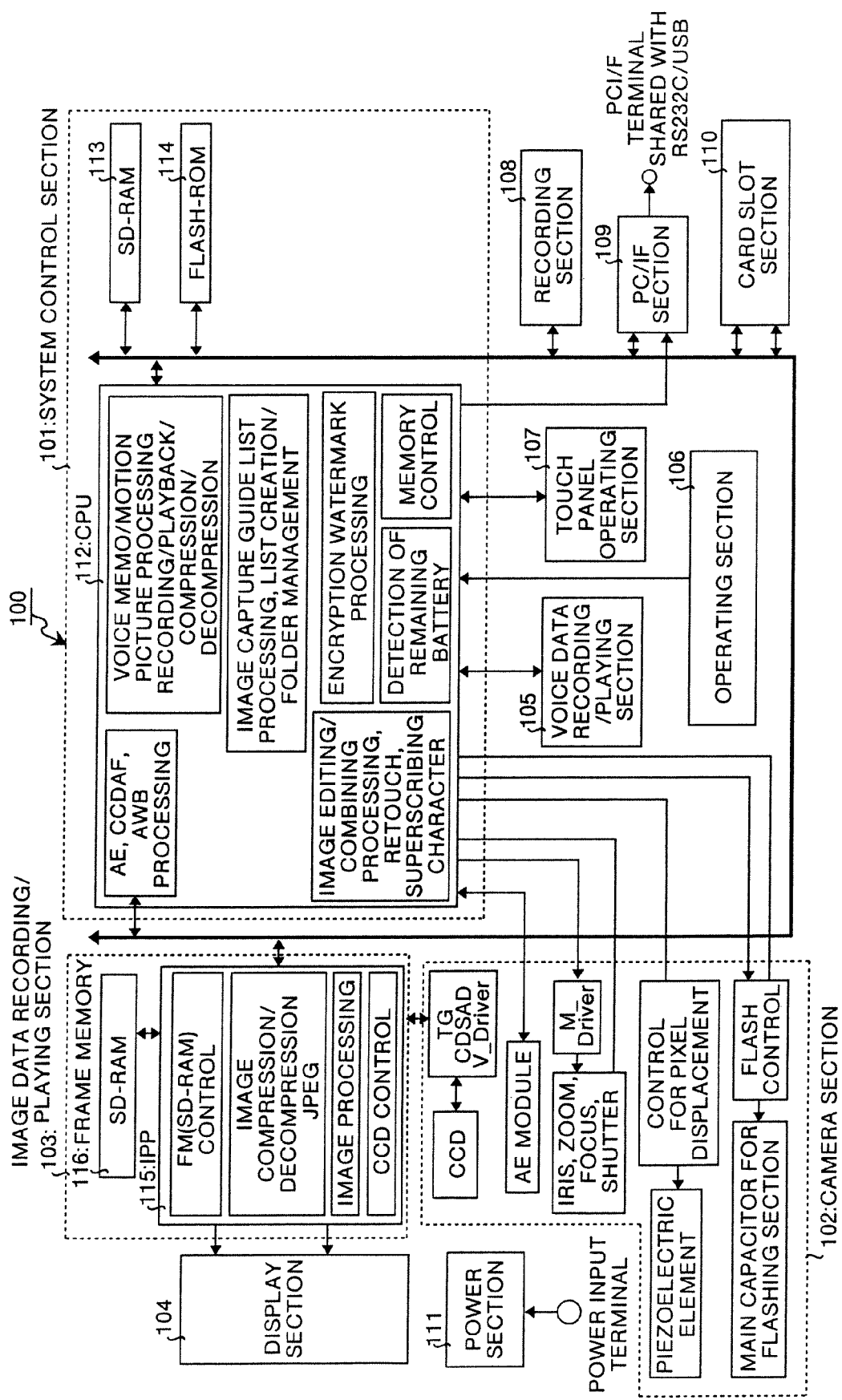
FIG. 6 is a block diagram showing the configuration of the digital camera in FIG. 1.

The block diagram in FIG. 6 shows the configuration of the digital camera 100. Legend 100 represents the digital camera. The digital camera 100 comprises a system control section 101 that controls the overall digital camera, a camera section 102 that shoots a subject and outputs image data, and an image data recording/playing section 103 that performs image processing on the image data output from the camera section 102. The digital camera 100 also comprises a display section 104 that displays image data and the like, and a voice data recording/playing section 105 that records and plays back voice data. The digital camera 100 further comprises an operating section 106 and a touch panel operating section 107 through which the user gives an operating instruction to the digital camera, a recording section 108 that records various types of image data or the like, a PC/IF section 109, the card slot section 110, and a power section 111.

The camera section 102 is provided for shooting a subject and outputting image data for the subject. This camera section 102 comprises lenses, such as zoom lens and focus lens, that form an image of a subject, a shutter, an iris, a motor to drive these lenses, shutter and iris, and a motor driver to drive the motor. The camera section 102 also comprises a CCD that converts the formed image of the subject to electric signals (analog image data), a CCD driving circuit that drives the CCD, a CDS circuit that reduces noise of the image data output from the CCD, and an A-to-D converter that converts the analog image data output from the CCD to digital signals, that is, digital image data.

The image data recording/playing section 103 consists of an IPP 115 and a frame memory 116. This section 103 controls the CCD driving circuit of the camera section 102 to adjust CCD driving timings, controls the lens driving motor to perform focusing and exposure adjustment, and performs signal processing so as to compress and decompress image signals and display the image signals on the LCD of the display section 104. This section 103 also produces various graphical images for a user interface, and displays the images on the LCD of the display section 104. The display section 104 has the LCD, which displays images or graphics for the user interface.

The recording section 108 records image data, thumbnail image data, e-mail data, written data freehand, voice data, and some other data. The PC/IF section 109 is an interface, such as RS232 or USB, through which data communications are performed with an external device such as a PC. The card slot section 110 is an adapter used for inserting a PC card based on PCMCIA into the slot. The PC card includes a communication card with which wireless or wired data communications are performed and a memory card or the like, which is inserted into the card slot section 110.

The operating section 106 is a part through which user gives an operating instruction to the digital camera. The operating section 106 comprises the operating buttons shown in FIG. 5: power button 20, shutter release button 21, zoom lever 22, JOBNABI button 24, DISPLAY button 25, MENU button 26, scroll buttons 27, SELECT button 28, ENTER button 29, CANCEL button 30, flash button 31, the PIC button 32. The operating section 106 also comprises the mode dial 23, and a button control section that detects the status of any of the operating buttons and of the mode dial 23 to notify of the status to the system control section 101.

The touch panel operating section 107 comprises a touch panel section adhered to the LCD of the display section 104, and a panel control section that notifies a CPU 112 of input from the touch panel section.

The voice data recording/playing section 105 has a microphone, an amplifier, an A-to-D converter, a D-to-A converter, or the like. This section 105 performs A-D conversion on sound input through the microphone and outputs it to the system control section 101 as voice data. This section 105 also performs D-A conversion on the voice data input from the system control section 101 and output the data from the speaker.

The system control section 101 is a unit that controls the overall digital camera. This section 101 comprises the CPU 112 that provides various controls on the digital camera using an SD-RAM 113 as a work area according to the program stored in a FLASH-ROM 114. This section 101 also comprises the FLASH-ROM 114 that stores the control program, fonts, and icons, or the like, and the SD-RAM 113 used as a work area for the CPU 112. The system control section 101 performs memory control and controls on data communications. More specifically, the system control section 101 controls AE/AF/AWB processing, image editing/combining processing such as retouch and superscribing characters, processing for image capture guide lists such as creation of these lists or management of folders, encryption/electronic watermark processing, and display of the display section 104. The system control section 101 has modes: SETUP mode, Still picture mode, Motion picture mode, Continuous shooting mode, Text mode, Image capture guide list mode, Image capture guide list shooting mode, Voice memo mode, Play mode, PC mode, and Communication mode. The system control section 101 controls execution of these modes.

The digital camera 100 can record still pictures, motion pictures, voice memos, and binary images. Further, the digital camera 100 has a function of transmitting and receiving e-mails, an Web browsing function, an auto HTML creating function, and a home page server function. These functions are performed through execution of the program stored in the FLASH-ROM 114 by the CPU 112. The system control section 101 has the image capture guide list mode in which an image capture guide list is used to perform shooting. This image capture guide list mode has a mode holding function. The mode holding function stores mode information in the SD-RAM 113. Therefore, if the mode is switched to another mode or if the power is turned off during execution of the operation in the image capture guide list mode, the suspended operation can be restarted in the previously selected image capture guide list mode. With the digital camera 100, an image capture guide list file can be created on it, and this created image capture guide list is recorded in the recording section 108.

The screen of the display section 104 for each of the following modes will be explained below: (1) Image capture guide list mode, (2) Communication mode, and (3) Memo input mode.

(1) Image Capture Guide List Mode

Figure 7A:
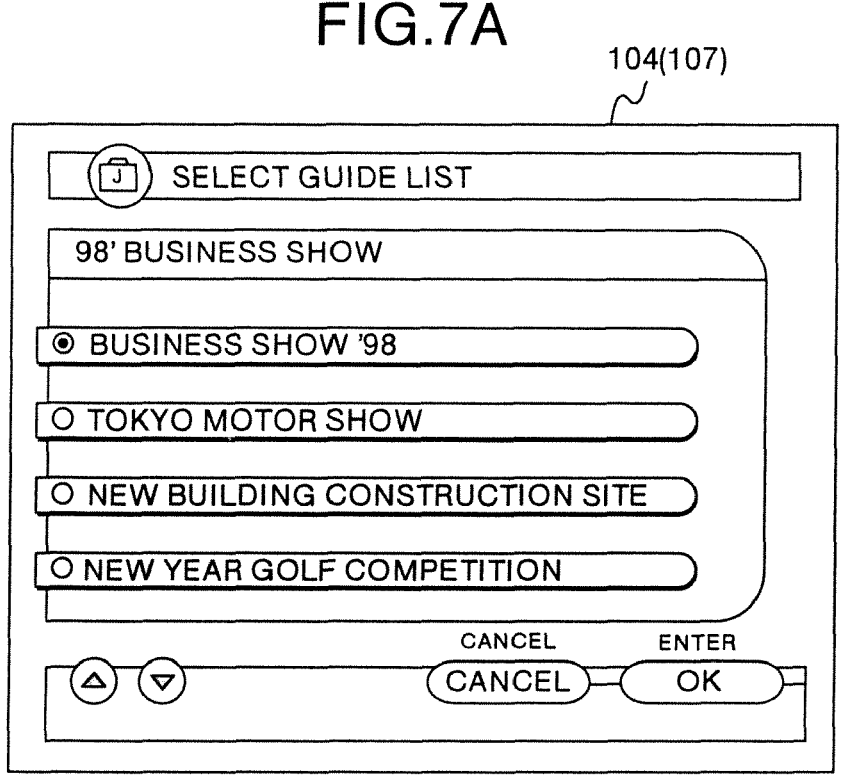
FIG. 7A and FIG. 7B show display examples of the screen for the image capture guide list mode.
Figure 7B:
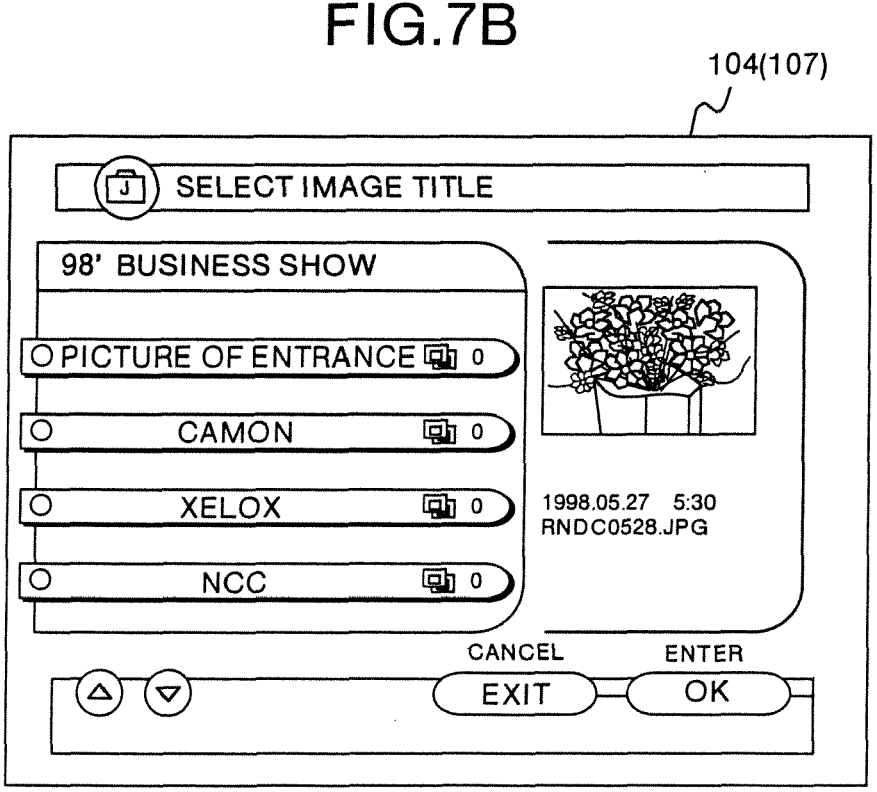

The display example of the image capture guide list mode on the display section 104 will be explained with reference to FIG. 7A and FIG. 7B. When the JOBNABI button 24 on the operating section 106 is pressed, the mode is switched to the image capture guide list mode, and a list of image capture guide lists, that is, titles of these guide lists in the image capture guide list file recorded in the recording section 108 is displayed on the display section 104. FIG. 7A shows the display example of the image capture guide list titles in list form on the display section 104. One of these image capture guide lists is selected here through operation of the operating section 106 such as the scroll buttons and the SELECT button, or through operation of the touch panel operating section 107 with the stylus pen by an operator. When one of these image capture guide lists is selected, a list of the image titles in the selected image capture guide list is displayed on the display section 104. FIG. 7B shows a display example of the list of the image titles in the image capture guide list of "Business Show '98", which has been selected on the screen shown in FIG. 7A. Further, the operator selects one of these image titles through operation of the operating section 106 or of the touch panel operating section 107. The mode is then switched to the image capture guide list shooting mode (recording mode) to be ready to shoot. This image capture guide list shooting mode indicates a state in which shooting in the image capture guide list mode is ready to be performed. In the digital camera 100, a folder is created for each image capture guide list, so that the files of images recorded according to the same image capture guide list are stored in the same folder (see FIG. 55).

(2) Communication Mode

Figure 8:
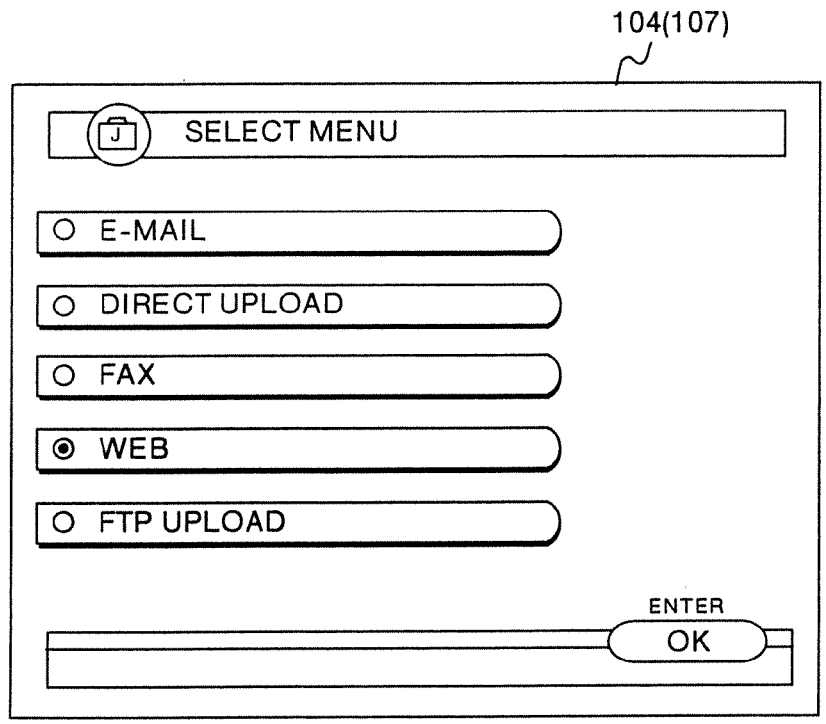
FIG. 8 shows a display example of the screen for the communication mode.
Figure 9:
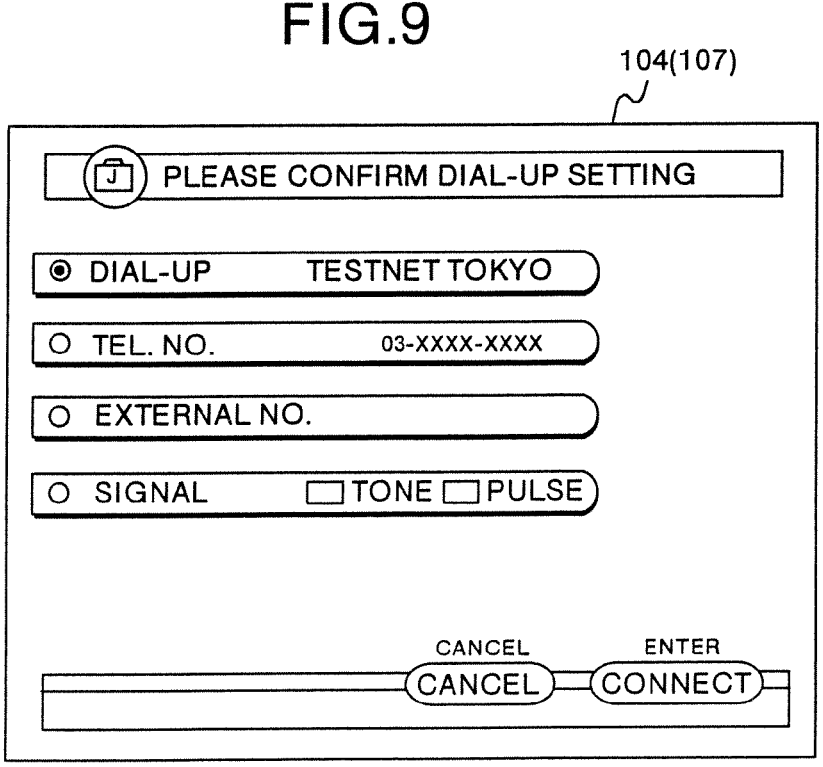
FIG. 9 shows another display example of the screen for the communication mode.

The display example of the communication mode on the display section 104 will be explained with reference to FIG. 8 and FIG. 9. When the communication mode is selected through operation of the mode dial on the operating section 106, the mode is switched to the communication mode, and the initial selection screen for the communication mode shown in FIG. 8 appears on the display section 104. Any of an e-mail mode, a direct uploading mode, a FAX mode, a WEB mode, an FTP upload mode is selected on this initial selection screen. When the WEB mode is selected, the mode is switched to the WEB mode, and a setting/verifying screen for connection information shown in FIG. 9 is displayed. Setting and verification of the connection information are performed on this setting/verifying screen for the connection information. When "CONNECT" is selected, a connection to the Internet is established, and the browser screen is displayed.

(3) Memo Input Mode

Figure 10:
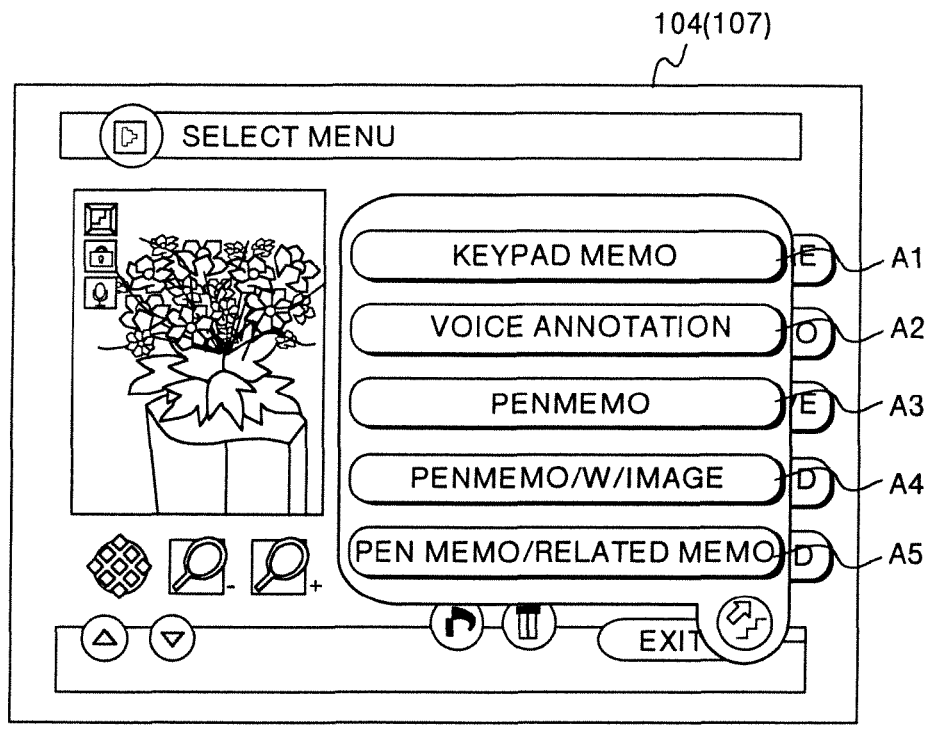
FIG. 10 shows a display example of the screen for the memo input mode.
Figure 11:
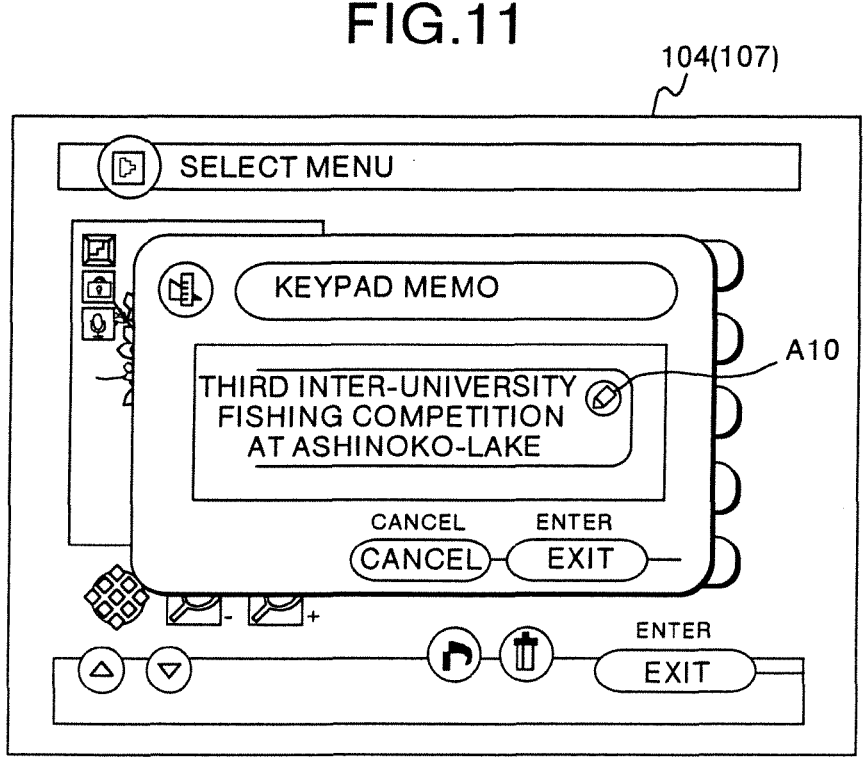
FIG. 11 shows another display example of the screen for the memo input mode.
Figure 12:
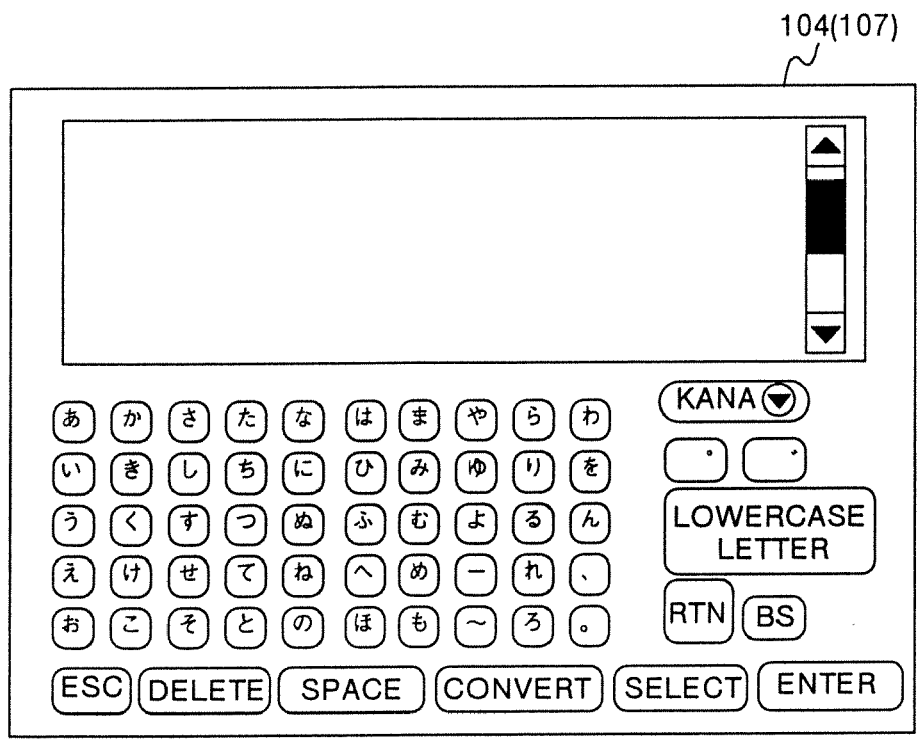
FIG. 12 shows another display example of the screen for the memo input mode.

The display example of the memo input mode on the display section 104 will be explained with reference to FIG. 10 to FIG. 18. Memo information that can be input includes text information such as text file and freehand characters, and voice memo information. By selecting the memo input mode through operation of the touch panel operating section 107 with the stylus pen on an image playback screen of the play mode, for example, the memo input selection screen as shown in FIG. 10 is displayed. A message and menu items of the memo input mode explained below are displayed on the input memo selection screen as shown in FIG. 10. This message is "Select editing operation", "Select MENU" on the actual screen, which prompts the user to select any of the menu items of the memo input mode. The menu items are "Keypad memo A1" indicating text memo created using an on-screen keypad, "Voice annotation A2" indicating a voice memo, "Pen memo A3" indicating a memo written in freehand, "Pen memo/image A4" indicating the pen memo in combination with the image, and "Pen-memo/related memo A5" indicating the pen memo as a related memo to the image. When "Keypad memo A1" is selected on the screen shown in FIG. 10, the keypad memo screen as shown in FIG. 11 appears. When a tap A10 is selected on the keypad memo screen, the on-screen keypad as shown in FIG. 12 is displayed. The user enters text through the on-screen keypad. The system control section 101 records this entered text in the recording section 108 as a memo file.

Figure 13:
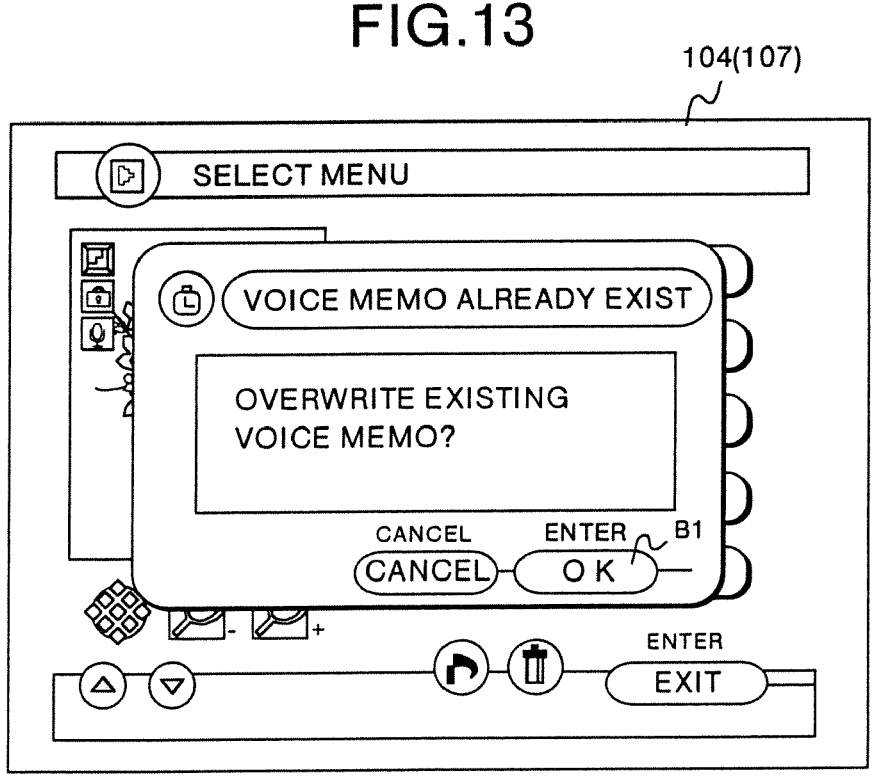
FIG. 13 shows another display example of the screen for the memo input mode.
Figure 14:
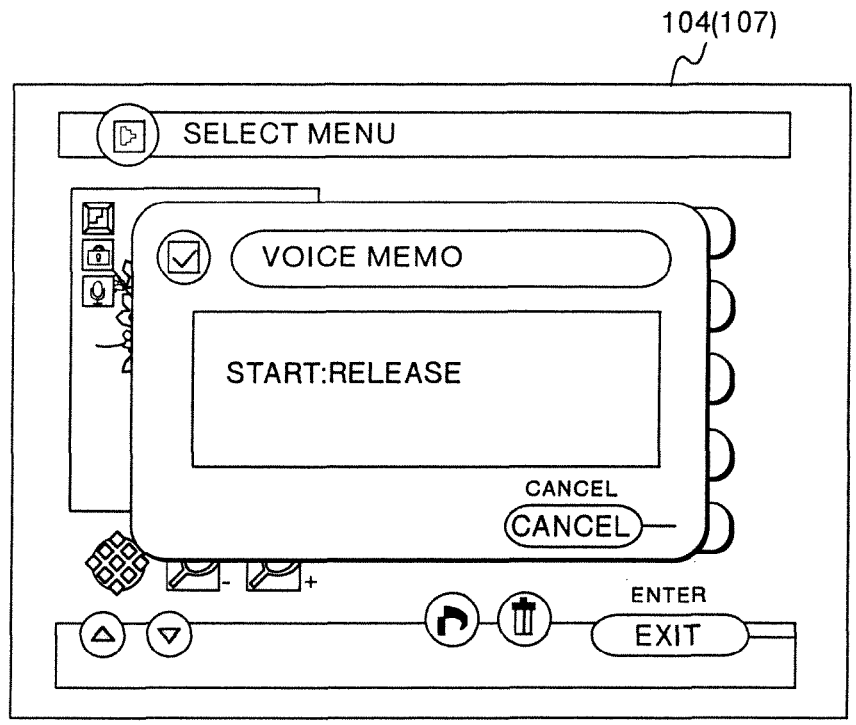
FIG. 14 shows another display example of the screen for the memo input mode.
Figure 15:
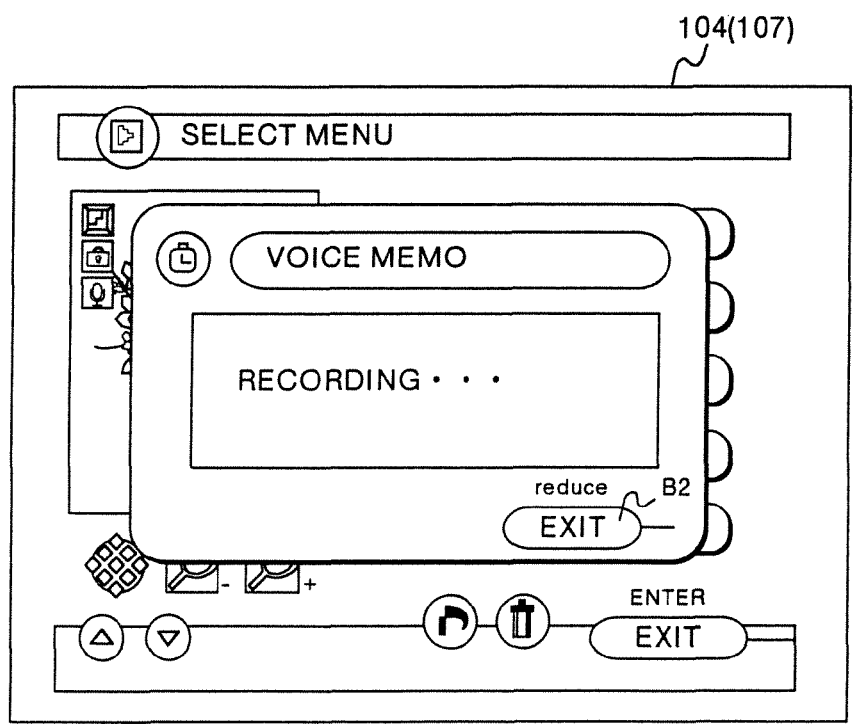
FIG. 15 shows another display example of the screen for the memo input mode.
Figure 16:
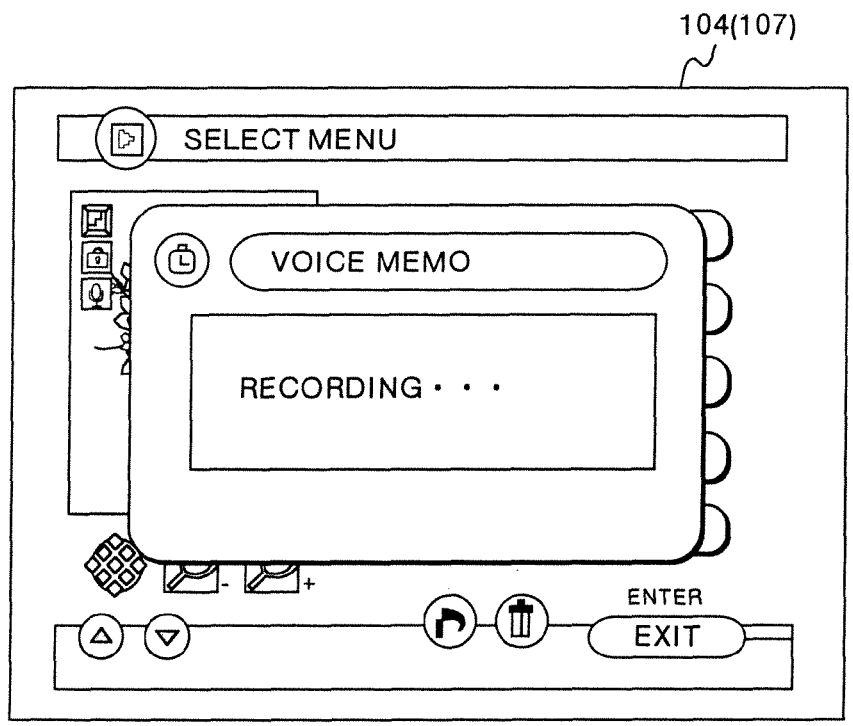
FIG. 16 shows another display example of the screen for the memo input mode.

When "Voice annotation A2" is selected on the memo input selection screen shown in FIG. 10, the screen for recording a voice memo as shown in FIG. 13 is displayed. When "OK B1" is selected on the voice memo recording screen, the screen of the message to prompt the user to record a voice memo as shown in FIG. 14 is displayed. When the shutter release button 21 is pressed, the "Recording" message as shown in FIG. 15 appears on the screen. The user records a voice memo while pressing the shutter release button 21. When "EXIT B2" is selected on the screen in FIG. 15, the voice memo recording is finished, and the screen as shown in FIG. 16 is displayed. The system control section 101 records the input voice memo in the recording section 108 as a voice memo file while displaying this screen.

Figure 17:
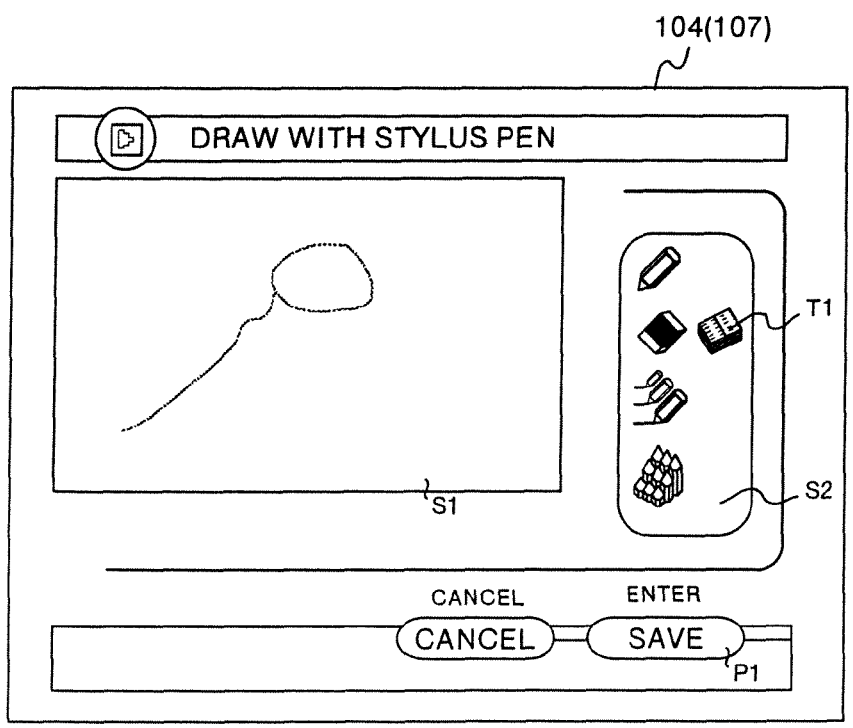
FIG. 17 shows another display example of the screen for the memo input mode.
Figure 18:
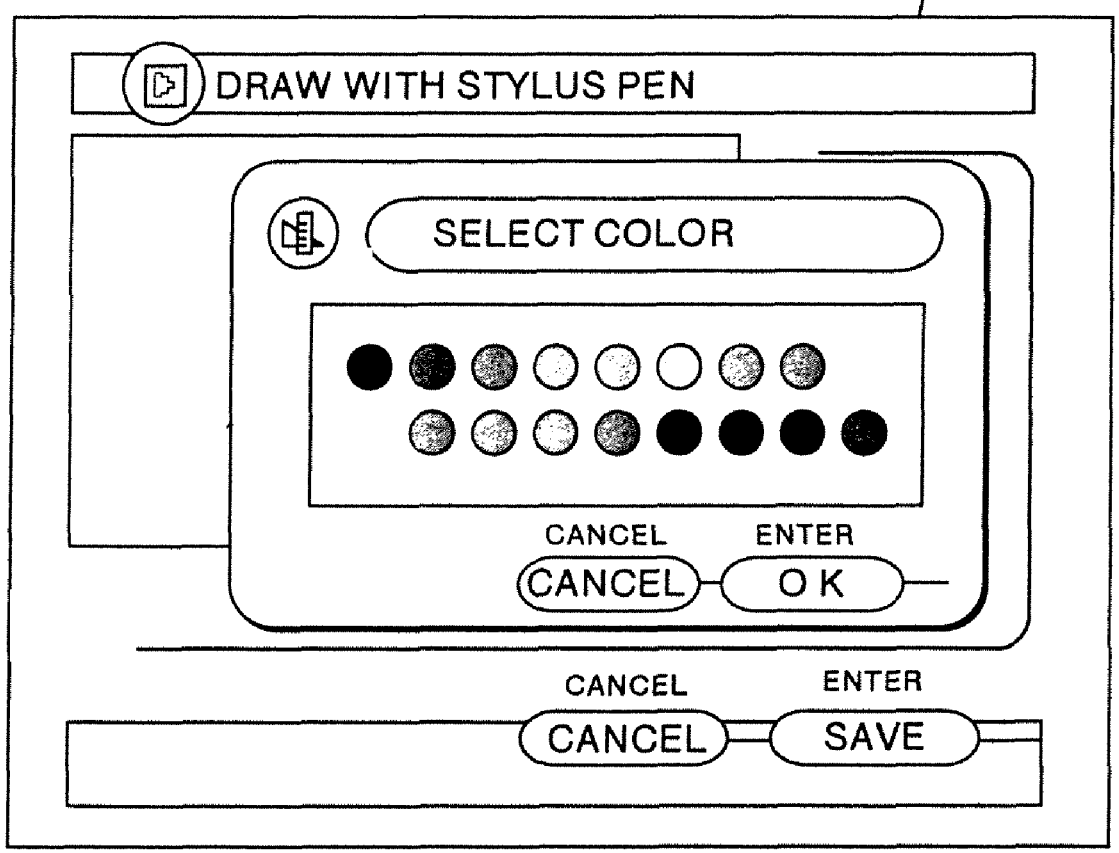
FIG. 18 shows another display example of the screen for the memo input mode.

When "Pen memo A3" is selected on the memo input selection screen as shown in FIG. 10, the screen for editing only a pen memo as shown in FIG. 17 is displayed. The user selects a tool from a tool selection area S2 on the screen only for the pen memo, and enters a freehand character within a drawing area S1 using the selected tool. When a palette tool is selected from the tool selection area S2, a color palette is displayed on the screen as shown in FIG. 18, and the user selects a desired color. Accordingly, any color for the pen memo can be selected. When "Save P1" is selected on the screen in FIG. 17 or FIG. 18, the system control section 101 records this entered pen memo in the recording section 108 as a memo file.

The outline of the basic operations of shooting with the digital camera 100 will be explained below. In the camera section 102, the subject image formed on the CCD through the lens is converted to image data, that is, electric signals, noise is removed therefrom in the CDS circuit, and the image data is converted to digital image data in the A-to-D converter. This digital image data is input to the IPP 115, is stored in the frame memory (SD-RAM) 116. Further, this digital image data is subjected to image processing such as white balance adjustment, aperture correction, and gradation correction, and data compression by the IPP 115 to be written in the frame memory (SD-RAM) 116. The data written in the frame memory (SD-RAM) 116 is recorded in the recording section 108 by the CPU 112 in a predetermined file format, such as the EXIF format.

The outline of the operation when home pages in the Web server are browsed through the digital camera 100 will be explained below. The WEB mode is first selected through operation of the operating section 106 and the touch panel operating section 107, and the predetermined operation is executed. The CPU 112 then writes Web information, which is downloaded from the Web server through the communication card in the card slot section 110 over the network 400, in the frame memory 116 as display data. The display data written in the frame memory 116 is displayed on the display section 104 by the IPP 115. When the shutter release button 21 on the operating section 106 is pressed, the IPP 115 compresses the display data in the frame memory 116, and the CPU 112 writes the data in the recording section 108 in a file format for shot data, such as the EXIF format. When input of the zoom lever 22 through the operating section 106 is detected, the CPU 112 performs enlargement or reduction on the display data in the frame memory 116. In association with this performance, the display on the display section 104 is changed, that is, enlarged or reduced (see FIG. 66 to FIG. 68).

Configuration of the Personal Computer According to this Embodiment

Figure 19:
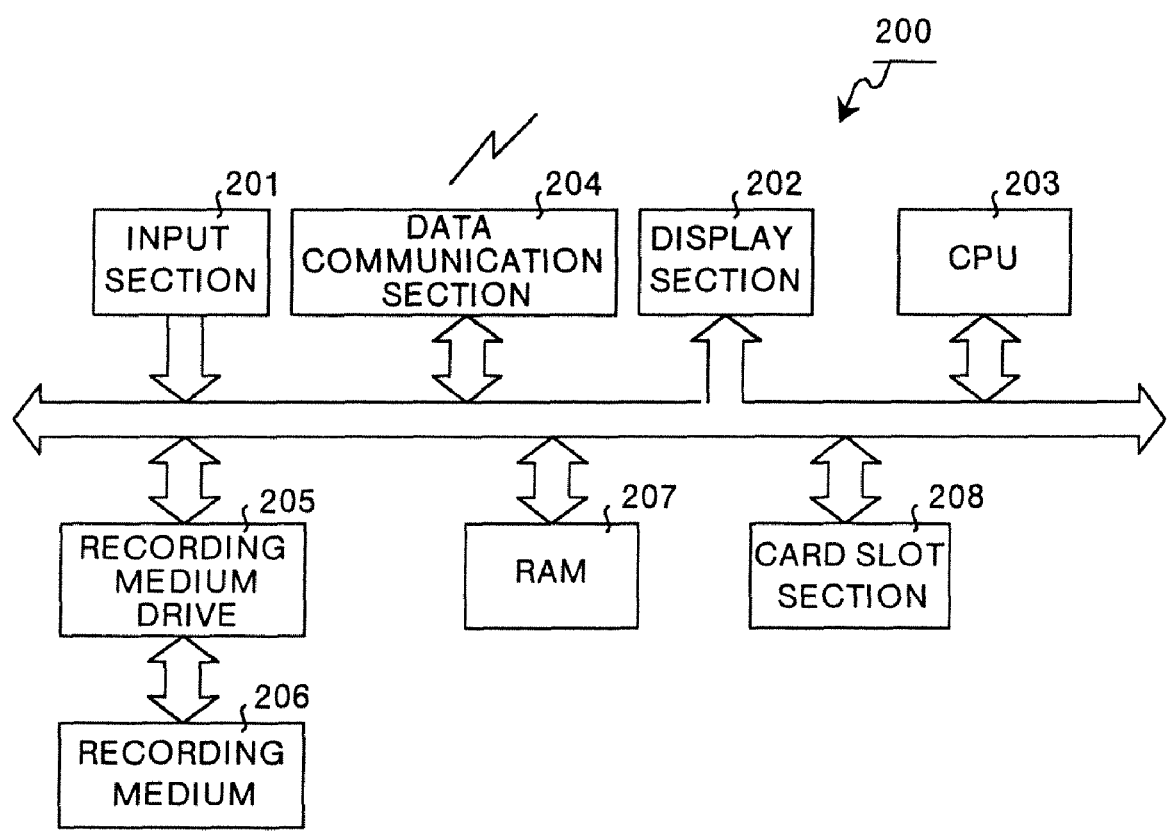
FIG. 19 is a block diagram showing the configuration of the personal computer shown in FIG. 1.

FIG. 19 shows the personal computer 200 in FIG. 1. The personal computer 200 comprises an input section 201 that gives an operating instruction to the personal computer 200, a display section 202, a CPU 203 that controls the overall device, and a data communication section 204 through which data communication is performed with an external device. The personal computer 200 also comprises a recording medium drive 205 that reads/writes data from/in a recording medium 206, the recording medium 206 that stores a program to operate the CPU 203, and RAM 207 used as a work area of the CPU 203. These sections are connected to one another through buses.

The input section 201 comprises a keyboard with cursor keys, a numeric keypad and function keys, a mouse, and a scanner that scans images. This input section 201 is not always required to locally connect to the personal computer 200. A remote device such as a PHS or a remote terminal (personal digital assistant) may be used as an input unit. Any other device, through which data communication can be bi-directionally performed with the personal computer 200, may also be used as an input unit. The input section 201 is a user interface through which the user gives operation commands to the CPU 203 so as to operate. Further, the input section 201 is not limited to the above-featured input section, but a touch panel, a track ball, or a voice recognition mechanism may be used instead.

The display section 202 is structured with a CRT (Cathode Ray Tube), an LCD (Liquid Crystal Display), or a plasma display, and displays data based on the display data input from the CPU 203.

The CPU 203 comprises a 32-bit microprocessor, another microprocessor, a digital signal processor (DSP), and a programmable logic. The CPU 203 is not always a single processor, and may be any type that performs decentralized data processing. The CPU 203 is a central control unit that controls the entire device according to the program stored in the recording medium 206. The CPU 203 is connected by the input section 201, the display section 202, the data communication section 204, the recording medium drive 205, and the RAM 207. The CPU 203 controls data communications, reading out an application program through accessing to the memory, read/write of various types of data from/in the memory, input of data and command, and color display.

The data communication section 204 is connected to a network such as a telephone line, an ISDN (Integrated Service Digital Network), a LAN (Local Area Network), or a WAN (Wide Area Network). The data communication section 204 performs data communications through its built-in modem (not shown) over the telephone line. The data communication section 204 has an RS232C interface or an IrDA interface, and performs data communications with an external device such as a digital camera by means of cable (wired) through the RS232C interface, or by means of infrared rays (wireless) through the IrDA interface.

The recording medium 206 stores an OS program that is executable by the CPU 203 such as WINDOWS, various types of programs and data such as application programs. One of the application programs is a program for the digital camera used for creation of the image capture guide list for the digital camera, or the like. The recording medium 206 also stores a model table in which available functions for each model of digital cameras are registered. More specifically, this model table has functions that can be used by each model, that is, model ability information registered in correlation with each model code. FIG. 90 shows an example of the model table. The model table has model ability information for each item in each model code (i700, i800, i900). The recording medium 206 includes optical, magnetic, and electric ones such as a floppy disk, a hard disk, a CD-ROM, a DVD-ROM, an MO, and a PC card. The various types of programs are stored in the recording medium 206 in the form of object code or source code so that the CPU 203 can directly or indirectly interpret. The programs stored in the recording medium 206 can be distributed through the network.

The RAM 207 has a work memory that stores the specified program, the input instruction, the input data and the results of processing, and a display memory that temporarily stores display data to be displayed on the screen of the display section 202. A card slot section 208 is an adapter used for inserting a PC card or the like based on PCMCIA into the slot. The memory card as the PC card is inserted into the card slot section 208.

The program for the digital camera stored in the recording medium 206 is started up by the personal computer 200, an image capture guide list file is created, and the created image capture guide list file is transferred to the digital camera 100.

EXAMPLES OF THE RECORDING OPERATION IN THE DIGITAL CAMERA ACCORDING TO THIS EMBODIMENT

A first example to a ninth example of the recording operation in the digital camera will be explained below.

First Example

Figure 20:
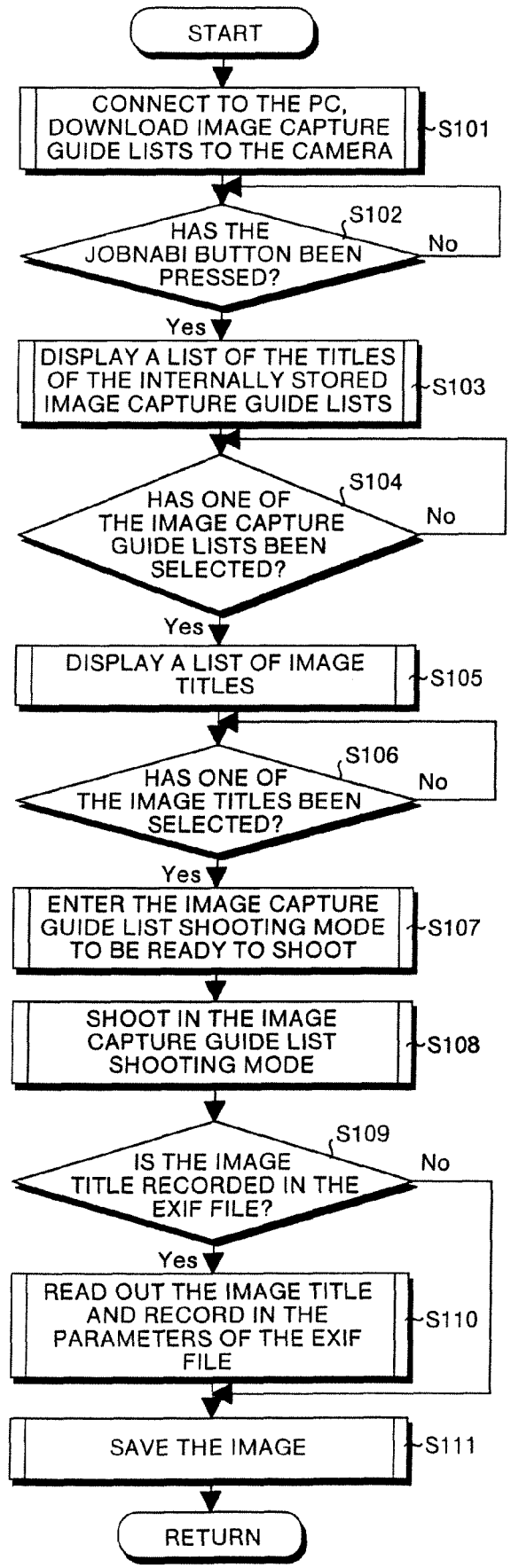
FIG. 20 is a flow chart for explaining a first example of recording operation in the digital camera.
Figures 21, 22:
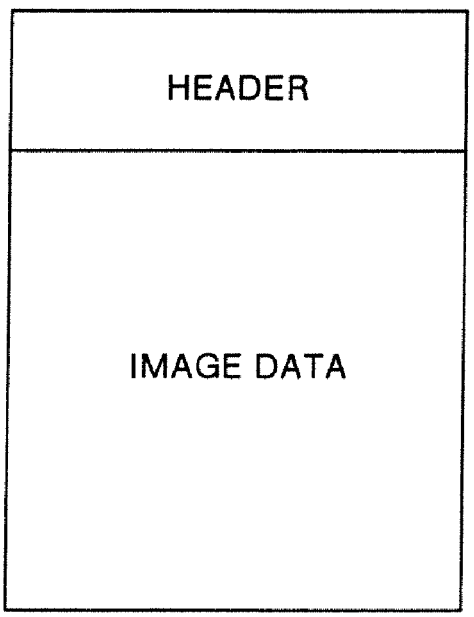
FIG. 21 shows an example of an image capture guide list.
FIG. 22 shows an example of the format of an image file.

The first example is explained with reference to FIG. 20 to FIG. 22. FIG. 20 is a flow chart for explaining the first example of the recording operation in the digital camera. FIG. 21 shows an example of the image capture guide list file. FIG. 22 shows an example of the format of an image file. In the first example, the operation in the following case will be explained. This case is such that a list of image titles in an image capture guide list is displayed, and when an image title is selected from the displayed list of image titles, the mode is switched to the image capture guide list shooting mode (recording mode), shooting is executed according to pressing of the shutter release button 21 by the user, and the selected image title is added to the image file of the shot image data obtained through shooting.

In FIG. 20, the digital camera 100 is connected to the personal computer 200 to download image capture guide lists, and stores these lists in the recording section 108 (step S101). FIG. 21 shows an example of the image capture guide list. This image capture guide list has its list title and image titles as targets to be recorded. The system control section 101 determines whether the JOBNABI button 24 on the operating section 106 has been pressed (step S102). When the button 24 has been pressed, the system control section 102 enters the image capture guide list mode, and displays a list of the image capture guide list titles stored in the recording section 108 on the display section 104 (step S103). FIG. 7A shows the display example of the image capture guide list titles in list form on the display section 104. The operator selects one from the list of these list titles through operation of the touch panel operating section 107.

The system control section 101 determines whether one of these list titles has been selected (step S104). When selection has been made, the system control section 101 displays a list of image titles in the selected image capture guide list on the display section 104 (step S105). FIG. 7B shows the display example of the image titles in the image capture guide list of "Business Show '98", which has been selected on the screen shown in FIG. 7A. The operator selects one out of these image titles through operation of the touch panel operating section 107.

The system control section 101 determines whether one of these image titles has been selected (step S106). When selection has been made, the system control section 101 shifts to the image capture guide list shooting mode (recording mode), which allows the camera to be ready to shoot (step S107). The operator selects a subject for the image title to take its picture.

Further, the system control section 101 shoots the subject in response to pressing of the shutter release button 21 on the operating section 106 (step S108). After the shooting, the system control section 101 displays the message to prompt the operator to make a selection of "whether the image title is to be recorded in an EXIF file, that is, an image file of the shot image". The system control section 101 then determines whether the operator has selected "Record the image title in the EXIF file (image file) of the shot image" (step S109). When "Record the image title in the EXIF file of the shot image" has been selected, the system control section 101 adds the image title in the header (parameter) of the EXIF file (image file) (step S110), and stores the shot image data in the recording section 108 as the EXIF file (image file) (step S111).

FIG. 22 shows an example of the format of the EXIF file. The EXIF file has a header area and an image data area, and the image title is recorded in the header.

On the other hand, at step S109, when "Do not record the image title in the EXIF file of the shot image" has been selected, the system control section 101 stores the shot image data in the recording section 108 as the EXIF file (image file) without addition of the image title in parameters (header) of the EXIF file (step S111).

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the first example of the operation, the list of the image titles in the image capture guide list is displayed. When an image title is selected from the displayed image titles, the system control section 101 shifts to the recording mode (image capture guide list shooting mode). When the shutter release button 21 is pressed, shooting is executed, and the selected image title is added in parameters of the image file of the shot image data. Accordingly, using the image capture guide list can prevent the user from forgetting to take required pictures during shooting, and after the shooting, erroneous correspondence between any of the images and any of the image titles can be prevented, thus improving usability for the user.

Second Example

Figure 23:
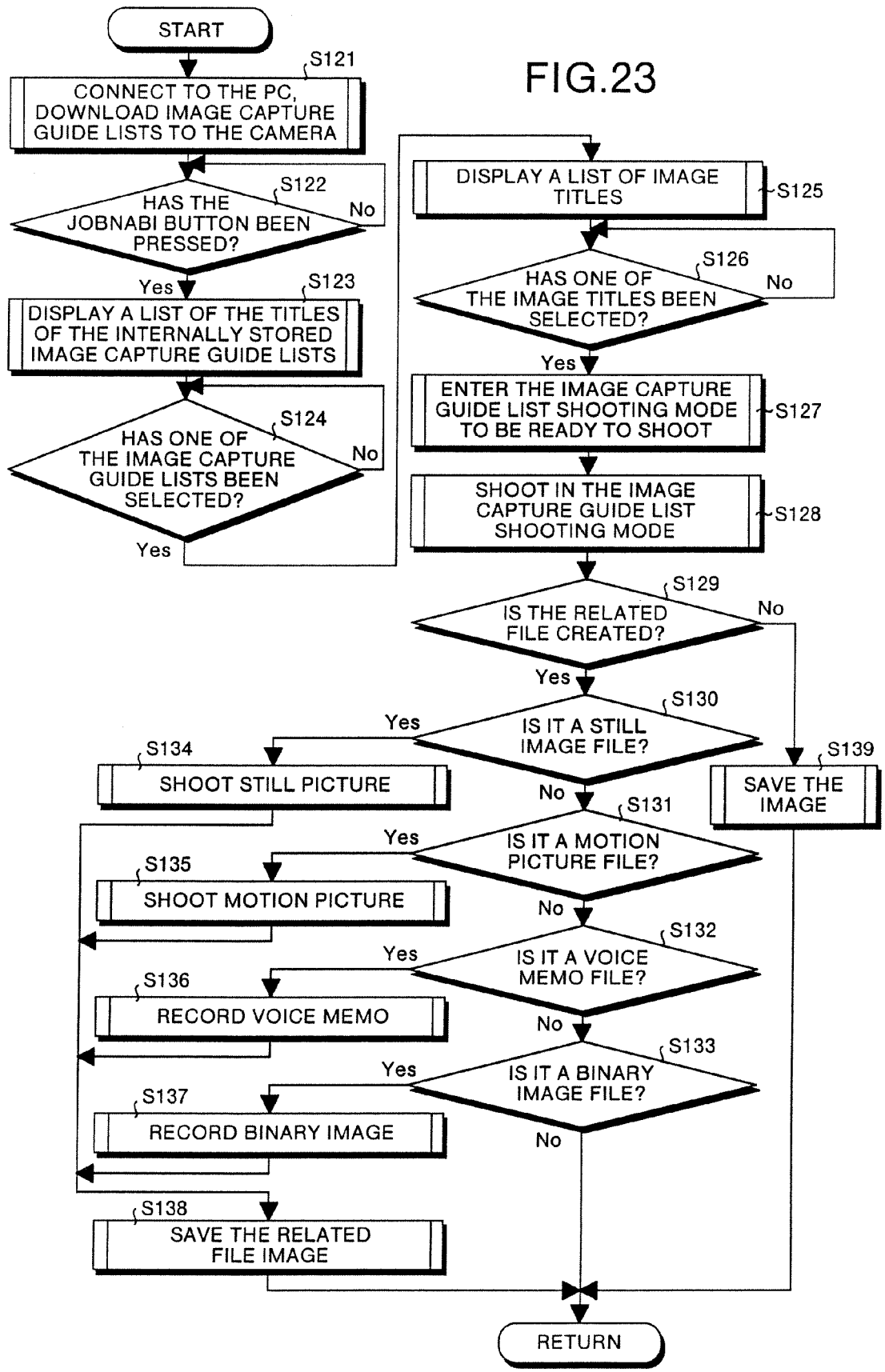
FIG. 23 is a flow chart for explaining a second example of the recording operation in the digital camera.

The second example will be explained with reference to FIG. 23 and FIG. 24. FIG. 23 is a flow chart for explaining the operation of the digital camera 100 in the second example. FIG. 24 shows the image capture guide list after the shooting. In this second example, the operation in the following case will be explained. This case is such that a list of image titles in an image capture guide list file is displayed, an image title is selected from the list of the displayed image titles, and a file of recorded data is stored in correlation with the selected image title. More specifically, this recorded data may be for any of still pictures, motion pictures, voice memos, and binary images, and may be obtained in any manner of still picture shooting, motion picture shooting, voice memo recording, and binary image recording.

In FIG. 23, the digital camera 100 is connected to the personal computer 200 to download image capture guide lists, and stores these lists in the recording section 108 (step S121). FIG. 21 shows an example of the format of the image capture guide list. This image capture guide list has image titles as targets to be recorded.

The system control section 101 determines whether the JOBNABI button 24 on the operating section 106 has been pressed (step S122). When the button 24 has been pressed, the system control section 101 shifts to the image capture guide list mode, and displays a list of the image capture guide list titles stored in the recording section 108 on the display section 104 (step S123). FIG. 7A, as mentioned above, shows the display example of the image capture guide list titles in list form on the display section 104. The operator selects one out of these list titles through operation of the touch panel operating section 107.

The system control section 101 determines whether one of these list titles has been selected (step S124). When selection has been made, the system control section 101 displays the list of image titles in the selected image capture guide list on the display section 104 (step S125). FIG. 7B, as mentioned above, shows the display example of the image titles in the image capture guide list of "Business Show '98", which has been selected on the screen shown in FIG. 7A. The operator selects one out of these image titles through operation of the touch panel operating section 107.

The system control section 101 determines whether one of these image titles has been selected (step S126). When selection has been made, the system control section 101 shifts to the image capture guide list shooting mode (recording mode) to allow shooting (step S127). When recording is instructed by the operator through operation of the operating section 106 (step S128), the system control section 101 displays the message to prompt the operator to make a selection of whether a related file is created on the display section 104.

The system control section 101 determines whether the operator has selected "Create a related file" through the operation of the touch panel operating section 107 (step S129). It is determined that "Create a related file" has been selected, and if the instruction is to record a still picture (step S130), the system control section 101 shoots a still picture (step S134). If the instruction is to record a motion picture (step S131), the system control section 101 shoots the motion picture (step S135). If the instruction is to record a voice memo (step S132), the system control section 101 records the voice memo (step S136). If the instruction is to record a binary image (step S133), the system control section 101 records the binary image (step S137), and proceeds to step S138.

At step S138, the system control section 101 executes the processing of saving the related file and stores the read-in recorded data in the recording section 108 as the EXIF file. The system control section 101 also registers the file of this recorded data in the image capture guide list in correlation with the selected image title. On the other hand, at step S129, when "Do not create a related file" has been selected, shooting is executed according to the recording instruction and the read-in recorded data in the recording section 108 as an EXIF file (step S139).

FIG. 24 shows an example of how the format of the image capture guide list in FIG. 21, which shows before shooting, is changed after the shooting. As shown in the figure, the names of the recorded files of the data, recorded after the image titles are selected, are registered below the respective image titles.

Further, the digital camera 100 transfers the image capture guide list and the file (s) recorded using this image capture guide list to the personal computer 200. Accordingly, the user of the personal computer 200, who has created this image capture guide list, can utilize the image(s) recorded using the image capture guide list for making a report or the like. Thus, the usability of the image capture guide list for its creator is improved.

As explained above, according to the second example of the operation, the recorded files of the data, that is recorded after the image titles in the image capture guide list are selected, are registered in the image capture guide list in correlation with the selected image titles, respectively. Accordingly, using the image capture guide list can prevent the user from forgetting to take required pictures during shooting, and after the shooting, erroneous correspondence between any of the images and any of the image titles can be prevented, thus improving usability for the user.

Third Example

Figure 25:
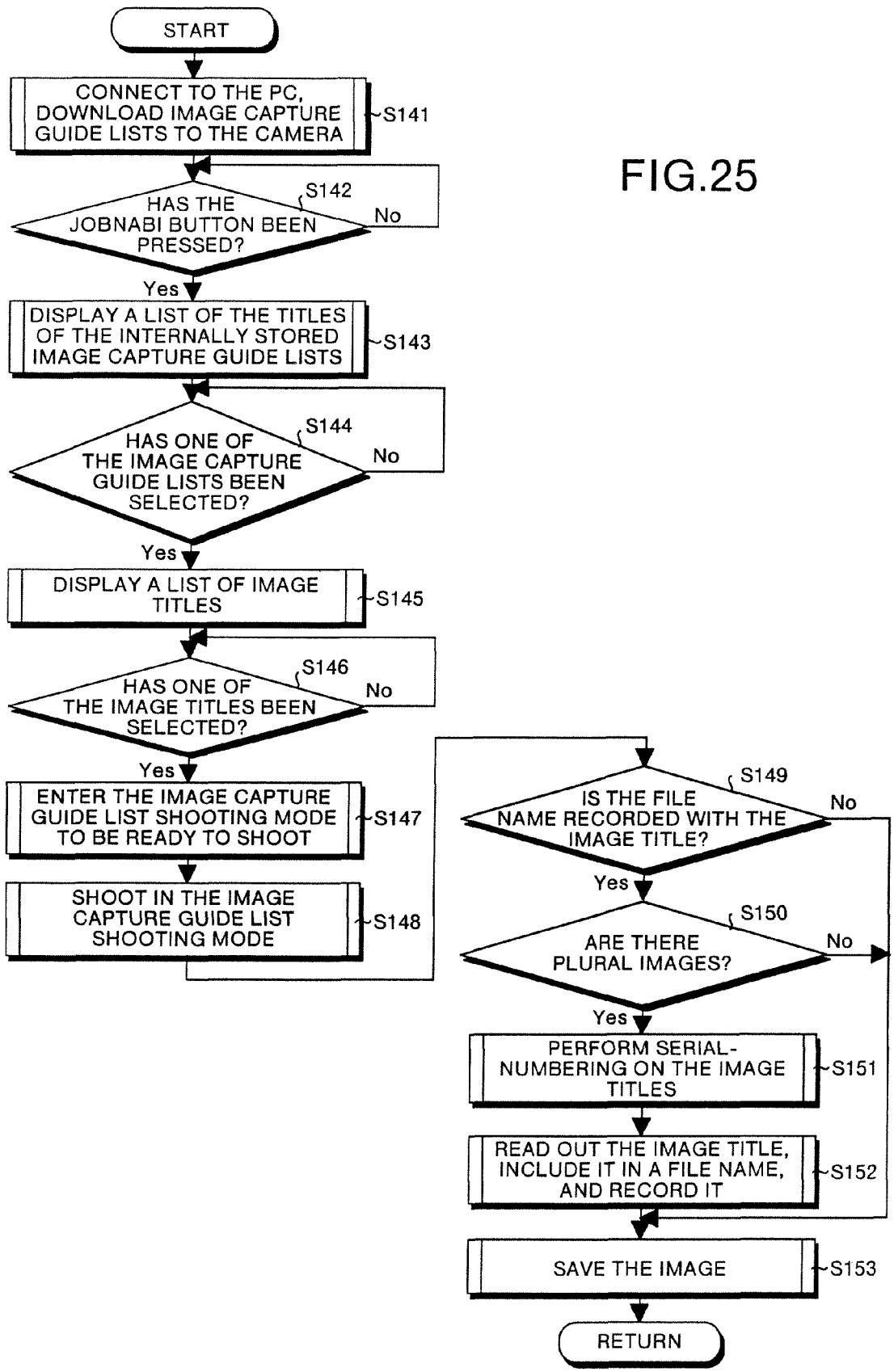
FIG. 25 is a flow chart for explaining a third example of the recording operation in the digital camera.

The third example is explained with reference to FIG. 25. The flow chart in FIG. 25 shows the operation in the digital camera 100 according to the third example. In this third example, the operation in the following case will be explained. This case is such that an image title is selected from an image capture guide list, and the name of an image file of the data for the recorded image is determined so as to include the selected image title.

In FIG. 25, the digital camera 100 is connected to the personal computer 200 to download image capture guide lists, and stores these lists in the recording section 108 (step S141). FIG. 21, as mentioned above, shows an example of the image capture guide list. This image capture guide list includes its list title and image titles as targets to be recorded. The system control section 101 determines whether the JOBNABI button 24 on the operating section 106 has been pressed (step S142). When the button 24 has been pressed, the system control section 102 enters the image capture guide list mode, and displays a list of the image capture guide list titles stored in the recording section 108 on the display section 104 (step S143).

FIG. 7A, as mentioned above, shows the display example of the image capture guide list titles in list form. The operator selects one out of these list titles through operation of the touch panel operating section 107. The system control section 101 determines whether one of these list titles has been selected (step S144). When selection has been made, the system control section 101 displays a list of image titles in the selected image capture guide list on the display section 104 (step S145). FIG. 7B, as mentioned above, shows the display example of the image titles in the image capture guide list of "Business Show '98", which has been selected on the screen shown in FIG. 7A. The operator selects one out of these image titles through operation of the touch panel operating section 107.

The system control section 101 determines whether one of these image titles has been selected (step S146). When selection has been made, the system control section 101 shifts to the image capture guide list shooting mode (recording mode) to allow shooting (step S147). Accordingly, the user can be prevented from forgetting to take any subject relating to the image title. The system control section 101 shoots the subject according to the operation of the shutter release button 21 on the operating section 106 (step S148).

After the shooting, the system control section 101 displays the message to prompt the operator to make a selection on "whether the image title is included in its file name" on the display section 104. The system control section 101 then determines whether the operator has selected "Include the image title in its file name" through the operation of the touch panel section 107 (step S149). When "Include the image title in its file name" has been selected, the system control section 101 proceeds to step S150, and determines whether there are plural images on this title. When it is determined that there are no plural images, the system control section 101 proceeds to step S152. On the other hand, when there are plural images, the system control section 101 proceeds to step S151, performs serial-numbering on their file names, and proceeds to step S152. More specifically, if "Picture No. 1" includes three pieces of images, the serial-numbering is performed by assigning numbers to the pictures like "Picture No. 1-1", "Picture No. 1-2", and "Picture No. 1-3".

At step S152, the system control section 101 reads out the selected image title to set the name of the image file to the file name including this image title (step S152), and stores the shot image file in the recording section 108 as an EXIF file (step S153).

On the other hand, at step S149, when "Include the image title in its file name" has not been selected, the system control section 101 stores the shot image file in the recording section 108 as an EXIF file with an ordinary file name not including its image title (step S153).

A concrete example of a file name including its image title will be explained below. If an image title of "RICOH" is selected and a piece of image is shot, its file name will be "RICOH.jpg". If an image title of "CAMON" is selected and three pieces of images are shot, their file names will be serial-numbered as "CAMON01.jpg", "CAMON02.jpg", and "CAMON03.jpg".

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the third example, the list of the image titles in the image capture guide list is displayed on the display section 104. An image title is selected from the displayed image titles, and this image title is included in at least a part of a file name of the image data obtained through shooting executed after the selection of this image title. Accordingly, using the image capture guide list can prevent the user from forgetting to take required pictures during shooting, and after the shooting, erroneous correspondence between any of the images and any of the image titles can be prevented, thus improving usability for the user.

Fourth Example

Figure 26:
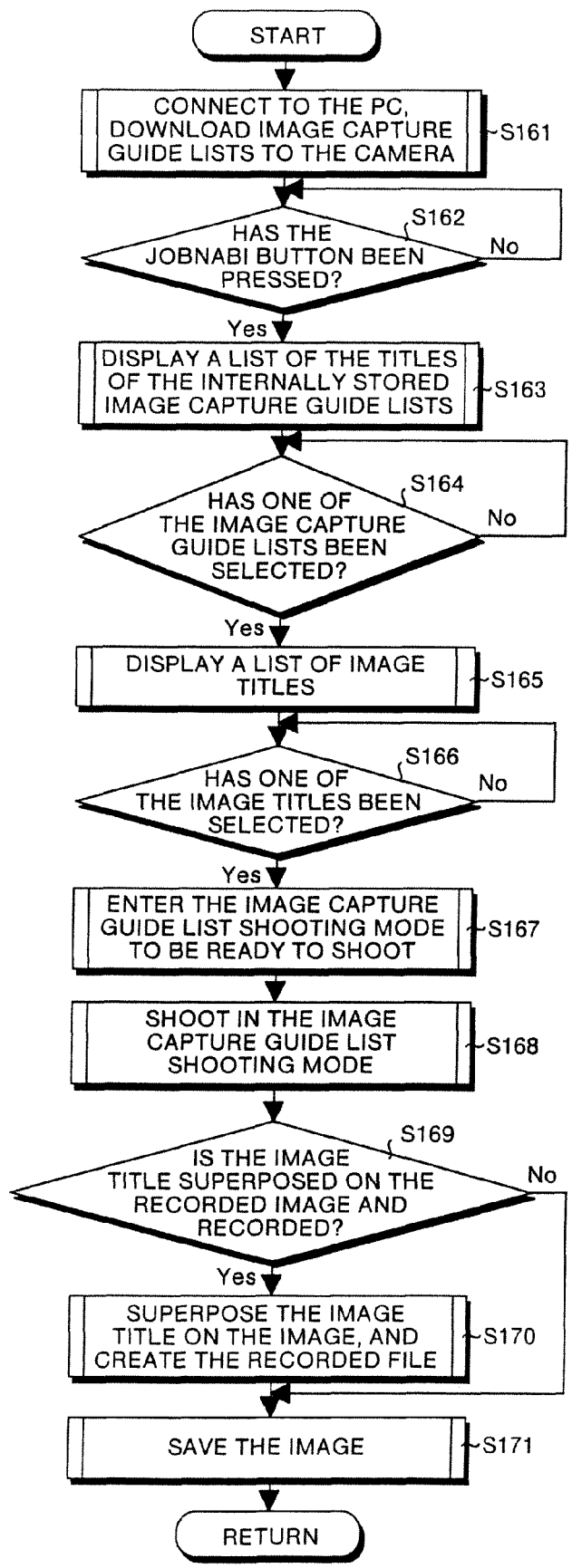
FIG. 26 is a flow chart for explaining a fourth example of the recording operation in the digital camera.
Figure 27A:
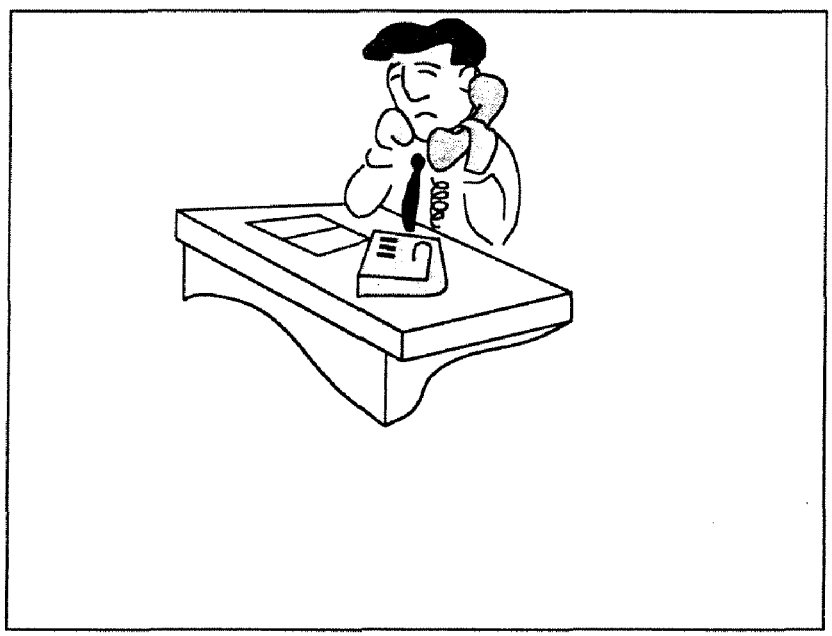
FIG. 27A and FIG. 27B show a case in which a selected image title is superposed on image data.
Figure 27B:
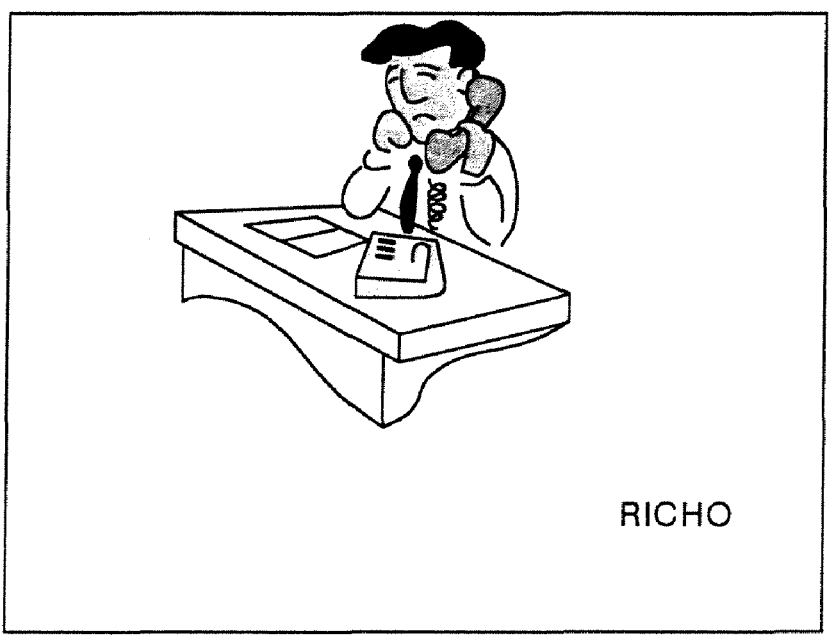

The fourth example will be explained with reference to FIG. 26, FIG. 27A and FIG. 27B. FIG. 26 is a flow chart for explaining the operation in the digital camera 100 according to the fourth example. FIG. 27A and FIG. 27B show the case in which a selected image title is superposed on image data. In this fourth example, the operation in the following case will be explained. This case is such that an image title is selected from an image capture guide list and then the image title is superposed on the shot image data.

In FIG. 26, the digital camera 100 is connected to the personal computer 200 to download image capture guide lists, and stores these lists in the recording section 108 (step S161). FIG. 21, as mentioned above, shows an example of the image capture guide list. This image capture guide list includes image titles indicating targets to be recorded. The system control section 101 determines whether the JOBNABI button 24 on the operating section 106 has been pressed (step S162). When the button 24 has been pressed, the system control section 102 enters the image capture guide list mode, and displays a list of the image capture guide list titles stored in the recording section 108 on the display section 104 (step S163).

FIG. 7A shows the display example of the image capture guide list titles in list form on the display section 104. The operator selects one out of these list titles through operation of the touch panel operating section 107. The system control section 101 determines whether one of these list titles has been selected (step S164). When selection has been made, the system control section 101 displays a list of image titles in the selected image capture guide list on the display section 104 (step S165).

FIG. 7B, as mentioned above, shows the display example of the image titles in the image capture guide list of "Business Show '98", which has been selected on the screen shown in FIG. 7A. The operator selects one out of these image titles through operation of the touch panel operating section 107.

The system control section 101 determines whether one of these image titles has been selected (step S166). When selection has been made, the system control section 101 shifts to the image capture guide list shooting mode (recording mode) to allow shooting (step S167). Accordingly, the user can be prevented from forgetting to take any subject relating to the image title. Shooting is executed according to the operation of the shutter release button 21 on the operating section 106 (step S168).

After the shooting, the system control section 101 displays the message to prompt the operator to make a selection of whether the image title is superposed on the shot image, on the display section 104. The system control section 101 then determines whether the operator has selected "Superpose the image title on the shot image" through the operation of the operating section 106 (step S169). When "Superpose the image title on the recorded image" has been selected, the system control section 101 superposes the image title on the shot image to create an image file of the composite image (step S170). The system control section 101 then stores this image file in the recording section 108 as an EXIF file (step S171). On the other hand, at step S169, when "Superpose the image title on the shot image" has not been selected, the system control section 101 stores the shot image in the recording section 108 as an EXIF file (step S171).

FIG. 27A and FIG. 27B show the composite image obtained by superposing the image title on the shot image data. For example, if "RICOH" is selected as an image title and then the image as shown in FIG. 27A is shot, the image title of "RICOH" is superposed on the image in FIG. 27A to create the composite image as shown in FIG. 27B.

Further, the digital camera 100 transfers the image capture guide list and the recorded file recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the fourth example, the image capture guide list is displayed on the display section 104. An image title is selected from the displayed image capture guide list, and this image title is superposed on the image data obtained through shooting executed after the selection of the image title. Accordingly, using the image capture guide list can prevent the user from forgetting to take required pictures during shooting, and after the shooting, erroneous correspondence between any of the images and any of the image titles can be prevented, thus improving usability for the user.

Fifth Example

Figure 28:
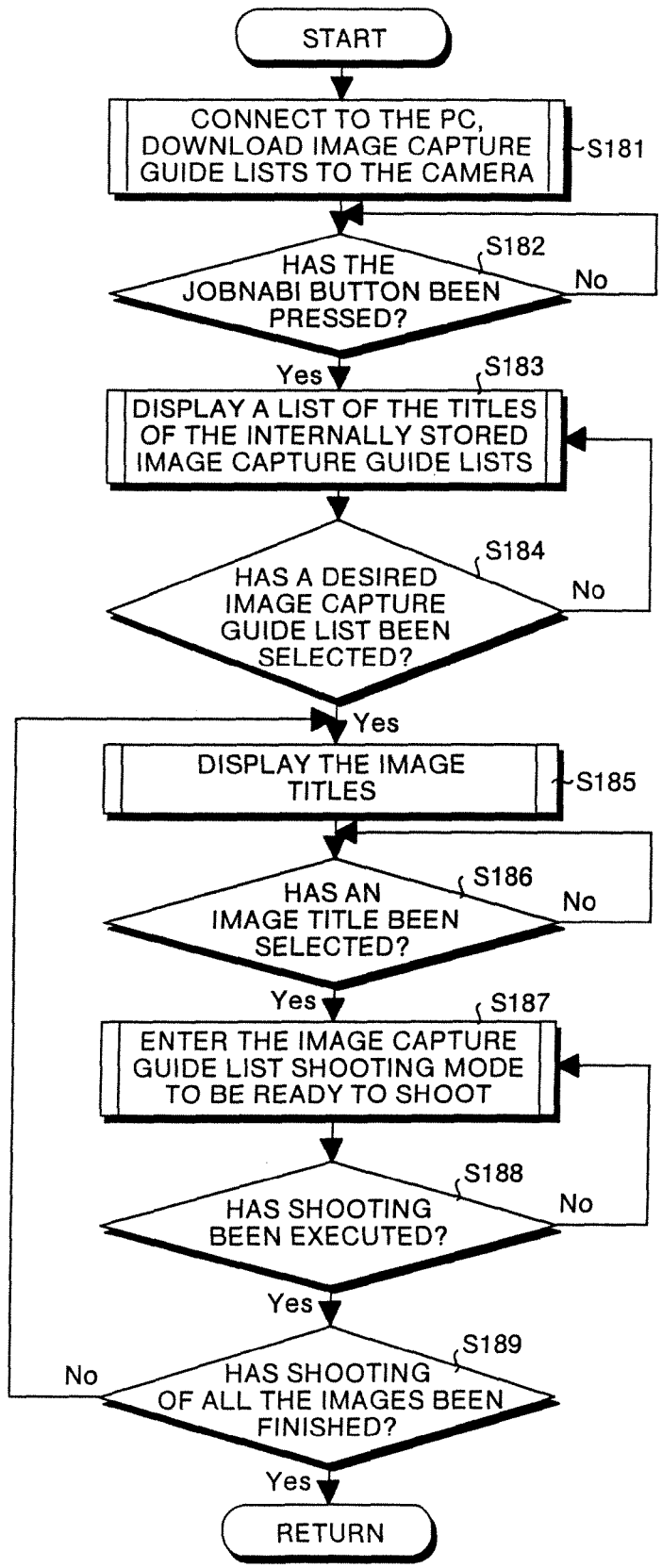
FIG. 28 is a flow chart for explaining a fifth example of the recording operation in the digital camera.
Figure 29:
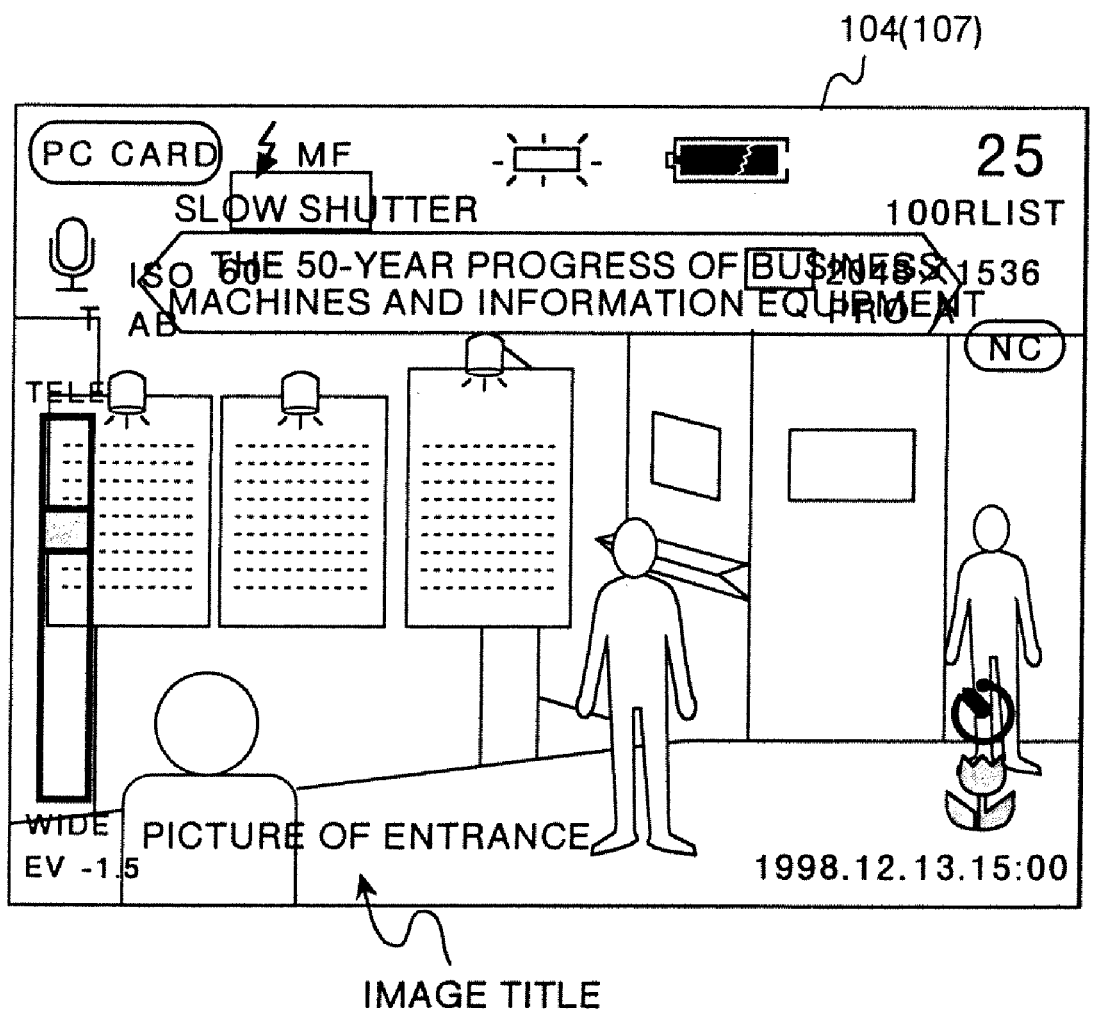
FIG. 29 shows a display example on the display section of the digital camera.

The fifth example will be explained with reference to FIG. 28 and FIG. 29. FIG. 28 is a flowchart for explaining the operation in the digital camera 100 according to the fifth example. FIG. 29 shows the display example of the display section 104. In this fifth example, the operation in the following case will be explained. This case is such that an image capture guide list is displayed on the display section 104, the user selects an image title from the displayed image capture guide list and takes its picture while viewing the selected image title.

In FIG. 28, the digital camera 100 is connected to the personal computer 200 to download image capture guide lists, and stores these lists in the recording section 108 (step S181). FIG. 21, as mentioned above, shows an example of the image capture guide list. This image capture guide list has image titles as targets to be recorded. The system control section 101 determines whether the JOBNBI button 24 on the operating section 106 has been pressed (step S182). When the button 24 has been pressed, the system control section 102 enters the image capture guide list mode, and displays a list of the image capture guide list titles stored in the recording section 108 on the display section 104 (step S183).

FIG. 7A, as mentioned above, shows the display example of the image capture guide list titles in list form on the display section 104. The operator selects one out of these list titles through operation of the touch panel operating section 107. The system control section 101 determines whether one of these list titles has been selected (step S184). When selection has been made, the system control section 101 displays a list of image titles in the selected image capture guide list on the display section 104 (step S185). FIG. 7B shows the display example of the image titles in the image capture guide list of "Business Show '98", which has been selected on the screen shown in FIG. 7A. The operator selects one out of these image titles through operation of the touch panel operating section 107.

The system control section 101 determines whether one of these image titles has been selected (step S186). When selection has been made, the system control section 101 enters the image capture guide list shooting mode (recording mode) and displays the monitoring image of a subject on the display section 104 (step S187). In this case, the selected image title is also displayed on a part of the display section 104 together with the monitoring image of the subject. FIG. 29 shows an example of a display screen when an image title of "Picture of Entrance" is selected on the screen shown in FIG. 7B. As shown in FIG. 29, the monitoring image of the subject and the image title of "Picture of Entrance" are displayed on the display section 104.

Shooting is executed according to pressing of the shutter release button 21 on the operating section 106, and the shot image is stored in the recording section 108 as an image file in the EXIF format (step S188). The system control section 101 determines whether shooting of all images for the image titles has been finished (step S189). When it is determined that the images for the image titles have been recorded, the processing is returned. On the other hand, when the shooting of all images for the image titles has not been completed, the system control section 101 returns to step S185, and repeats the same processing until all images for the image title have been shot (step S185 to step S189).

Further, the digital camera 100 transfers the image capture guide list and the recorded file(s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the fifth example, the image capture guide list is displayed on the display section 104. The user selects an image title from the displayed image capture guide list, and this selected image title is displayed together with a monitoring image for this title. Accordingly, the user can take pictures while viewing the image titles. Therefore, forgetting to take required pictures can be prevented, thus improving usability for the user.

Sixth Example

Figure 30:
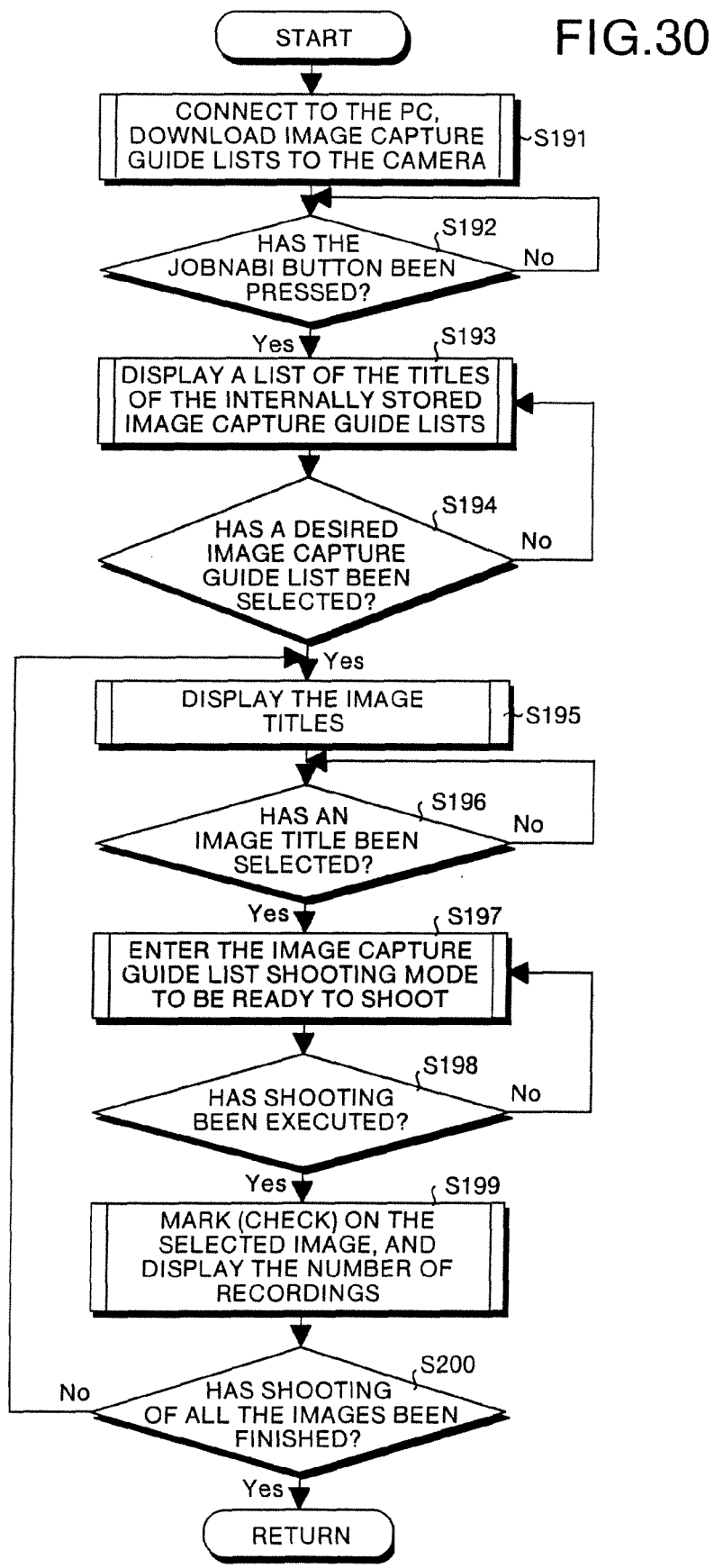
FIG. 30 is a flow chart for explaining a sixth example of the recording operation in the digital camera.

The sixth example will be explained with reference to FIG. 30. The flow chart in FIG. 30 shows the operation in the digital camera 100 according to the sixth example. In this sixth example, the operation in the following case will be explained. This case is such that image titles in the image capture guide list are displayed, and when one of these titles is selected and shooting for the selected title is executed, a checkmark is registered in the image title on its side, and the number of shot images for the image title is displayed.

In FIG. 30, the digital camera 100 is connected to the personal computer 200 to download image capture guide lists, and stores these lists in the recording section 108 (step S191). The image capture guide list has image titles as targets to be recorded. The system control section 101 determines whether the JOBNABI button 24 on the operating section 106 has been pressed (step S192). When the button 24 has been pressed, the system control section 102 enters the image capture guide list mode, and displays a list of the image capture guide list titles stored in the recording section 108 on the display section 104 (step S193).

FIG. 7A, as mentioned above, shows the display example of the image capture guide list titles in list form on the display section 104. The operator selects one out of these list titles through operation of the touch panel operating section 107. The system control section 101 determines whether one of these list titles has been selected (step S194). When selection has been made, the system control section 101 displays a list of image titles in the selected image capture guide list on the display section 104 (step S195). FIG. 7B shows the display example of the image titles in the image capture guide list of "Business Show '98", which has been selected on the screen shown in FIG. 7A. The operator selects one out of these image titles through operation of the touch panel operating section 107. The system control section 101 determines whether one of these image titles has been selected (step S196).

After the determination, the system control section 101 enters the image capture guide list shooting mode (recording mode) to allow shooting (step S197), and displays the monitoring image on the display section 104. Shooting is executed according to pressing of the shutter release button 21 on the operating section 106 (step S198), and the shot image is stored in the recording section 108 as an image file in the EXIF format. When an image title is selected, the system control section 101 marks the selected image title and displays the number of shot images (step S199).

The system control section 101 determines whether shooting of all images for the displayed image titles has been finished (step S200). When it is determined that all images for the displayed image title have been shot, the processing is returned. On the other hand, when the shooting of all images for the image titles has not been completed, the system control section 101 returns to step S195, and repeats the same processing until all the images for the image titles have been shot (step S195 to step S200).

Figure 31:
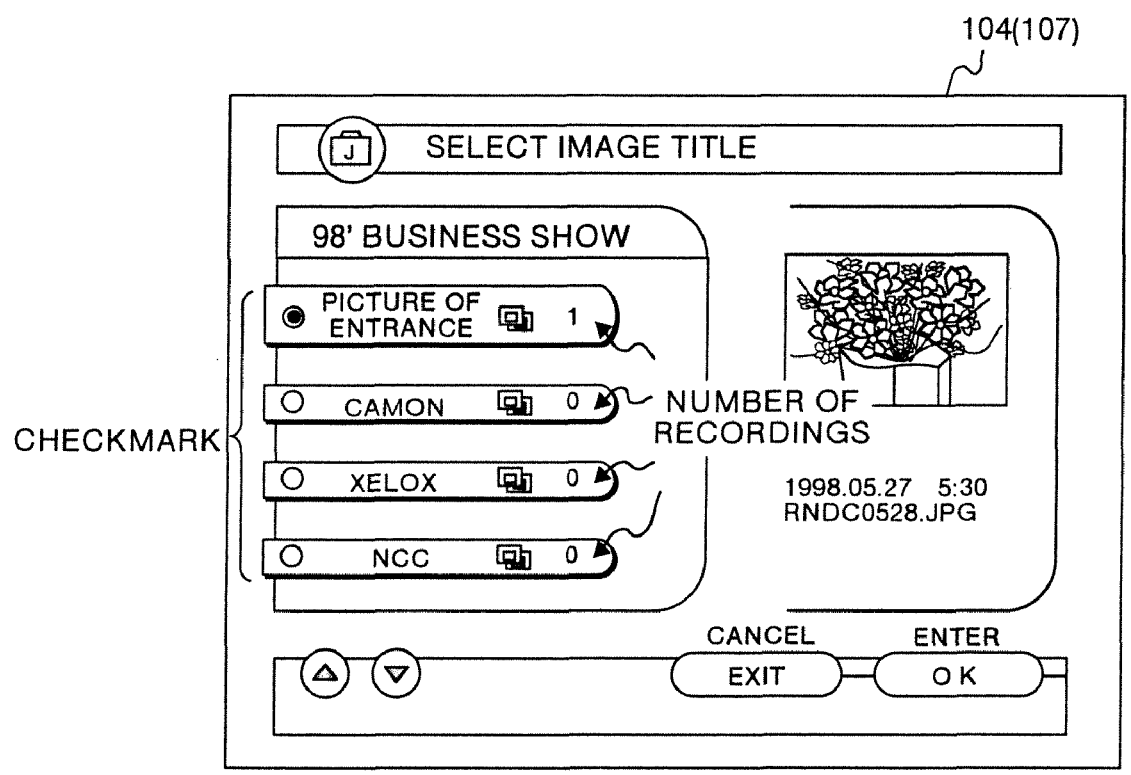
FIG. 31 shows another display example on the display section of the digital camera.

A concrete display example of the display section 104 according to the sixth example will be explained with reference to FIG. 31. FIG. 7B, as mentioned above, shows a selection screen for the image titles in the image capture guide list. In FIG. 7B, "Select an image title from the image capture guide list" as a message to prompt to the operator to select an image title from the image capture guide list is displayed on the display section 104. In addition to this, the image capture guide list of "Business Show '98" and a list of its image titles such as "Picture of Entrance", "CAMON", "XELOX", and "NCC" are displayed. Further, the number of shot images for each of the image titles is displayed on its right side. When the user selects an image title and takes a picture for this title, a checkmark (the color of a circle on the left is changed) is entered in the selected image title, as shown in FIG. 31, and the number of shot images for each of the image titles is displayed on its right side. The example in FIG. 31 shows a case where "Picture of Entrance" has been selected as an image title and one picture for this title has been taken. When this checkmark is again selected through the operation of the touch panel operating section 107 with the stylus pen, the system control section 101 deletes this checkmark.

Further, the digital camera 100 transfers the image capture guide list and the recorded file(s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the sixth example, the image titles in the image capture guide list are displayed on the display section 104. When one of these image titles has been selected and shooting for the selected title has been executed, a checkmark and the number of shot images are entered in the image title. Accordingly, using the image capture guide list can prevent the user from forgetting to take required pictures, thus improving usability for the user.

Seventh Example

Figure 32:
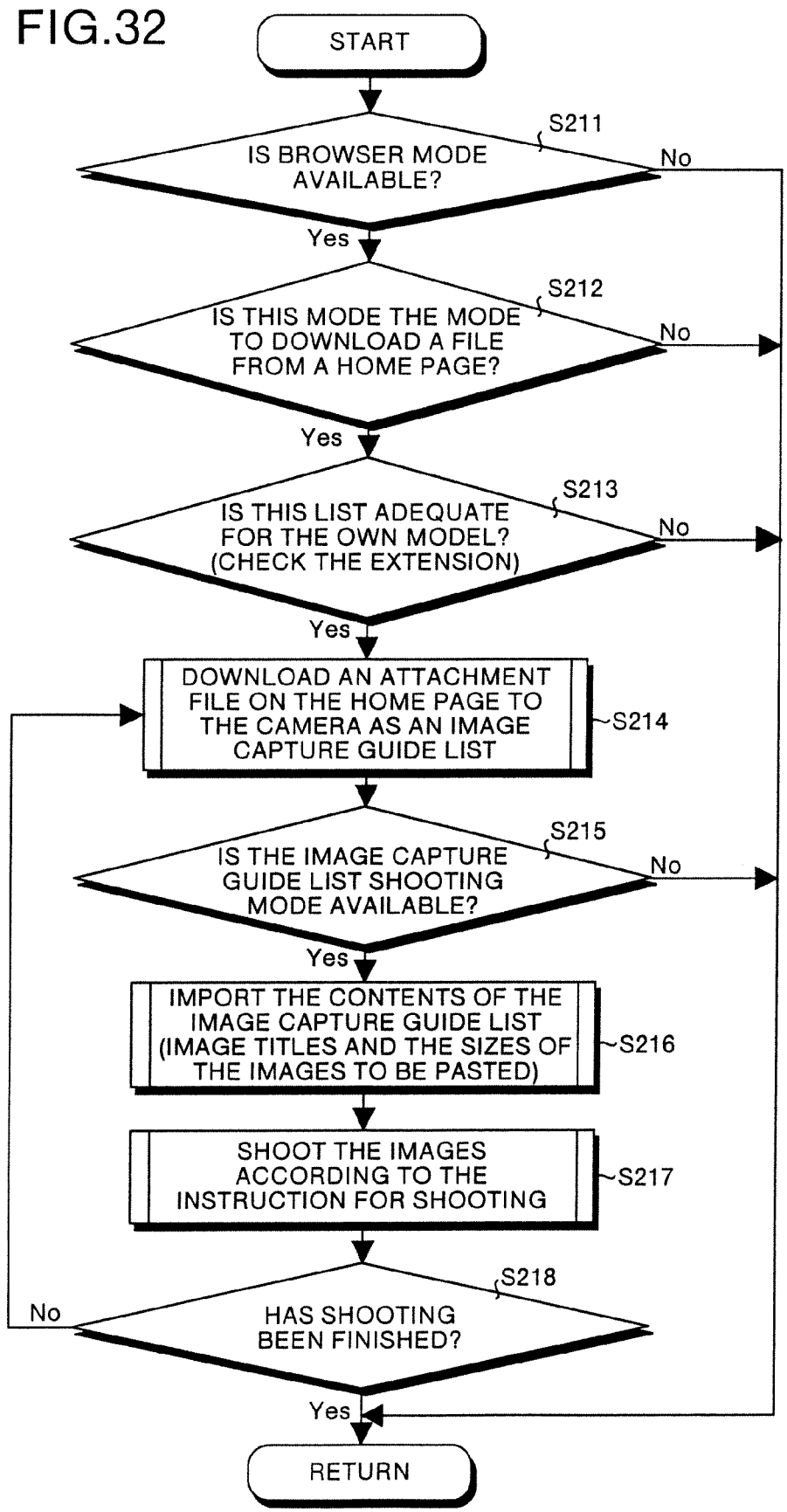
FIG. 32 is a flow chart for explaining a seventh example of the recording operation in the digital camera.

The seventh example will be explained with reference to FIG. 32. The flow chart in FIG. 32 shows the operation in the digital camera 100 according to the seventh example. FIG. 8, as mentioned above, shows the selection screen for the communication mode, and FIG. 9, as mentioned above, shows the setting screen for the WEB mode. In this seventh example, an example of the operation in the following case will be explained. This case is such that the digital camera 100 downloads an image capture guide list file from the home page in the Web server 300 through the Web browser, and shooting is executed according to this image capture guide list file.

In FIG. 32, in the digital camera, it is determined whether the Web mode is available (step S211). When the WEB mode is available, it is determined whether a file can be downloaded from the home page in this mode (step S212). When a file can be download from the home page in this mode, it is determined whether the image capture guide list on the home page is adequate for its own model (step S213). More specifically, whether or not the list is adequate for the model is determined by referring to, for example, the extension in the image capture guide list file. When the list is adequate for its own model, the processing proceeds to step S214, and an attachment file on the home page as an image capture guide list is downloaded. It is determined whether the image capture guide list mode is available (step S215). When the image capture guide list mode is available, the digital camera downloads the contents of the image capture guide list such as image titles and the sizes of the images to be pasted (step S216).

Shooting is performed according to the instruction of the image capture guide list (step S217). It is determined whether shooting of all images for the image titles has been finished (step S218). When it is determined that the shooting of all images for the image titles has not been completed, the processing proceeds to step S214, and the same processing is repeated until all images for the image title have been shot (step S214 to step S218).

As explained above, according to the seventh example, the digital camera 100 downloads the image capture guide list file from the home page in the Web server through the Web browser. Shooting is then performed according to the downloaded image capture guide list file. Therefore, the image capture guide list can easily be acquired, and shooting can be executed according to this image capture guide list. Accordingly, forgetting to take required pictures can be prevented, and shooting can be executed according to the instruction by an instructor or the creator who has created this image capture guide list.

Eighth Example

Figure 33:
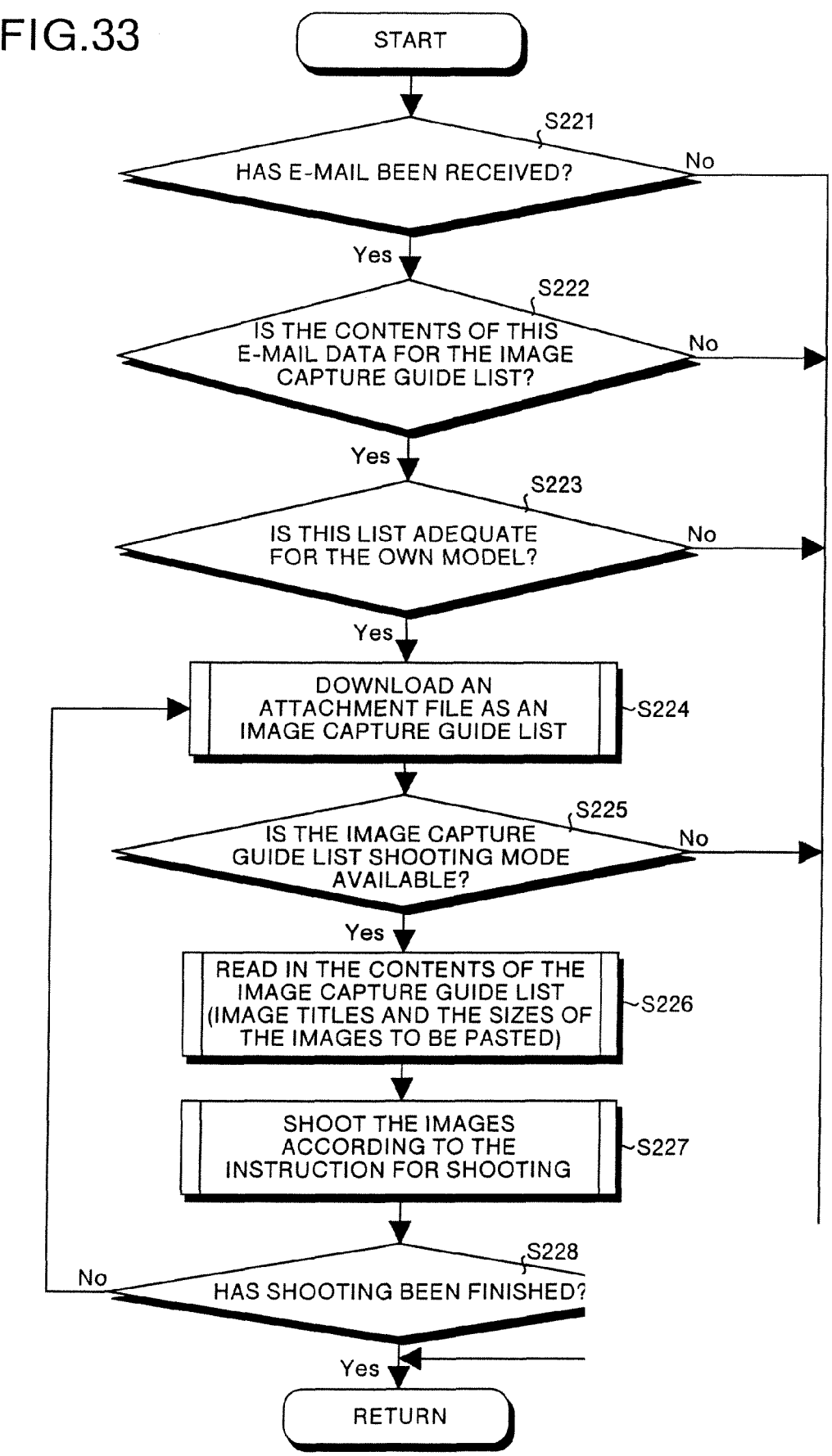
FIG. 33 is a flow chart for explaining an eighth example of the recording operation in the digital camera.

The eighth example will be explained with reference to FIG. 33. The flow chart in FIG. 33 shows the operation in the digital camera 100 according to the eighth example. In this eighth example, the operation in the following case will be explained. This case is such that the digital camera 100 receives an image capture guide list file by e-mail through a network, and shooting is executed according to this received image capture guide list file.

In FIG. 33, In the digital camera, it is determined whether e-mail has been received (step S221). When e-mail has been received, the processing proceeds to step S222, and it is determined whether the contents of the received e-mail are an image capture guide list. When it is determined that the contents are the image capture guide list, it is determined whether this image capture guide list is adequate for its own model (step S223). When this image capture guide list is the adequate one, the digital camera downloads the attachment file as the image capture guide list (step S224). More specifically, whether or not the image capture guide list file is adequate for the model is determined by referring to, for example, the extension in the image capture guide list file. It is then determined whether the image capture guide list shooting mode is available (step S225). When the image capture guide list shooting mode is available, the digital camera downloads the contents of the image capture guide list such as image titles and the size for pasting (step S226).

Shooting is performed according to the instruction of the image capture guide list (step S227). It is determined whether shooting of all images for the image titles has been finished (step S228). When it is determined that the shooting has not been completed, the processing proceeds to step S224, and the same processing is repeated until all the images for the image title have been shot (step S224 to step S228).

As explained above, according to the eighth example, the digital camera 100 receives the image capture guide list by e-mail, and shooting is performed according to the received image capture guide list. Therefore, the image capture guide list can easily be acquired, and shooting can be performed according to this image capture guide list. Accordingly, forgetting to take required pictures can be prevented, and shooting subjects can be executed according to the instruction by an instructor or the creator who has created this image capture guide list.

Ninth Example

Figure 34:
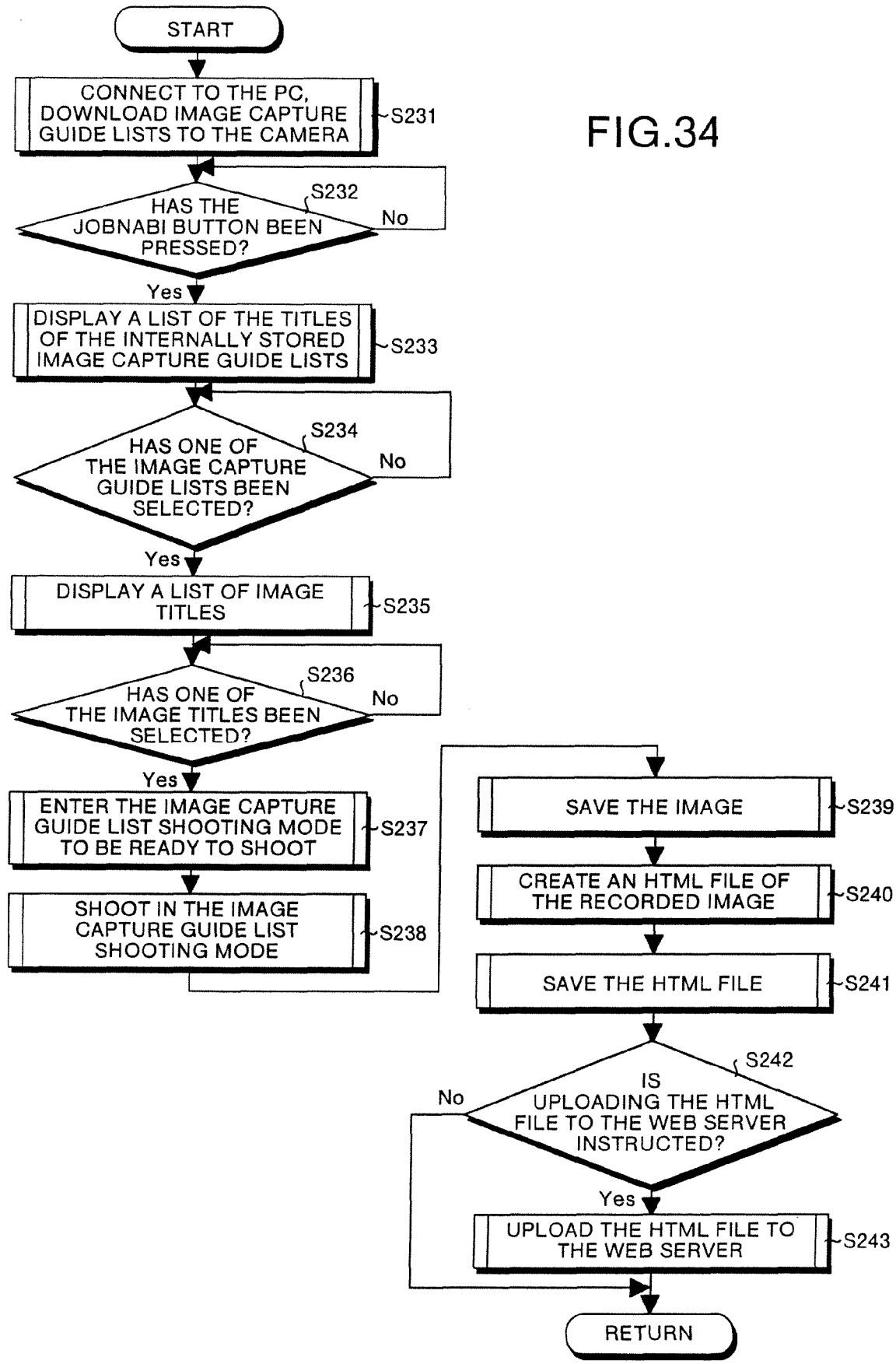
FIG. 34 is a flow chart for explaining a ninth example of the recording operation in the digital camera.

The ninth example is explained with reference to FIG. 34. The flow chart in FIG. 34 shows the operation in the digital camera according to the ninth example. In this ninth example, the operation in the following case will be explained. This case is such that a list of image titles in an image capture guide list is displayed, and when an image title is selected from the displayed image titles, the mode is switched to the recording mode (image capture guide list shooting mode), shooting is executed according to pressing of the shutter release button 21, and an HTML file of the shot image data is automatically created.

In FIG. 34, the digital camera 100 is connected to the personal computer 200 to download image capture guide lists, and stores these lists in the recording section 108 (step S231). FIG. 21 shows an example of the image capture guide list. This image capture guide list has image titles as targets to be recorded. The system control section 101 determines whether the JOBNABI button 24 on the operating section 106 has been pressed (step S232). When the button 24 has been pressed, the system control section 102 enters the image capture guide list mode, and displays a list of the image capture guide list titles stored in the recording section 108 on the display section 104 (step S233). FIG. 7A shows the display example of the image capture guide list titles in list form on the display section 104. The operator selects one out of these list titles through operation of the touch panel operating section 107.

The system control section 101 determines whether one of these list titles has been selected (step S234). When selection has been made, the system control section 101 displays a list of image titles in the selected image capture guide list on the display section 104 (step S235). FIG. 7B shows the display example of the image titles in the image capture guide list of "Business Show '98", which has been selected on the screen shown in FIG. 7A. The operator selects one out of these image titles through operation of the touch panel operating section 107.

The system control section 101 determines whether one of these image titles has been selected (step S236). When selection has been made, the system control section 101 shifts to the shooting mode to allow shooting to be ready (step S237). The operator selects a subject for the image title to take its picture.

Further, the system control section 101 shoots the subject according to pressing of the shutter release button 21 on the operating section 106 (step S238), and stores the data for the shot image in the recording section 108 as an EXIF file (image file) (step S239).

The system control section 101 creates an HTML file that transfers the shot image data to an HTML file (step S240), and saves the created HTML file in the recording section 108 (step S241). The system control section 101 determines whether uploading of the HTML file to the Web server has been instructed by the user through operation of the operating section 106 (step S242). When such an instruction has been issued, the system control section 101 uploads the HTML file to the Web server (step S243).

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the ninth example of the operation, the list of the image titles in the image capture guide list is displayed. When an image title is selected from the displayed image titles, the system control section 101 shifts to the recording mode (image capture guide list shooting mode). Shooting is executed according to pressing of the shutter release button 21, and the HTML file of the data for the recorded image is automatically created. Accordingly, using the image capture guide list can prevent the user from forgetting to take required pictures during shooting, and after the shooting, the HTML file can automatically be created, thus improving usability for the user.

EXAMPLES OF THE IMAGE CAPTURE GUIDE LIST FOR THE DIGITAL CAMERA ACCORDING TO THIS EMBODIMENT

A first example to a twentieth example of the image capture guide list for the digital camera 100 will be explained below. The image capture guide list has included its title and image titles indicating targets to be recorded. Further, this image capture guide list may additionally include shooting instruction information, such as text, voice memo or drawings, that provides a shooting procedure or an operating instruction for each of the image titles to a photographer. This guide list may also include automatic processing instruction information (operation instructing commands) that provides an instruction for automatic settings of setting conditions when recording a target to be recorded for an image title, or an instruction for necessary processing after recording.

First Example

Figure 35:
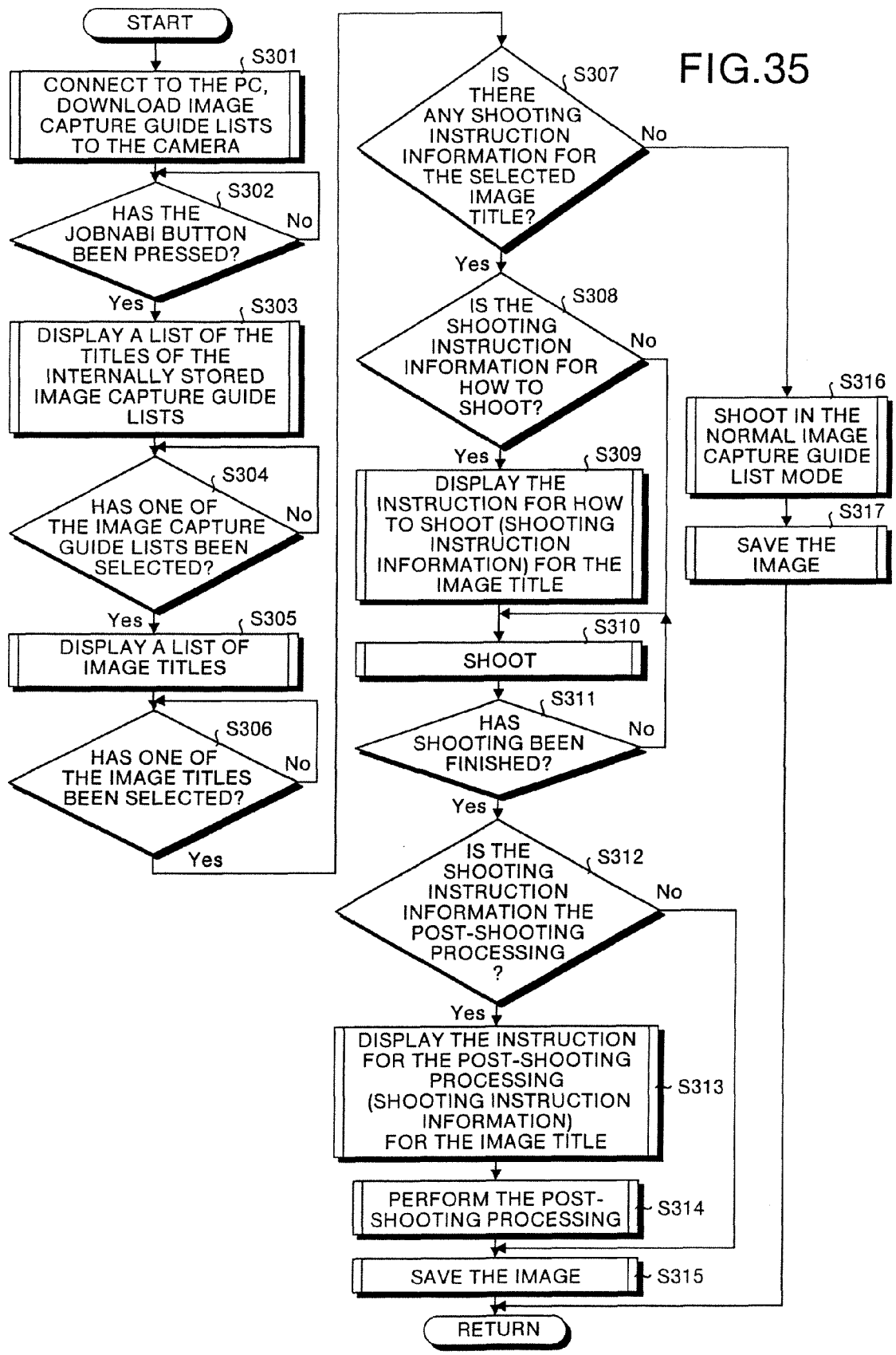
FIG. 35 is a flow chart for explaining a first example of the image capture guide list for the digital camera.
Figures 36, 37:
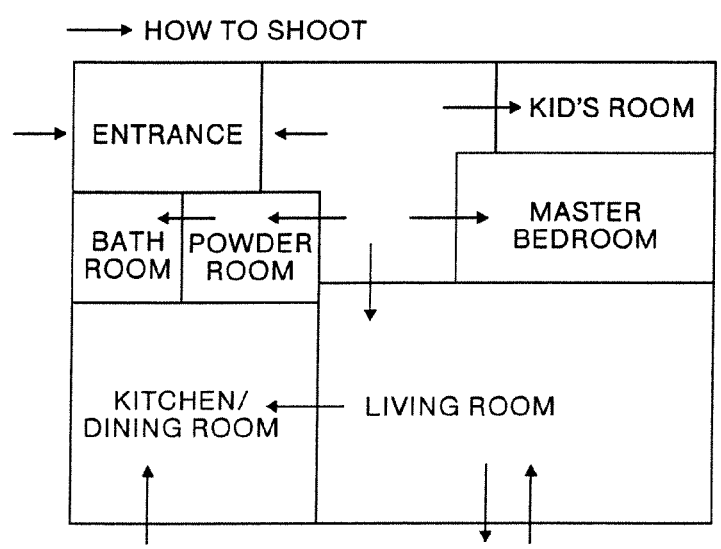
FIG. 36 shows shooting instruction information.
FIG. 37 shows another type of the shooting instruction information.

The first example is explained with reference to FIG. 35 to FIG. 37. The flow chart in FIG. 35 shows the operation in the digital camera 100 according to the first example. FIG. 36 and FIG. 37 show the shooting instruction information. In this first example, the operation in the following case will be explained. This case is such that image titles in an image capture guide list is displayed, one of these titles is selected, shooting instruction information (instructions for how to shoot and for post-shooting processing), corresponding to the selected image title is displayed, and the user takes its picture based on the displayed shooting method and performs the processing according to the displayed instruction for post-shooting processing.

In order to identify between the shooting instruction information for pre-shooting and the shooting instruction information for post-shooting, an identifier is added to the end of the image title. An identifier "A" represents the shooting instruction information for pre-shooting, while an identifier "B" represents the shooting instruction information for post-shooting. The system control section 101 determines which of the identifiers is added to the image title. When the identifier "A" is added, the system control section 101 notifies the user of the shooting instruction information before shooting, and notifies the user of the shooting instruction information for post-shooting processing after the shooting when the identifier "B" is added.

For example, in the case of the image capture guide list as shown in FIG. 36, if "Bag No. 1" is selected as an image title, the message "Enter the name of the photographer as memo information" is displayed on the display section 104 after the shooting. If "Bag No. 2" is selected, the message "Shoot the subject with a sophisticated feeling" is displayed on the display section 104 before the shooting.

FIG. 89 shows an example of the item list on the personal computer 200. In FIG. 89, the operator selects the scope of "Item" as an image title on the personal computer 200, and further selects "Shooting instruction (which is provided before shooting)" as shooting instruction information. An image capture guide list file is created by inserting the identifier "A", which represents the shooting instruction information for pre-shooting such as the instruction for how to shoot, between the image title of the image capture guide list and this shooting instruction information. The setting of the list title and the file name may also be required when creating the image capture guide list file.

In FIG. 35, the digital camera 100 is connected to the personal computer 200 to download image capture guide lists, and stores these lists in the recording section 108 (step S301). Each of these lists includes image titles as targets to be recorded, and further, respective shooting instruction information (instructions for how to shoot and for post-shooting processing) registered therein in text form in correlation with these image titles.

The system control section 101 determines whether the JOBNABI button 24 on the operating section 106 has been pressed (step S302). When the button 24 has been pressed, the system control section 102 enters the image capture guide list mode, and displays a list of the image capture guide list titles stored in the recording section 108 on the display section 104 (step S303). The operator selects one out of these list titles through operation of the touch panel operating section 107. The system control section 101 determines whether one of these list titles has been selected (step S304).

When selection has been made, the system control section 101 displays a list of image titles in the selected image capture guide list on the display section 104 (step S305). The system control section 101 determines whether one of these image titles has been selected (step S306). When one of these image titles has been selected, the system control section 101 shifts to the image capture guide list shooting mode (recording mode) to allow shooting. The system control section 101 determines whether there is any shooting instruction information for the selected image title in the image capture guide list (step S307).

When it is determined that there is the shooting instruction information for the selected image title in the image capture guide list, the system control section 101 then determines whether the shooting instruction information is an instruction for how to shoot (step S308). When it is determined that the information is not such an instruction, the system control section 101 proceeds to step S310, while proceeds to step S309 when it is determined that the information is such an instruction. At step S309, the system control section 101 displays the instruction for how to shoot as shooting instruction information for the selected image title on the display section 104. Accordingly, the user can select a subject for the image title to take its picture based on the displayed instruction for how to shoot.

Shooting is executed according to pressing of the shutter release button 21 on the operating section 106 (step S310). If there are plural shooting points, shooting is performed plural times. The system control section 101 determines whether the shooting has been finished (step S311). When it is determined that the shooting has been finished, the system control section 101 determines whether the shooting instruction information for the selected image title is an instruction for post-shooting processing (step S312). When it is determined that the instruction is not such an instruction, the system control section 101 proceeds to step S315, and saves the shot image in the recording section 108 as an image file.

On the other hand, at step S312, when it is determined that the shooting instruction information for the selected image title is the instruction for post-shooting processing, the system control section 101 proceeds to step S313, and displays the instruction for the post-shooting processing as the shooting instruction information on the display section 104. Accordingly, the user can perform the processing based on the instruction for post-shooting processing.

The operator gives instructions for execution of the instructed post-shooting processing to the system control section 101 through the operating section 106. The system control section 101 executes the instructed post-shooting processing (step S314). The instruction for the post-shooting processing includes an instruction to enter a memo, for example. The system control section 101 saves the image, that has been subjected to the processing as instructed, in the recording section 108 as an image file (step S315).

On the other hand, at step S307, when it is determined that there is no shooting instruction information for the selected image title in the image capture guide list, the system control section 101 proceeds to step S306, executes the processing for shooting in the normal image capture guide list mode, and stores the shot image in the recording section 108 as an image file (step S307).

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

FIG. 89 shows an example of the item list on the personal computer 200. In FIG. 89, the operator selects the scope of "Item" as an image title on the personal computer 200, and further selects "Shooting instruction (which is provided before shooting)" as shooting instruction information. An image capture guide list file is created by inserting the identifier "A", which represents the shooting instruction information for pre-shooting, between the image title and this shooting instruction information. The setting of the list title and the file name may also be required when creating the image capture guide list file.

The shooting instruction information is not limited to the text, but a drawing, for example, may be used. FIG. 37 shows an example of the drawing as the shooting instruction information, and particularly shows the drawing for guidance of how to shoot such as shooting points. In accordance with this drawing, the user can select subjects according to the instruction for how to shoot (shooting points) shown in this drawing, and take pictures of these. Although the instruction for post-shooting processing is shown here as the shooting instruction information, any instruction for processing to be performed simultaneously with shooting, such as the processing for measuring a distance, may be provided. When the instruction for processing to be performed simultaneously with shooting is provided, the instruction is displayed before shooting. Accordingly, the user can give instructions for execution of the processing to be performed simultaneously with shooting to the digital camera.

As explained above, according to the first example, the image titles in the image capture guide list are displayed. An image title is selected from the displayed image titles, and the shooting instruction information for the selected image title (instructions for how to shoot and for post-shooting processing) is displayed. The user takes pictures based on the displayed method for shooting and performs the processing based on the instruction for the displayed post-shooting processing. Accordingly, the user can perform shooting and its post-shooting processing based on the displayed shooting instruction information. Therefore, shooting and post-shooting processing can be performed based on the instruction by the creator, who has created the image capture guide list, or an instructor.

Second Example

Figure 38:
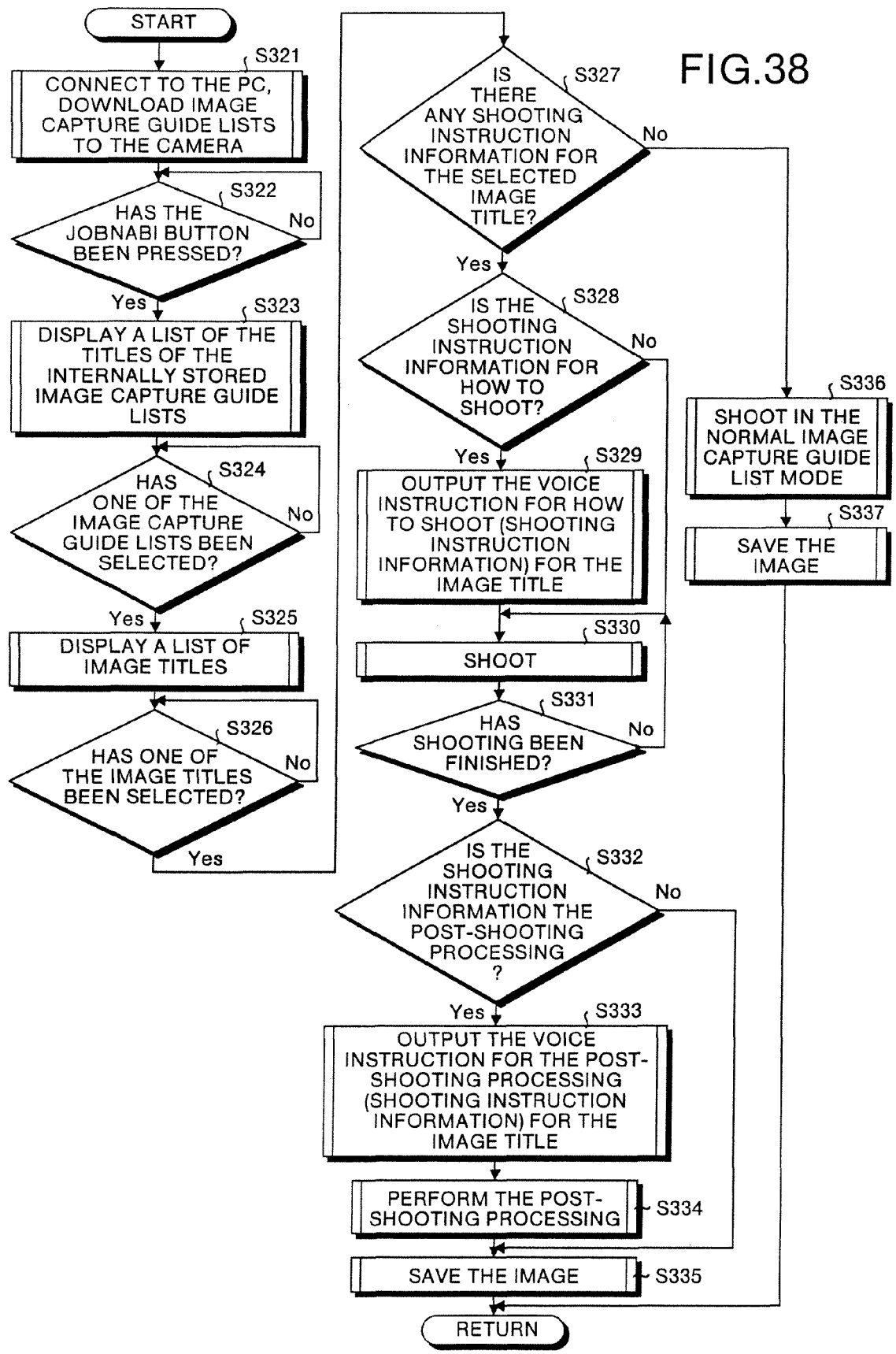
FIG. 38 is a flow chart for explaining a second example of the image capture guide list for the digital camera.

The second example is explained with reference to FIG. 38. The flow chart in FIG. 38 shows the operation in the digital camera 100 according to the second example. In this second example, the operation in the following case will be explained. This case is such that shooting instruction information (instructions for how to shoot and processing for post-shooting processing), corresponding to each of selected image titles in an image capture guide list, is output by voice, and the user takes pictures based on the voice instruction for how to shoot, and performs the processing based on the voice instruction for post-shooting processing.

In FIG. 38, the digital camera 100 is connected to the personal computer 200 to download image capture guide lists, and stores these lists in the recording section 108 (step S321). Each of these lists includes image titles as targets to be recorded, and further, respective shooting instruction information (instruction for how to shoot and instruction for post-shooting processing) registered therein as voice information in correlation with each of these image titles.

The system control section 101 determines whether the JOBNABI button 24 on the operating section 106 has been pressed (step S322). When the button 24 has been pressed, the system control section 102 enters the image capture guide list mode, and displays a list of the image capture guide list titles stored in the recording section 108 on the display section 104 (step S323). The operator selects one out of these list titles through operation of the touch panel operating section 107. The system control section 101 determines whether one of these list titles has been selected (step S324).

When selection has been made, the system control section 101 displays a list of image titles in the selected image capture guide list on the display section 104 (step S325). The operator selects one of these image titles through the operation of the touch panel operating section 107. The system control section 101 determines whether one of these image titles has been selected (step S326). When selection has been made, the system control section 101 enters the shooting mode to allow shooting. The system control section 101 determines whether there is any shooting instruction information for the selected image title in the image capture guide list (step S327).

When it is determined that there is the shooting instruction information for the selected image title in the image capture guide list, the system control section 101 then determines whether the shooting instruction information is an instruction for how to shoot (step S328). When it is determined that the information is not such an instruction, the system control section 101 proceeds to step S330, while proceeds to step S329 when it is determined that the information is such an instruction. At step S329, the system control section 101 outputs the instruction for how to shoot as shooting instruction information for the selected image title in the image capture guide list by voice from the voice data recording/playing section 105 (step S329). Accordingly, the user can select a subject for the image title to take its picture based on the voice instruction for how to shoot.

Shooting is executed according to pressing of the shutter release button 21 on the operating section 106 (step S330). If there are plural shooting points, shooting is performed plural times. The system control section 101 determines whether the shooting has been finished (step S331). When it is determined that the shooting has been finished, the system control section 101 determines whether the shooting instruction information for the selected image title is an instruction for post-shooting processing (step S332). When it is determined that the information is not such an instruction, the system control section 101 proceeds to step S335, and saves the shot image in the recording section 108 as an image file.

On the other hand, at step S335, when it is determined that the shooting instruction information for the selected image title is the instruction for post-shooting processing, the system control section 101 proceeds to step S333, and outputs the instruction for post-shooting processing (shooting instruction information) by voice from the voice data recording/playing section 105. Accordingly, the user can perform the processing based on the instruction for post-shooting processing.

The operator gives instructions for execution of the instructed post-shooting processing to the system control section 101 through the operating section 106. The system control section 101 executes the instructed post-shooting processing (step S334). The instruction for the post-shooting processing includes an instruction to enter a memo, for example. The system control section 101 saves the image, that has been subjected to the processing as instructed, in the recording section 108 as an image file (step S335).

On the other hand, at step S327, when it is determined that there is no shooting instruction information for the selected image title in the image capture guide list, the system control section 101 proceeds to step S336. Shooting is executed in the normal image capture guide list mode (step S336), and the shot image is stored in the recording section 108 as an image file (step S337).

Although the instruction for post-shooting processing is shown here as the shooting instruction information, any instruction for processing to be performed simultaneously with shooting, such as the processing for measuring a distance, may be provided. When the instruction for processing to be performed simultaneously with shooting is provided, the voice instruction is output before shooting. Accordingly, the user can give instructions for execution of the processing to be performed simultaneously with shooting to the digital camera.

Further, the digital camera 100 transfers the image capture guide list and the file(s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the second example, the user selects one of the image titles in the image capture guide list. The shooting instruction information (instructions for how to shoot and for post-shooting processing), corresponding to the selected image title in the image capture guide list, is output by voice. The user then takes pictures based on the voice instruction for how to shoot and performs the processing based on the voice instruction for post-shooting processing. Accordingly, the user can perform shooting and post-shooting processing based on the shooting instruction information output by voice. Therefore, shooting and post-shooting processing can be performed based on the instruction by the creator, who has created the image capture guide list, or its instructor.

Third Example

Figure 39:
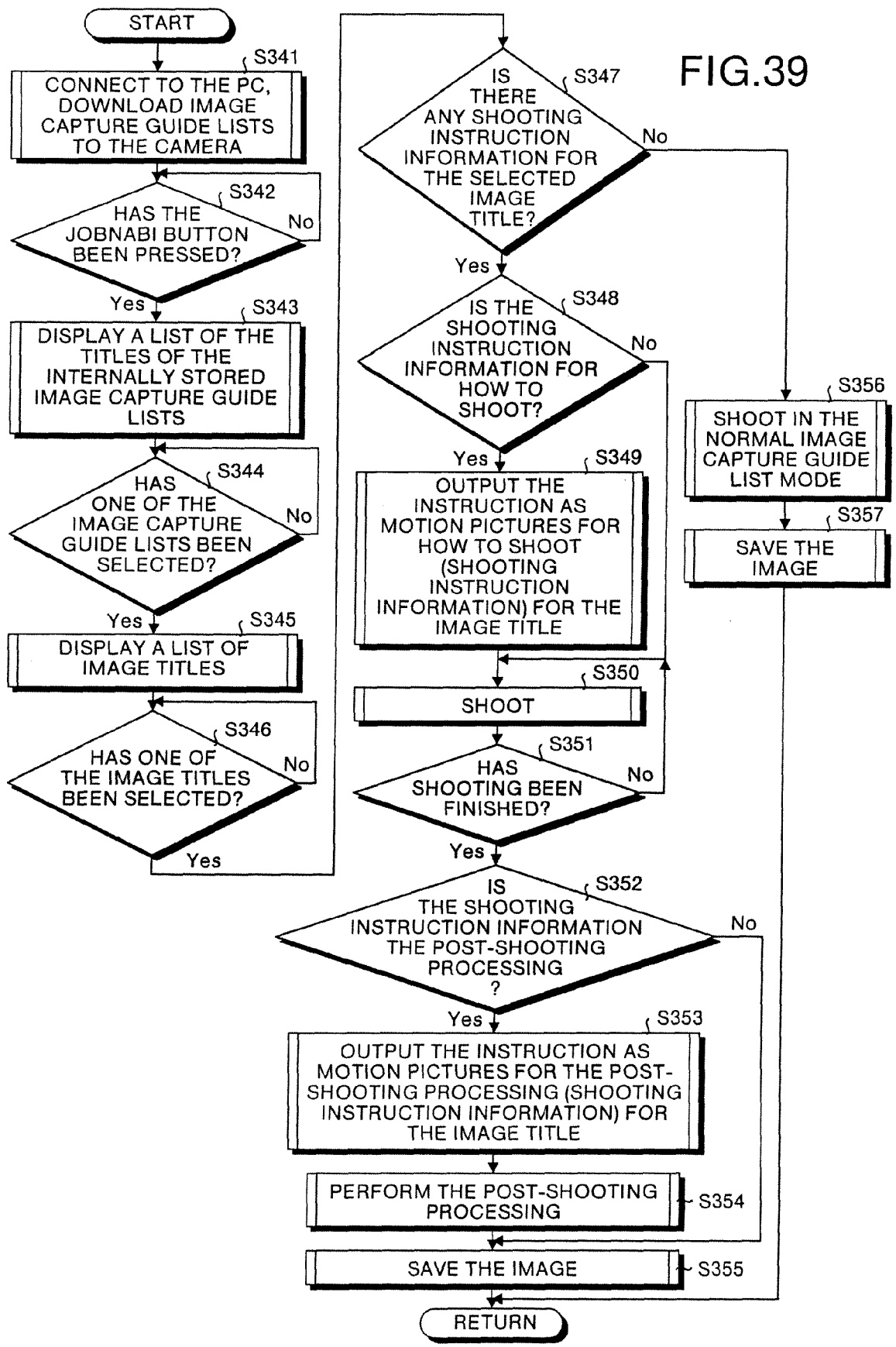
FIG. 39 is a flow chart for explaining a third example of the image capture guide list for the digital camera.

The third example is explained with reference to FIG. 39. The flow chart in FIG. 39 shows the operation in the digital camera 100 according to the third example. In this third example, the operation in the following case will be explained. This case is such that the shooting instruction information (instructions for how to shoot and for post-shooting processing), corresponding to each of selected image titles in an image capture guide list, is played as motion pictures, and the user takes pictures according to the instruction for how to shoot played as motion pictures, and performs the processing according to the instruction for post-shooting processing played as motion pictures.

In FIG. 39, the digital camera 100 is connected to the personal computer 200 to download image capture guide lists, and stores these lists in the recording section 108 (step S341). Each of these lists has its list title, image titles as targets to be recorded, and further, respective shooting instruction information (instructions for how to shoot and for post-recording processing) registered therein as motion pictures in correlation with each of these image titles.

The system control section 101 determines whether the JOBNABI button 24 on the operating section 106 has been pressed (step S342). When the button 24 has been pressed, the system control section 102 enters the image capture guide list mode, and displays a list of the image capture guide list titles stored in the recording section 108 on the display section 104 (step S343). The user selects one out of these list titles. The system control section 101 determines whether one of these list titles has been selected (step S344).

When selection has been made, the system control section 101 displays a list of image titles in the selected image capture guide list on the display section 104 (step S345). The user selects one out of these image titles through the operation of the touch panel operating section 107. The system control section 101 determines whether one of these image titles has been selected (step S346). When selection has been made, the system control section 101 enters the image capture guide list shooting mode (recording mode) to allow shooting. The system control section 101 determines whether there is any shooting instruction information for the selected image title in the image capture guide list (step S347).

When it is determined that there is the shooting instruction information for the selected image title in the image capture guide list, the system control section 101 then determines whether the shooting instruction information is an instruction for how to shoot (step S348). When it is determined that the information is not such an instruction, the system control section 101 proceeds to step S350, while proceeds to step S349 when it is determined that the information is such an instruction. At step S349, the system control section 101 plays the instruction as motion pictures for how to shoot (shooting instruction information) corresponding to the selected image title in the image capture guide list on the display section 104. Accordingly, the user can select a subject for the image title to take its picture based on the instruction for how to shoot.

At step S350, shooting is executed according to pressing of the shutter release button 21 on the operating section 106. If there are plural shooting points, shooting is performed plural times. The system control section 101 determines whether the shooting has been finished (step S351). When it is determined that the shooting has been finished, the system control section 101 determines whether the shooting instruction information for the selected image title is an instruction for post-shooting processing (step S352). When it is determined that the information is not such an instruction, the system control section 101 proceeds to step S355, and saves the shot image in the recording section 108 as an image file. On the other hand, at step S352, when it is determined that the shooting instruction information for the selected image title is the instruction for post-shooting processing, the system control section 101 proceeds to step S354, and plays the instruction as motion pictures for post-shooting processing (shooting instruction information) on the display section 104. Accordingly, the user can perform the processing based on the instruction for post-shooting processing.

The operator gives instructions for execution of the instructed post-shooting processing to the system control section 101 through the operating section 106. The system control section 101 executes the instructed post-shooting processing (step S354) The instruction for the post-shooting processing includes an instruction to enter a memo, for example. The system control section 101 saves the image, that has been subjected to the processing as instructed, in the recording section 108 as an image file (step S355).

On the other hand, at step S347, when it is determined that there is no shooting instruction information for the selected image title in the image capture guide list, the system control section 101 proceeds to step S356. Shooting is executed in the normal image capture guide list mode, and the shot image is stored in the recording section 108 as an image file (step S357).

Although the instruction for post-shooting processing is shown here as the shooting instruction information, any instruction for processing to be performed simultaneously with shooting, such as the processing for measuring a distance, may be provided. When the instruction for processing to be performed simultaneously with shooting is provided, the instruction as motion pictures is output to the display 104 before shooting. Accordingly, the user can give instructions for execution of the processing to be performed simultaneously with shooting to the digital camera.

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the third example, the user selects one of the image titles from the image capture guide list. The shooting instruction information (instructions for how to shoot and for post-shooting processing), corresponding to the selected image title in the image capture guide list, is output as motion pictures. The user takes pictures based on the instruction as motion pictures for how to shoot and performs the processing based on such an instruction for post-shooting processing. Accordingly, the user can perform shooting and the post-shooting processing based on the shooting instruction information output as motion pictures. Therefore, shooting and post-shooting processing can be performed based on the instruction by the creator, who has created the image capture guide list, or its instructor.

Fourth Example

Figure 40:
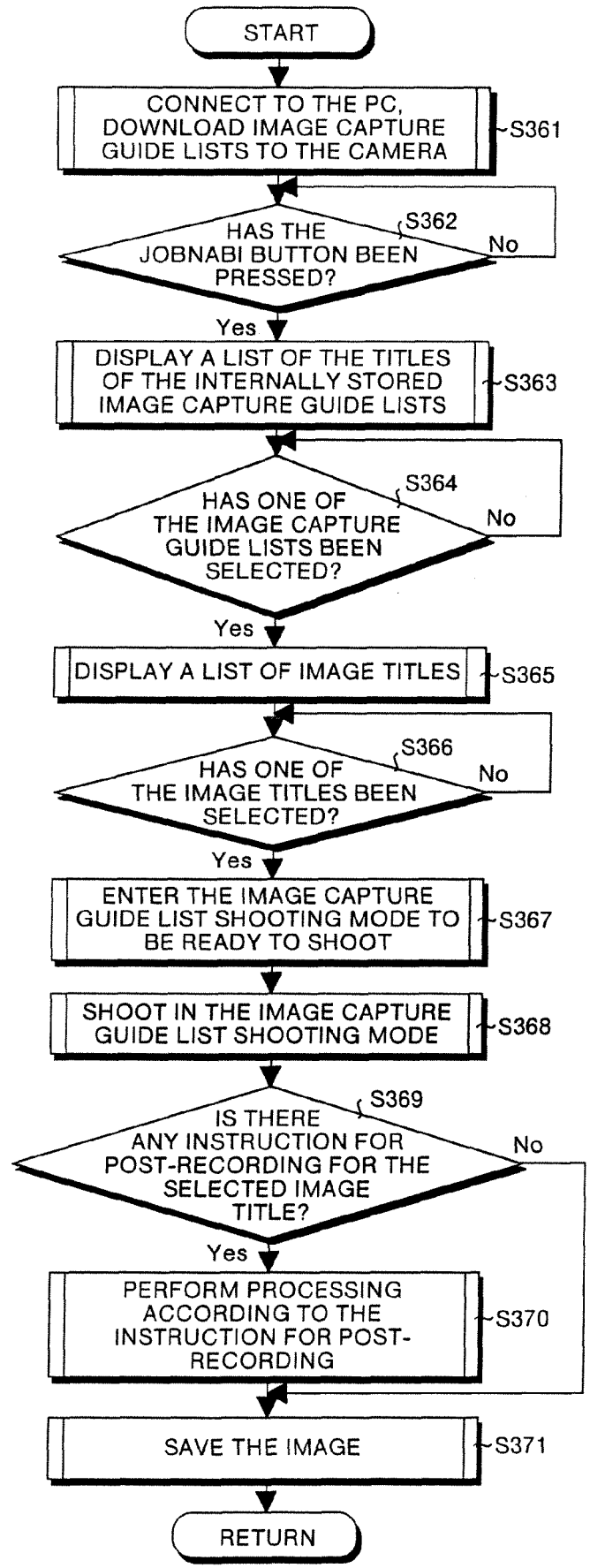
FIG. 40 is a flow chart for explaining a fourth example of the image capture guide list for the digital camera.

The fourth example is explained with reference to FIG. 40. The flow chart in FIG. 40 shows the operation in the digital camera 100 according to the fourth example. In this fourth example, the operation in the following case will be explained. This case is such that a list of image titles in an image capture guide list is displayed, the mode is switched to a recording mode after an image title is selected, the data recorded in this recording mode is automatically processed based on automatic processing instruction information (instruction for post-recording) corresponding to the selected image title in the image capture guide list.

In FIG. 40, the digital camera 100 is connected to the personal computer 200 to download image capture guide lists, and stores these lists in the recording section 108 (step S361). Each of these lists has its list title, image titles as targets to be recorded, and further, respective automatic processing instruction information (instruction for post-recording) registered therein in correlation with each of these image titles. The operation instructing commands as shown in FIG. 41 are used for this automatic processing instruction information.

The system control section 101 determines whether the JOBNBI button 24 on the operating section 106 has been pressed (step S362). When the button 24 has been pressed, the system control section 102 enters the image capture guide list mode, and displays a list of the image capture guide list titles stored in the recording section 108 on the display section 104 (step S363). The operator selects one out of these list titles through operation of the touch panel operating section 107. The system control section 101 determines whether one of these list titles has been selected (step S364).

When selection has been made, the system control section 101 displays a list of image titles in the selected image capture guide list on the display section 104 (step S365). The operator selects one out of these image titles through the operation of the touch panel operating section 107. The system control section 101 determines whether one of these image titles has been selected (step S366). When selection has been made, the system control section 101 enters the image capture guide list shooting mode (recording mode) to allow shooting (step S367). Accordingly, the user can select a subject for the image title to take its picture.

Shooting is executed according to pressing of the shutter release button 21 on the operating section 106 (step S368). Further, the system control section 101 determines whether there is automatic processing instruction information (instruction for post-recording) corresponding to the selected image title (step S369). When it is determined that there is such information (instruction for post-recording), the system control section 101 then performs processing on the recorded image based on the automatic processing instruction information (instruction for post-recording) corresponding to the selected image title (step S370). The image subjected to the processing is saved in the recording section 108 as an image file (step S371).

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the fourth example, the list of the image titles in the image capture guide list is displayed. The mode is switched to the recording mode after an image title is selected, and the data recorded in this recording mode is subjected to the processing based on the automatic processing instruction information (instruction for post-recording) corresponding to the selected image title in the image capture guide list. Accordingly, using the image capture guide list can prevent the user from forgetting to take required pictures during shooting, and after the shooting, the post-shooting processing can be automated, thus improving usability for the user.

Fifth Example

Figure 42:
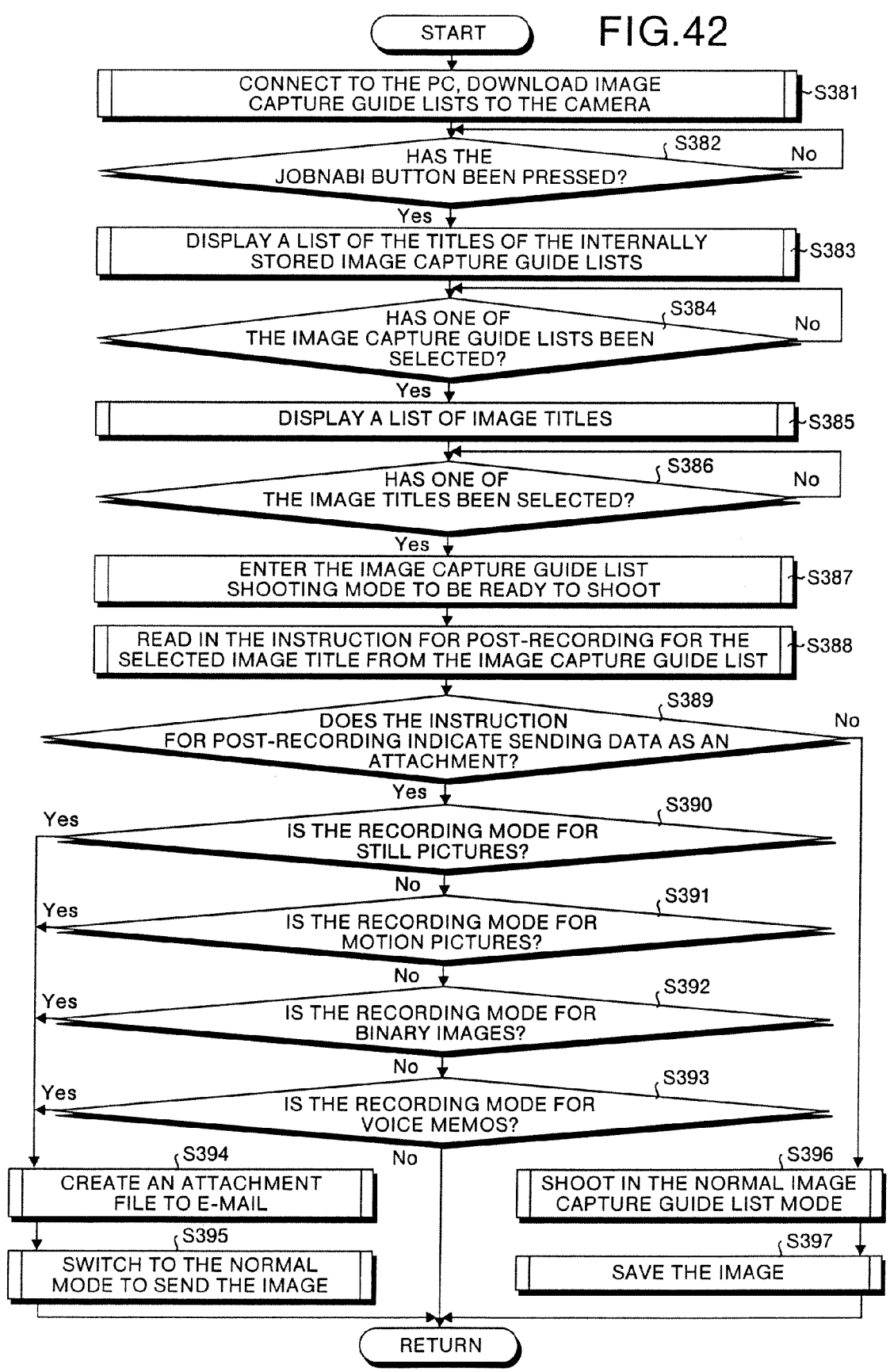
FIG. 42 is a flow chart for explaining a fifth example of the image capture guide list for the digital camera.

The fifth example is explained with reference to FIG. 42. The flow chart in FIG. 42 shows the operation in the digital camera 100 according to the fifth example. In this fifth example, the operation in the following case will be explained. This case is such that a list of image titles in an image capture guide list is displayed, and when automatic processing instruction information (instruction for post-recording), corresponding to a selected image title in this list, indicates sending data as an attachment, the recorded data is attached to the e-mail to be sent to a specified destination.

In FIG. 42, the digital camera 100 is connected to the personal computer 200 to download image capture guide lists, and stores these lists in the recording section 108 (step S381). Each of these lists includes image titles as targets to be recorded (see FIG. 6), and further, respective automatic processing instruction information (instruction for post-recording) registered therein in correlation with each of these image titles. The operation instructing commands as shown in FIG. 41 are used for this automatic processing instruction information. FIG. 43 shows an example of the commands used for sending an image by e-mail as post-processing of shooting.

The system control section 101 determines whether the JOBNABI button 24 on the operating section 106 has been pressed (step S382). When the button 24 has been pressed, the system control section 102 enters the image capture guide list mode, and displays a list of the image capture guide list titles stored in the recording section 108 on the display section 104 (step S383). The operator selects one out of these list titles through operation of the touch panel operating section 107. The system control section 101 determines whether one of these list titles has been selected (step S384).

When selection has been made, the system control section 101 displays a list of image titles in the selected image capture guide list on the display section 104 (step S385). The operator selects one out of these image titles through the operation of the touch panel operating section 107. The system control section 101 determines whether one of these image titles has been selected (step S386). When selection has been made, the system control section 101 enters the image capture guide list shooting mode to allow shooting to be ready (step S387). Accordingly, the user can select a subject for the image title to take its picture.

The system control section 101 reads out the instruction for post-recording corresponding to the selected image title in the image capture guide list from the recording section 108 (step S388). Further, the system control section 101 determines whether the automatic processing instruction information (instruction for post-recording) indicates sending data as an attachment (step S389).

When it is determined that the automatic processing instruction information (instruction for post-recording) indicates sending data as an attachment, the system control section 101 then determines whether the recording mode is any of still picture, motion picture, binary image, or voice memo modes (step S390 to step S393). The system control section 101 then creates an attachment file to e-mail as any of the recorded still picture, motion pictures, binary image, and voice memo (step S394). Further, the system control section 101 shifts to the communication mode and sends the attachment file to the specified destination (step S395). On the other hand, at step S389, when it is determined that the automatic processing instruction information (instruction for post-recording) does not indicate sending data as an attachment, shooting is executed in the normal image capture guide list mode (step S396), and the file of the shot image is stored in the recording section 108 (step S397).

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the fifth example, the list of the image titles in the image capture guide list is displayed. When it is determined that the automatic processing instruction information (instruction for post-recording), corresponding to the selected image title in the image capture guide list, indicates sending data as an attachment, the recorded data is attached to e-mail and sent to a specified destination. Accordingly, using the image capture guide list can prevent the user from forgetting to take required pictures during shooting, and after the shooting, it is possible to automatically send the recorded image or the like attached to e-mail to a destination, thus improving usability for the user.

Sixth Example

Figure 44:
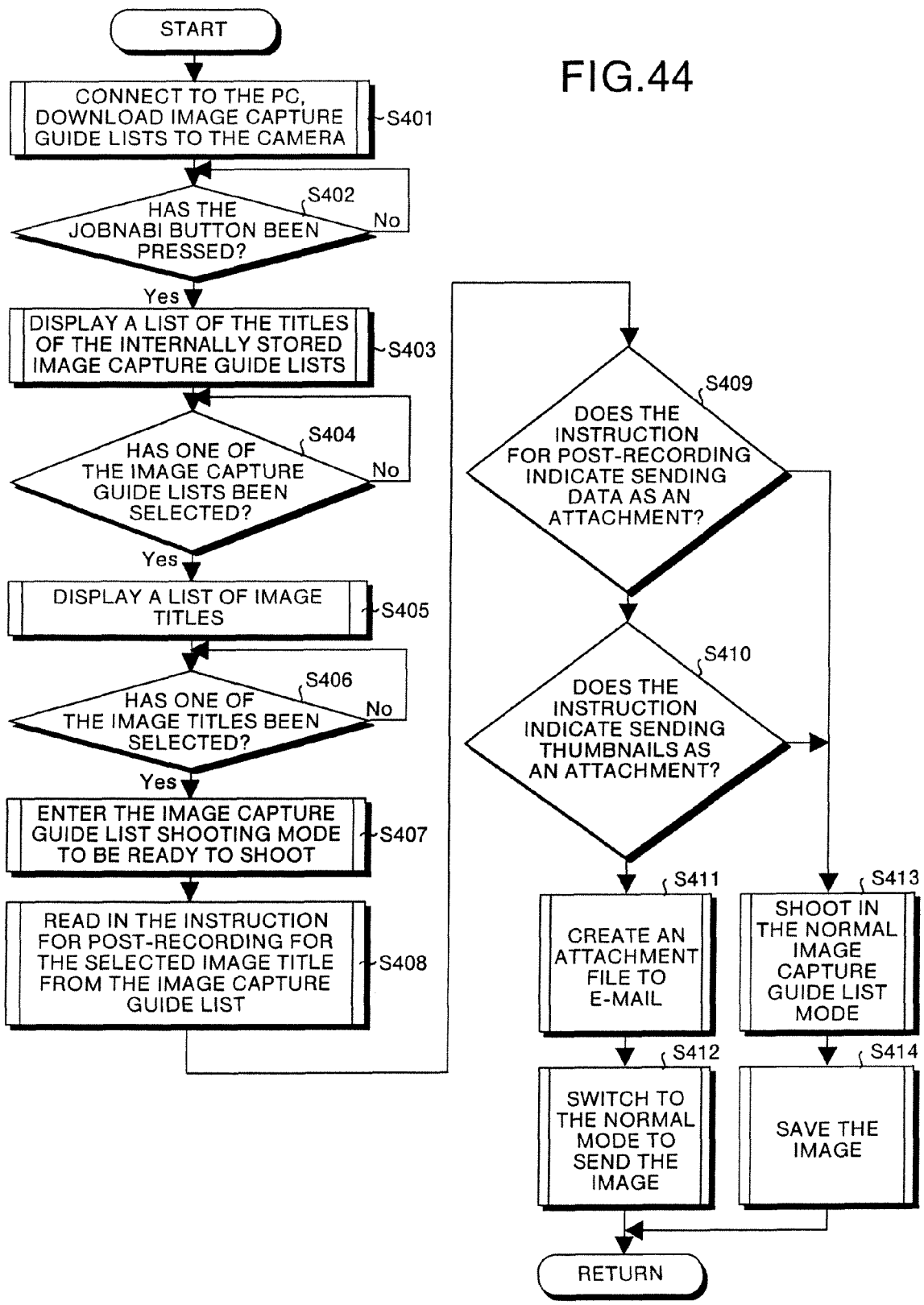
FIG. 44 is a flow chart for explaining a sixth example of the image capture guide list for the digital camera.

The sixth example is explained with reference to FIG. 44. The flow chart in FIG. 44 shows the operation in the digital camera 100 according to the sixth example. In this sixth example, the operation in the following case will be explained. This case is such that a list of image titles in an image capture guide list is displayed, and when automatic processing instruction information (instruction for post-recording), corresponding to a selected image title in this list, indicates sending thumbnail data as an attachment, thumbnail images of the shot images are attached to e-mail and are sent to a specified destination.

In FIG. 44, the digital camera 100 is connected to the personal computer 200 to download image capture guide lists, and stores these lists in the recording section 108 (step S401). Each of these lists includes image titles as targets to be recorded, and further, respective automatic processing instruction information (instruction for post-recording) registered therein in correlation with each of these image titles. The operation instructing commands as shown in FIG. 41 are used for this automatic processing instruction information (instruction for post-recording). FIG. 43 shows an example of the commands used for sending an image by e-mail as processing of post-recording.

The system control section 101 determines whether the JOBNABI button 24 on the operating section 106 has been pressed (step S402). When the button 24 has been pressed, the system control section 102 enters the image capture guide list mode, and displays a list of the image capture guide list titles stored in the recording section 108 on the display section 104 (step S403). The operator selects one out of these list titles through operation of the touch panel operating section 107. The system control section 101 determines whether one of these list titles has been selected (step S404).

When selection has been made, the system control section 101 displays a list of image titles in the selected image capture guide list on the display section 104 (step S405). The operator selects one out of these image titles through the operation of the touch panel operating section 107. The system control section 101 determines whether one of these image titles has been selected (step S406). When selection has been made, the system control section 101 enters the image capture guide list shooting mode to allow shooting to be ready (step S407). Accordingly, the user can select a subject for the image title to take its picture.

The system control section 101 reads out automatic processing instruction information (instruction for post-recording) corresponding to the selected image title in the image capture guide list, from the recording section 108 (step S408). Further, the system control section 101 determines whether the automatic processing instruction information (instruction for post-recording) indicates sending data as an attachment (step S409).

When it is determined that the automatic processing instruction information (instruction for post-recording) indicates sending data as an attachment, the system control section 101 further determines whether the instruction for post-recording indicates sending thumbnail data as an attachment (step S410). When the instruction for post-recording indicates sending thumbnail data as an attachment, the system control section 101 creates thumbnail images of the data for the shot images, and creates an attachment file of the thumbnail images attached to e-mail (step S411). Further, the system control section 101 shifts to the communication mode and sends the attachment file to a specified destination (step S412). On the other hand, at step S409, when it is determined that the instruction for post-recording does not indicate sending data by e-mail, and when it is determined at step S410 that such an instruction does not indicate sending thumbnail data by e-mail, the system control section 101 proceeds to step S413. Shooting is executed in the normal image capture guide list mode, and the shot image is stored in the recording section 108 as an image file (step S414).

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the sixth example, the list of the image titles in the image capture guide list is displayed. When it is determined that the automatic processing instruction information (instruction for post-recording), corresponding to a selected image title in the image capture guide list, indicates sending thumbnail data as an attachment, thumbnail images of the recorded images are attached to e-mail and are sent to a specified destination. Accordingly, using the image capture guide list can prevent the user from forgetting to take required pictures during shooting, and after the shooting, it is possible to automatically send the thumbnail images of the shot images attached to e-mail to a destination, thus improving usability for the user.

Seventh Example

Figure 45:
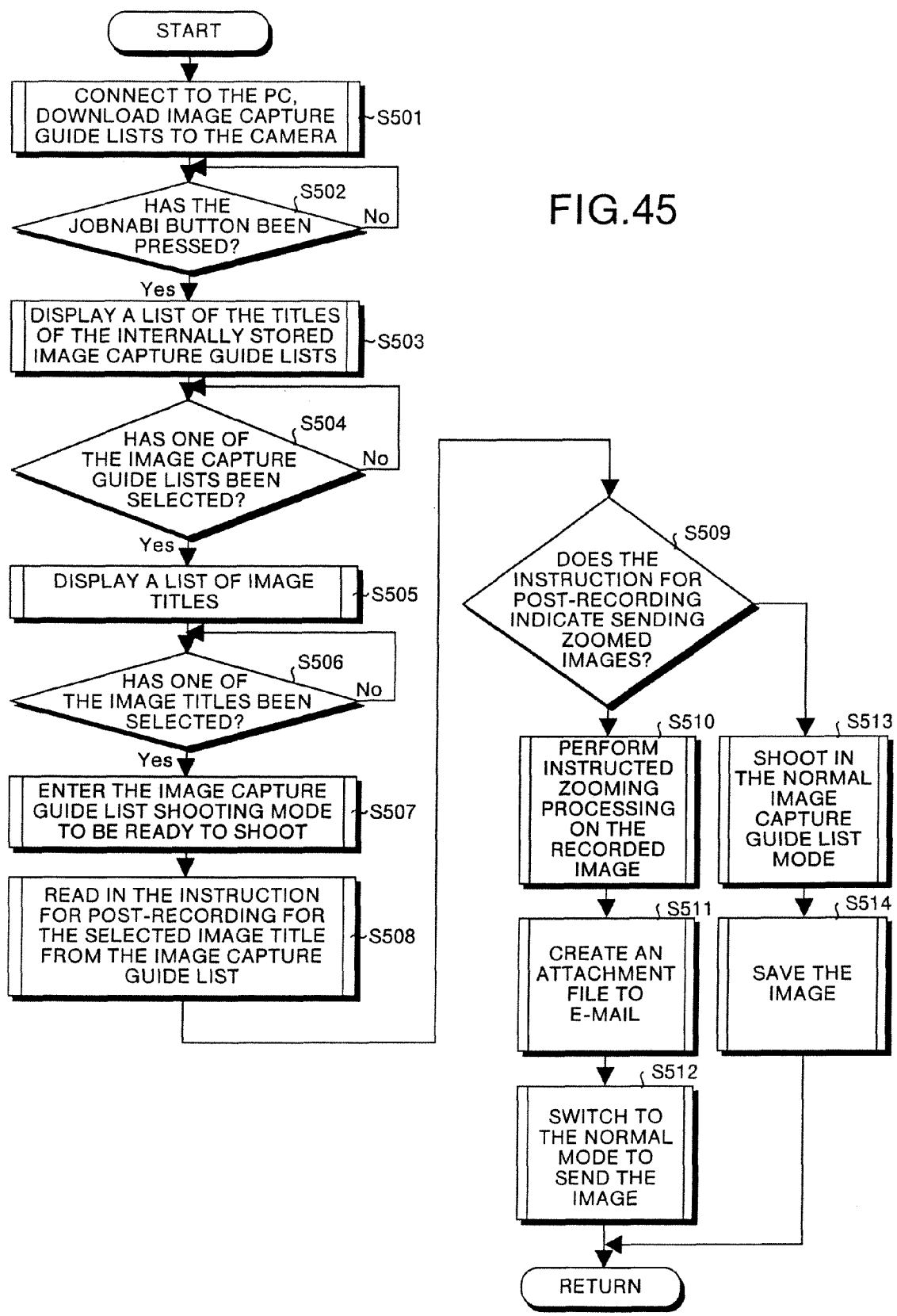
FIG. 45 is a flow chart for explaining a seventh example of the image capture guide list for the digital camera.

The seventh example is explained with reference to FIG. 45. The flow chart in FIG. 45 shows the operation in the digital camera 100 according to the seventh example. In this seventh example, the operation in the following case will be explained. This case is such that a list of image titles in an image capture guide list is displayed, and when automatic processing instruction information (instruction for post-recording), corresponding to a selected image title in this list, indicates sending a zoomed image, the shot image data is zoomed to a specified size, which is attached to e-mail, and the data is sent to a specified destination.

In FIG. 45, the digital camera 100 is connected to the personal computer 200 to download image capture guide lists, and stores these lists in the recording section 108 (step S501). Each of these lists includes image titles as targets to be recorded (see FIG. 6), and further, respective automatic processing instruction information (instruction for post-recording) registered therein in correlation with each of these image titles. The operation instructing commands as shown in FIG. 41 are used for this instruction for post-recording.

The system control section 101 determines whether the JOBNABI button 24 on the operating section 106 has been pressed (step S502). When the button 24 has been pressed, the system control section 102 enters the image capture guide list mode, and displays a list of the image capture guide list titles stored in the recording section 108 on the display section 104 (step S503). The operator selects one out of these list titles through operation of the touch panel operating section 107. The system control section 101 determines whether one of these list titles has been selected (step S504).

When selection has been made, the system control section 101 displays a list of image titles in the selected image capture guide list on the display section 104 (step S505). The operator selects one out of these image titles through the operation of the touch panel operating section 107. The system control section 101 determines whether one of these image titles has been selected (step S506). When selection has been made, the system control section 101 enters the image capture guide list shooting mode to allow shooting to be ready (step S507). Accordingly, the user can select a subject for the image title to take its picture.

The system control section 101 reads out automatic processing instruction information (instruction for post-recording) corresponding to the selected image title in the image capture guide list, from the recording section 108 (step S508). Further, the system control section 101 determines whether this automatic processing instruction information (instruction for post-recording) indicates sending a zoomed image (step S509). When it is determined that the automatic processing instruction information (instruction for post-recording) indicates sending a zoomed image, the system control section 101 zooms the shot image to a size in a magnification specified in the data recording/playing section (step S510). The system control section 101 attaches the zoomed image to e-mail to create an e-mail attachment file (step S511). Further, the system control section 101 shifts to the communication mode and sends the e-mail attachment file to a specified destination (step S512). On the other hand, at step S509, when it is determined that the automatic processing instruction information (instruction for post-recording) does not indicate sending a zoomed image, the system control section 101 proceeds to step S513. shooting is executed in the normal image capture guide list mode, and the shot image is stored in the recording section 108 as an image file (step S514).

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the seventh example, the list of the image titles in the image capture guide list is displayed. When the automatic processing instruction information (instruction for post-recording), corresponding to the selected image title in the image capture guide list, indicates sending a zoomed image, the shot image data is zoomed to a specified size and attached to e-mail, and the e-mail is sent to a specified destination. Accordingly, using the image capture guide list can prevent the user from forgetting to take required pictures during shooting, and after the shooting, the set image is zoomed in a specified magnification to be attached to e-mail, and the e-mail can automatically be sent to a destination, thus improving usability for the user.

Eighth Example

Figure 46:
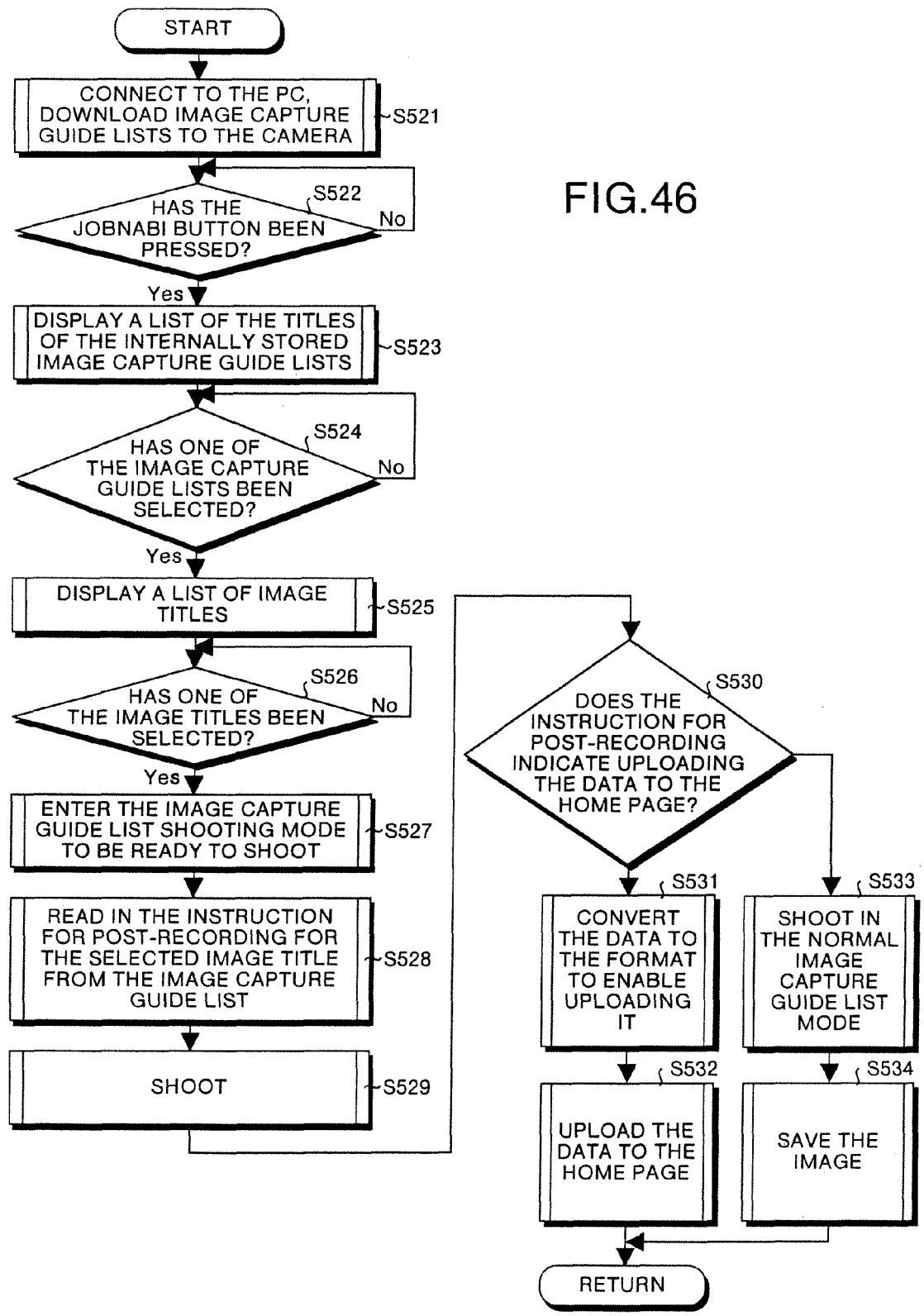
FIG. 46 is a flow chart for explaining an eighth example of the image capture guide list for the digital camera.

The eighth example is explained with reference to FIG. 46. The flow chart in FIG. 46 shows the operation in the digital camera 100 according to the eighth example. In this eighth example, the operation in the following case will be explained. This case is such that when the automatic processing instruction information (instruction for post-recording), corresponding to a selected image title in an image capture guide list indicates uploading an image to a home page, an HTML file of a shot image is created and uploaded to a specified home page.

In FIG. 46, the digital camera 100 is connected to the personal computer 200 to download image capture guide lists, and stores these lists in the recording section 108 (step S521). Each of these lists includes image titles as targets to be recorded (see FIG. 6), and further, respective automatic processing instruction information (instruction for post-recording) registered therein in correlation with each of these image titles. The operation instructing commands as shown in FIG. 41 are used for this instruction for post-recording. FIG. 47 shows an example of commands used for uploading an image to the Web server 300 as an instruction for post-recording.

The system control section 101 determines whether the JOBNBI button 24 on the operating section 106 has been pressed (step S522). When the button 24 has been pressed, the system control section 102 enters the image capture guide list mode, and displays a list of the image capture guide list titles stored in the recording section 108 on the display section 104 (step S523). The operator selects one out of these list titles through operation of the touch panel operating section 107. The system control section 101 determines whether one of these list titles has been selected (step S524).

When selection has been made, the system control section 101 displays a list of image titles in the selected image capture guide list on the display section 104 (step S525). The operator selects one out of these image titles through the operation of the touch panel operating section 107. The system control section 101 determines whether one of these image titles has been selected (step S526). When selection has been made, the system control section 101 enters the image capture guide list shooting mode to allow shooting to be ready (step S527). Accordingly, the user can select a subject for the image title to take its picture.

The system control section 101 reads out automatic processing instruction information (instruction for post-recording) corresponding to the selected image title in the image capture guide list, from the recording section 108 (step S528). Shooting is executed according to operation of the shutter release button 21 on the operating section 106 (step S529). Further, the system control section 101 determines whether the automatic processing instruction information (instruction for post-recording) indicates uploading an image to a home page (step S530). When it is determined that the automatic processing instruction information (instruction for post-recording) indicates uploading an image to a home page, the system control section 101 converts the shot images to an HTML file format so as to enable uploading of the images (step S531). The system control section 101 shifts to the communication mode and uploads the HTML file to a specified home page (step S532).

On the other hand, at step S530, when it is determined that the automatic processing instruction information (instruction for post-recording) does not indicates uploading an image to a home page, the system control section 101 proceeds to step S533. Shooting is executed in the normal image capture guide list mode, and the shot image is stored in the recording section 108 as an image file (step S534).

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the eighth example, when the automatic processing instruction information (instruction for post-recording), corresponding to the selected image title in the image capture guide list, indicates uploading an image to a home page, the HTML file of the shot image is created and uploaded to the specified home page. Accordingly, using the image capture guide list can prevent the user from forgetting to take required pictures during shooting, and after the shooting, the shot image can automatically be uploaded to the home page, thus improving usability for the user.

Ninth Example

Figure 48:
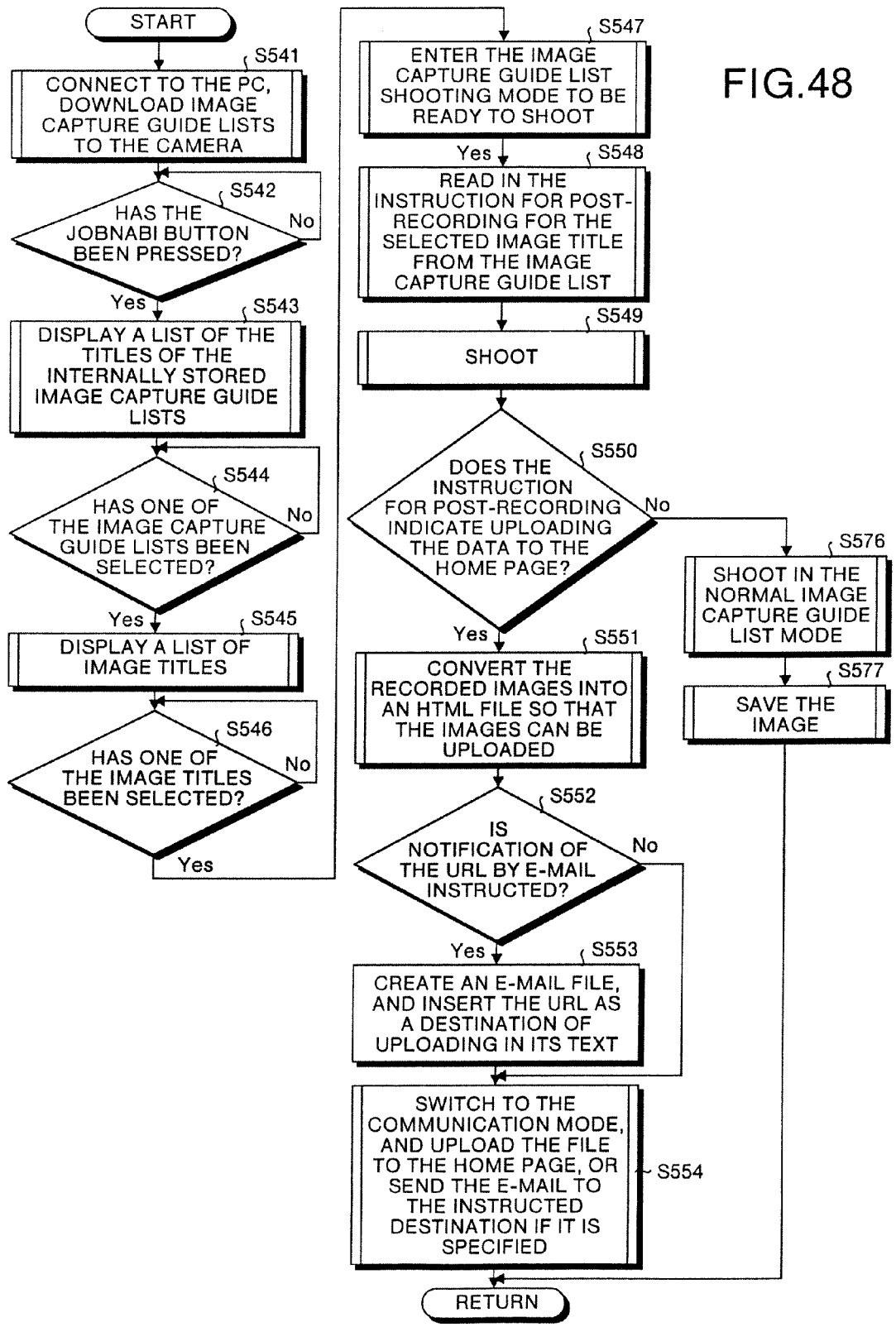
FIG. 48 is a flow chart for explaining a ninth example of the image capture guide list for the digital camera.

The ninth example is explained with reference to FIG. 48. The flow chart in FIG. 48 shows the operation in the digital camera 100 according to the ninth example. In this ninth example, the operation in the following case will be explained. This case is such that when the instruction for post-recording for a selected image title in an image capture guide list indicates uploading an image to a home page and notification of the URL of this home page, the shot image is uploaded to a specified home page, and the URL of this home page is sent by e-mail to a specified destination.

In FIG. 48, the digital camera 100 is connected to the personal computer 200 to download image capture guide lists, and stores these lists in the recording section 108 (step S541). Each of these lists includes image titles as targets to be recorded (see FIG. 6), and further, respective automatic processing instruction information (instruction for post-recording) registered therein in correlation with each of these image titles. The operation instructing commands as shown in FIG. 41 are used for this instruction for post-recording. FIG. 47 shows an example of the commands used for uploading an image to a Web server as an instruction for post-recording.

The system control section 101 determines whether the JOBNABI button 24 on the operating section 106 has been pressed (step S542). When the button 24 has been pressed, the system control section 102 enters the image capture guide list mode, and displays a list of the image capture guide list titles stored in the recording section 108 on the display section 104 (step S543). The operator selects one out of these list titles through operation of the touch panel operating section 107. The system control section 101 determines whether one of these list titles has been selected (step S544).

When selection has been made, the system control section 101 displays a list of image titles in the selected image capture guide list on the display section 104 (step S545). The operator selects one out of these image titles through the operation of the touch panel operating section 107. The system control section 101 determines whether one of these image titles has been selected (step S546). When selection has been made, the system control section 101 enters the image capture guide list shooting mode to allow shooting to be ready (step S547). Accordingly, the user can select a subject for the image title to take its picture.

The system control section 101 reads out automatic processing instruction information (instruction for post-recording) corresponding to the selected image title in the image capture guide list, from the recording section 108 (step S548). Shooting is executed according to operation of the shutter release button 21 on the operating section 106 (step S549). Further, the system control section 101 determines whether the read-out automatic processing instruction information (instruction for post-recording) indicates uploading an image to a home page (step S550). When it is determined that the automatic processing instruction information (instruction for post-recording) indicates uploading an image to a home page, the system control section 101 converts the shot images to an HTML file format so as to enable uploading of the images (step S551).

The system control section 101 determines whether the automatic processing instruction information (instruction for post-recording) indicates notification of URL by e-mail (step S552). When the automatic processing instruction information (instruction for post-recording) does not indicate notification of URL by e-mail, the system control section 101 proceeds to step S554. On the other hand, when the automatic processing instruction information (instruction for post-recording) indicates notification of URL by e-mail, the system control section 101 creates an e-mail file that the URL as a destination of uploading is inserted in its text (step S553), and proceeds to step S554. At step S554, the system control section 101 uploads the HTML file to a specified home page, and sends the e-mail file created at step S553 to the specified address.

On the other hand, at step S550, when it is determined that the automatic processing instruction information (instruction for post-recording) does not indicate uploading an image to a home page, the system control section 101 proceeds to step S555. Shooting is executed in the normal image capture guide list mode, and the shot image is stored in the recording section 108 as an image file (step S556).

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the ninth example, the image capture guide list is displayed on the display section 104, and an image title is selected from the displayed list. When the automatic processing instruction information (instruction for post-recording), corresponding to the selected image title, indicates uploading an image to a home page and notification of the URL of this home page, the shot image is uploaded to a specified homepage. Further, the URL of this homepage is sent to the specified destination by e-mail. Accordingly, using the image capture guide list can prevent the user from forgetting to take required pictures during shooting, and after the shooting, the shot image can automatically be uploaded to the home page and the URL of this home page can automatically be sent to the specified destination by e-mail, thus improving usability for the user.

In the fourth example to the ninth example, the automatic processing instruction information (instruction for post-recording/post-shooting) is registered in the image capture guide list for each image title. However, the instruction may not be provided for each image title, but may be provided for the overall image capture guide list. For example, this instruction may be provided when recording (shooting) for all the image titles is finished. In the eighth example and the ninth example, for example, when recording for all the image titles in the image capture guide list is finished according to this image capture guide list, the instruction to upload the shot images in one file to the home page may be issued.

Tenth Example

Figure 49:
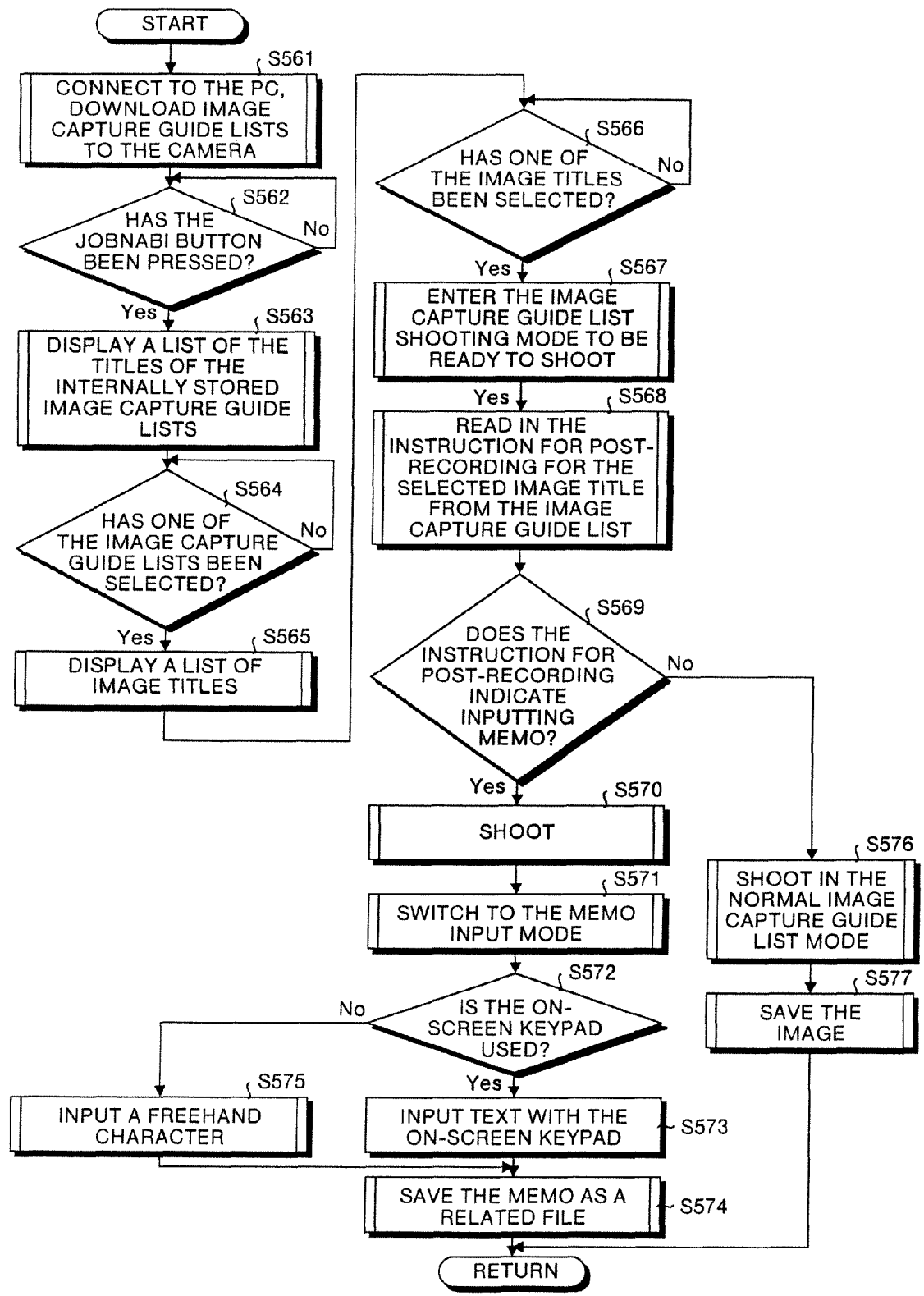
FIG. 49 is a flow chart for explaining a tenth example of the image capture guide list for the digital camera.

The tenth example is explained with reference to FIG. 49. The flow chart in FIG. 49 shows the operation in the digital camera 100 according to the tenth example. In this tenth example, the operation in the following case will be explained. This case is such that an image title is selected from the image capture guide list, and when the automatic processing instruction information (instruction for post-recording), corresponding to the selected image title, indicates inputting a memo, the mode is automatically switched to the memo input mode after shooting, and a file of the input memo is saved as a related file to an image file of the shot image data.

In FIG. 49, the digital camera 100 is connected to the personal computer 200 to download image capture guide lists, and stores these lists in the recording section 108 (step S561). Each of these lists includes its own title, image titles as targets to be recorded, and further, respective automatic processing instruction information (instruction for post-recording) registered therein in correlation with each of these image titles. The operation instructing commands as shown in FIG. 41 are used for this automatic processing instruction information.

The system control section 101 determines whether the JOBNABI button 24 on the operating section 106 has been pressed (step S562). When the button 24 has been pressed, the system control section 102 enters the image capture guide list mode, and displays a list of the image capture guide list titles stored in the recording section 108 on the display section 104 (step S563). The operator selects one out of these list titles through operation of the touch panel operating section 107.

The system control section 101 determines whether one of these list titles has been selected (step S564).

When selection has been made, the system control section 101 displays a list of image titles in the selected image capture guide list on the display section 104 (step S565). The operator selects one out of these image titles through the operation of the touch panel operating section 107. The system control section 101 determines whether one of these image titles has been selected (step S566). When selection has been made, the system control section 101 enters the image capture guide list shooting mode to allow shooting to be ready (step S567). Accordingly, the user can select a subject for the image title to take its picture.

The system control section 101 reads out the instruction for post-recording corresponding to the selected image title in the image capture guide list, from the recording section 108 (step S568). Further, the system control section 101 determines whether the automatic processing instruction information (instruction for post-recording) indicates inputting a memo (step S569). When it is determined that the instruction for post-recording for the selected image title indicates inputting a memo, the system control section 101 proceeds to step S570. A subject is shot according to pressing of the shutter release button 21 on the operating section 106. The image data for the shot subject is stored in the recording section 108 as an image file (step S570).

Further, the system control section 101 shifts to the memo input mode (step S571), and determines whether the button for selecting on-screen keypad entry has been selected on the touch panel operating section 107 (step S572). When such a button has been selected, the user enters text through the on-screen keypad (step S573), and the entered text is stored in the recording section 108 as a related file (step S574). On the other hand, at step S572, when it is determined that the button for selecting on-screen keypad entry has not been selected on the touch panel operating section 107, the user enters a character written in freehand using the stylus pen on the touch panel operating section 107 (step S575). This centered freehand character is stored in the recording section 108 as a related file (step S574).

On the other hand, at step S569, when it is determined that the automatic processing instruction information (instruction for post-recording) does not indicate inputting a memo, the system control section 101 proceeds to step S576. Shooting is executed in the normal image capture guide list mode, and the shot image is stored in the recording section 108 as an EXIF-format image file (step S577).

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the tenth example, when inputting a memo after shooting is instructed in the image capture guide list, the mode is switched to the memo input mode after the shooting. Accordingly, the memo information for the shot image can be input, so that it is possible to prevent the pictures from being mixed up after the shooting, thus improving usability for the user.

Further, according to the tenth example, when an image title is selected from the image capture guide list and the automatic processing instruction information (instruction for post-recording), corresponding to the selected image title, indicates inputting a memo, the mode is switched to the memo input mode, and the file of the entered memo is saved as the related file to the file of the shot image. Accordingly, using the image capture guide list can prevent the user from forgetting to take required pictures during shooting, and after the shooting, the memo relating to the shooting can be saved as the related file. Thus, the user can smoothly carry out the operations.

Eleventh Example

Figure 50:
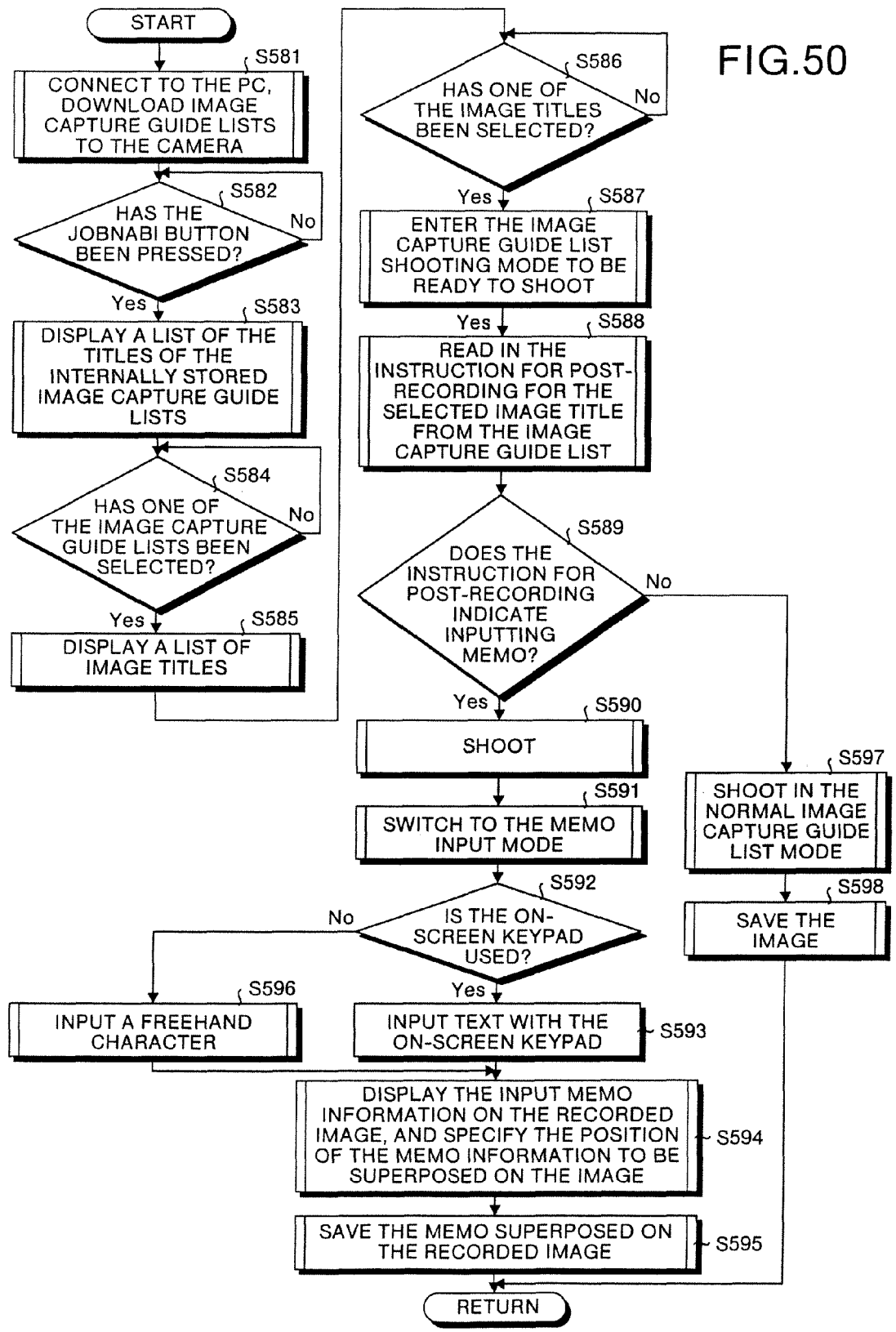
FIG. 50 is a flow chart for explaining an eleventh example of the image capture guide list for the digital camera.

The eleventh example is explained with reference to FIG. 50. The flow chart in FIG. 50 shows the operation in the digital camera 100 according to the eleventh example. In this eleventh example, the operation in the following case will be explained. This case is such that an image title is selected from an image capture guide list, and when the automatic processing instruction information (instruction for post-recording), corresponding to the selected image title, indicates combination of an input memo with an image, the mode is switched to the memo input mode after shooting, and input memo information is combined with the shot image to be saved.

In FIG. 50, the digital camera 100 is connected to the personal computer 200 to download image capture guide lists, and stores these lists in the recording section 108 (step S581). Each of these lists has its own title, image titles as targets to be recorded, and respective automatic processing instruction information (instruction for post-recording) registered therein in correlation with each of these image titles.

The system control section 101 determines whether the JOBNABI button 24 on the operating section 106 has been pressed (step S582). When the button 24 has been pressed, the system control section 102 enters the image capture guide list mode, and displays a list of the image capture guide list titles stored in the recording section 108 on the display section 104 (step S583). The operator selects one out of these list titles through operation of the touch panel operating section 107. The system control section 101 determines whether one of these list titles has been selected (step S584).

When selection has been made, the system control section 101 displays a list of image titles in the selected image capture guide list on the display section 104 (step S585). The operator selects one out of these image titles through the operation of the touch panel operating section 107. The system control section 101 determines whether one of these image titles has been selected (step S586). When selection has been made, the system control section 101 enters the image capture guide list shooting mode to allow shooting to be ready (step S587). The monitoring image then appears on the display section 104. Accordingly, the user can select a subject for the image title to take its picture.

The system control section 101 reads out the automatic processing instruction information (instruction for post-recording) corresponding to the selected image title in the image capture guide list, from the recording section 108 (step S588). Further, the system control section 101 determines whether the automatic processing instruction information (instruction for post-recording) indicates combination of an input memo with an image (step S589). When it is determined that the instruction for post-recording for the selected image title indicates such combination, the system control section 101 proceeds to step S590. The subject is shot according to pressing of the shutter release button 21 on the operating section 106. In this case, the shot image is appeared on the display section 104.

Further, the system control section 101 shifts to the memo input mode (step S591), and determines whether the button for selecting on-screen keypad entry has been selected on the touch panel operating section 107 (step S592). When such a button has been selected, the user enters text through the on-screen keypad (step S593). At step S592, when it is determined that the button for selecting on-screen keypad entry has not been selected on the touch panel operating section 107, the user enters a character written in freehand using the stylus pen on the touch panel operating section 107 (step S596). This entered memo information (text or freehand character) is displayed by being superposed on the selected and shot image. Further, the user specifies a position of the memo information that will be superposed on the shot image (step S594). Accordingly, the user can check the position of the memo information to be superposed on the shot image while viewing this shot image.

The system control section 101 combines the shot image with the memo information whose position is specified to create a composite image, and saves this composite image in the recording section 108 as an image file (step S595).

On the other hand, at step S589, when it is determined that the instruction for post-recording does not indicate combination of an input memo with an image, the system control section 101 proceeds to step S597. Shooting is executed in the normal image capture guide list mode, and the shot image is stored in the recording section 108 as an image file (step S598).

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the eleventh example, an image title is selected from the image capture guide list, and when the automatic processing instruction information (instruction for post-recording), corresponding to the selected image title, indicates combination of an input memo with an image, the mode is switched to the memo input mode after the shooting. The input memo information is then combined with the recorded image to be saved. Accordingly, using the image capture guide list can prevent the user from forgetting to take required pictures during shooting, and after the shooting, it is possible to combine the memo relating to the shooting with the shot image to be saved. Thus, the user can smoothly carry out the operations.

Twelfth Example

Figure 51:
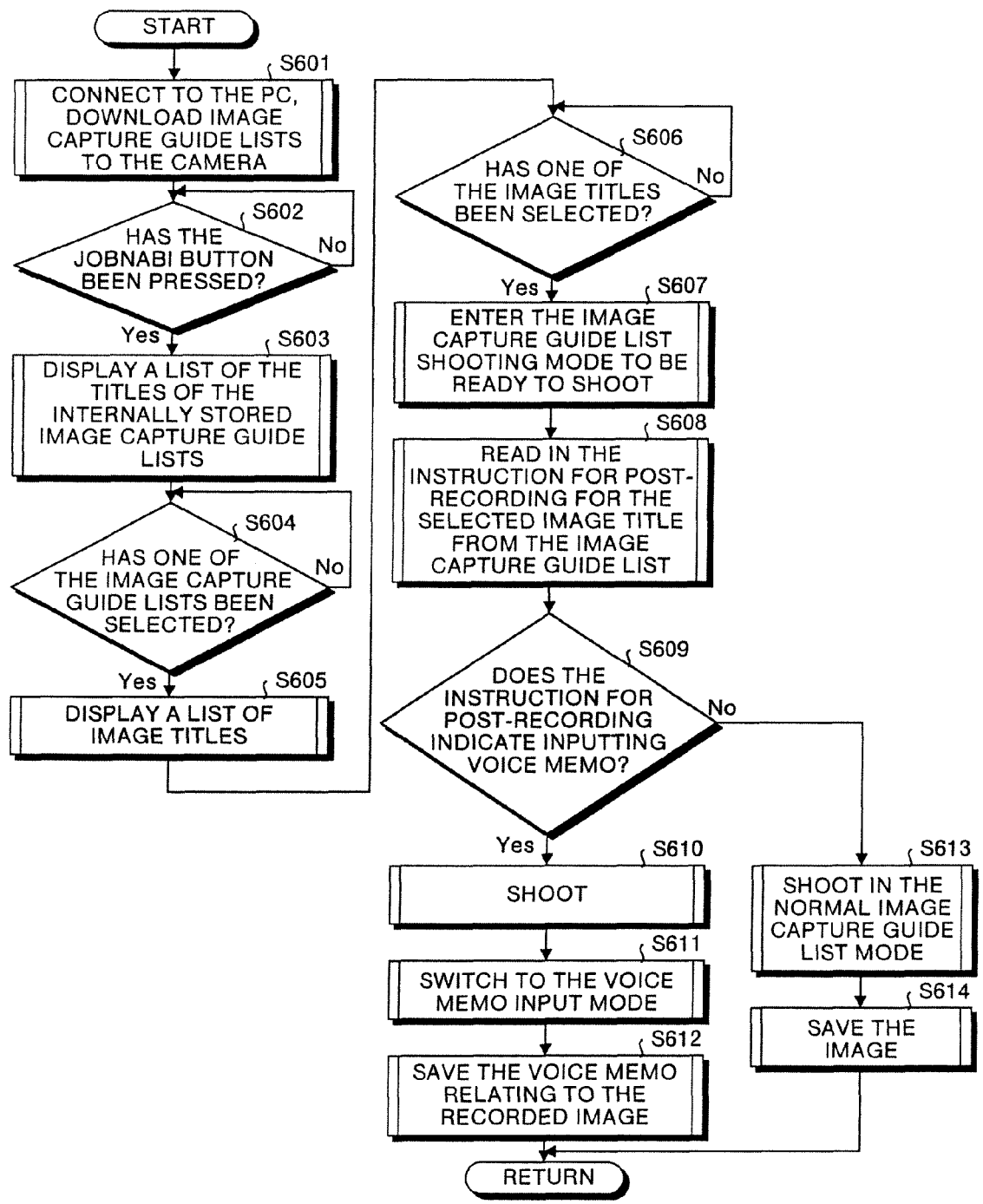
FIG. 51 is a flow chart for explaining a twelfth example of the image capture guide list for the digital camera.

The twelfth example is explained with reference to FIG. 51. The flow chart in FIG. 51 shows the operation in the digital camera 100 according to the twelfth example. In this twelfth example, the operation in the following case will be explained. This case is such that an image title in an image capture guide list is selected, and when the automatic processing instruction information (instruction for post-recording), corresponding to the selected image title, indicates voice entry, the mode is switched to the voice memo input mode after shooting, and an input voice memo is saved as a related file to the file of the shot image.

In FIG. 51, the digital camera 100 is connected to the personal computer 200 to download image capture guide lists, and stores these lists in the recording section 108 (step S601). Each of these lists has its own title, image titles as targets to be recorded, and respective automatic processing instruction information (instruction for post-recording) registered therein in correlation with each of these image titles. The operation instructing commands as shown in FIG. 41 are used for this automatic processing instruction information (instruction for post-recording).

The system control section 101 determines whether the JOBNABI button 24 on the operating section 106 has been pressed (step S602). When the button 24 has been pressed, the system control section 102 enters the image capture guide list mode, and displays a list of the image capture guide list titles stored in the recording section 108 on the display section 104 (step S603). The operator selects one out of these list titles through operation of the touch panel operating section 107. The system control section 101 determines whether one of these list titles has been selected (step S604).

When selection has been made, the system control section 101 displays a list of image titles in the selected image capture guide list on the display section 104 (step S605). The operator selects one out of these image titles through the operation of the touch panel operating section 107. The system control section 101 determines whether one of these image titles has been selected (step S606). When selection has been made, the system control section 101 enters the image capture guide list shooting mode to allow shooting to be ready (step S607). Accordingly, the user can select a subject for the image title to take its picture.

The system control section 101 reads out the automatic processing instruction information (instruction for post-recording) corresponding to the selected image title in the image capture guide list, from the recording section 108 (step S608). Further, the system control section 101 determines whether the automatic processing instruction information (instruction for post-recording) indicates voice entry (step S609). When it is determined that the automatic processing instruction information (instruction for post-recording) indicates voice entry, the system control section 101 proceeds to step S610. At step S610, a subject is shot according to pressing of the shutter release button 21 on the operating section 106. The shot image is stored in the recording section 108 as an image file. Further, the system control section 101 shifts to the voice memo input mode (step S611), and saves a file of the voice memo input through the voice data recording/playing section 105 in the recording section 108 as a related file to the image file of the shot image (step S612).

On the other hand, at step S609, when it is determined that the automatic processing instruction information (instruction for post-recording) does not indicate voice entry, the system control section 101 proceeds to step S613. Shooting is executed in the normal image capture guide list mode, and the shot image is stored in the recording section 108 as an image file (step S614).

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the twelfth example, the image title is selected from the image capture guide list, and when the automatic processing instruction information (instruction for post-recording), corresponding to the selected image title, indicates voice entry, the mode is switched to the voice memo input mode. The file of the entered voice memo is then saved as the related file to the image file of the shot image. Accordingly, using the image capture guide list can prevent the user from forgetting to take required pictures during shooting, and after the shooting, it is possible to save the voice memo relating to the shooting as its related file. Thus, the user can smoothly carry out the operations.

In the fourth example to the twelfth example, the automatic processing instruction information (instruction for post-recording (post-shooting)) is added to the image capture guide list for each image title. However, the instruction may not be provided for each image title, but may be provided for the overall image capture guide list. The case, in which the automatic processing instruction information for the overall image capture guide list is added to the guide list, will be explained in the thirteenth example to the eighteenth example.

Thirteenth Example

Figure 52:
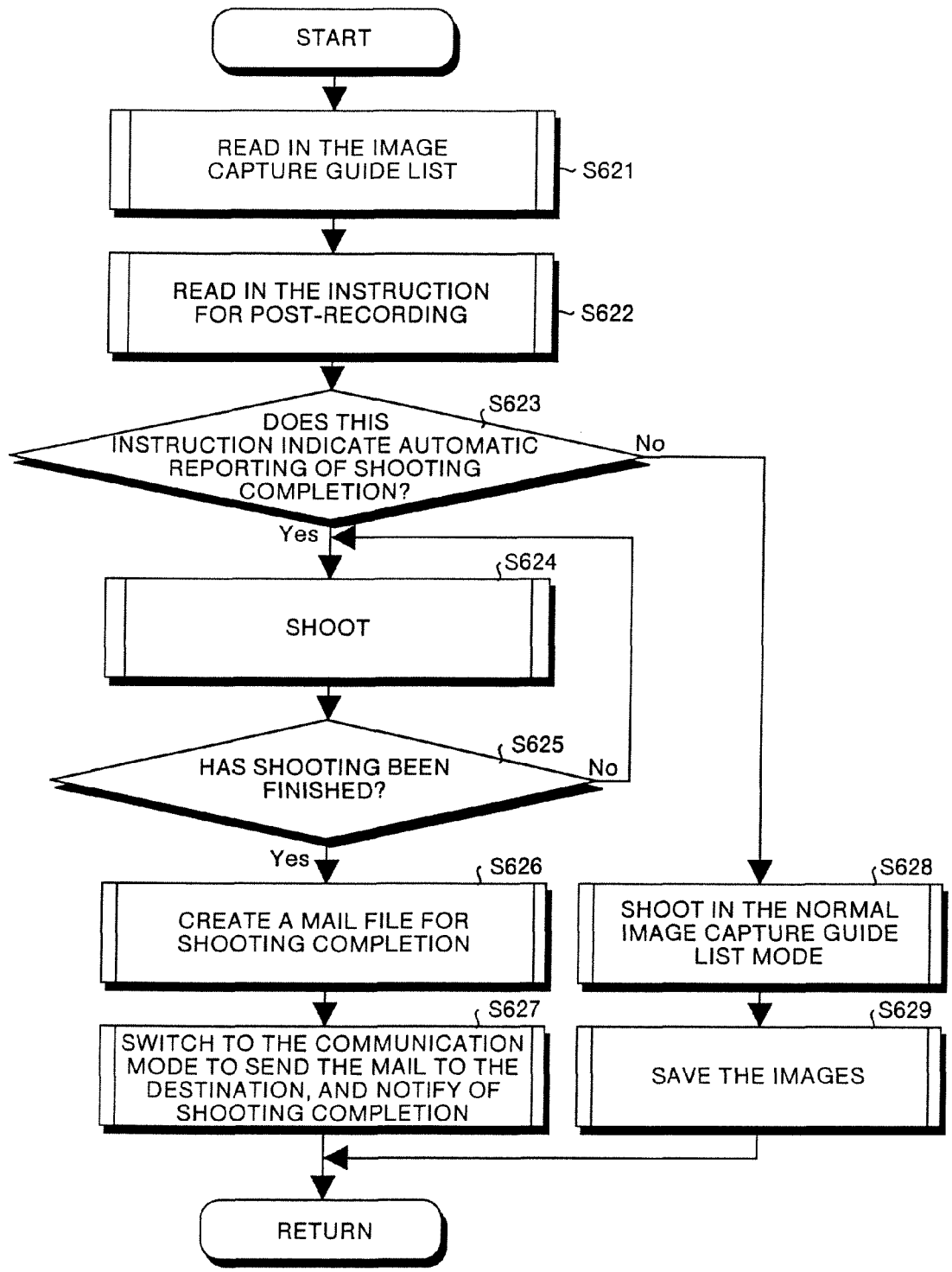
FIG. 52 is a flow chart for explaining a thirteenth example of the image capture guide list for the digital camera.

The thirteenth example is explained with reference to FIG. 52. The flow chart in FIG. 52 shows the operation in the digital camera 100 according to the thirteenth example. In this thirteenth example, the operation in the following case will be explained. This case is such that when shooting for all the image titles in an image capture guide list is finished, the massage to that effect is sent to the personal computer 200.

The digital camera 100 is assumed to store the image capture guide list file downloaded from the personal computer 200 in the recording section 108. In FIG. 52, when the JOBNABI button 24 on the operating section 106 has been pressed, the system control section 102 enters the image capture guide list mode, and reads out image titles in the image capture guide list stored in the recording section 108 to display these titles on the display section 104 (step S621). The system control section 101 further reads out the automatic processing instruction information (instruction for post-recording) in the image capture guide list (step S622). The system control section 101 then determines whether the automatic processing instruction information (instruction for post-recording) indicates automatic reporting of shooting completion (step S623).

When it is determined that the automatic processing instruction information (instruction for post-recording) indicates such automatic reporting, the system control section 101 proceeds to step S624. At step S624, an image title is selected and shooting is performed. The system control section 101 determines whether shooting for all the image titles in the image capture guide list has been finished (step S625). When it is determined that shooting for all the image titles has not been finished, the system control section 101 returns to step S624. On the other hand, when shooting for all the image titles has been completed, the system control section 101 proceeds to step S626, and creates a mail file for shooting completion indicating that shooting for all the image titles in the image capture guide list has been finished.

Further, the system control section 101 shifts to the communication mode and sends the mail file for shooting completion to the personal computer 200 (step S627). On the other hand, at step S623, when it is determined that the automatic processing instruction information (instruction for post-recording) does not indicate automatic reporting of shooting completion, shooting is executed in the normal image capture guide list mode (step S628), and the shot image is stored in the recording section 108 as an image file (step S629).

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the thirteenth example, when shooting of all images for the image titles in the image capture guide list is finished with the digital camera, the message to that effect is sent to the personal computer 200. Therefore, the instructor can grasp whether the operations for the image capture guide list have been finished.

When the image capture guide list includes the automatic processing instruction information that instructs to report shooting completion at the time of finishing shooting for all the image titles, shooting completion is reported. However, reporting on shooting completion may also automatically be performed regardless of whether such automatic processing instruction information is included in the image capture guide list.

Fourteenth Example

Figure 53:
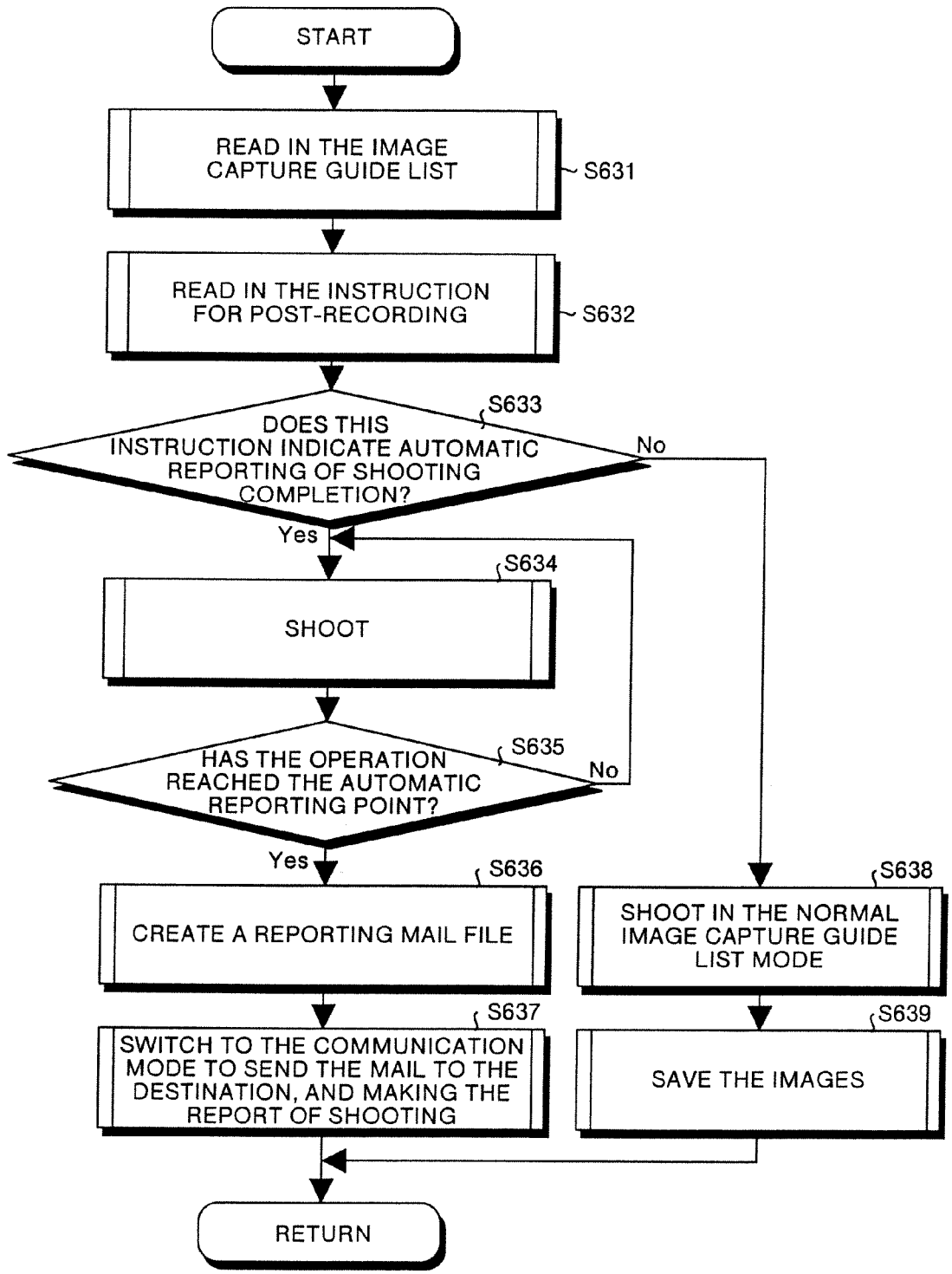
FIG. 53 is a flow chart for explaining a fourteenth example of the image capture guide list for the digital camera.

The fourteenth example is explained with reference to FIG. 53. The flow chart in FIG. 53 shows the operation in the digital camera 100 according to the fourteenth example. In this fourteenth example, the operation in the following case will be explained. This case is such that when shooting for all the image titles in an image capture guide list has been finished up to the point at which reporting will automatically be performed, the massage to that effect is sent to the personal computer 200.

The digital camera 100 is assumed to store the image capture guide list file downloaded from the personal computer 200 in the recording section 108. In FIG. 53, when the JOBNABI button 24 on the operating section 106 has been pressed, the system control section 102 enters the image capture guide list mode, and reads out image titles in the image capture guide list stored in the recording section 108 to display these titles on the display section 104 (step S631). The system control section 101 further reads out the automatic processing instruction information (instruction for post-recording) in the image capture guide list (step S632). The system control section 101 then determines whether the automatic processing instruction information (instruction for post-recording) indicates automatic reporting of shooting completion (step S633).

When it is determined that the automatic processing instruction information (instruction for post-recording) indicates such automatic reporting, the system control section 101 proceeds to step S634. At step S634, an image title is selected and shooting is performed. The system control section 101 determines whether shooting for the image titles in the image capture guide list has been finished up to the point at which reporting will automatically be performed (step S635). This automatic reporting point mentioned here indicates the points as follows at which reporting is automatically performed. That is, the point at which shooting for the predetermined number of images for the image capture guide list is finished, and the point at which shooting for the predetermined number of image titles is finished.

When it is determined that the shooting for the image titles in the image capture guide list has not been finished up to such a point, the system control section 101 returns to step S634. On the other hand, when the shooting for the image titles in the image capture guide list has been finished up to such a point, the system control section 101 proceeds to step S636, and creates a reporting mail file indicating that the shooting for all the image titles in the image capture guide list is finished up to the point for automatic reporting (step S636). The system control section 101 then shifts to the communication mode and sends the reporting mail file to the personal computer 200 (step S637).

On the other hand, at step S633, when it is determined that the automatic processing instruction information (instruction for post-recording) does not indicate automatic reporting of shooting completion, the system control section 101 proceeds to step S638, shooting is executed in the normal image capture guide list mode, and the shot image is stored in the recording section 108 as an image file (step S639).

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the fourteenth example, when shooting for the image titles in the image capture guide list is finished with the digital camera up to the automatic reporting point, the message to that effect is sent to the personal computer 200. Therefore, the instructor can grasp how the operations for the image capture guide list are progressing.

When the image capture guide list includes the automatic processing instruction information that instructs to report at the time of finishing shooting for image titles up to the automatic reporting point, shooting completion is reported. However, reporting may also be performed regardless of whether such automatic processing instruction information is included in the image capture guide list.

Fifteenth Example

Figure 54:
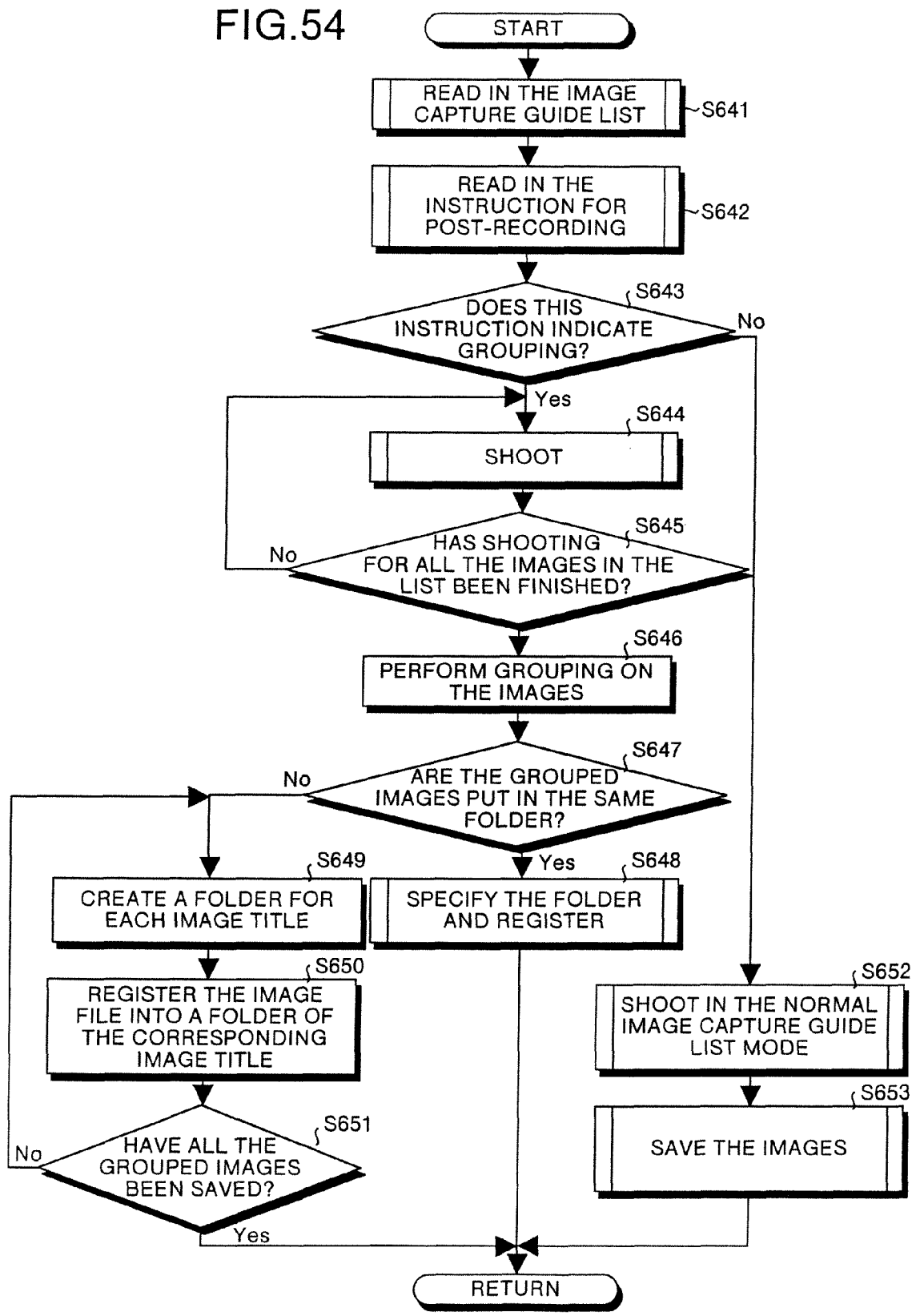
FIG. 54 is a flow chart for explaining a fifteenth example of the image capture guide list for the digital camera.

The fifteenth example is explained with reference to FIG. 54. The flow chart in FIG. 54 shows the operation in the digital camera 100 according to the fifteenth example. In this fifteenth example, the operation in the following case will be explained. This case is such that when the automatic processing instruction information in an image capture guide list indicates grouping, shot images are grouped and saved.

In FIG. 54, the digital camera 100 is assumed to store the image capture guide list file downloaded from the personal computer 200 in the recording section 108. When the JOBNABI button 24 on the operating section 106 has been pressed, the system control section 102 enters the image capture guide list mode, and reads out image titles in the image capture guide list stored in the recording section 108 to display these titles on the display section 104 (step S641). The system control section 101 further reads out the automatic processing instruction information (instruction for post-recording) in the image capture guide list (step S642), and determines whether the automatic processing instruction information (instruction for post-recording) indicates grouping (step S643). When grouping is instructed, the system control section 101 proceeds to step S644. At step S644, an image title is selected and shooting is performed.

The system control section 101 determines whether shooting for all the image titles in the image capture guide list has been finished (step S645). When it is determined that the shooting for all the image titles in the image capture guide list has not been finished, the system control section 101 returns to step S644. On the other hand, when shooting for all the image titles in the image capture guide list has been finished, the system control section 101 performs grouping on the images (step S646). Further, the system control section 101 displays the message to prompt the operator to make a selection of whether the grouped images are to be stored in the same folder on the display section 104. When the same folder for the grouped images has been selected by the user through operation of the operating section 106 (step S647), the folder of the image capture guide list is specified, and the recorded files for all the image titles in the image capture guide list are then registered into this folder (step S648). On the other hand, at step S647, when the same folder for the grouped images has not been selected by the user through operation of the operating section 106, a folder for each image title is prepared in the lower layer of the folder of the image capture guide list (step S649). Each image file is registered in a folder of a corresponding image title (step S650), and the same processing is then repeated until all the grouped image titles have been saved (step S649 to step S651).

On the other hand, at step S643, when grouping is not instructed in the image capture guide list, the system control section 101 proceeds to step S652. Shooting is executed in the normal image capture guide list mode, and the shot image is stored in the recording section 108 as an image file (step S653).

FIG. 55 shows an example of the folder structure of a shot image. This figure shows an example in which a file of the image capture guide list, for which shooting has been finished, and shot images are registered in the folder that is created for each image capture guide list.

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the fifteenth example, when grouping is instructed in the image capture guide list, the files of the shot images are grouped and registered in the folder(s), thus facilitating management of the files.

When the image capture guide list includes the automatic processing instruction information that instructs grouping, the files of shot images are grouped and registered in the folder(s). However, the files of the images shot based on the image capture guide list may also be grouped and registered in the folder(s) regardless of whether the automatic processing instruction information, that instruct grouping, is included in the image capture guide list.

Sixteenth Example

Figure 56:
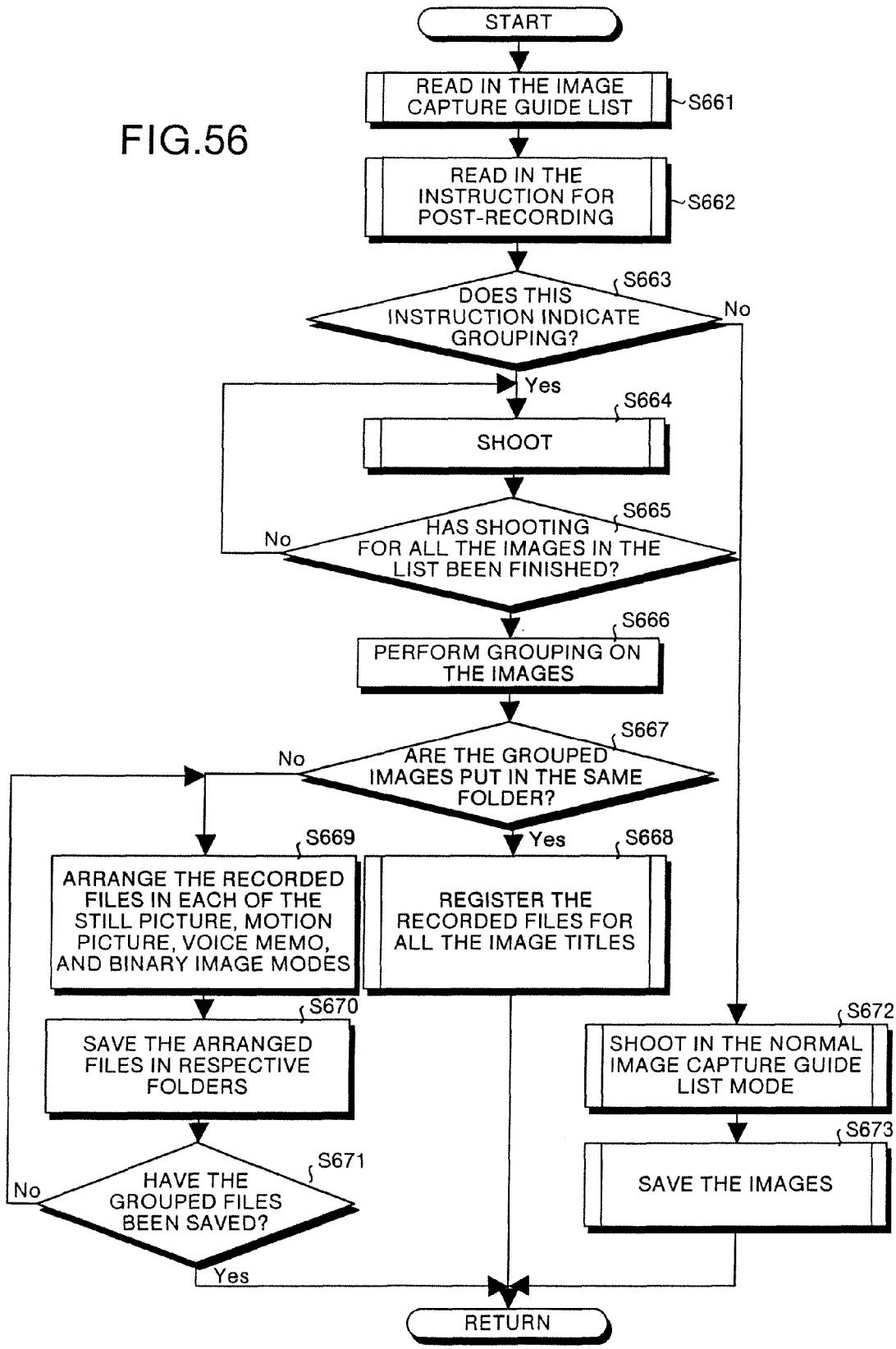
FIG. 56 is a flow chart for explaining a sixteenth example of the image capture guide list for the digital camera.

The sixteenth example is explained with reference to FIG. 56. The flow chart in FIG. 56 shows the operation in the digital camera 100 according to the sixteenth example. In this sixteenth example, the operation in the following case will be explained. This case is such that when grouping is instructed in the image capture guide list, still pictures, motion pictures, voice memos, and binary images recorded according to the image capture guide list are grouped and saved for each type of the still pictures, motion pictures, voice memos, and binary images.

In FIG. 56, the digital camera 100 is assumed to store the image capture guide list file downloaded from the personal computer 200 in the recording section 108. When the JOBNABI button 24 on the operating section 106 has been pressed, the system control section 102 enters the image capture guide list mode, and reads out image titles in the image capture guide list stored in the recording section 108 to display these titles on the display section 104 (step S661). The system control section 101 further reads out the automatic processing instruction information (instruction for post-recording) in the image capture guide list (step S662). The system control section 101 then determines whether the automatic processing instruction information (instruction for post-recording) indicates grouping (step S663). When grouping is instructed, the system control section 101 proceeds to step S664. At step S664, an image title is selected and shooting is performed. The system control section 101 then determines whether shooting for all the image titles in the image capture guide list has been finished (step S665).

When it is determined that the shooting for all the image titles in the image capture guide list has not been finished, the system control section 101 returns to step S664. On the other hand, when the shooting for all the image titles in the image capture guide list has been finished, the system control section 101 performs grouping on the images (step S666). Further, the system control section 101 displays the message to prompt the operator to make a selection of whether the grouped images are to be stored in the same folder. When the same folder for the grouped images has been selected by the user through operation of the operating section 106 (step S667), the folder of the image capture guide list is specified and the recorded files for all the image titles in the image capture guide list are registered into the folder (step S668).

On the other hand, when the same folder for the grouped images has not been selected by the user through operation of the operating section 106 (step S667), the recorded files are arranged for each of the modes for the recorded file such as the still picture, motion picture, voice memo, and binary image modes (step S669). Further, folders are prepared for each type of the still picture, motion picture, voice memo, and binary image modes in the lower layer of the folder of the image capture guide list, and a corresponding recorded file is registered in each of the folders (step S670). The same processing is then repeated until all the groups have been saved (step S671).

At step S663, when grouping is not instructed in the image capture guide list, the system control section 101 proceeds to step S672. Shooting is executed in the normal image capture guide list mode, and the shot image is stored in the recording section 108 as an image file (step S673).

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the sixteenth example, when grouping is instructed in the image capture guide list, still pictures, motion pictures, voice memos, and binary images recorded based on the image capture guide list are grouped and saved for each type of the still pictures, motion pictures, voice memos, and binary images, thus facilitating management of the files.

Seventeenth Example

Figure 57:
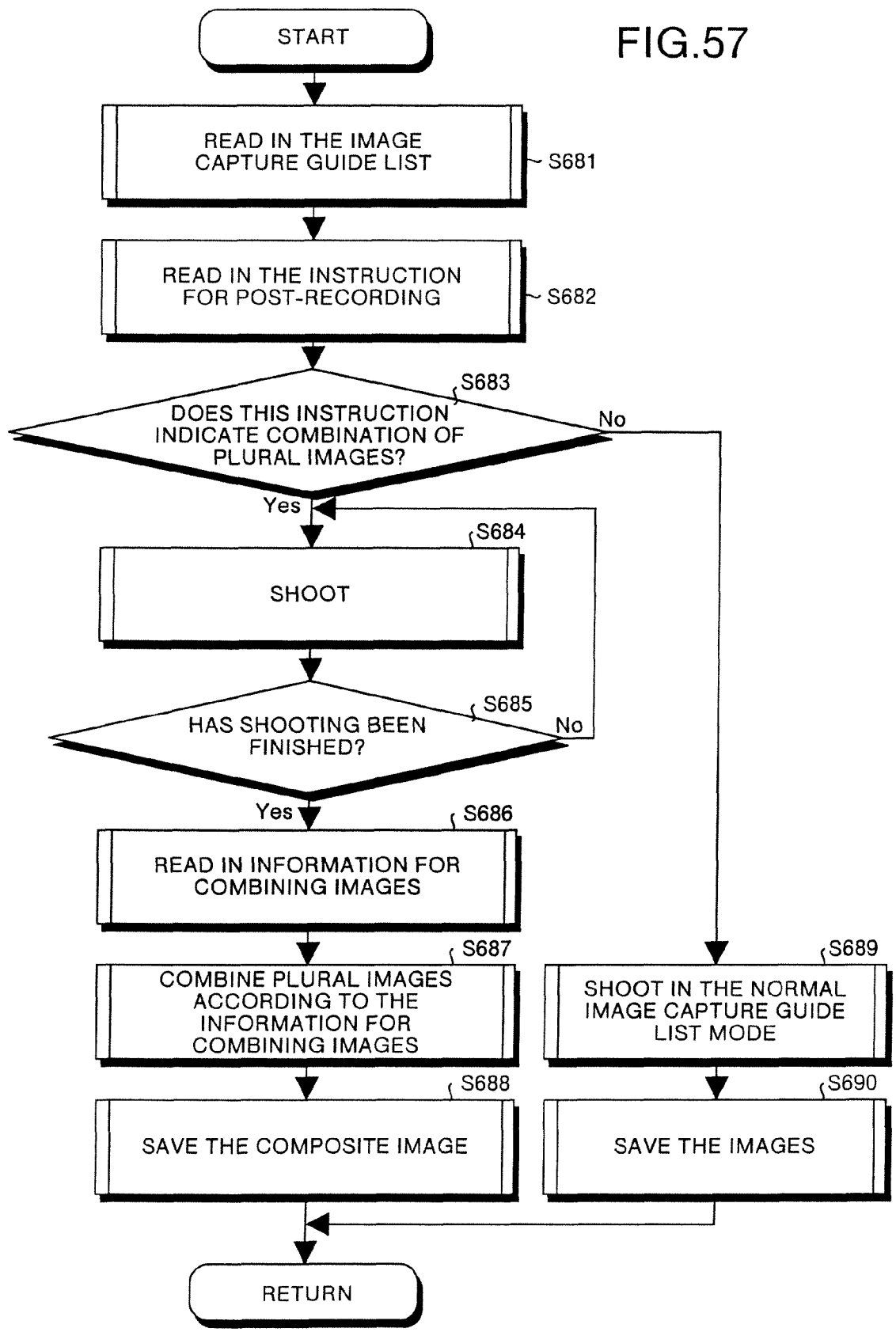
FIG. 57 is a flow chart for explaining a seventeenth example of the image capture guide list for the digital camera.

The seventeenth example is explained with reference to FIG. 57. The flow chart in FIG. 57 shows the operation in the digital camera 100 according to the seventeenth example. In this seventeenth example, the operation in the following case will be explained. This case is such that when the automatic processing instruction information (instruction for post-recording) in an image capture guide list indicates combination of plural images, after the predetermined number of images are shot, plural images of these images are combined according to combination information for each images in the image capture guide list to create one image file.

In FIG. 57, the digital camera 100 is assumed to store the image capture guide list transferred from the personal computer 200 in the recording section 108. When the JOBNABI button 24 on the operating section 106 has been pressed, the system control section 102 enters the image capture guide list mode, and reads out image titles in the image capture guide list stored in the recording section 108 to display these titles on the display section 104 (step S681). The system control section 101 further reads out the automatic processing instruction information (instruction for post-recording) in the image capture guide list (step S682). The system control section 101 then determines whether the automatic processing instruction information (instruction for post-recording) indicates combination of plural images (step S683). When it is determined that the automatic processing instruction information (instruction for post-recording) indicates combination of plural images, the system control section 101 proceeds to step S684.

At step S684, an image title is selected and recording is performed. The system control section 101 then determines whether the predetermined number of recordings has been finished (step S685). When it is determined that the predetermined number of recordings has not been finished, the system control section 101 returns to step S684. On the other hand, when the predetermined number of recordings has been finished, the system control section 101 reads in the information for combination of images, such as information for the size of images or order of arranging the images, from the image capture guide list (step S686). Further, the system control section 101 combines the recorded plural images according to the combination information of images (step S687), and saves the composite image in the recording section 108 as one image file (step S688).

On the other hand, at step S683, when the automatic processing instruction information (instruction for post-recording) does not indicate combination of plural images, the system control section 101 proceeds to step S689, and stores the image recorded in the normal image capture guide list mode in the recording section 108 as an image file (step S690).

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

The example of the automatic processing instruction information i.e. command, that instructs combination of plural images included in the image capture guide list, will be explained below. The command in the case of combining images is as follows: comp: {(pair=a, . . . ), (base=0/not base=1, 2, 3 . . . ), (size=w×h), (when not base, position=x,y)}.

pair: represents combination of images.
  Alphabetically expressed like, a,b,c . . . , and identical letters of the alphabet in plural images indicate the images to be combined.
base: expressed by 1,0, and
  base=0 represents a base image on which another image is superposed.
  base=1 represents an image superposed on another image.
  If there are plural images to be combined, the image with the larger number is superposed on the image with the lower number.
size: expressed by w×h, w; expressed by the number of lateral pixels, xh; expressed by the number of longitudinal pixels.
  The size of the image superposed on another image can be omitted if not changed. (e.g., 340×170)
position: expressed by x,y coordinates, which represent the coordinates of a position at an upper left angle of the image on the base image when the base image is divided by 100.

Figures 58, 59:
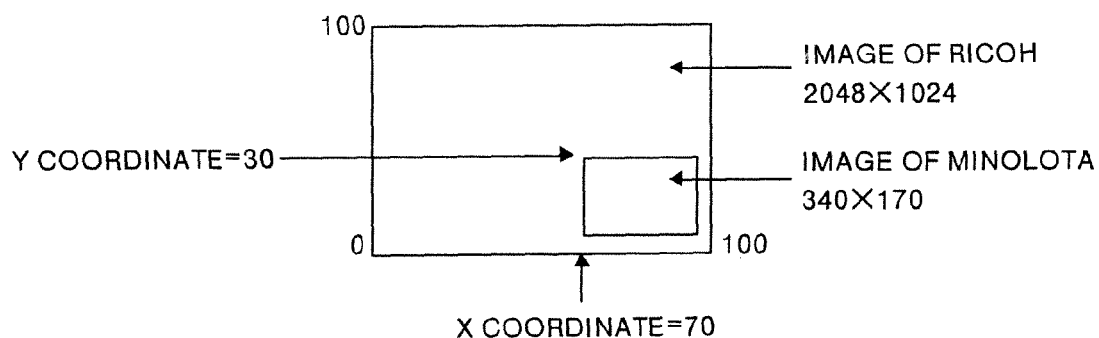
FIG. 58 shows an example of a composite image.
FIG. 59 shows an example of how the image capture guide list is described.

FIG. 59 shows the example of description of the image capture guide list when the image of MINOLOTA is superposed on the image of RICOH as shown in FIG. 58. In FIG. 58, the base image is formed with a recorded image consisting of the original number of pixels, but the image on the base image is formed by the size of 340×170.

As explained above, according to the seventeenth example, when the instruction for post-recording in the image capture guide list indicates combination of plural images, the plural images are combined to create one image file. Accordingly, a plurality of images can automatically be combined after recording the images, thus improving usability for the user.

Eighteenth Example

Figure 60:
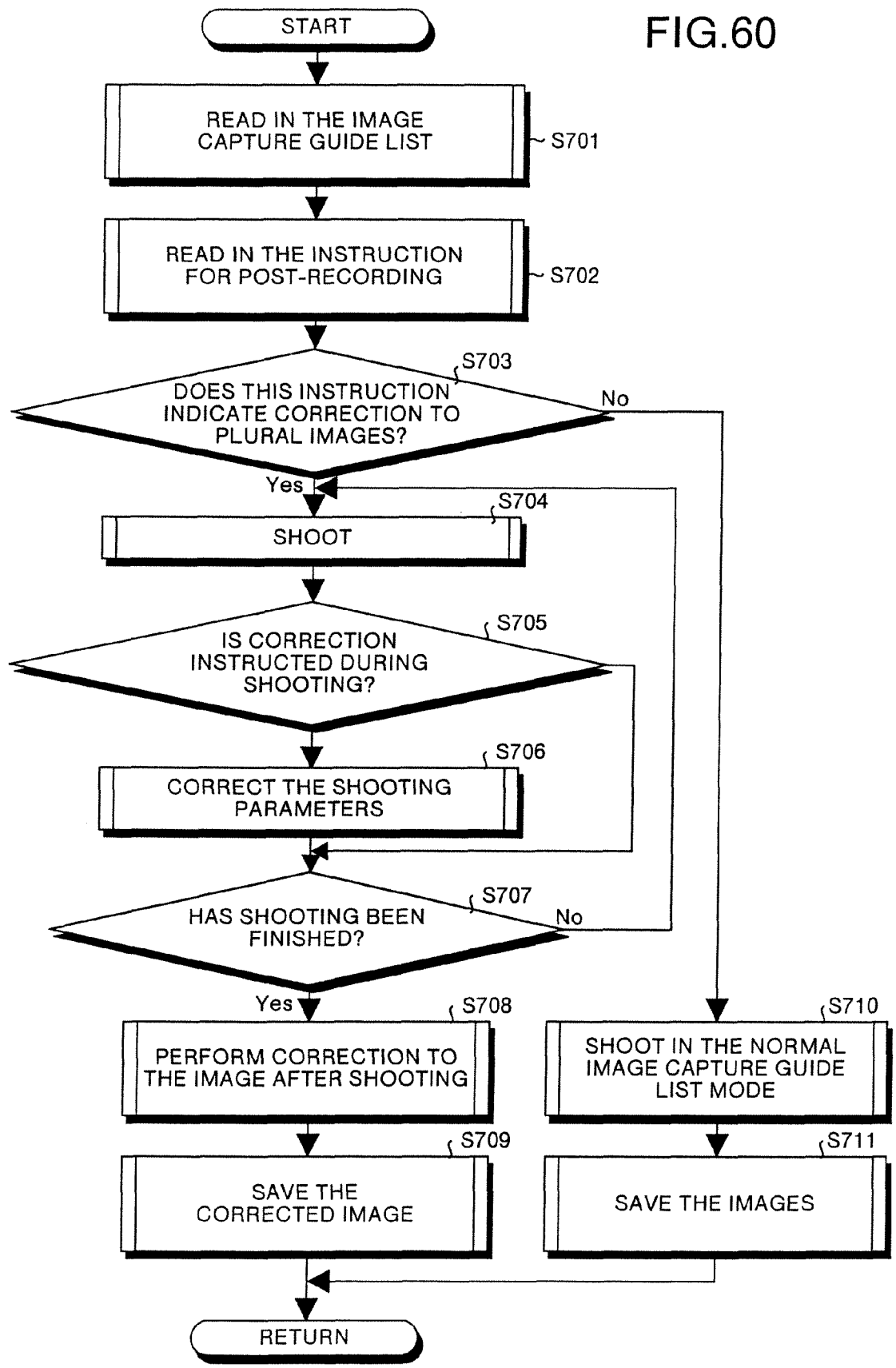
FIG. 60 is a flow chart for explaining an eighteenth example of the image capture guide list for the digital camera.

The eighteenth example is explained with reference to FIG. 60. The flow chart in FIG. 60 shows the operation in the digital camera 100 according to the eighteenth example. In this eighteenth example, the operation in the following case will be explained. This case is such that when the automatic processing instruction information (instruction for post-recording) in an image capture guide list indicates correction to plural images, the plural images are to be corrected after recording the images.

In FIG. 60, the digital camera 100 is assumed to store the image capture guide list transferred from the personal computer 200 in the recording section 108. When the JOBNABI button 24 on the operating section 106 has been pressed, the system control section 102 enters the image capture guide list mode, and reads out image titles in the image capture guide list stored in the recording section 108 to display these titles on the display section 104 (step S701). The system control section 101 further reads out the automatic processing instruction information (instruction for post-recording) from the image capture guide list (step S702). The system control section 101 then determines whether the automatic processing instruction information (instruction for post-recording) indicates correction to plural images (step S703). When it is determined that the automatic processing instruction information (instruction for post-recording) indicates correction to plural images, the system control section 101 proceeds to step S704.

At step S704, an image title is selected and recording is performed. When the automatic processing instruction information (instruction for post-recording) in the image capture guide list indicates correction during recording (step S705), the system control section 101 corrects parameters of recording such as exposure adjustment (step S706). The system control section 101 then determines whether the predetermined number of recordings has been finished (step S707). When it is determined that the predetermined number of recordings has not been finished, the system control section 101 returns to step S704. On the other hand, when the predetermined number of recordings has been finished, the system control section 101 performs post-recording correction, such as color correction or correction to distortion of lenses, on the recorded plural images (step S708). The corrected images are stored in the recording section 108 (step S709).

On the other hand, at step S703, when the instruction for post-recording in the image capture guide list does not indicate correction to plural images, the system control section 101 proceeds to step S710. Recording is performed in the normal image capture guide list mode, and the recorded image is stored in the recording section 108 as an image file (step S711).

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the eighteenth example, when the instruction for post-recording in the image capture guide list indicates correction to plural images, the same processing of correction is automatically executed on the plural images after recording the images, thus improving usability for the user. Therefore, this instruction is useful for the case where the same processing of correction is to be performed on the plural images.

Nineteenth Example

Figure 61:
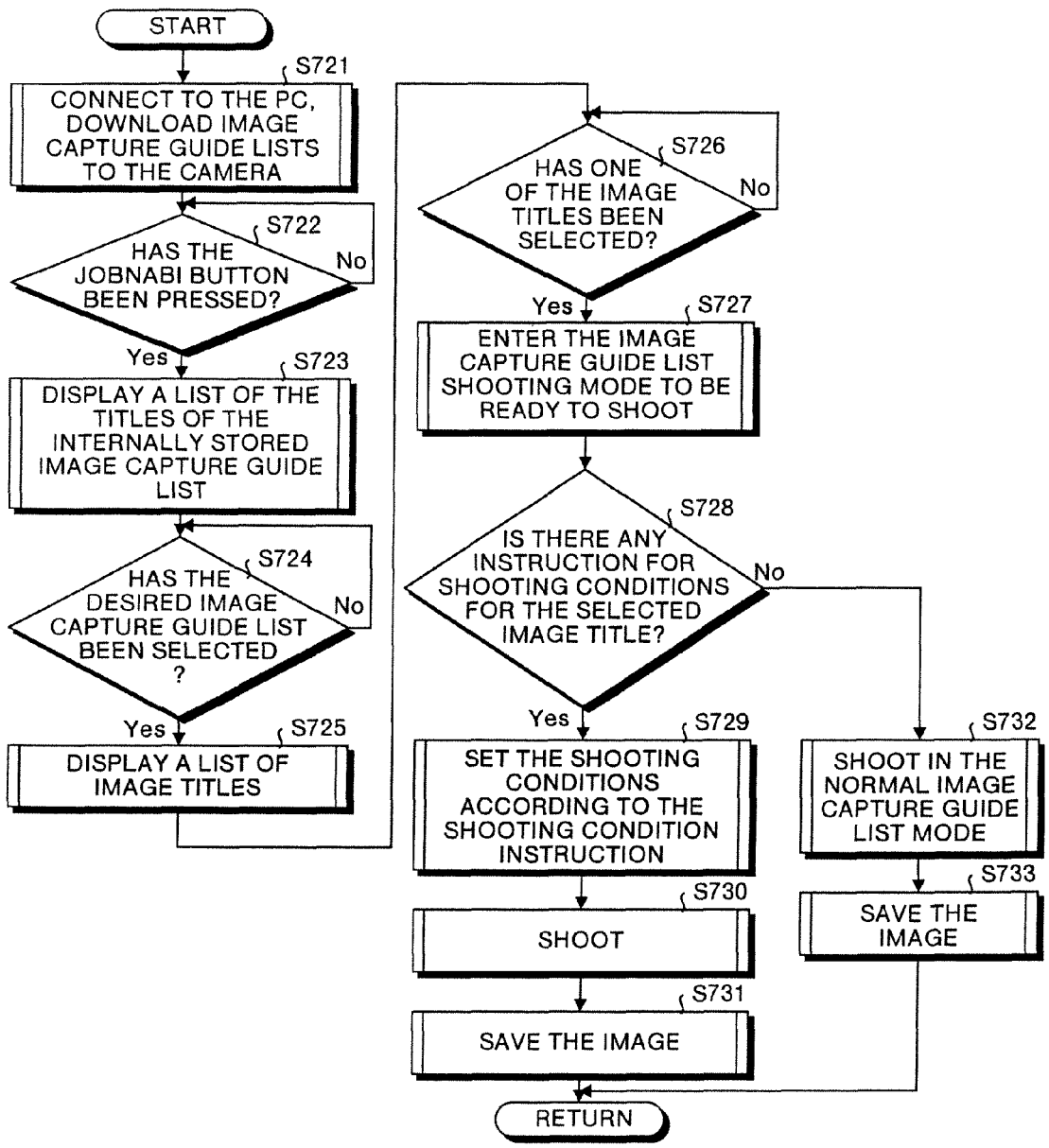
FIG. 61 is a flow chart for explaining a nineteenth example of the image capture guide list for the digital camera.

The nineteenth example is explained with reference to FIG. 61. The flow chart in FIG. 61 shows the operation in the digital camera 100 according to the nineteenth example. In this nineteenth example, the operation in the following case will be explained. This case is such that shooting is performed according to the instruction for recording conditions in an image capture guide list corresponding to a selected image title.

In FIG. 61, the digital camera 100 is connected to the personal computer 200 to download image capture guide lists, and stores these lists in the recording section 108 (step S721). Each of these lists has its own title, image titles as targets to be recorded, and respective automatic processing instruction information (instruction for recording conditions) registered therein in correlation with each of these image titles.

The system control section 102 determines whether the JOBNABI button 24 on the operating section 106 has been pressed (step S722). When the button 24 has been pressed, the system control section 102 enters the image capture guide list mode, and displays a list of the titles of image capture guide lists stored in the recording section 108 on the display section 104 (step S723). The operator selects one out of these list titles through operation of the touch panel operating section 107. The system control section 101 determines whether one of these list titles has been selected (step S724). When selection has been made, the system control section 101 displays a list of image titles in the selected image capture guide list on the display section 104 (step S725). The operator selects one out of these image titles through operation of the touch panel operating section 107. The system control section 101 determines whether one of these image titles has been selected (step S726). When selection has been made, the system control section 101 shifts to the image capture guide list shooting mode to allow shooting to be ready (step S727). Accordingly, the user can select a subject for the image title to take its picture.

The system control section 101 then determines whether the image capture guide list includes the automatic processing instruction information (instruction for recording conditions) corresponding to the selected image title (step S728). When it is determined that automatic processing instruction information (instruction for recording conditions) is included, the system control section 101 sets the recording conditions according to the automatic processing instruction information (instruction for recording conditions) (step S729). The shooting is executed under the set recording conditions (step S730), and the recorded image is stored in the recording section 108 (step S731). On the other hand, at step S728, when the image capture guide list does not include the automatic processing instruction information (instruction for recording conditions) corresponding to the selected image title, the system control section 101 proceeds to step S732. Shooting is executed in the normal image capture guide list mode, and the shot image is stored in the recording section 108 as an image file (step S733).

The automatic processing instruction information (instruction for recording conditions) included in the image capture guide list are as follows: instruction of recording mode such as voice memo or motion picture modes, date and time imprinting, posture of the camera such as it's angle and rotating angle, continuous shooting mode, focus mode, setting of a shutter speed, flash ON/OFF mode, redeye reduction ON/OFF mode, black and white mode, sepia mode, text recording mode to obtain a sharp character with its enhanced edge, the number of pixels, a compression rate, autofocus mode, manual focus mode, fixing a distance, camera-shake correction ON/OFF mode, setting of white balance, signature imprinting, setting of image quantities, setting the size of a subject, an aspect ratio, exposure mode, resolution, presence or absence of encryption, and presence or absence of an electronic watermark, or the like.

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the nineteenth example, the image capture guide list is displayed on the display section 104, an image title is selected from the displayed image capture guide list, and shooting is performed according to the instruction for recording conditions corresponding to the selected image title. Accordingly, using the image capture guide list can prevent the user from forgetting to take required pictures during shooting, and the shooting can be automatically executed under the set recording conditions. Thus, it is possible to perform shooting based on the instruction by the creator or instructor of this image capture guide list.

Twelfth Example

Figure 62:
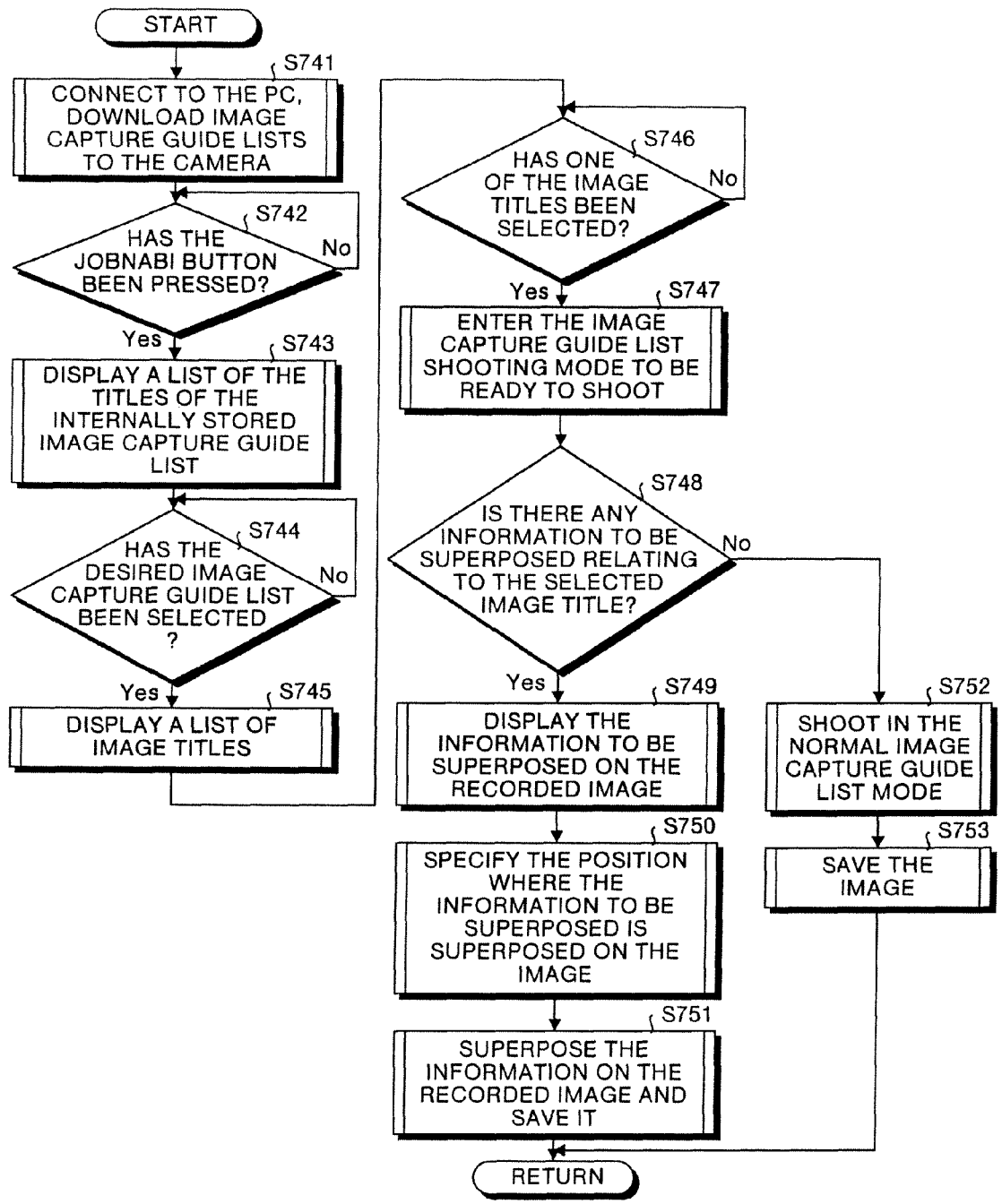
FIG. 62 is a flow chart for explaining a twentieth example of the image capture guide list for the digital camera.

The twelfth example is explained with reference to FIG. 62. The flow chart in FIG. 62 shows the operation in the digital camera 100 according to the twelfth example. In this twelfth example, the operation in the following case will be explained. This case is such that an image title is selected from an image capture guide list, and information to be superposed for the selected image title is superposed on a capture image.

In FIG. 62, the digital camera 100 is connected to the personal computer 200 to download image capture guide lists, and stores these lists in the recording section 108 (step S741). Each of these lists includes image titles as targets to be recorded (see FIG. 6), and further, respective information to be superposed (such as images, text, or freehand characters) registered therein in correlation with each of these image titles.

The system control section 102 determines whether the JOBNABI button 24 on the operating section 106 has been pressed (step S742). When the button 24 has been pressed, the system control section 102 enters the image capture guide list mode, and displays a list of the titles of image capture guide lists stored in the recording section 108 on the display section 104 (step S743). The operator selects one out of these list titles through operation of the touch panel operating section 107. The system control section 101 determines whether one of these list titles has been selected (step S744).

When selection has been made, the system control section 101 displays a list of image titles in the selected image capture guide list on the display section 104 (step S745). The operator selects one out of these image titles through operation of the touch panel operating section 107. The system control section 101 determines whether one of these image titles has been selected (step S746). When selection has been made, the system control section 101 shifts to the shooting mode to allow shooting to be ready (step S747). A monitoring image is then displayed on the display section 104. Accordingly, the user can select a subject for the image title to take its picture.

The system control section 101 then determines whether the image capture guide list includes any information to be superposed for the selected image title (step S748). When it is determined that such information is included, shooting is executed according to the operation of the shutter release button 21, the shot image is displayed on the display section 104, and the information to be superposed for the selected image title is displayed by being superposed on this shot image (step S749). The user specifies a position at which the information to be superposed will be superposed on the shot image through the operation of the touch panel operating section 107 (step S750). Accordingly, the user can check the position of the information to be superposed while viewing the shot image.

The system control section 101 combines the information to be superposed, whose position to be superposed is specified, with the shot image to create a composite image, and stores this composite image in the recording section 108 as an image file (step S751).

On the other hand, at step S748, when the image capture guide list does not include the information to be superposed for the selected image title, the system control section 101 proceeds to step S752. Shooting is executed in the normal image capture guide list mode, and the shot image is stored in the recording section 108 as an image file (step S753).

Further, the digital camera 100 transfers the image capture guide list and the file (s) recorded using this image capture guide list to the personal computer 200. Accordingly, the user of the personal computer 200, who has created this image capture guide list, can utilize the image(s) recorded using this image capture guide list for making a report or the like. Thus, the usability of the image capture guide list for its creator is improved.

As explained above, according to the twelfth example, the image title is selected from the image capture guide list, and the information to be superposed for the selected image title is combined with the shot image. Accordingly, using the image capture guide list can prevent the user from forgetting to take required pictures during shooting, and after the shooting, the information to be superposed relating to the shooting can be combined with the recorded image to save it. Thus, the user can smoothly carry out the operations.

EXAMPLES OF THE BROWSER FUNCTION OF THE DIGITAL CAMERA ACCORDING TO THIS EMBODIMENT

A first example to a third example of using the browser function of the digital camera 100 will be explained below. With the digital camera 100, the image capture guide list is downloaded from the home page of the Web server, and Web information for a Web page of the Web server is also captured using the browser function.

First Example

Figure 63:
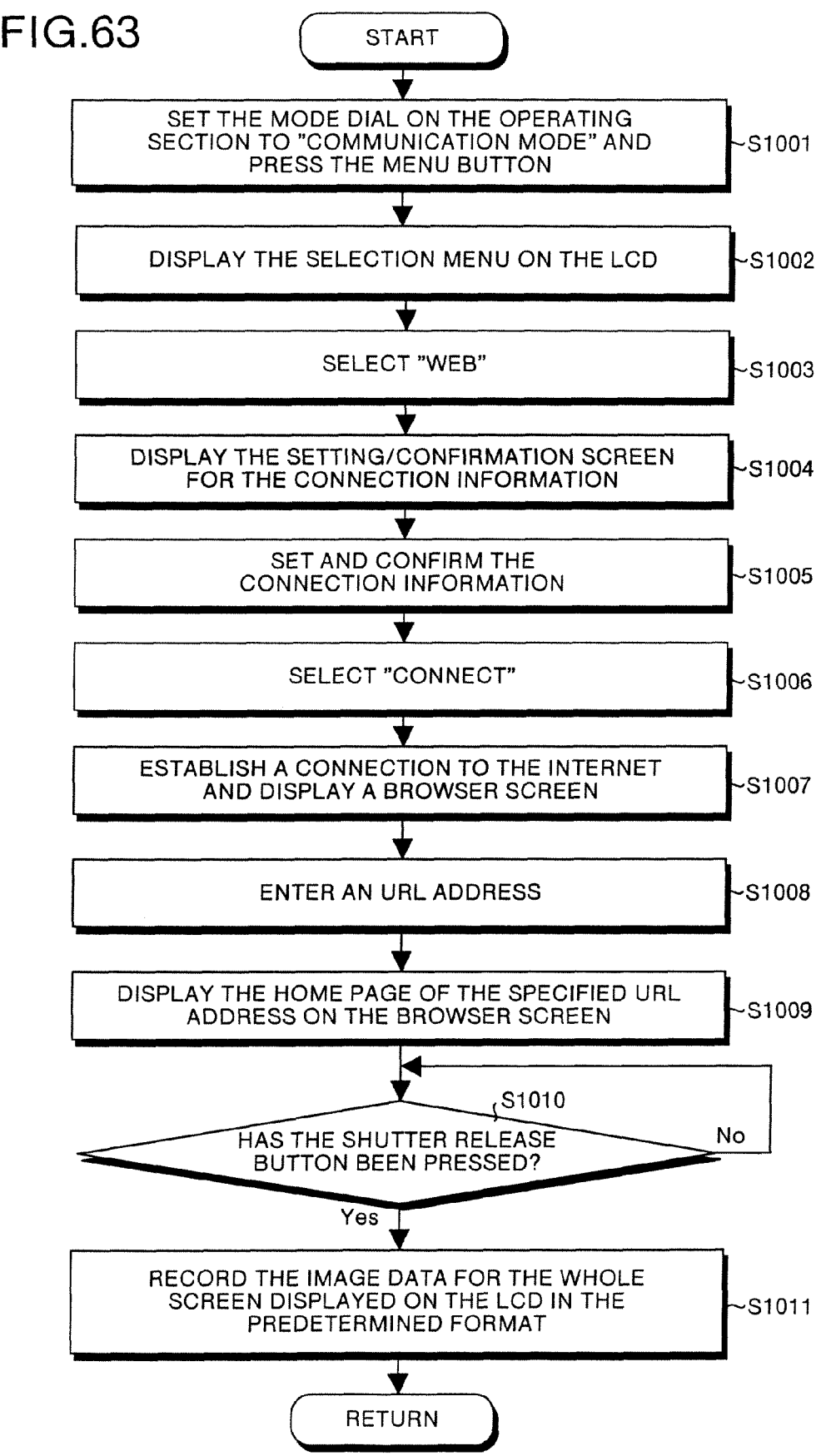
FIG. 63 is a flow chart for explaining a first example of the browser function in the digital camera.
Figure 64:
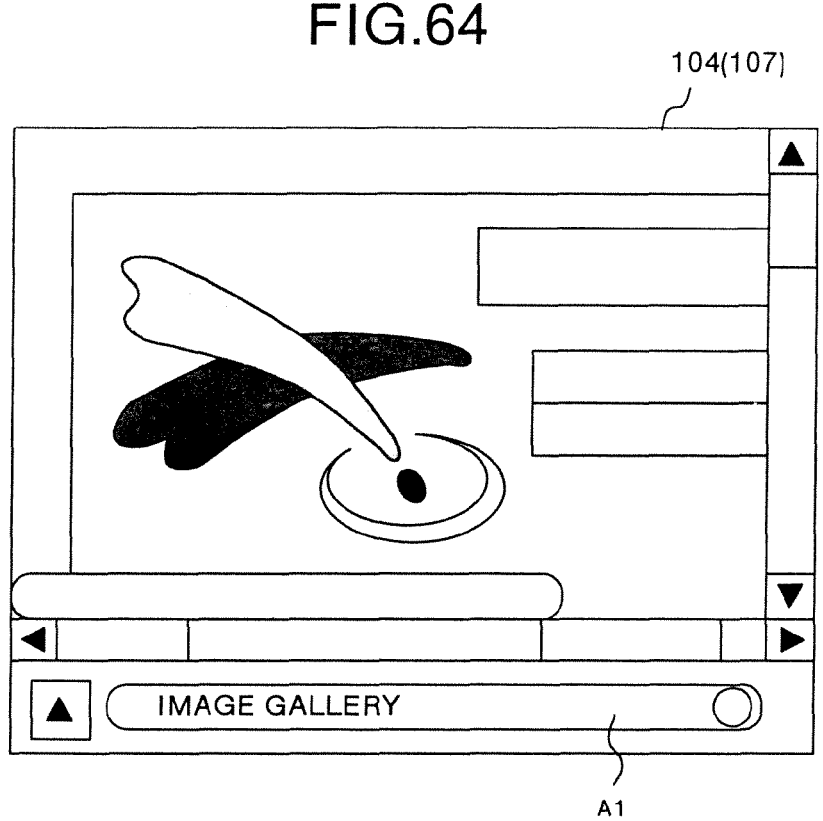
FIG. 64 shows an example of a browser screen.
Figure 65:
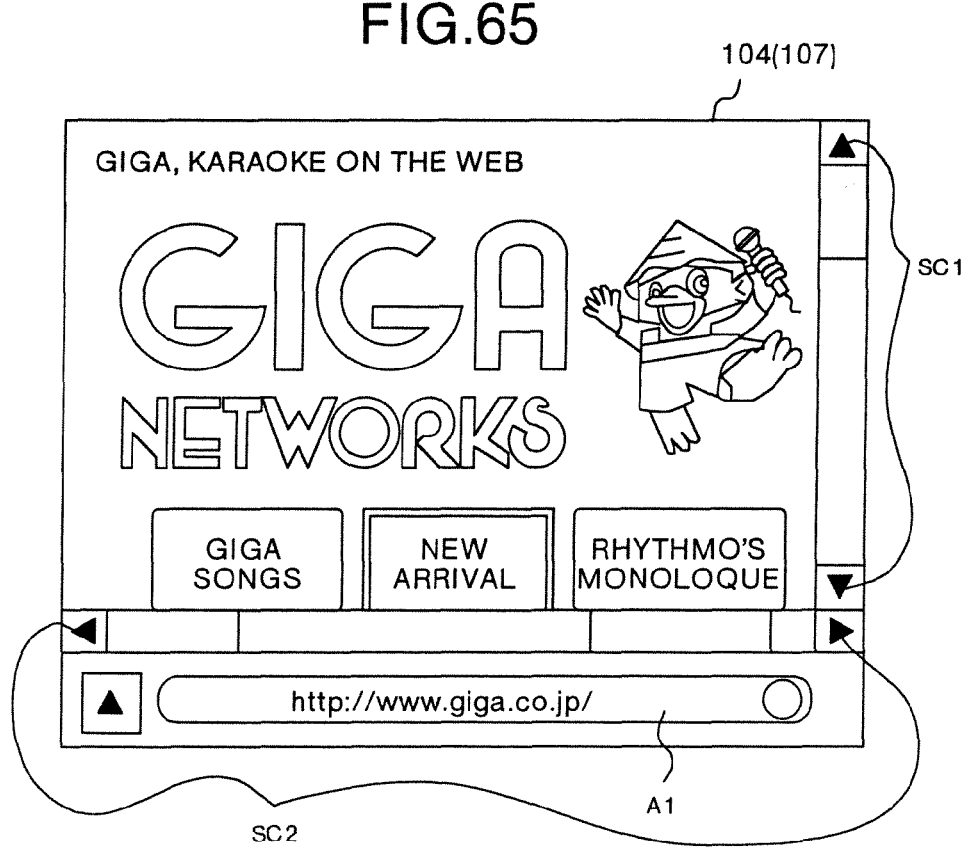
FIG. 65 shows another example of the browser screen.

The first example is explained with reference to FIG. 63 to FIG. 65. The flow chart in FIG. 63 shows the operation in the digital camera 100 according to the first example. FIG. 64 and FIG. 65 show display examples of the LCD of the display section 104 in the first example. In this first example, the operation in the case of capturing image data from the Web server 300 will be explained.

In FIG. 63, in the digital camera 100, when the mode dial on the operating section 106 is set to "communication mode" (step S1001), the selection menu is displayed on the LCD of the display section 104 (step S1002). FIG. 8 shows the display example of this menu.

When "Web" is selected on the LCD of the display section 104 and the button [OK/ENTER] is pressed (step S1003), a setting/confirmation screen for the connection information is displayed (step S1004). FIG. 9 shows the setting/confirmation screen for the connection information. The connection information can be changed or confirmed on this setting/confirmation screen for the connection information (step S1005). "CONNECT" is selected on the setting/confirmation screen for the connection information (step S1006) to establish a connection to the Internet, and the browser screen will be displayed (step S1007). FIG. 64 shows the display example of the browser screen. When an URL address is entered in an address information input area A1 on the browser screen (step S1008), a Web page of the specified URL address appears on the browser screen (step S1009). FIG. 65 shows the display example of the image of a Web page on the browser screen. This browser screen has vertical and horizontal scroll bars SC1 and SC2. By touching one of these bars with the stylus pen, the screen can be moved up and down, left and right. A part of the Web page is displayed on the LCD of the display section 104. When any hidden part of the page on the screen is viewed, the display of the screen can be change by using the scroll bars SC1 and SC2 provided on the right side and the bottom of the screen. When the shutter release button 21 on the operating section 106 is pressed (step S1010), the image data for the entire displayed screen is recorded in the recording section 108 in the format the same as that of the data for a picked-up image (e.g., GIF, TIFF, and JPEG formats) (step S1011).

More specifically, the CPU 112 writes Web information downloaded through a communication card of the card slot section 110, from the Web server over the network 400, in the frame memory 116 as display data. The display data written in the frame memory 116 is displayed on the display section 104 by the IPP 115. When the shutter release button 21 on the operating section 106 is pressed, the display data in the frame memory 116 is compressed in the IPP 115, and then written in the recording section 108 by the CPU 112 in the file format for the data for a picked-up image such as the EXIF format. That is, the Web information is handled as image data the same as the data for a picked-up image, in any of GIF, TIFF and JPEG formats, captured by an image pickup unit.

When an Web image is to be recorded, the range of a browsed image to be captured (display area on the LCD) is enlarged or reduced by the zoom lever 22 on the operating section 106, so that the enlarged or reduced image can be captured. That is, the zoom lever 22 used for a zooming function of the camera section: the optical system and image pickup unit to adjust the size of a subject is used for adjusting the size of the Web information screen to be downloaded. To be more specific, when detecting input of the zoom lever 22 through the operating section 106, the CPU 112 performs enlargement/reduction of the display data in the frame memory 116, and the display on the display section 104 is changed to its enlarged size or reduced size according to the processing.

Figure 66A:
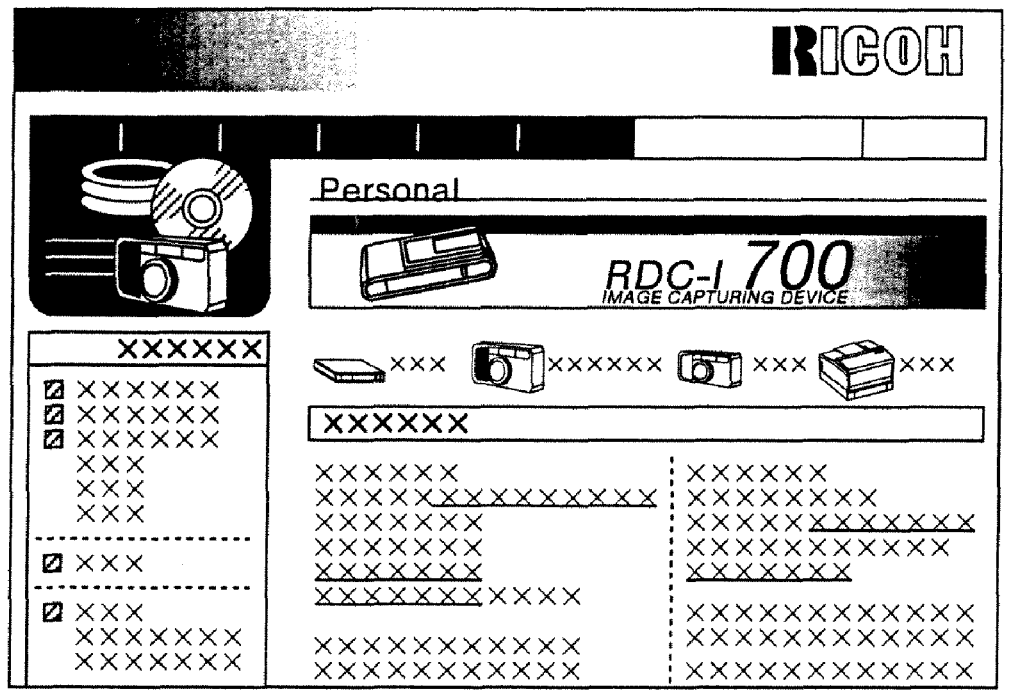
FIG. 66A and FIG. 66B show a case in which a range of browsed image to be captured is enlarged or reduced.
Figure 66B:
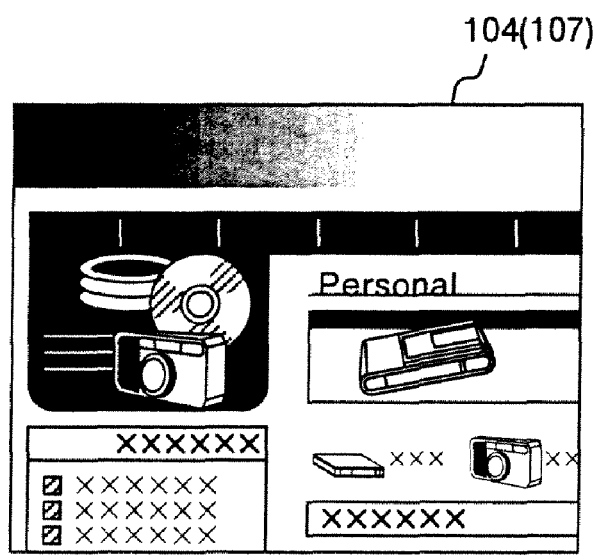
Figure 67:
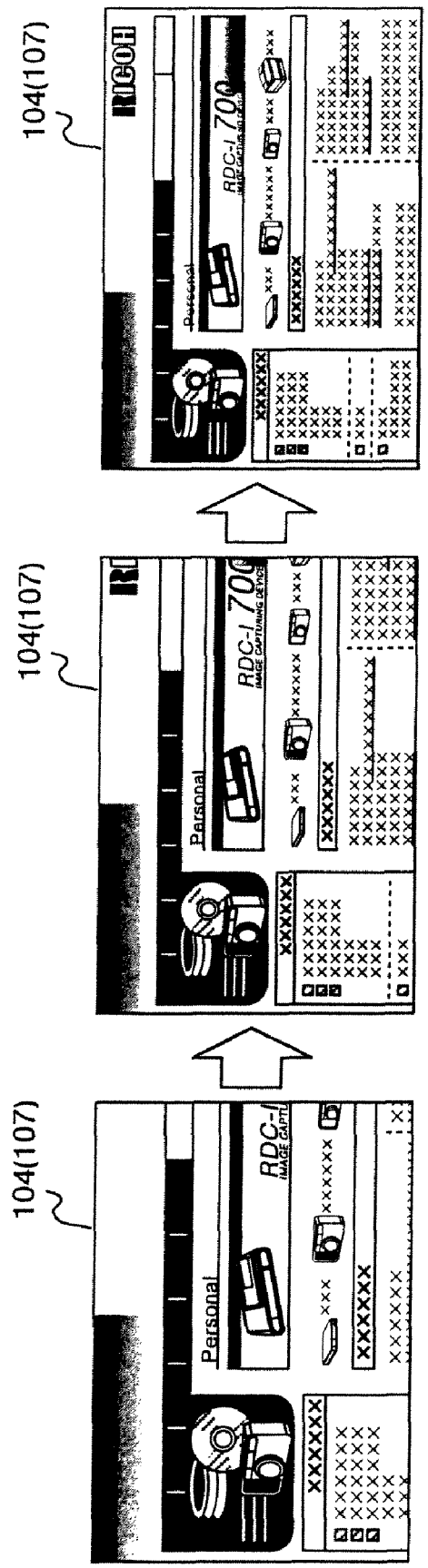
FIG. 67 shows a case of how the range of a browsed image to be captured is enlarged or reduced.
Figure 68:
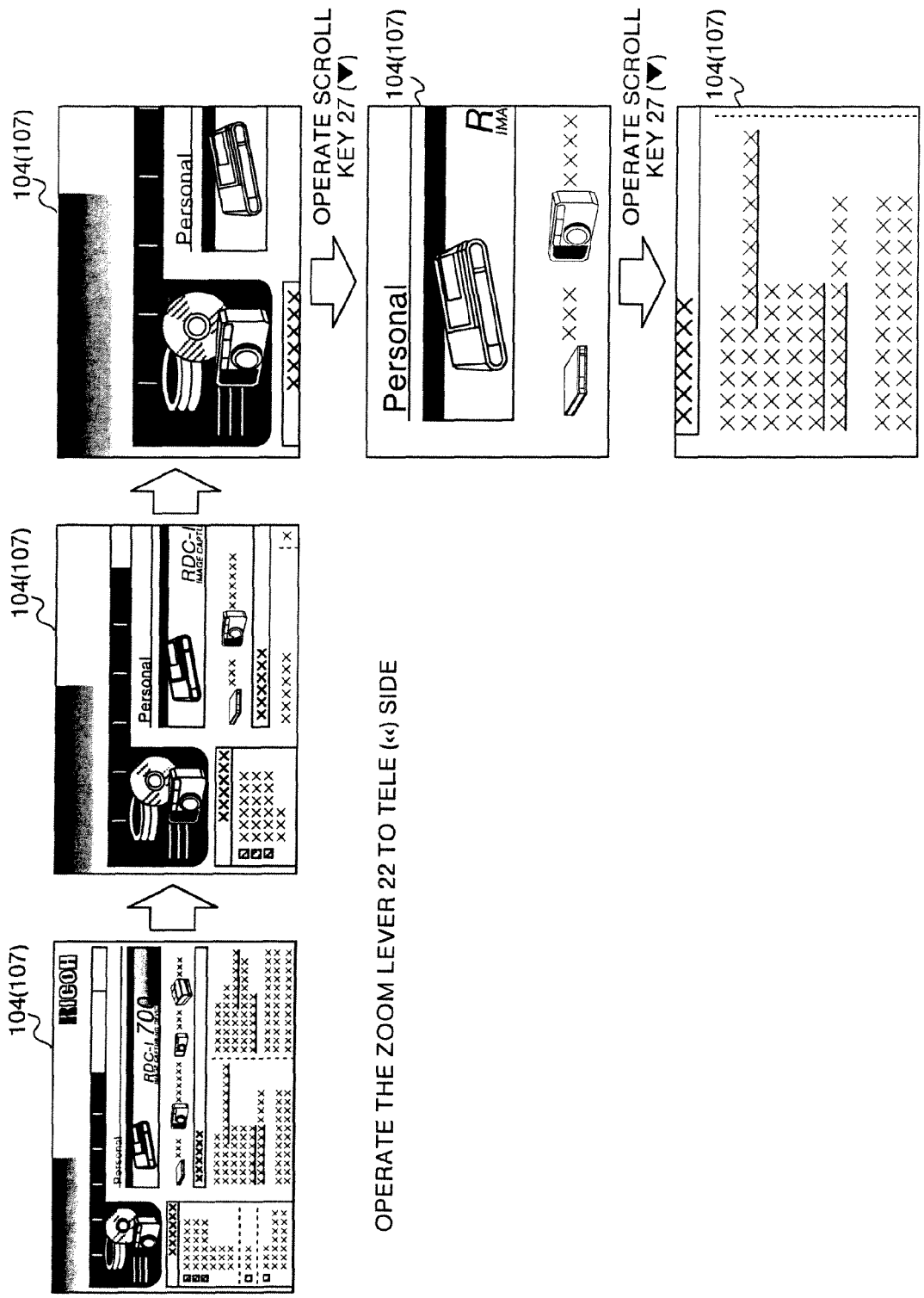
FIG. 68 shows another case of how the range of the browsed image to be captured is enlarged or reduced.

The case where the range of the browsed image to be captured (display are on the LCD) is enlarged or reduced by the zoom lever 22 on the operating section 106 will be explained below with reference to FIG. 66 to FIG. 68. The actual Web page has such a screen as shown in FIG. 66A. The digital camera 100 has a small-sized LCD screen of the display section 104, therefore, only about one fourth of the actual screen can be displayed as shown in FIG. 66B. As shown in FIG. 67, by operating the zoom lever 22 to << side, the image is reduced and the detail in its wide range is displayed. On the other hand, as shown in FIG. 68, by operating the zoom lever 22 to >> side, the image is enlarged and the detail in its narrow range is displayed. Further, the area can be moved up to any part of the image that the user wants to view by using the scroll buttons 27.

Further, there is a method of using the function of shooting still pictures in the continuous shooting mode, in which pictures are shot while the shutter release button is being pressed. By using this function, the image of the Web page may be captured continuously by dividing this image into a plurality of images within the display area on the LCD while scrolling the whole Web information to one part another. In this case, the way to scroll for capturing can be specified to any of the clockwise direction, the counterclockwise direction, the N-shaped direction, or the inverted N-shaped direction. The area is displayed on the LCD each time it is captured.

Periodic access is made to a particular URL address of the image to be browsed, and the data may be downloaded. In this case, some time is required for accessing the Web information, that is, the time interval can not be set to the value less than the time required for accessing. Therefore, this access time can be set prior to setting of the shutter release time.

Figure 69:
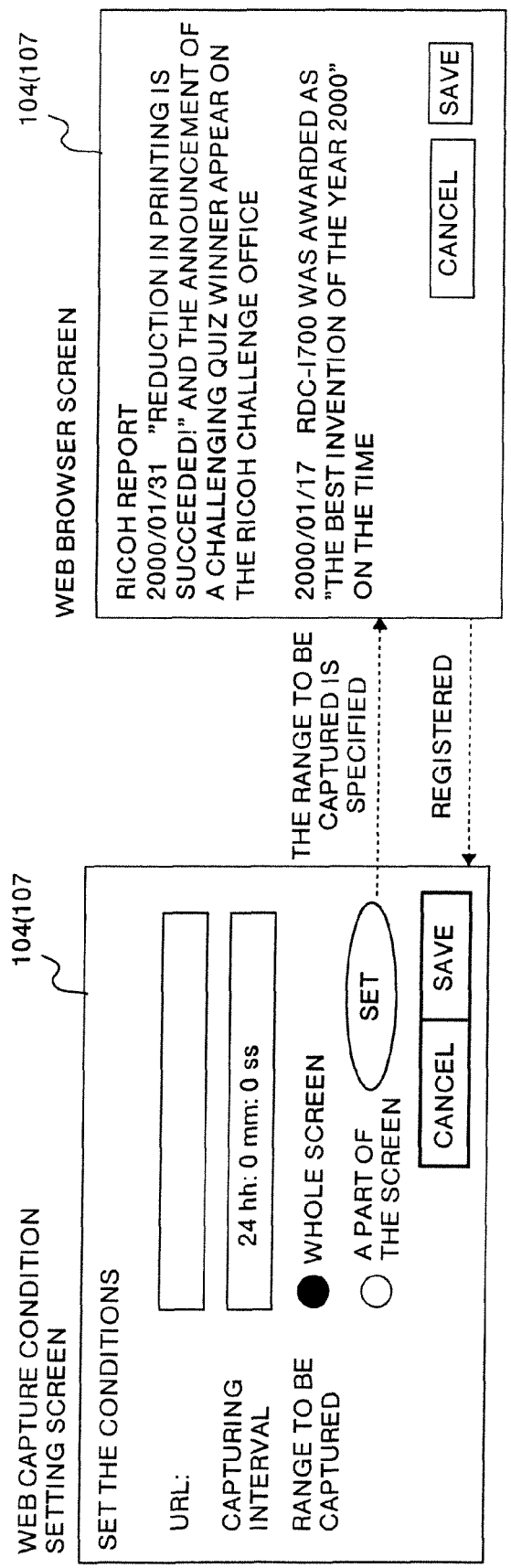
FIG. 69 shows an example of an Web capture condition setting screen.

FIG. 69 shows the Web capture condition setting screen. "URL", "Capture interval", and "Range to be captured" are set on this Web capture condition setting screen. At first, the URL of a target to be captured is set. The capture interval is then set. "0" represents the case of accessing not periodically, but only once. The range to be captured is then set. If the user wants to select the whole screen, the whole Web page obtained by accessing its URL is captured. When a part of the Web page is selected, the range setting button becomes effective. When the range setting button is pressed, the browser is started, and a part of the range to be captured including enlarged or reduced range is displayed. After the range is displayed, [SAVE] is pressed and the conditions are set.

As explained above, according to the first example, the captured Web information after browsing is handled as image data the same as the data for a picked-up image (in any of GIF, TIFF, and JPEG formats) captured by the image pickup unit. Therefore, the Web information such as the browsed Web page can be captured as data for a picked-up image the same as that captured by the optical system or the image pickup unit, thus facilitating processing and management of the data.

The zoom lever used for the zooming function of the camera section, the optical system and image pickup unit to adjust the size of a subject, is used for adjusting the size of the Web information screen to be downloaded. Therefore, it is possible to freely set the capture range of data to be downloaded in much the same way shooting is performed with the camera using the zoom lever.

The shutter release button is used for downloading the Web information. The Web information for a browsed Web page can be captured by pressing the shutter release button. Therefore, the data can be captured in much the same way the shooting is performed with the digital camera. Thus, it is possible to provide a user-friendly interface.

The image of the Web page is captured continuously by dividing this image into a plurality of images within the display area on the LCD while scrolling the whole Web information to one part another. Therefore, it is possible to facilitate capturing of the data for the Web page in much the same way the continuous shooting is performed with the camera, which is one of the camera functions performing in the continuous shooting mode.

Periodic access is made to a particular URL of the images to be browsed, and the image data may be captured. Therefore, it is possible to facilitate periodic capturing of data for the Web page in much the same way the interval shooting is performed with the camera.

The image data captured from the Web server 300 is combined with the freehand memo information. Therefore, the freehand memo information can be superposed on the Web information on a browsed Web page, which makes it possible to superpose related information on the image. Thus, the user's intention can clearly be expressed in a simple manner.

Further, the voice memo information is added to the downloaded data for the browsing image. Therefore, related voice memo can easily be added to the Web information on the browsed Web page in much the same way the shooting is performed with the camera.

Second Example

Figure 70:
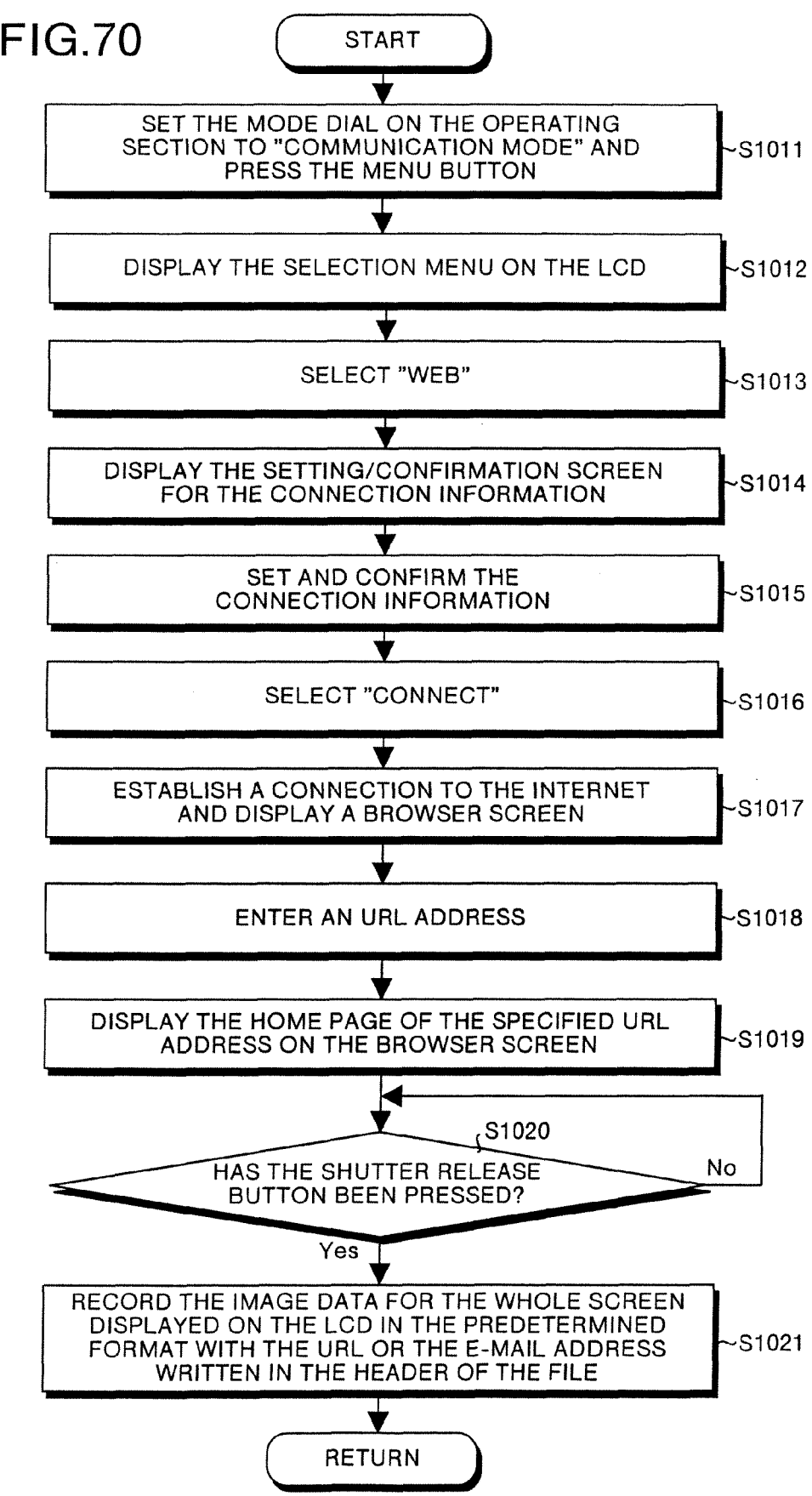
FIG. 70 is a flow chart for explaining a second example of the browser function in the digital camera.

The second example is explained with reference to FIG. 70. The flow chart in FIG. 70 shows the operation in the digital camera 100 according to the second example. FIG. 38 to FIG. 41, as mentioned above, show display examples on the LCD of the display section 104 in the second example. In this second example, the operation in the following case will be explained. This case is such that Web information is captured from the Web server 300 and the URL address and e-mail address are written in the header of the image file of the captured Web information.

In FIG. 70, in the digital camera 100, when the mode dial on the operating section 106 is set to "communication mode" (step S1011), the selection menu is displayed on the LCD of the display section 104 (step S1012). FIG. 8, as mentioned above, shows the display example of this menu.

When "Web" is selected on the LCD of the display section 104 and the button [OK/ENTER] is pressed (step S1013), the setting/confirmation screen for the connection information is displayed (step S1014). FIG. 9, as mentioned above, shows this setting/confirmation screen for the connection information. The connection information can be changed or confirmed on this setting/confirmation screen for the connection information (step S1015). "CONNECT" is selected on the setting/confirmation screen (step S1016) to establish a connection to the Internet, and the browser screen will be displayed (step S1017). FIG. 64, as mentioned above, shows the display example of the browser screen. When an URL address is entered in an address information input area A1 on the browser screen (step S1018), the Web page of the specified URL address is displayed on the browser screen (step S1019). FIG. 65, as mentioned above, shows the display example of the image of the Web page on the browser screen. This browser screen has vertical and horizontal scroll bars SC1 and SC2. By touching one of these bars with the stylus pen, the screen can be moved up and down, left and right. A part of the Web page is displayed on the LCD of the display section 104. When any hidden part of the image on the screen is viewed, the display of the screen can be changed by using the scroll bars SC1 and SC2 provided on the right side and the bottom of the screen. When the shutter release button 21 on the operating section 106 is pressed (step S1020), the image data for the whole screen currently displayed is recorded in the recording section 108 in the predetermined format the same as the data for a picked-up image, such as the EXIF format. In this case, this image data is also recorded in the recording section 108 with the URL or the e-mail address, obtained when the image has been captured, written in the header of the file (step S1021). That is, the captured Web information is handled as image data the same as the image data picked-up by the image pickup unit, such as the data in the EXIF format.

In this second example, by using the functions of managing the captured still pictures with folders and analyzing or layering URLs to be browsed, the image files of the browsed images may be classified into those to be stored in the respective folders depending on the contents of the URLs, for each URL address.

When the URL or the e-mail address is recorded in the header of the image file of the image data played back, the browser screen or the e-mail sending screen may be displayed when the image data is clicked. According to this feature, when the URL of the captured Web information or the e-mail address attached to this information is written in the header, only clicking on the image allows the Web browser to start up if the URL is in the file, and the e-mail sending screen to start up if the e-mail address is in the file. Further, when the e-mail address has the structure of a plurality of mailing lists, automatic selection and specification of an address may be enabled instead of the address directory.

As explained above, according to the second example, the URL of the captured Web information or the attached e-mail address is written in the header of the image file such as the EXIF file. Therefore, the URL of the Web information for the Web page, which has been captured in much the same way the shooting is performed with the camera, can easily be confirmed, thus being capable of accessing the Web page.

The digital camera has the function of analyzing URLs to be browsed by using the function of managing the captured still pictures with folders. By using this function, the captured image data that has been browsed is classified into those to be stored in the respective folders depending on the contents of the URLs. Therefore, the Web information for the captured Web pages can be classified into those to be stored in respective folders for each Web page, for example.

When the captured Web information has its own URL or the e-mail address attached to this information, only clicking on the image allows the Web browser to start up if the URL is in its image file, and the e-mail sending screen to startup if the e-mail address is in the file. Therefore, when the URL or the e-mail address has been recorded in the captured image, only by clicking on the image, the browser screen or the e-mail sending screen can be started, thus improving the user interface.

Third Example

Figure 71:
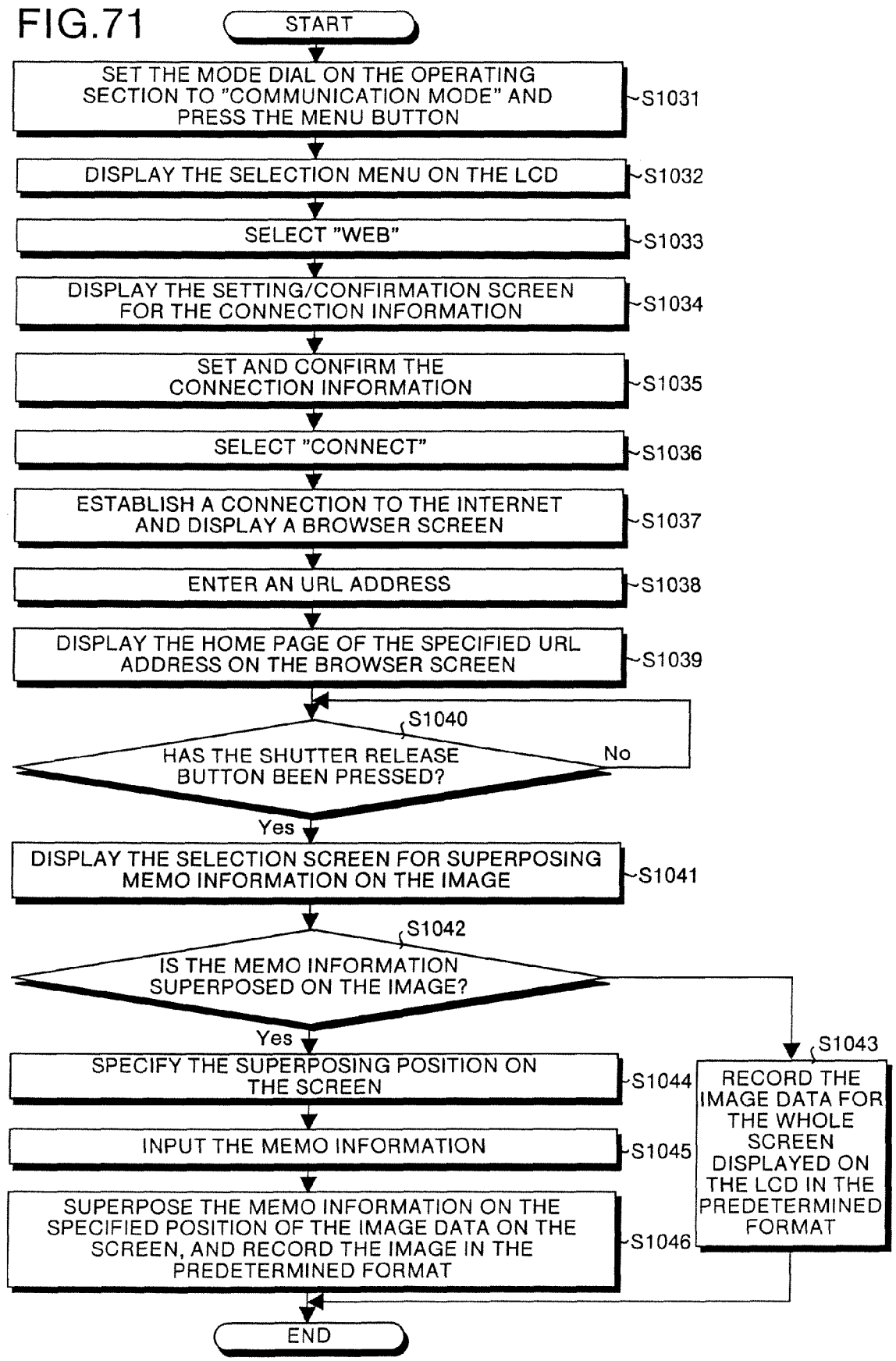
FIG. 71 is a flow chart for explaining a third example of a browser function in the digital camera.

The third example is explained with reference to FIG. 71. The flow chart in FIG. 71 shows the operation in the digital camera 100 according to the third example. FIG. 64 and FIG. 38 to FIG. 41, as mentioned above, show display examples on the LCD of the display section 104 in the third example. In this third example, the operation in the following case will be explained. This case is such that Web information is captured from the Web server 300 and memo information is superposed on the captured Web information.

In FIG. 71, in the digital camera 100, when the mode dial on the operating section 106 is set to "communication mode" (step S1031), the selection menu is displayed on the LCD of the display section 104 (step S1032). FIG. 8, as mentioned above, shows the display example of this menu.

When "Web" is selected on the LCD of the display section 104 and the button [OK/ENTER] is pressed (step S1033), the setting/confirmation screen for the connection information is displayed (step S1034). FIG. 9, as mentioned above, shows this setting/confirmation screen for the connection information. The connection information can be changed or confirmed on this setting/confirmation screen for the connection information (step S1035). "CONNECT" is selected on the setting/confirmation screen (step S1036) to establish a connection to the Internet, and the browser screen will be displayed (step S1037). FIG. 64 shows the display example of the browser screen. When an URL address is entered in an address information input area A1 on the browser screen (step S1038), the Web page of the specified URL address is displayed on the browser screen (step S1039). FIG. 65 shows the display example of the image of the Web page on the browser screen. This browser screen has vertical and horizontal scroll bars SC1 and SC2. By touching one of these bars with the stylus pen, the screen can be moved up and down, left and right. A part of the Web page is displayed on the LCD of the display section 104. When any hidden part of the image on the screen is viewed, the display of the screen can be changed by using the scroll bars SC1 and SC2 provided on the right side and the bottom of the screen. When the shutter release button 21 on the operating section 106 is pressed (step S1040), the menu, not shown, for making a selection of whether "the memo information is superposed" is displayed (step S1041). Such selection is made on this menu (step S1042). When "Do not superpose the memo information" is selected, the image data for the whole screen currently displayed is recorded in the recording section 108 in the predetermined format the same as the data for a picked-up image, for example, in any of the GIF, TIFF, and JPEG formats (step S1043).

Figure 72:
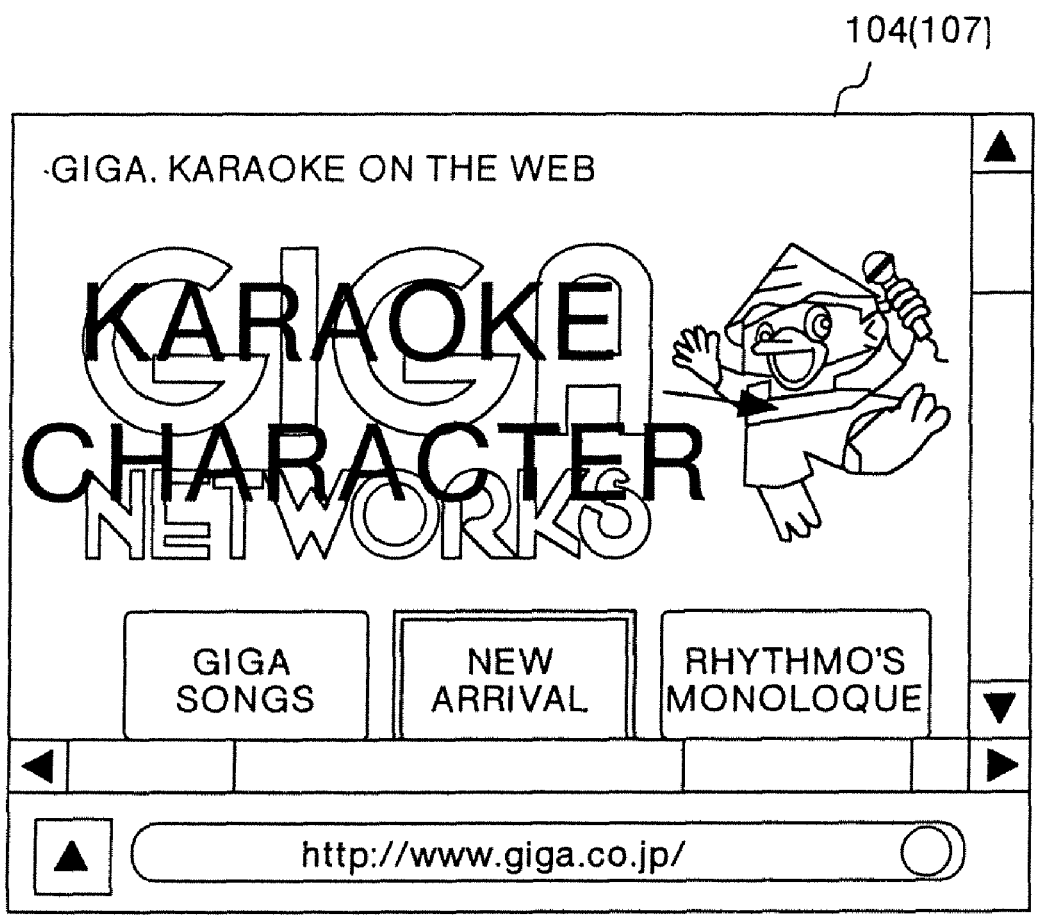
FIG. 72 shows another example of the browser screen.

On the other hand, at step S1042, when "superpose the memo information" is selected, the superposing position is specified on this screen (step S1044), and the memo information such as text is entered through the on-screen keypad (step S1045). Further, the entered memo information is superposed on the specified position of the image data on the screen, and the composite image is recording section 108 in the predetermined format the same as the data for a picked-up image, for example, in any of the GIF, TIFF, and JPEG formats (step S1046). FIG. 72 shows a display example of the display section 104 when the memo information such as text is superposed on the captured image.

In this third example, the text entered through the on-screen keypad as the memo information is superposed on the specified position of the image data. However, the memo information such as templates, which have been previously stored in the recording section 108, may be superposed on the specified position of the image data.

Any mark as memo information (such as a circle, a star, or an arrow) used for identifying a specified position is previously recorded in the recording section 108 in the BMP format or in the text format. The mark may be superposed on a predetermined position of the captured Web information or a specified superposing position. Further, by using the function of imprinting the date to a captured still picture, the date or the date and time may be imprinted to a specified position of the image when it is captured.

As explained above, according to the third example, any position on the captured Web information can be freely specified. Memo information as text is superposed on the specified position, or memo information such as any of the templates previously stored in the recording section 108 is superposed on a specified position of the captured Web information. Therefore, required information can be superposed on the Web information. Thus, the user's intention can clearly be expressed in a simple manner.

Any mark as memo information (such as a circle, a star, and an arrow) used for identifying a specified position is previously recorded in the recording section 108 in the BMP format or in the text format. The mark is superposed on a predetermined position of the captured Web information or a specified position. Therefore, any mark as memo information to identify a position can be superposed on the information.

Further, by using the function of imprinting the date to the captured still picture, the date of the captured image is imprinted to a specified position of the image when it is captured. Therefore, the date easily be imprinted to the Web information for the Web page captured in much the same way the shooting is performed with the camera.

EXAMPLES OF THE PERSONAL COMPUTER ACCORDING TO THIS EMBODIMENT

A first example to an eleventh example will be explained below. These examples are provided for cases in which an image capture guide list is created on a PC, shooting is performed using the image capture guide list created on the PC with the digital camera, and this shot image is used on the PC.

First Example

Figure 73:
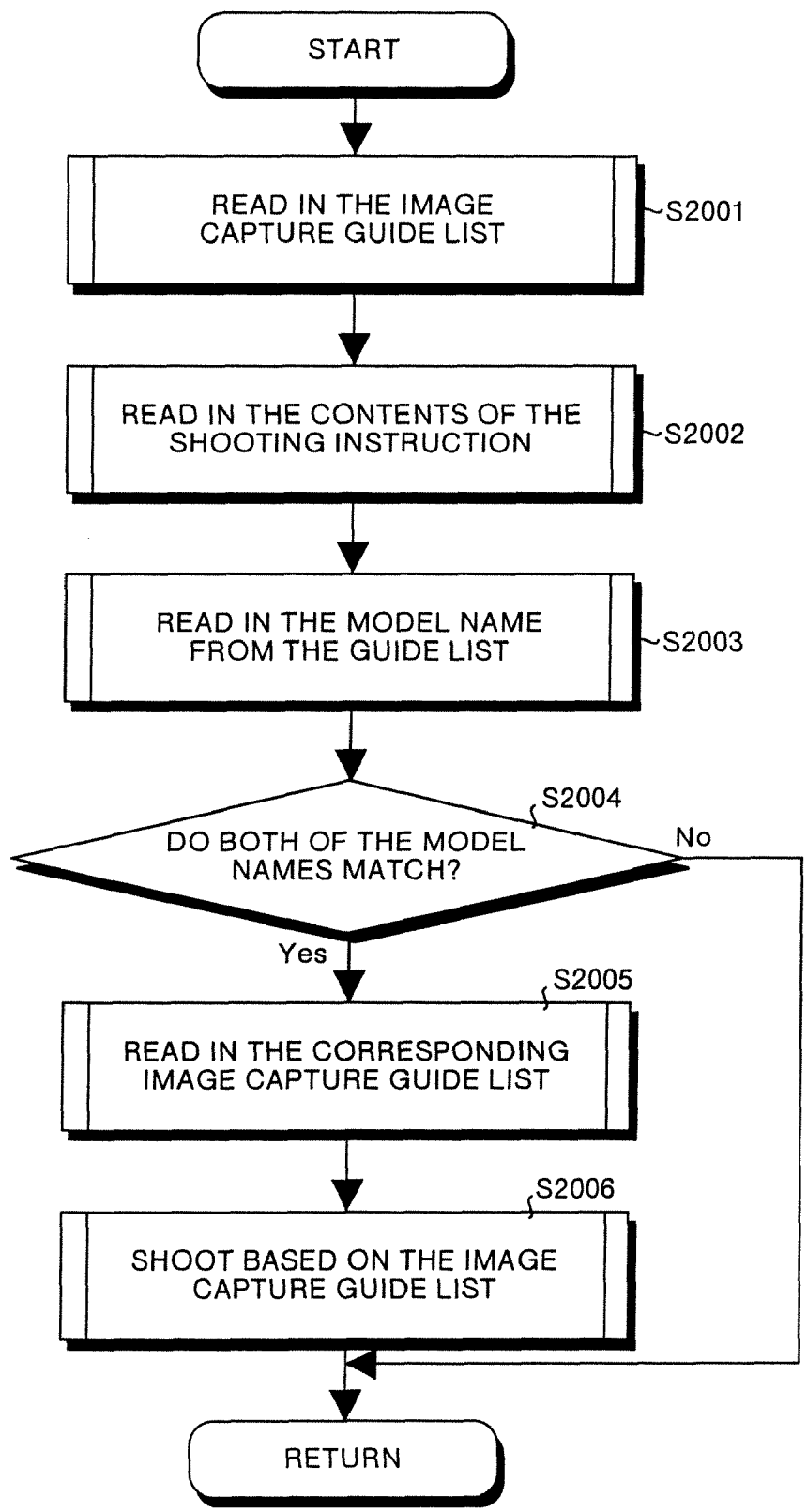
FIG. 73 is a flow chart for explaining a first example of the personal computer.

The first example is explained with reference to FIG. 73. The flow chart in FIG. 73 shows the operation in the digital camera 100 according to the first example. In this first example, the operation in the following case will be explained. This case is such that the model of an image capture guide list format is defined on the personal computer 200, the image capture guide list in which the model of the device is described is transferred to the digital camera 100, and shooting is executed based on the image capture guide list when the model of the digital camera 100 matches the model specified in the image capture guide list.

An image capture guide list including the model code of the digital camera is created on the personal computer 200 (See a second example to a fifth example for the actual method for creating the image capture guide list). This image capture guide list includes image titles as targets to be recorded, and further the contents of shooting instruction is registered in this list in correlation with the respective image titles. The digital camera 100 is connected to the personal computer 200 to download the image capture guide list and store this image capture guide list in the recording section 108.

In FIG. 73, the system control section 101 reads out the image capture guide list from the recording section 108 (step S2001), and reads in the contents of shooting instruction (step S2002). The system control section 101 reads in the model name from the image capture guide list (step S2003), and determines whether the model name of its own and the model name in the image capture guide list match with each other (step S2004). When it is determined that both of the two fail to match, the processing is returned. On the other hand, when these two match with each other, the system control section 101 reads in the corresponding image capture guide list (step S2005). Shooting is performed based on the image capture guide list (step S2006).

As explained above, according to the first example, the personal computer 200 defines the model name of the digital camera in the image capture guide list and transfers the image capture guide list with it's adequate model name described, to the digital camera 100. On the other hand, shooting is executed with the digital camera 100 based on this image capture guide list when the model of its own and the model in the image capture guide list match with each other. Therefore, in the digital camera side, forgetting to take required images can be prevented by performing shooting according to the image capture guide list. Thus, it is possible to perform shooting according to the instruction by the instructor or the creator of this guide list.

Further, the digital camera 100 transfers the image capture guide list and the file (s) recorded using this image capture guide list (such as an image file of a capture image) to the personal computer 200. Accordingly, the user of the personal computer 200, who has created this image capture guide list, can utilize the image (s) recorded using this image capture guide list for making a report or the like. Thus, the usability of the image capture guide list for its creator is improved.

Second Example

Figure 74:
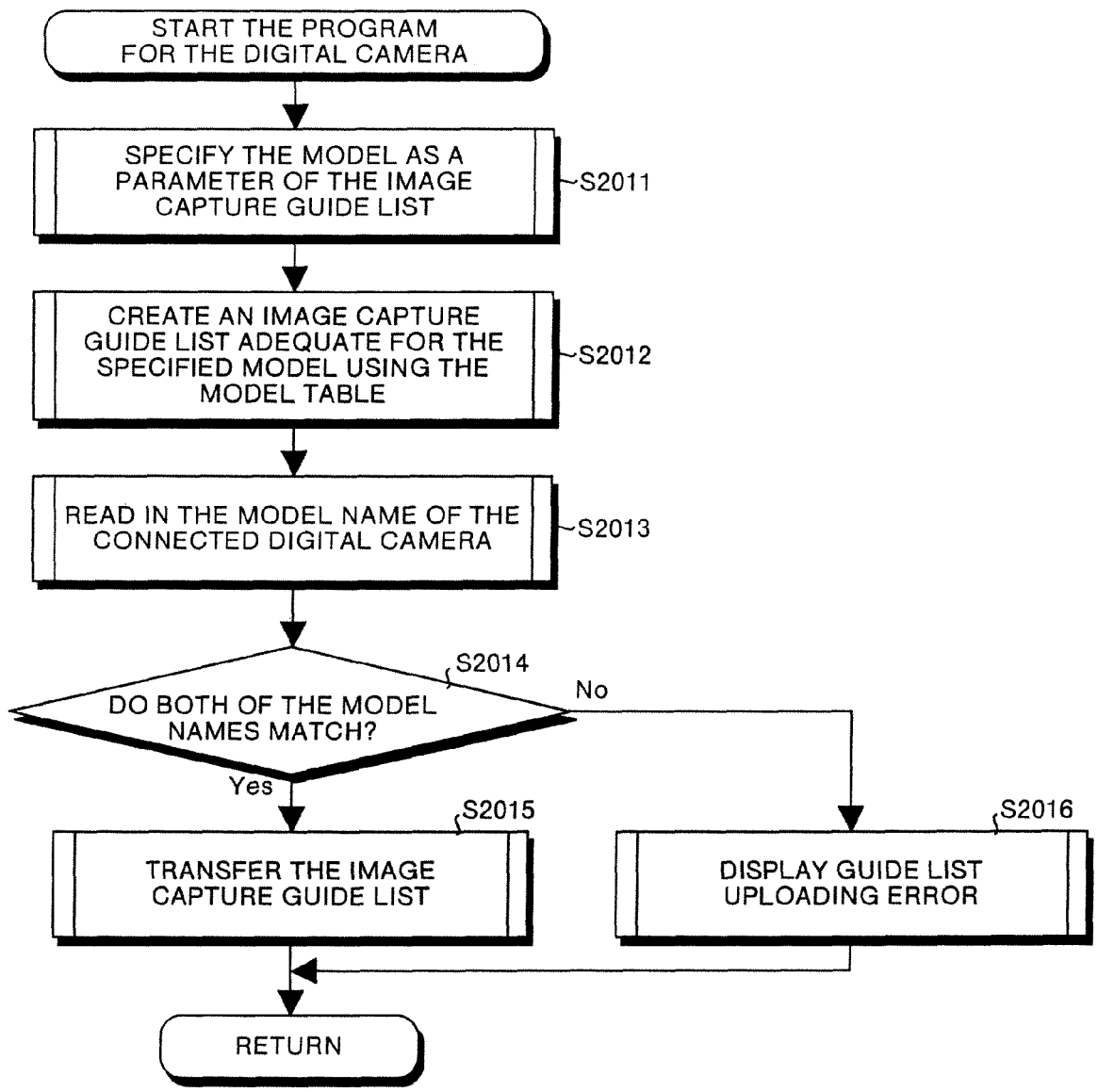
FIG. 74 is a flow chart for explaining a second example of the personal computer.

The second example is explained with reference to FIG. 74. The flow chart in FIG. 74 shows the operation in the personal computer 200 according to the second example. In this second example, the operation in the following case will be explained. This case is such that an image capture guide list adequate for the model of the digital camera is created on the personal computer 200, and this guide list is transferred to the digital camera 100.

In FIG. 74, the program for the digital camera is started on the personal computer 200 to specify the model of a digital camera as a parameter of the image capture guide list by the user through operation of the input section 201 (step S2011). the operator creates an image capture guide list adequate for the specified model using the model table (step S2012). Alternatively, when the model is specified, the macro may be started to automatically create the image capture guide list adequate for the specified model using the model table. This image capture guide list describes image titles as targets to be recorded and the contents of shooting instruction relating to each of the image titles.

The personal computer 200 reads in the model name (model code) of the connected digital camera 100 (step S2013), and determines whether the model name specified in the image capture guide list and the model name of the camera connected to the computer 200 match with each other (step S2014).

When it is determined that these two match with each other, the personal computer 200 transfers the created image capture guide list to the digital camera 100 (step S2015). On the other hand, when these two fail to match, the guide list uploading error is displayed on the display section (step S2016).

As explained above, according to the second example, the operator creates an image capture guide list adequate for the model of the digital camera on the personal computer 200 and transfers this guide list to the digital camera. Therefore, the image capture guide list adequate for the model of the connected digital camera can be created and transferred. Accordingly, it is possible to improve the operability of creation and transfer of the image capture guide list and the operability in the digital camera, thus improving usability for the user.

Further, on the personal computer 200, the operator acquires the model code of the connected digital camera, and creates the image capture guide list adequate for the model of the connected digital camera by using the model table in which available functions for each model of the digital cameras are registered. However, the operator may acquire the model code and information for it's available functions from the connected digital camera and create an image capture guide list adequate for the model of the connected digital camera.

Third Example

Figure 75:
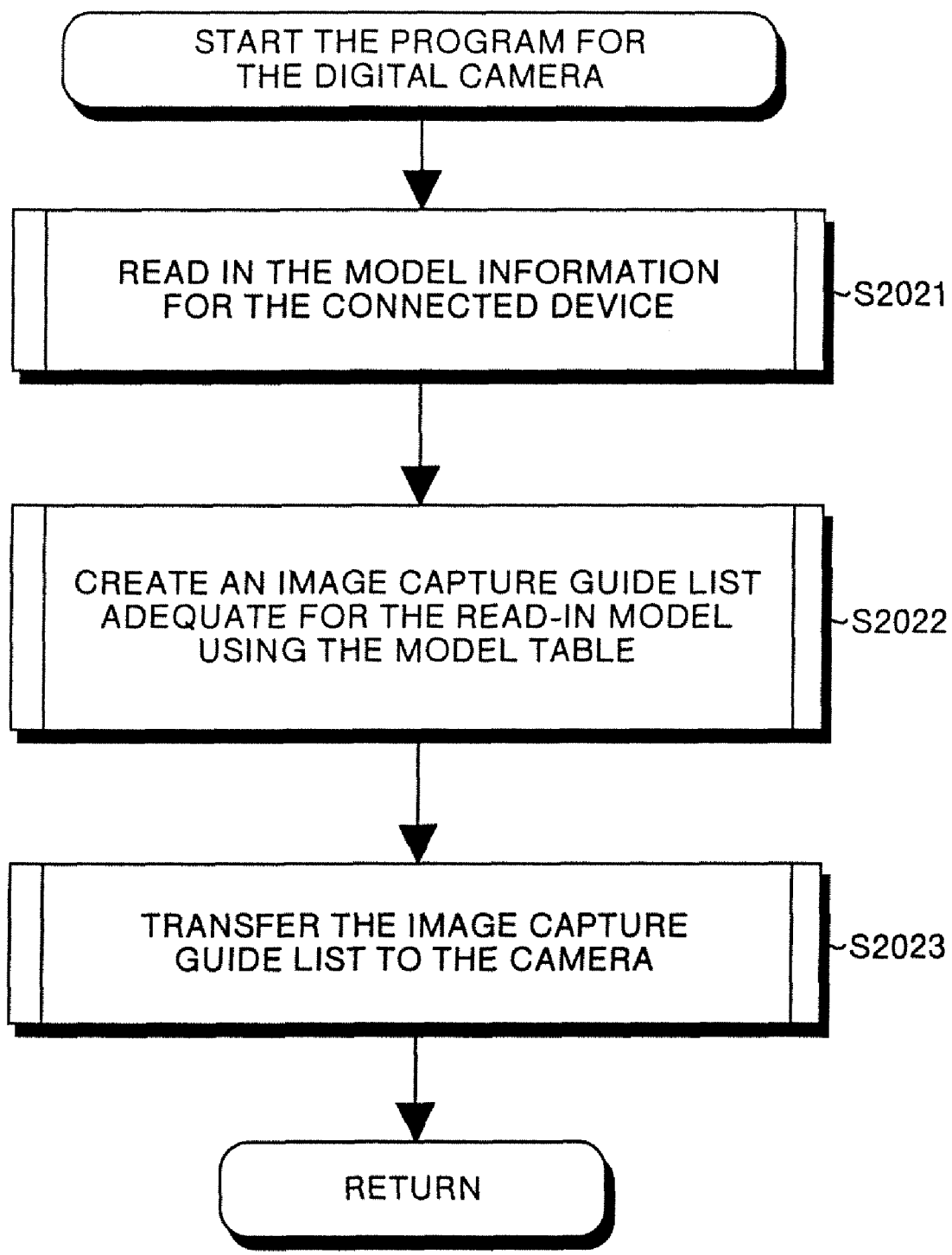
FIG. 75 is a flow chart for explaining a third example of the personal computer.

The third example is explained with reference to FIG. 75. The flow chart in FIG. 75 shows the operation in the personal computer according to the third example. In this third example, the operation in the following case will be explained. This case is such that an image capture guide list adequate for the model of the digital camera is created on the personal computer 200 and this guide list is transferred to the digital camera 100.

In FIG. 75, the program for the digital camera is started on the personal computer 200 to read in the model name (model code) of the connected digital camera 100 from this digital camera 100 (step S2021). The operator then creates an image capture guide list adequate for the read-in model using the model table (step S2022). Alternatively, the macro may be started to automatically create the image capture guide list adequate for the read-in model by referring to the model table. This image capture guide list describes image titles as targets to be recorded and the contents of the shooting instruction relating to each of the image titles. The created image capture guide list is transferred to the digital camera 100 (step S2023).

As explained above, according to the third example, the model of the connected digital camera is read out on the personal computer 200, and the image capture guide list adequate for the model of the digital camera is created to transfer the guide list to the digital camera. Therefore, the image capture guide list that is adequate for the model of the connected digital camera can be created and transferred. Accordingly, it is possible to improve the operability of creation and transfer of the image capture guide list and the operability in the digital camera, thus improving usability for the user.

The model code of the connected digital camera is acquired on the personal computer 200, and the image capture guide list adequate for the model of the connected digital camera is created by using the model table in which available functions for each model of the digital cameras are registered. However, the model code and the information for its available functions may be acquired from the connected digital camera, and the image capture guide list adequate for the model of the connected digital camera may be created.

Fourth Example

Figure 76:
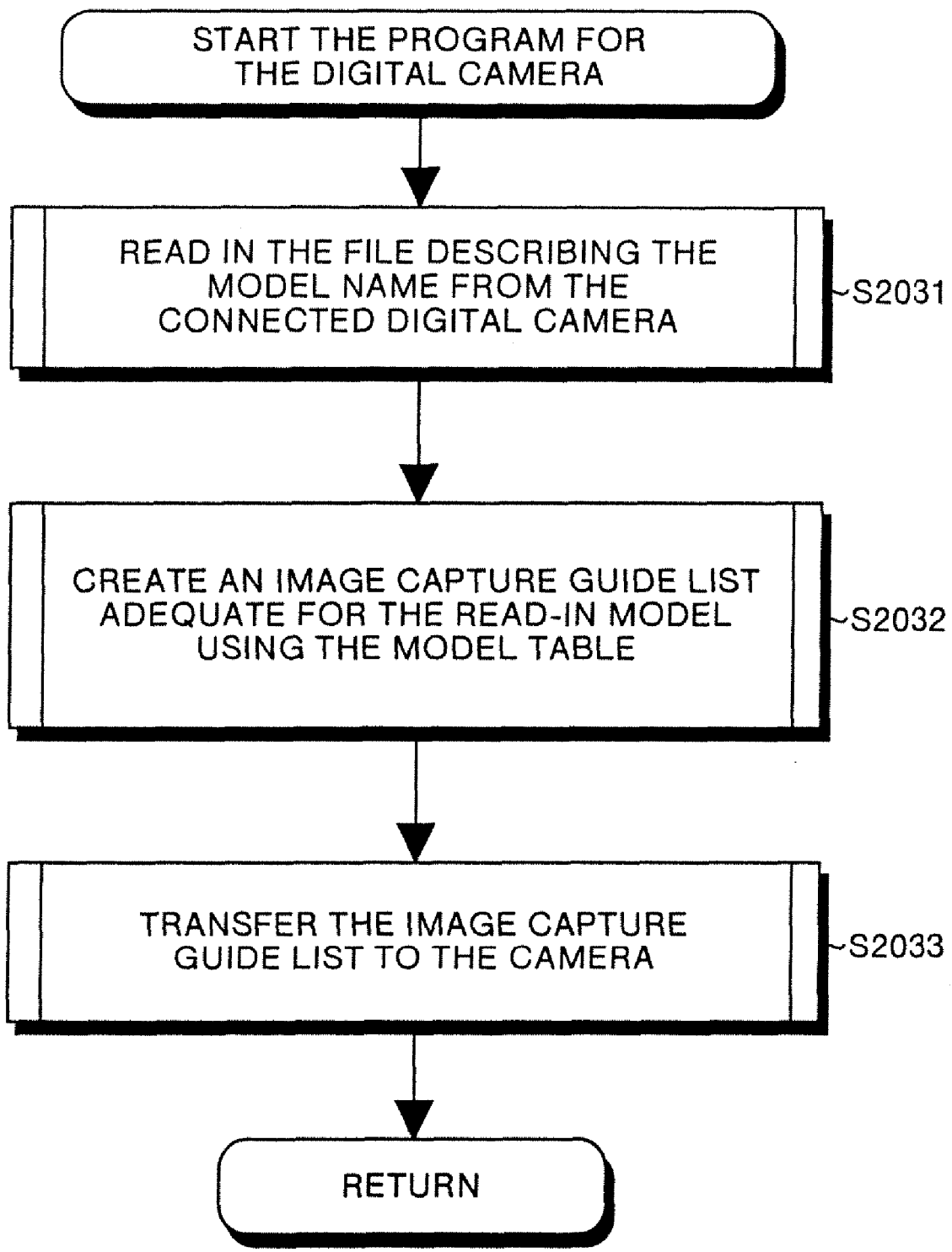
FIG. 76 is a flow chart for explaining a fourth example of the personal computer.

The fourth example is explained with reference to FIG. 76. The flow chart in FIG. 76 shows the operation in the personal computer according to the fourth example. In this fourth example, the operation executed on the personal computer 200 in the following case will be explained. This case is such that a file describing the model or the like is read out from the digital camera connected to the personal computer 200, an image capture guide list adequate for the model in the read-out file is created, and this guide list is transferred to the digital camera 100.

In FIG. 76, the program for the digital camera is started on the personal computer 200 to read in the file describing the model name (model code) of the digital camera from this connected digital camera 100 (step S2031). The operator then creates an image capture guide list adequate for the model in the read-in file using the model table (step S2032). Alternatively, the macro may be started to automatically create an image capture guide list adequate for the read-in model by referring to the model table. This image capture guide list describes image titles as targets to be recorded and the contents of the shooting instruction relating to each of the image titles. The created image capture guide list is transferred to the digital camera 100 (step S2033).

As explained above, according to the fourth example, the file describing the model name of the digital camera is read out from the connected digital camera on the personal computer 200, an image capture guide list adequate for the read-out model is created and transferred to the digital camera. Therefore, the image capture guide list that is adequate for the model of the connected digital camera can be created and transferred. Accordingly, it is possible to improve the operability of creation and transfer of the image capture guide list and the operability in the digital camera, thus improving usability for the user.

The model code of the connected digital camera is acquired on the personal computer 200, and the shooting instruction list adequate for the model of the connected digital camera is created by using the model table in which available functions for each model of the digital cameras are registered. However, the model code and the information for its available functions may be acquired from the connected digital camera, and the image capture guide list adequate for the model of the connected digital camera may be created.

Fifth Example

Figure 77:
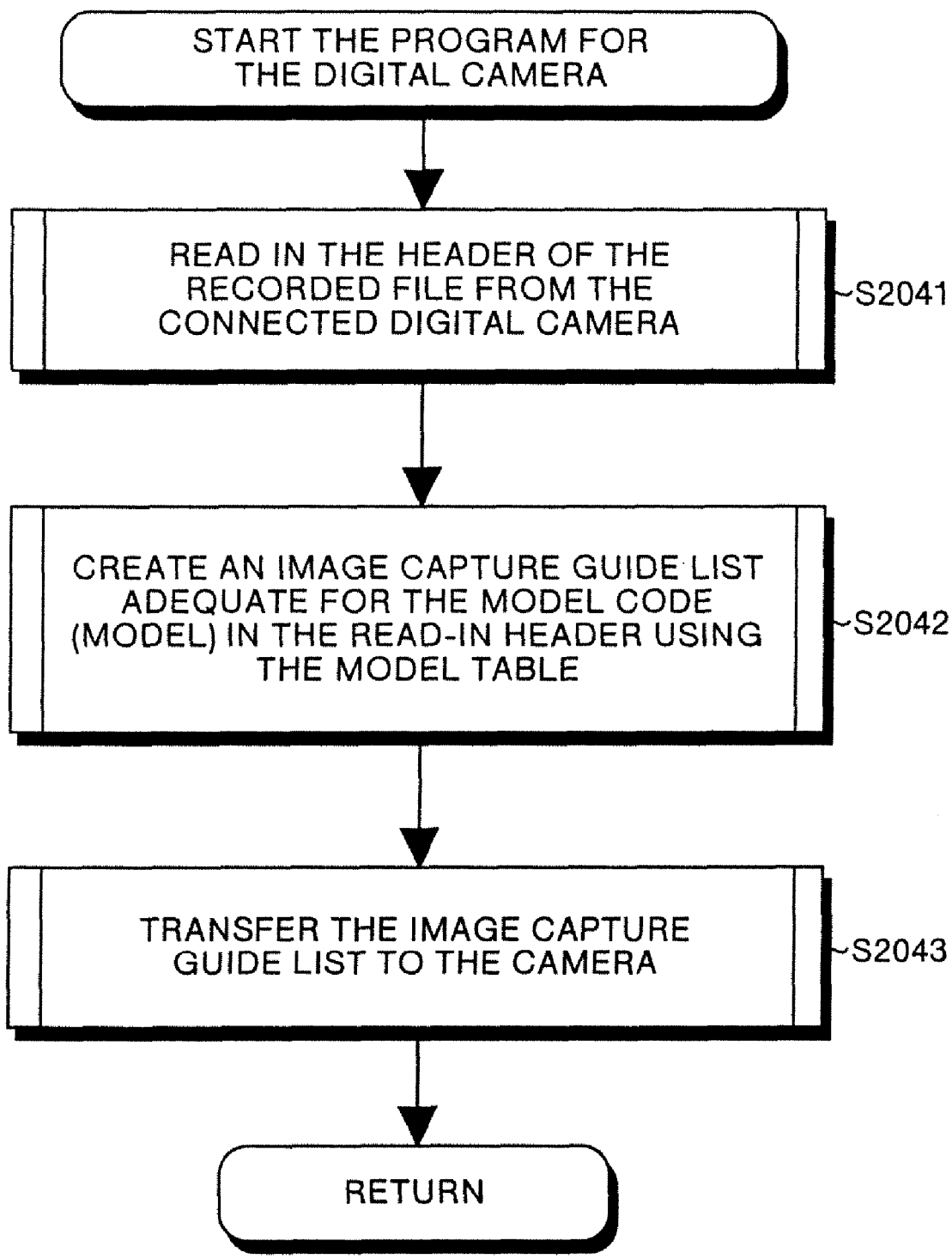
FIG. 77 is a flow chart for explaining a fifth example of the personal computer.

The fifth example is explained with reference to FIG. 77. The flow chart in FIG. 77 shows the operation in the personal computer side according to the fifth example. In this fifth example, the operation executed on the personal computer 200 in the following case will be explained. This case is such that the header of the recorded file of the connected digital camera is read out from this connected digital camera, an image capture guide list adequate for the model code (model name) stored in the header is created, and this guide list is transferred to the digital camera.

In FIG. 77, the program for the digital camera is started on the personal computer 200 to read in the header of the recorded file (such as the file in the EXIF format) stored in the recording section 108 or in the card slot section 110 of the connected digital camera (step S2041). The EXIF format file stores the information such as model code in its header. The operator then creates an image capture guide list adequate for the model code (model name) in the read-in header using the model table (step S2042). Alternatively, the macro may be started to automatically create an image capture guide list adequate for the read-in model code by referring to the model table. This image capture guide list describes image titles as targets to be recorded and the contents of the shooting instruction relating to each of the image titles. The created image capture guide list is transferred to the digital camera 100 (step S2043).

As explained above, according to the fifth example, the header of the recorded file of the connected digital camera is read out on the personal computer 200. The image capture guide list adequate for the model code in the read-out header is created and transferred to the digital camera. Therefore, the image capture guide list that is adequate for the model of the connected digital camera can be created and transferred. Accordingly, it is possible to improve the operability of creation and transfer of the image capture guide list and the operability in the digital camera, thus improving usability for the user.

The model code of the connected digital camera is acquired on the personal computer 200, and the shooting instruction list adequate for the model of the connected digital camera is created by using the model table in which available functions for each model of the digital cameras are registered. However, the model code and the information for its available functions may be acquired from the connected digital camera without using the model table and the image capture guide list adequate for the model of the connected digital camera may be created based on the information for the available functions.

Sixth Example

Figure 78:
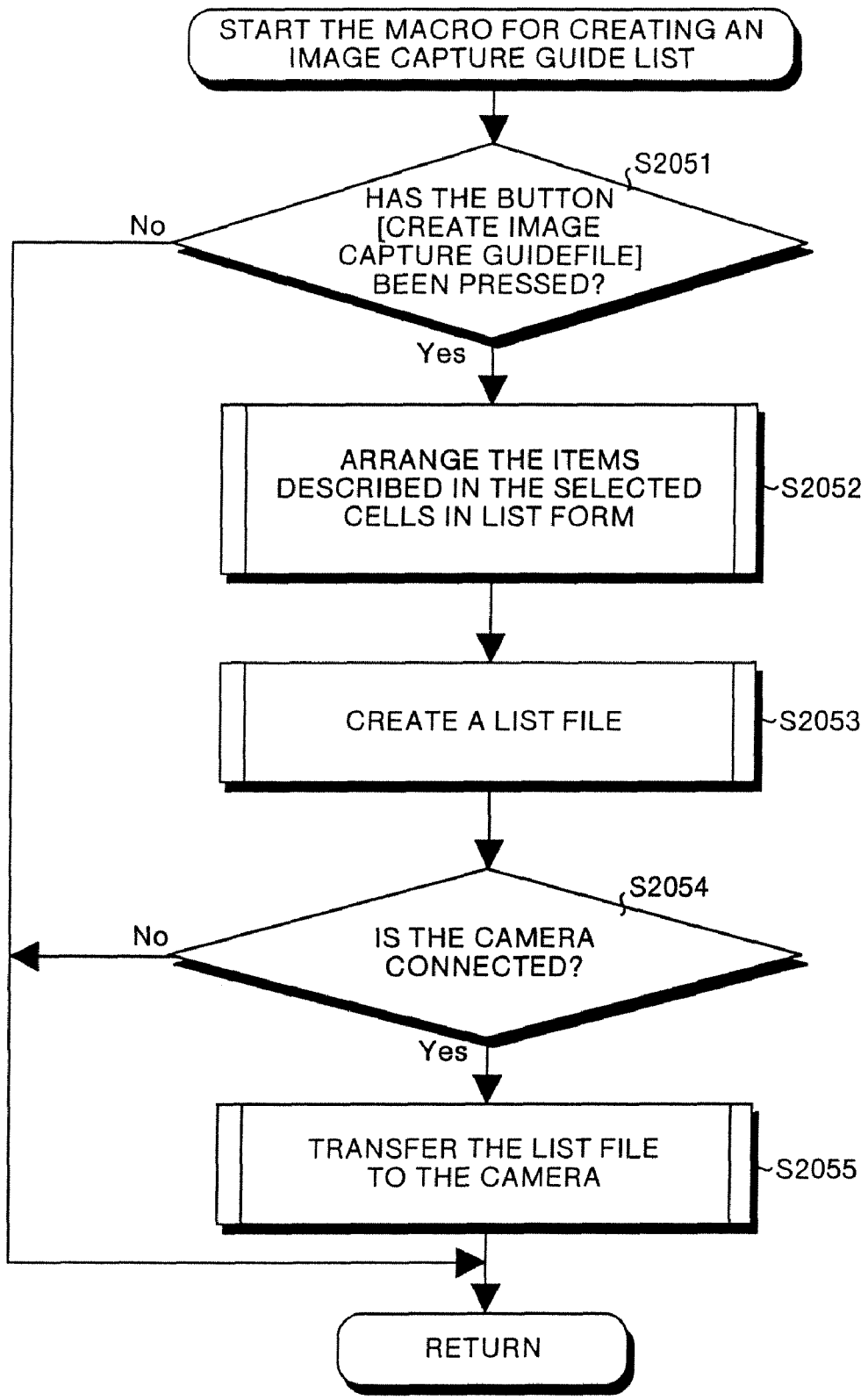
FIG. 78 is a flow chart for explaining a sixth example of the personal computer.

The sixth example is explained with reference to FIG. 78. The flow chart in FIG. 78 shows the operation in the personal computer according to the sixth example. In this sixth example, the operation executed on the personal computer in the following case will be explained. This case is such that information for the position of a cell to be selected as an image title is previously embedded in a macro program for a template, and the macro program is started to automatically create an image capture guide list and transfer this guide list to the digital camera.

In FIG. 78, the macro for creating an image capture guide list is started on the personal computer 200, and the spreadsheet type screen is displayed. It is determined whether a button [Create Image Capture Guidefile] has been pressed (step S2051). When it is determined that this button has been pressed, the items (image titles) described in the selected cells are arranged in list form (step S2052) to create an image capture guide list file (step S2053). FIG. 79 shows an example of the spreadsheet type screen. The information for the positions of the cells B3 to B7 is previously embedded in the macro program as position information for the cells from which image titles are selected. The image titles of "Item No. 1", "Item No. 2", "Item No. 3", "Item No. 4", and "Item No. 5" are entered in the respective cells B3 to B7 by the user through operation of the input section 201. When the button [Create Image Capture Guidefile] is pressed, the image titles of "Item No. 1", "Item No. 2", "Item No. 3", "Item No. 4", and "Item No. 5" in the cells B3 to B7 are read out to create an image capture guide list file.

It is determined whether the digital camera is connected to the personal computer 200 (step S2054). When the digital camera is connected, the processing proceeds to step S2055, and the image capture guide list file is transferred to the digital camera 100.

As explained above, in the personal computer 200 according to the sixth example, the information for positions of the cells to be taken out as image titles are previously embedded in the macro program for the template. Therefore, this macro is started to automatically create the image capture guide list and transfer this guide list to the digital camera. Accordingly, it is possible to improve the operability of creation and transfer of the image capture guide list and the operability in the digital camera, thus improving usability for the user.

Seventh Example

Figure 80:
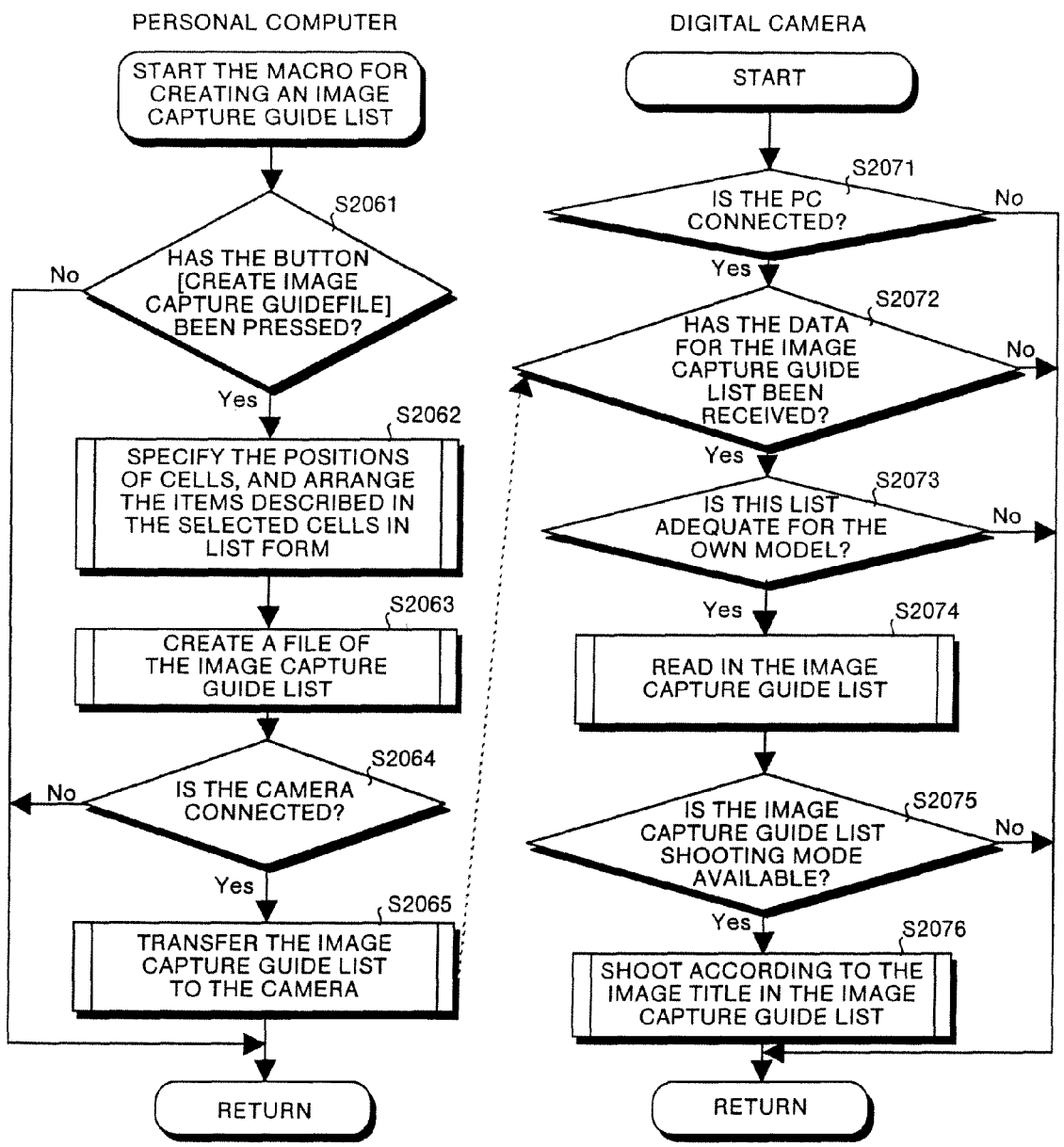
FIG. 80 is a flow chart for explaining a seventh example of the personal computer.

The seventh example is explained with reference to FIG. 80. The flow chart in FIG. 80 shows the operations in the personal computer and in the digital camera according to the seventh example. In this seventh example, the operation executed on the personal computer in the following case will be explained. This case is such that the positions of cells are specified, and the macro is started to automatically create an image capture guide list and transfer this guide list to the digital camera.

In the personal computer 200 in FIG. 80, the macro for creating an image capture guide list is started, and the spreadsheet type screen is displayed on the display section 202. Image titles are entered in the cells on the spreadsheet type screen. It is then determined whether the button [Create Image Capture Guidefile] has been pressed (step S2061). When it is determined that this button has been pressed, the positions of the cells are specified, and the items entered in the selected cells are arranged in list form (step S2062) to create an image capture guide list file (step S2063). It is determined whether the digital camera is connected (step S2064). When the digital camera is connected, the processing proceeds to step S2065, and the image capture guide list file is transferred to the digital camera.

FIG. 79 shows an example of the spreadsheet type screen. For example, the image titles of "Item No. 1", "Item No. 2", "Item No. 3", "Item No. 4", and "Item No. 5" are entered in the respective cells B3 to B7 by the user through operation of the input section 201. When the cells B3 to B7 are selected and the button [Create Image Capture Guidefile] is pressed by the user through the operation of the input section 201, the image titles of "Item No. 1", "Item No. 2", "Item No. 3", "Item No. 4", and "Item No. 5" in the cells B3 to B7 are read out to create an image capture guide list file, in which "Item No. 1", "Item No. 2", "Item No. 3", "Item No. 4", and "Item No. 5" are arranged in list form.

In the digital camera 100, on the other hand, it is determined whether the personal computer (PC) 200 is connected (step S2071). When the personal computer 200 is connected, the processing proceeds to step S2072, and it is determined whether the image capture guide list has been received from the personal computer 200. When the image capture guide list has been received from the personal computer 200, it is determined whether this image capture guide list is adequate for its own model (step S2073). When this image capture guide list is adequate, the digital camera 100 reads in the image capture guide list (step S2074). It is then determined whether the image capture guide list shooting mode is available (step S2075). When the image capture guide list shooting mode is available, shooting is performed according to the image titles in the image capture guide list (step S2076).

As explained above, in the personal computer 200 according to the seventh example, the positions of cells to be taken out as image titles are specified by the user. The macro is then started to automatically read out the image titles in the selected cells to create an image capture guide list and transfer this guide list to the digital camera. Accordingly, it is possible to improve the operability of creation and transfer of the image capture guide list and the operability in the digital camera, thus improving usability for the user.

Eighth Example

Figure 81:
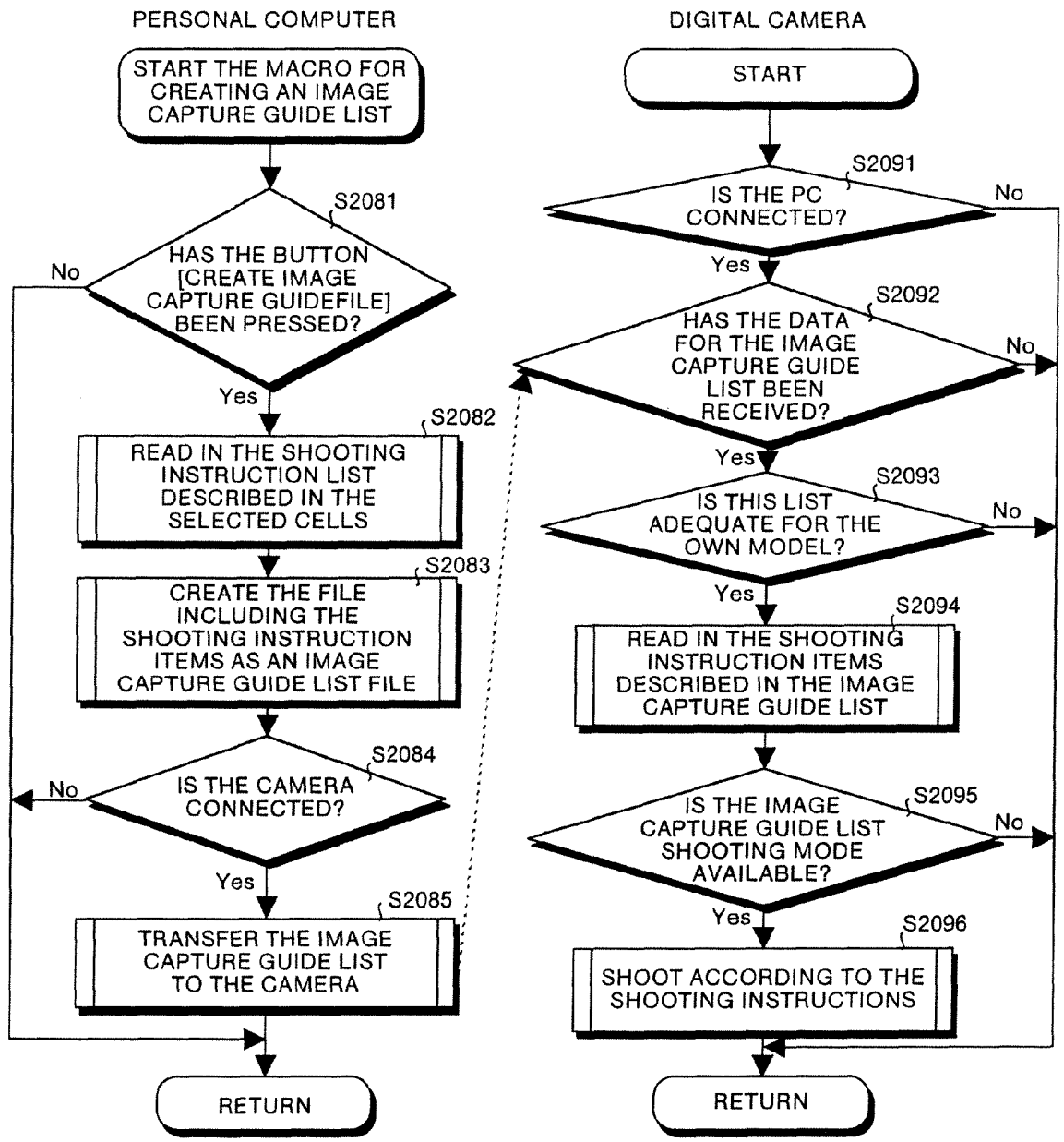
FIG. 81 is a flow chart for explaining an eighth example of the personal computer.

The eighth example is explained with reference to FIG. 81. The flowchart in FIG. 81 shows the operations in the personal computer and in the digital camera according to the eighth example. In this eighth example, the operation executed on the personal computer in the following case will be explained. This case is such that the position of cells are specified, and the macro is started to automatically create an image capture guide list including shooting instruction items and transfer this guide list to the digital camera.

In the personal computer 200, the macro for creating an image capture guide list is started to display the spreadsheet type screen on the display section 202. It is determined whether the button [Create Image Capture Guidefile] has been pressed (step S2081). When it is determined that this button has been pressed, the positions of the cells are specified, and the image titles described in the selected cells and the respective shooting instruction items relating to the image titles are read in (step S2082). The image capture guide list file including the image titles and the respective shooting instruction items relating to the image titles is created (step S2083).

FIG. 82 shows another example of the spreadsheet type screen. The image titles of "Item No. 1", "Item No. 2", "Item No. 3", "Item No. 4", and "Item No. 5" are entered in the respective cells B3 to B7 by the user through operation of the input section 201. Further, the shooting instruction items of "Picture of person A", "Picture of person B", "Picture of person C", "Picture of person D", and "Picture of person E" are entered in the cells C3 to C7. When the cells B3 to B7 are selected by the user through the operation of the input section 201 and the button [Create Image Capture Guidefile] is pressed, the image titles of "Item No. 1", "Item No. 2", "Item No. 3", "Item No. 4", and "Item No. 5" in the cells B3 to B7 are read out. Further, the shooting instruction items of "Picture of person A", "Picture of person B", "Picture of person C", "Picture of person D", and "Picture of person E" in the cells C3 to C7 relating to these respective image titles are read out to create an image capture guide list file including these image titles and the shooting instruction items (shooting instruction information).

It is determined whether the digital camera 100 is connected (step S2084). When the digital camera 100 is connected, the processing proceeds to step S2085, and the image capture guide list file is transferred to the digital camera 100.

In the digital camera 100, on the other hand, it is determined whether the personal computer (PC) is connected (step S2091). When the personal computer is connected, the processing proceeds to step S2092, and it is determined whether the image capture guide list has been received from the personal computer. When the image capture guide list has been received from the personal computer, it is determined whether this image capture guide list is adequate for its own model (step S2093). When this image capture guide list is adequate, the digital camera 100 reads in the shooting instruction items described in the image capture guide list (step S2094). It is then determined whether the image capture guide list shooting mode is available (step S2095). When the image capture guide list shooting mode is available, shooting is executed according to the image titles in the image capture guide list (step S2096).

As explained above, in the personal computer 200 according to the eighth example, the positions of cells to be taken out as image titles are specified by the user. The macro is then started to automatically create the image capture guide list file including the shooting instruction items, and transfer this guide list file to the digital camera. Accordingly, it is possible to improve the operability of creation and transfer of the image capture guide list and the operability in the digital camera, thus improving usability for the user.

Ninth Example

Figure 83:
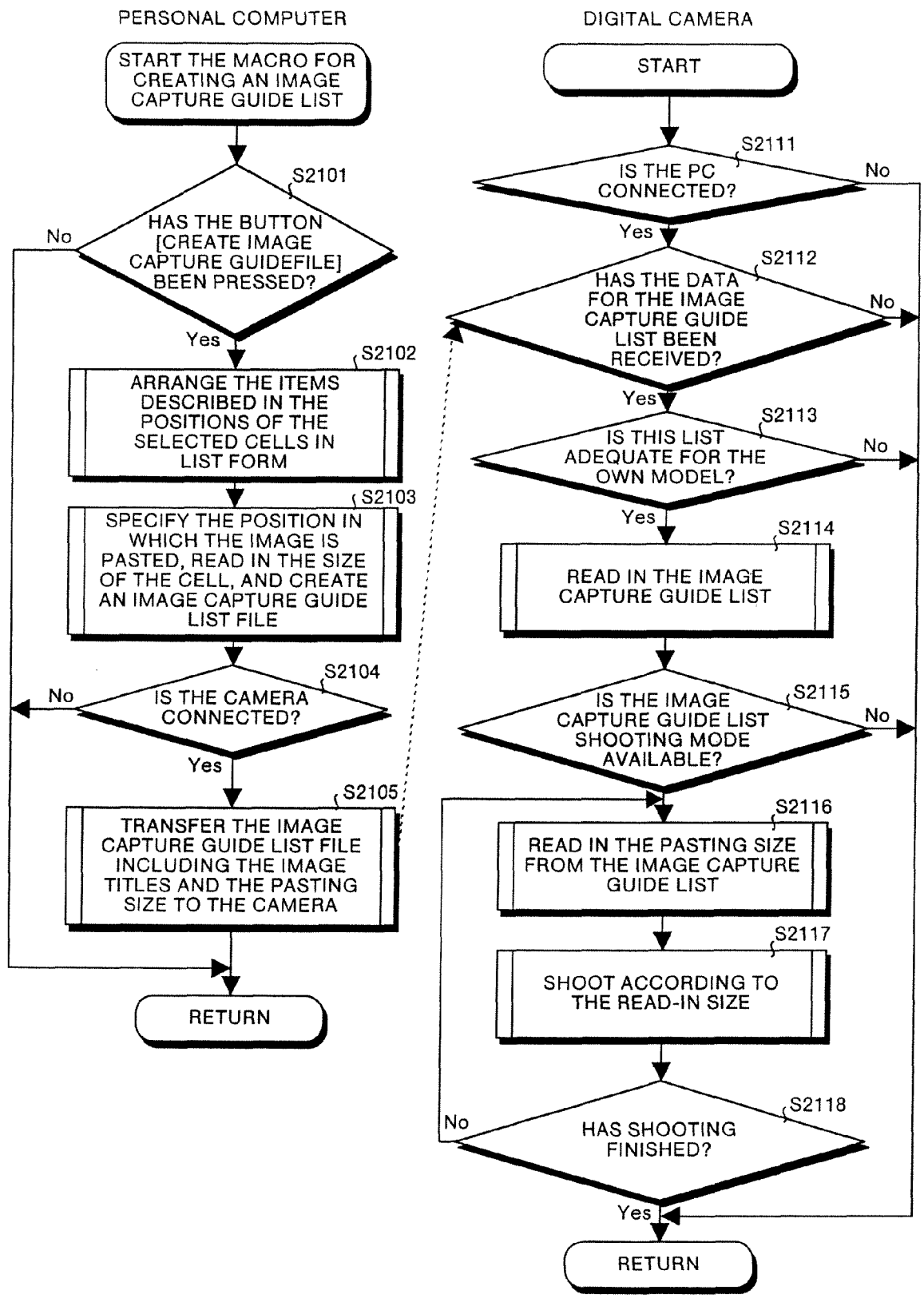
FIG. 83 is a flow chart for explaining a ninth example of the personal computer.

The ninth example is explained with reference to FIG. 83. The flowchart in FIG. 83 shows the operations in the personal computer and in the digital camera side according to the ninth example. In this ninth example, the operation executed on the personal computer in the following case will be explained. This case is such that the positions of cells to be selected as image titles and the positions in which images are pasted are specified, and the image title and the size of the cell in which the image is pasted are read out to automatically create an image capture guide list and transfer this guide list to the digital camera.

In the personal computer 200 in FIG. 83, the macro for creating an image capture guide list is started, and the spreadsheet type screen is displayed on the display section 202. It is determined whether the button [Create Image Capture Guidefile] has been pressed (step S2101). When it is determined that this button has been pressed, the items (image titles) described in the positions of selected cells are arranged in list form (step S2102). The positions of the cells in which the images are to be pasted are specified, and the size of the specified cells is read in to create an image capture guide list file including the image titles and the size of the cells of the images to be pasted (step S2103).

FIG. 84 shows another example of the spreadsheet type screen. The image titles of "Item No. 1", "Item No. 2", "Item No. 3", and "Item No. 4" are entered in the respective cells B4 to B7 by the user through operation of the input section 201. Further, when the button [Create Image Capture Guidefile] is pressed by the user through the operation of the input section 201 and the cells B4 to B7 to be selected as image titles are selected, the image titles of "Item No. 1", "Item No. 2", "Item No. 3", and "Item No. 4" in the cells B4 to B7 are read out. When cells C4 to C7 in which images are to be pasted are selected, the respective sizes of the cells C4 to C7 are read out to create an image capture guide list file, in which "Size of the cell C4", "Size of the cell C5", "Size of the cell C6", and "Size of the cell C7" are correlated with the image titles of "Item No. 1", "Item No. 2", "Item No. 3", and "Item No. 4", respectively.

It is determined whether the digital camera is connected (step S2104). When the digital camera is connected, the processing proceeds to step S2105, and the image capture guide list file including the image titles and the pasting sizes is transferred to the digital camera 100.

In the digital camera 100, on the other hand, it is determined whether the personal computer (PC) is connected (step S2111). When the personal computer is connected, the processing proceeds to step S2112, and it is determined whether the image capture guide list has been received from the personal computer. When the image capture guide list has been received from the personal computer, it is determined whether this image capture guide list is adequate for its own model (step S2113). When this image capture guide list is adequate, the digital camera 100 reads in the shooting items described in the image capture guide list (step S2114).

It is then determined whether the image capture guide list shooting mode is available (step S2115). When the image capture guide list shooting mode is available, the digital camera reads in the pasting sizes in the image capture guide list (step S2116). Images are shot according to the pasting sizes (step S2117). More specifically, the data for the shot image is changed to the size based on the pasting size. After the shooting, it is determined whether the shooting of all the images has been finished. When the shooting of all the images has not been finished, the processing proceeds to step S2116, and the same processing is repeated until the shooting has been finished (step S2118).

As explained above, in the personal computer 200 according to the ninth example, the positions of the cells to be selected as image titles and the positions of the cells in which images are pasted are specified. The image titles and the sizes of such cells are read out to automatically create the image capture guide list and transfer this guide list to the digital camera. Accordingly, it is possible to improve the operability of creation and transfer of the image capture guide list and the operability in the digital camera, thus improving usability for the user.

Tenth Example

Figure 85:
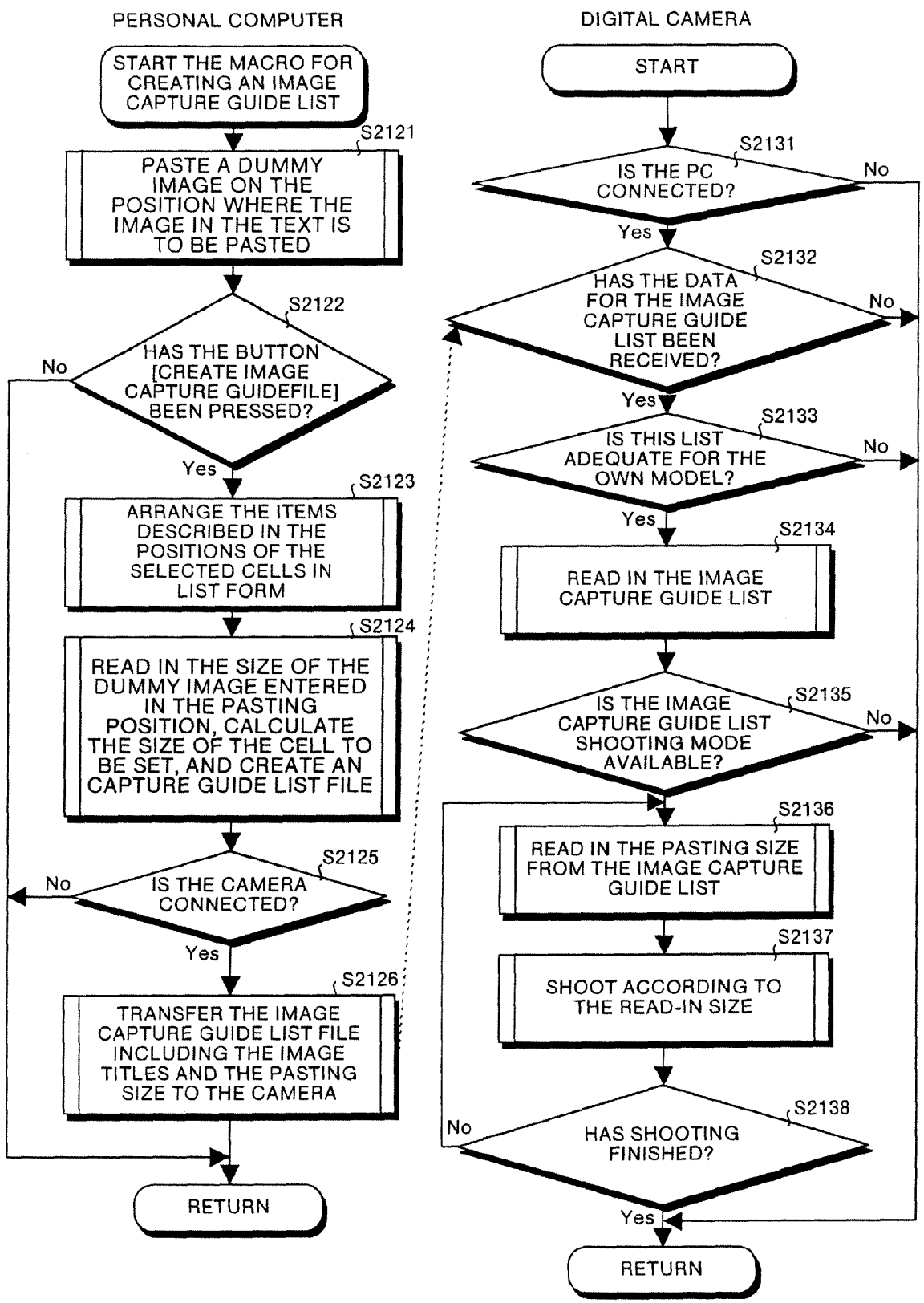
FIG. 85 is a flow chart for explaining a tenth example of the personal computer.

The tenth example is explained with reference to FIG. 85. The flowchart in FIG. 85 shows the operations in the personal computer and in the digital camera according to the tenth example. In this tenth example, the operation executed on the personal computer in the following case will be explained. This case is such that dummy images are previously pasted on to text, and the sizes of the images are read out to automatically create an image capture guide list including the image size and transfer this guide list to the digital camera.

In the personal computer 200 in FIG. 85, the macro for creating an image capture guide list is started to display the spreadsheet type screen on the display section 202 and paste dummy images in the position in which images are to be pasted (step S2121). It is determined whether the button [Create Image Capture Guidefile] has been pressed (step S2122). When it is determined that this button has been pressed, the image titles described in the selected cells are arranged in list form (step S2123). The dummy images entered in the pasting positions are read in, and the sizes (pasting sizes) of the dummy images are calculated to create an capture guide list file including the image titles and the sizes of the dummy images relating to the image titles (step S2124).

FIG. 86 shows another example of the spreadsheet type screen. The image titles of "Item No. 1", "Item No. 2", "Item No. 3", and "Item No. 4" are entered in the respective cells B4 to B7 by the user through operation of the input section 201. Further, "Dummy image No. 1", "Dummy image No. 2", "Dummy image No. 3", and "Dummy image No. 4" are pasted in the cells C4 to C7. When the button [Create Image Capture Guidefile] is pressed by the user through the operation of the input section 201 and the cells B4 to B7 to be selected as the image titles are selected, the image titles of "Item No. 1", "Item No. 2", "Item No. 3", and "Item No. 4" in the cells B4 to B7 are read out. When cells C4 to C7 in which the dummy images have been pasted are selected, the respective sizes of the dummy images pasted in the cells C4 to C7 are calculated to create an image capture guide list file, in which "Size of the dummy image No. 1", "Size of the dummy image No. 2", "Size of the dummy image No. 3", and "Size of the dummy image No. 4" are correlated with the image titles of "Item No. 1", "Item No. 2", "Item No. 3", and "Item No. 4", respectively.

It is determined whether the digital camera is connected (step S2125). When the digital camera is connected, the processing proceeds to step S2126, and the image capture guide list file including the image titles and the pasting sizes is transferred to the digital camera.

In the digital camera 100, on the other hand, it is determined whether the personal computer (PC) is connected (step S2131). When the personal computer is connected, the processing proceeds to step S2132, and it is determined whether the image capture guide list has been received from the personal computer. When the image capture guide list has been received from the personal computer, it is determined whether this image capture guide list is adequate for its own model (step S2133). When this image capture guide list is adequate, the digital camera 100 reads in the shooting items described in the image capture guide list (step S2134).

It is then determined whether the image capture guide list shooting mode is available (step S2135). When the image capture guide list shooting mode is available, the pasting sizes are read in from the image capture guide list (step S2136). Images are shot according to the pasting sizes (step S2137). After the shooting, it is determined whether the shooting of all the images has been finished (step S2138). When the shooting of all the images has not been finished, the processing proceeds to step S2136, and the same processing is repeated until the shooting has been finished (steps S2136 to S2138).

As explained above, in the personal computer 200 according to the tenth example, the dummy images are previously pasted on the screen. The sizes of the dummy images are read out to create the image capture guide list including the image sizes and transfer this guide list to the digital camera. Accordingly, it is possible to improve the operability of creation and transfer of the image capture guide list and the operability in the digital camera, thus improving usability for the user.

Eleventh Example

Figure 87:
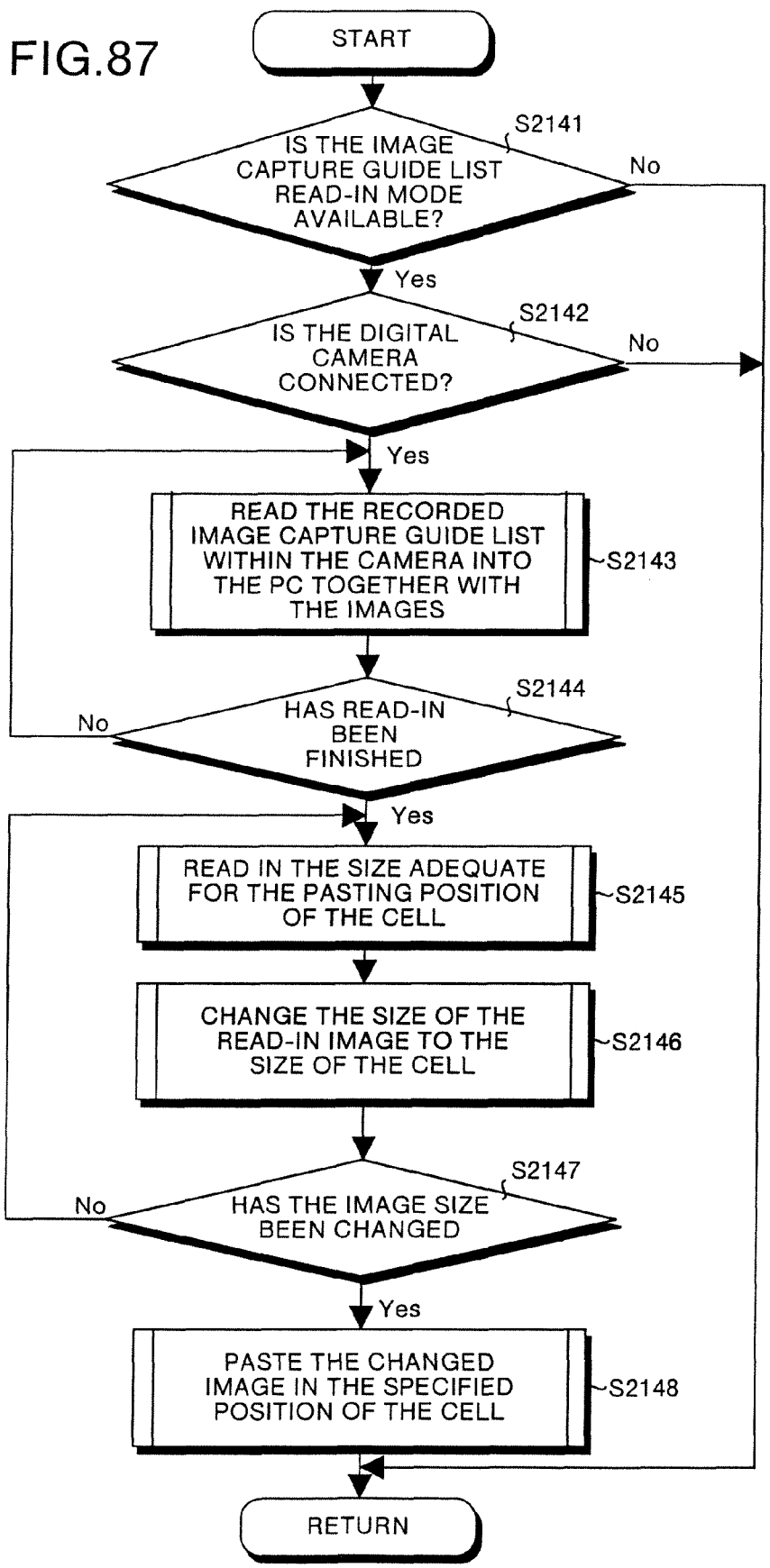
FIG. 87 is a flow chart for explaining an eleventh example of the personal computer.

The eleventh example is explained with reference to FIG. 87. The flow chart in FIG. 87 shows the operation in the personal computer 200 according to the eleventh example. In this eleventh example, the operation in the following case will be explained. This case is such that the file of an image recorded according to the image capture guide list with the digital camera is read into the personal computer, and the recorded image is pasted in the image capture guide list.

In FIG. 87, in the personal computer 200, it is determined whether the image capture guide list read-in mode is available (step S2141). When the image capture guide list read-in mode is available, it is then determined whether the digital camera is connected (step S2142). When the digital camera is connected, the recorded image capture guide list within the connected digital camera is read in together with the image file (step S2143).

It is determined whether read-in has been finished (step S2144). When read-in has been finished, the size adequate for the pasting position of the cell is read in (step S2145). The size of the read-in image is changed to the size of the cell (step S2146). Further, it is determined whether the image size has been changed (step S2147). When the image size has been changed, the changed image is pasted in the specified position of the cell (step S2148).

FIG. 84, as mentioned above, shows the spreadsheet type screen. In FIG. 84, the cells C4 to C7 in which the images are pasted are selected, the sizes of the cells C4 to C7 are read in, and the images No. 1 to No. 4 recorded with the digital camera are changed to these cell sizes. These images are pasted in the cells C4 to C7 as shown in FIG. 88.

As explained above, according to the eleventh example, the personal computer 200 reads in the files of the images recorded according to the image capture guide list with the digital camera, and pastes these recorded images in the image capture guide list. Accordingly, editing of the images recorded according to the image capture guide list is facilitated, thus improving usability for the user.

It is to be understood that the present invention is not limited by the embodiment and may be embodied in modified forms without departing from the spirit of the invention. Although the examples in which the image input apparatus according to this invention is applied in the digital camera are explained in the embodiment of this invention, this invention is not limited to this application, but is applicable to any other mobile information input device such as PDA.

As explained above, according to one aspect of this invention, the optical system forms an image of a subject, and the image pickup unit converts the formed subject image to image data. The image capture guide list input unit inputs image capture guide lists each including at least one of image titles representing targets to be recorded. The storage unit stores the image capture guide lists input through the image capture guide list input unit. The image title display unit displays the image title (s) included in one of the image capture guide lists stored in the storage unit on the screen of the display device. Therefore, shooting can be performed while checking the image title(s) in the image capture guide list. Accordingly, it is possible to prevent forgetting to take required pictures, thus improving usability for the user.

Further, the image capture guide list display unit displays the image capture guide lists stored in the storage unit in list form on the screen of the display device, and the image capture guide list selection unit selects one from the image capture guide lists displayed on the screen. The image title display unit displays the image title (s) included in the image capture guide list selected by the image capture guide list selection unit. Therefore, in addition to the effect due to the invention, it is possible to select a desired image capture guide list from the plurality of image capture guide list.

Further, the image capture guide list is input from the information processing device. Therefore, in addition to the effect due to the invention, it is possible to input the image capture guide list from the image processing device.

Further, the image capture guide list is downloaded from the home page of the Web server. Therefore, in addition to the effect due to the invention, it is possible to download the image capture guide list from the home page of the Web server.

Further, the image title selection unit selects one of the image titles displayed on the screen, and when one of the image titles is selected by the image title selection unit, the mode is switched to the recording mode. Therefore, in addition to the effect due to the invention, it is possible to enter the standby state for shooting after the image title is selected, thus facilitating shooting in correlation to the image title.

Further, still pictures, binary images and motion pictures as targets to be recorded, and also voice memos are recordable. Therefore, in addition to the effect due to the invention, it is possible to record still pictures, binary images, motion pictures as targets to be recorded, and voice memos.

Further, the HTML file conversion unit converts the data recorded in the recording mode to an HTML file. Therefore, in addition to the effect due to the invention, it is possible to create the HTML file of the recorded data.

Further, the uploading unit uploads the HTML file converted by the HTML file conversion unit to the home page in the Web server. Therefore, in addition to the effect due to the invention, it is possible to upload the HTML file of the recorded data to the Web server.

Further, the image title selected by the image title selection unit is added to the parameter in the recorded file for the data recorded in the recording mode. Therefore, in addition to the effect due to the invention, it is possible to correlate the recorded image with the image title. Thus, it is possible to prevent erroneous correspondence between any of the images and any of the image titles.

Further, the recorded file for the data recorded in the recording mode is stored in correlation with the image title selected by the image title selection unit. Therefore, in addition to the effect due to the invention, it is possible to correlate the recorded image with the image title. Thus, erroneous correspondence between any of the images and any of the image titles can be prevented.

Further, the name of the recorded file includes the image title selected by the image title selection unit. Therefore, it is possible to correlate the recorded image with the image title. Thus, erroneous correspondence between any of the images and any of the image titles can be prevented.

Further, the image title selected by the image title selection unit is superposed on the image data recorded in the recording mode. Therefore, it is possible to correlate the recorded image with the image title. Thus, erroneous correspondence between any of the images and any of the image titles can be prevented.

Further, when an image title is selected from the image capture guide list by the image title selection unit and recorded data relating to this image title is recorded, the image title display unit displays the message to the effect that recording corresponding to this image title has been performed. Therefore, in addition to the effect due to the invention, the user can visually identify the recorded image title.

Further, the image title display unit displays the number of recordings on the screen of the display device for each image title. Therefore, the user can check the number of recordings for each image title.

Further, when shooting for all the image titles in the image capture guide list has been finished, the message to the effect, that the shooting for the image capture guide list has been finished, is sent to a specified destination. Therefore, in addition to the effect due to the invention, the instructor in the destination can get to know whether the operations for the image capture guide list have been finished.

Further, when one of the image titles is selected by the image title selection unit, the mode is switched to the recording mode, and the image title selected by the image title selection unit is displayed together with the monitoring image of the subject on the screen of the display device. Therefore, in addition to the effect due to the invention, the user can take a picture while viewing the monitoring image of the subject and the image title.

Further, when one of the image titles is selected by the image title selection unit, the recording control unit shifts to the recording mode, records data to be recorded for any of still pictures, binary images, motion pictures of subjects, and voice memos according to the operation of the specific button, and stores the data in the storage unit as a recorded file. The grouping unit groups the recorded files for each image capture guide list. Therefore, in addition to the effect due to the invention, it is possible to group the recorded files of the recorded images for each image capture guide list, thus facilitating management of the files for each image capture guide list.

Further, the grouping unit registers the recorded files in a folder or folders for each image capture guide list to group the files. Therefore, in addition to the effect due to the invention, it is possible to manage the files with the folder(s).

Further, the image capture guide list further includes the shooting instruction information that corresponds to each image title and provides an instruction to a user. When one of the image titles is selected by the image title selection unit, the contents of the shooting instruction information for the selected image capture guide list is notified. Therefore, in addition to the effect due to the invention, it is possible to perform shooting and post-shooting processing based on the instructions by the creator or instructor of this image capture guide list.

Further, the contents of the shooting instruction information are the shooting procedure or the instruction for operations to be carried out after shooting. Therefore, in addition to the effect due to the invention, it is possible to perform shooting according to the shooting procedure corresponding to the image title.

Further, the attribute of the shooting instruction information is any of text, graphics, voice memo, and motion pictures. Therefore, in addition to the effect due to the invention, the shooting instructions can be provided in any of the text, graphics, a voice memo, and a motion picture.

Further, the image capture guide list further includes the automatic processing instruction information that corresponds to each image title and provides instructions for automatic settings of setting conditions when recording a target to be recorded, and/or for automatic processing to be executed after the recording. When an image title is selected by the image title selection unit, the mode is switched to the recording mode to execute the automatic settings of the setting conditions when recording the target to be recorded and/or the automatic processing. More specifically, this setting is required when the target is to be recorded, and this automatic processing is required to be executed after the recorded data is recorded. Both operations are executed based on the contents of the automatic processing instruction information for the image title selected by the image title selection unit. Therefore, in addition to the effect due to the invention, it is possible to execute the automatic setting of the setting conditions when recording a target to be recorded and/or the automatic processing to be executed after the recording.

Further, when the contents of the automatic processing instruction information for the image title selected by the image title selection unit indicate the instruction to send data as an attachment after the data is recorded, the data recorded in the recording mode is attached to e-mail to be sent to a specified destination through the communication means. Therefore, in addition to the effect due to the invention, it is possible to automatically send the recorded data as an attachment by e-mail.

Further, when the contents of the automatic processing instruction information for the image title selected by the image title selection unit indicate the instruction to send thumbnail data as an attachment after the data is recorded, thumbnail images for the image data recorded in the recording mode are attached to e-mail to be sent to a specified destination through the communication means. Therefore, in addition to the effect due to the invention, it is possible to automatically send the thumbnail images for the recorded images as an attachment by e-mail.

Further, when the contents of the automatic processing instruction information for the image title selected by the image title selection unit indicate the instruction to send zoomed image data as an attachment after the data is recorded, the image data recorded in the recording mode is changed to a specified size to be attached to e-mail, and the e-mail is sent to a specified destination through the communication means. Therefore, in addition to the effect due to the invention, it is possible to change the recorded image data to a desired size and send the zoomed image data as an attachment by e-mail.

Further, when the contents of the automatic processing instruction information for the image title selected by the image title selection unit indicate the instruction to upload data to the home page after the data is recorded, the image data recorded in the recording mode is converted to an HTML file, which is uploaded to a specified home page through the communication means. Therefore, in addition to the effect due to the invention, it is possible to automatically upload the recorded image data to the home page.

Further, when the contents of the automatic processing instruction information for the image title selected by the image title selection unit indicate the instruction to upload data to the home page after the data is recorded and notify of the URL address of this home page, the image data recorded in the recording mode is converted to an HTML file, which is uploaded to a specified home page through the communication means, and the URL address of this home page is sent to a specified destination through the communication means. Therefore, in addition to the effect due to the invention, it is possible to automatically upload the recorded image data to the home page and automatically send the URL address of this home page to a specified destination.

Further, when the contents of the automatic processing instruction information for the image title selected by the image title selection unit indicate the instruction to input memo information after related data is recorded, the mode is switched to the memo input mode after the data is recorded in the recording mode, and the file of the memo information input through the memo input unit is stored in correlation with the recorded file of the data recorded in the recording mode. Therefore, in addition to the effect due to the invention, it is possible to save the memo relating to the shooting as the related file. Thus, the user can smoothly carry out the operations.

Further, when the contents of the automatic processing instruction information for the image title selected by the image title selection unit indicate the instruction to input memo information after related data is recorded, the mode is switched to the memo input mode after the data is recorded in the recording mode, and the memo information input through the memo input unit is superposed on the image data recorded in the recording mode. Therefore, in addition to the effect due to the invention, it is possible to superpose the memo relating to the shooting on the recorded image. Thus, the user can smoothly carry out the operations.

Further, the memo information is provided with text or freehand characters. Therefore, in addition to the effect due to the invention, it is possible to input text or freehand characters as memo information.

Further, a superposing position of the memo information with respect to the recorded image can freely be set.

Further, when the contents of the automatic processing instruction information for the image title selected by the image title selection unit indicate the instruction to input voice memo after related data is recorded, the mode is switched to the voice memo input mode after the data is recorded in the recording mode, and the file of the voice memo input through the voice memo input unit is stored in correlation with the recorded file of the image data recorded in the recording mode. Therefore, in addition to the effect due to the invention, it is possible to store the voice memo file in correlation with the image file.

Further, when the contents of the automatic processing instruction information for the image title selected by the image title selection unit indicate the instruction to imprint a date on an image to be recorded, the image data is recorded in the recording mode, and then the date is imprinted on this image data. Therefore, in addition to the effect due to the invention, it is possible to imprint the date on the image data.

Further, when the contents of the automatic processing instruction information for the image title selected by the image title selection unit indicate the instruction to set the resolution of an image to be recorded, the resolution for shooting is set according to the setting instruction. Therefore, in addition to the effect due to the invention, it is possible to automatically set the resolution.

Further, the image capture guide list includes at least one of image titles as targets to be recorded and information to be superposed for this image title. When one of the image titles is selected by the image title selection unit, the mode is switched to the recording mode, and the information to be superposed for the image title, that is selected from the image capture guide list by the selection unit, is superposed on the image recorded in this recording mode. Therefore, in addition to the effect due to the invention, it is possible to superpose the information to be superposed relating to an image to be recorded on the recorded image and save it.

Further, a superposing position of the information to be superposed with respect to the recorded image can freely be set. Therefore, in addition to the effect due to the invention, it is possible to superpose the information to be superposed on a desired position of the recorded image.

Further, the image capture guide list includes automatic processing instruction information that provides the instruction for automatic processing to be executed after data is recorded. When an image title is selected by the image title selection unit, the mode is switched to the recording mode, shooting is performed for each of the image titles according to the operation of the specific button, and the shot image data is processed based on the automatic processing instruction information in the image capture guide list. Therefore, in addition to the effect due to the invention, it is possible to shoot for each image title and automatically perform the processing on the shot image data.

Further, when the automatic processing instruction information indicates the instruction to combine a plurality of images, the plurality of images recorded for each of the image titles are combined into one. Therefore, in addition to the effect due to the invention, it is possible to combine the plurality of images recorded for each image title into one.

Further, when the automatic processing instruction information indicates the instruction to correct a plurality of images, the plurality of images recorded for each of the image titles are corrected. Therefore, in addition to the effect due to the invention, it is possible to correct the plurality of images captured for each image title.

Further, the image capture guide list further includes the model name information. The automatic processing instruction information is the contents adequate for the model. The determination unit reads out the model name information from the image capture guide list input through the image capture guide list input unit, and determines whether the model name of its own and the model name in the image capture guide list match with each other. When it is determined by the determination unit that these two match with each other, shooting is performed based on the image capture guide list. Therefore, in addition to the effect due to the invention, it is possible to perform shooting using the image capture guide list adequate for the own model.

According to another aspect of this invention, the optical system forms an image of a subject, the image pickup unit converts the formed subject image to image data. The memory temporarily stores the image data output from the image pickup unit, and the storage control unit stores the image data stored in the memory, in the recording medium in the predetermined file format. The Web browsing unit captures Web information for the Web page of the Web server, stores the information in the memory as display data, and records the display data stored in the memory, in the recording medium in the predetermined file format. Therefore, it is possible to capture the Web information for the Web page or the like in the data format the same as the image data picked-up by the optical system and the image pickup unit. Thus, the data processing and the data management are facilitated.

Further, the Web browsing unit enlarges or reduces the size of the display data stored in the memory according to the operation of the zoom lever to change a range of the Web information to be captured. Therefore, in addition to the effect due to the invention, it is possible to freely set the capturing range of the data to be captured in much the same way the shooting is performed with the image input device by using the zoom lever.

Further, the display data stored in the memory is recorded in the recording medium in the predetermined file format according to the operation of the shutter release button. Therefore, in addition to the effect due to the invention, it is possible to capture the Web information for the Web page or the like by pressing the shutter release button. It is also possible to capture data in much the same way the shooting is performed with the digital camera. Thus, the user-friendly interface can be provided.

Further, the Web browsing unit periodically accesses a particular URL for the image to be browsed, and captures the Web information. Therefore, in addition to the effect due to the invention, it is possible to facilitate periodic capturing of the data for the Web page in much the same way the interval shooting is performed with the image input device.

Further, the freehand memo information input through the freehand memo information input unit and the Web information captured from the Web server are combined into one. Therefore, it is possible to superpose the freehand memo information on the Web information for the Web page or the like and combine the information relating to the image with this image. Thus, the user's intention can clearly be expressed in a simple manner.

Further, the voice memo information is added to the Web information captured from the Web server. Therefore, in addition to the effect due to the invention, it is possible to easily add related voice memo to the Web information for the Web page, which has been captured in much the same way the shooting is performed with the camera.

Further, a position on the Web information, which has been browsed, is specified, and the memo information input through the memo information input unit or previously stored in the memo information storage unit is superposed on the specified position of the Web information. Therefore, in addition to the effect due to the invention, it is possible to superpose the freehand memo information on the specified position of the Web information for the captured Web page, and combine the information relating to the image with this image. Thus, the user's intention can clearly be expressed in a simple manner.

Further, when the display data stored in the memory is recorded in the recording medium in the predetermined file format, the corresponding URL or e-mail address is written in the header of the file. Therefore, in addition to the effect due to the invention, it is possible to easily check the URL or the like of the web information, which enables accessing to the URL.

Further, the files in the predetermined file format are classified into those for respective folders according to the contents of the URLs. Therefore, in addition to the effect due to the invention, it is possible to classify the captured Web information for the Web pages or the like into those for respective folders, which is performed for each home page, for example.

According to still another aspect of this invention, the program is executed by the computer to create the image capture guide list which is displayed on the screen of the display device of the image input apparatus, and includes at least one of image titles that represent targets to be recorded and are used for shooting. Therefore, in the image input apparatus, shooting can be performed while checking the image title in the image capture guide list. Accordingly, it is possible to prevent forgetting to take required pictures, thus improving usability for the user.

Further, the program is executed by the computer to read out the model name information from the image input apparatus connected to the computer and create the image capture guide list adequate for the model. Therefore, in addition to the effect due to the invention, it is possible to easily acquire the model name of the image input apparatus connected to the computer, and create the image capture guide list adequate for the model in a simple manner.

Further, the program is executed by the computer to read out the model name information from the header of the recorded file stored in the image input apparatus and create the image capture guide list adequate for the model. Therefore, in addition to the effect due to the invention, it is possible to read out the model name information more easily.

Further, the program is executed by the computer to create the image capture guide list adequate for each model using the table in which the model ability information for each model of plural image input apparatuses is registered. Therefore, in addition to the effect due to the invention, it is possible to create the image capture guide list adequate for the model more easily.

Further, the program is executed by the computer to create the image capture guide list. This image capture guide list is created by displaying the spreadsheet type input screen consisting of a plurality of cells, inputting an image title in one of the cells on the input screen, specifying at least one of the cell positions where image titles have been input, and including the image title on the specified cell position. Therefore, in addition to the effect due to the invention, it is possible to improve the operability of creating the image capture guide list.

Further, the program is executed by the computer to create the image capture guide list. This image capture guide list is created by displaying the spreadsheet type input screen consisting of a plurality of cells, inputting an image title and a shooting instruction item relating to this image title in respective cells on the input screen, specifying at least one of the cell positions where image titles have been input, and including the image title and the shooting instruction item relating to the image title on the specified cell position. Therefore, in addition to the effect due to the invention, it is possible to improve the operability of creating the image capture guide list.

Further, the program is executed by the computer to create the image capture guide list. This image capture guide list is created by displaying the spreadsheet type input screen consisting of a plurality of cells; inputting an image title in one of the cells on the input screen; changing the size of at least a part of the cells on the input screen; specifying at least one of the cell positions where the image titles have been input; specifying a cell position, in which an image is to be pasted, for each image title; and including the image title on the specified cell position and the size of the specified cell. Therefore, in addition to the effect due to the invention, it is possible to improve the operability of creating the image capture guide list.

Further, the program is executed by the computer to create the image capture guide list. This image capture guide list is created by displaying the spreadsheet type input screen consisting of a plurality of cells; inputting an image title in one of the cells on the input screen, changing the size of at least a part of the cells on the input screen; pasting an image in one of the cells; specifying at least one of the cell positions where image titles have been input; specifying a cell position, in which the image has been pasted, for each image title; and including the image title in the specified cell position and the size of the image pasted in the specified cell. Therefore, in addition to the effect due to the invention, it is possible to improve the operability of creating the image capture guide list.

Further, the program is executed by the computer to input the image recorded by the image input apparatus based on the image capture guide list and also input this image capture guide list, display the spreadsheet type input screen consisting of a plurality of cells, display an image title in the image capture guide list on a cell, read out the size of a target cell in which the image recorded corresponding to the image title is to be pasted, change the size of the recorded image to the size of the read-out cell, and paste the recorded image in the target cell. Therefore, in addition to the effect due to the invention, it is possible to facilitate editing of the images recorded according to the image capture guide list, thus improving usability for the user.

Further, the program is executed by the computer to change the size of an image to the changed size of a cell if the size of the cell, in which the image has been pasted, is changed. Therefore, in addition to the effect due to the invention, it is possible to facilitate editing of the images recorded according to the image capture guide list.

The method according to still another aspect of this invention is realized by creating an item list, that includes at least an item indicating a title of a subject desired to be recorded, on the first screen; selecting the scope of writing out at least one of image titles from the item list; and creating the image capture guide list including the image title. This method is also realized by displaying the image title in the image capture guide list on the second screen; shooting a subject for each image title; selecting the range, in which the recorded image (s) is pasted, from the item list on the first screen; and pasting the recorded image (s) in the selected range. Therefore, it is possible to easily create text in which a desired image is pasted.

The present document incorporates by reference the entire contents of Japanese priority documents, 2000-100126 filed in Japan on Mar. 31, 2000, 2000-100137 filed in Japan on Mar. 31, 2000, 2000-136406 filed in Japan on Mar. 31, 2000, 2000-109973 filed in Japan on Apr. 11, 2000, 2000-109974 filed in Japan on Apr. 11, 2000, 2000-109975 filed in Japan on Apr. 11, 2000, 2000-269419 filed in Japan on Sep. 5, 2000, 2000-269420 filed in Japan on Sep. 5, 2000, 2000-269421 filed in Japan on Sep. 5, 2000, and 2001-73153 filed in Japan on Mar. 14, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image input apparatus comprising:
    an optical system which forms an image of a subject;
    an image pickup unit which converts the formed subject image to image data;
    an image capture guide list input unit which receives input of an image capture guide list, through which image capture guide lists each including at least one of image titles representing targets to be recorded are input;
    a storage unit which stores at least one said image capture guide list input through said image capture guide list input unit;
    a display device which displays information on its screen;
    an image capture guide list display unit which displays a list of said at least one image capture guide list stored in the storage unit on the screen of said display device;
    an image capture guide list selection unit which receives selection of one image capture guide list from said list of the at least one image capture guide list displayed on the screen of said display device;
    an image title display unit which displays the image title(s) included in the image capture guide list selected by said image capture guide list selection unit from the list of the at least one image capture guide list stored in said storage unit on the screen of said display device; and
    an image title selection unit which selects one of the image titles displayed on the screen of said display device,
    wherein when an image title is selected from the image capture guide list by said image title selection unit and the data for this title is recorded, said image title display unit displays a checkmark for a corresponding image title and displays a number of shot images for the image title, and
    when shooting of all images for the image titles displayed on the screen of said display device has not been completed, said image title display unit again displays the image title in the image capture guide list on the screen of said display device along with the checkmark for the corresponding image title and the number of shot images for the image title.

2. The image input apparatus according to claim 1 further comprising:
    an image capture guide list display unit which displays the image capture guide lists stored in said storage unit in list form on the screen of said display device; and
    an image capture guide list selection unit which selects one from the image capture guide lists displayed on the screen,
    wherein said image title display unit displays the image title(s) included in the image capture guide list selected by said image capture guide list selection unit.

3. The image input apparatus according to claim 1, wherein said image capture guide list input unit includes communication means used for receiving the image capture guide lists transferred from an information processing device connected thereto.

4. The image input apparatus according to claim 1, wherein said image capture guide list input unit includes a Web browsing unit which browses a home page of a Web server connected thereto and downloads the image capture guide list on the home page.

5. The image input apparatus according to claim 1, wherein when one of these image titles is selected by said image title selection unit, a mode is switched to a recording mode.

6. The image input apparatus according to claim 5, wherein data for any of still pictures, binary images and motion pictures as said targets to be recorded, and voice memos is recorded in the recording mode.

7. The image input apparatus according to claim 6 further comprising:
    an HTML file conversion unit which converts the data recorded in the recording mode to an HTML file.

8. The image input apparatus according to claim 7 further comprising:
    an uploading unit which uploads the HTML file converted by said HTML file conversion unit to a home page of a Web server.

9. The image input apparatus according to claim 6, wherein the image title selected by said image title selection unit is added to parameters in a recorded file for the data recorded in the recording mode.

10. The image input apparatus according to claim 9, wherein the recorded file for the data recorded in the recording mode is stored in correlation with the image title selected by said image title selection unit.

11. The image input apparatus according to claim 9, wherein a file name of the recorded file for the data recorded in the recording mode includes the image title selected by said selection unit in at least a part of the file name.

12. The image input apparatus according to claim 6, wherein the image title selected by said image title selection unit is superposed on the image data recorded in the recording mode.

13. The image input apparatus according to claim 1, wherein
    when shooting for all the image titles in the image capture guide list has been finished, a message to the effect, that the shooting for the image capture guide list has been finished, is sent to a specified destination.

14. The image input apparatus according to claim 1, wherein
    when one of the image titles is selected by said image title selection unit, the mode is switched to the recording mode to display the image title selected by said selection unit together with a monitoring image of the subject on the screen of said display device.

15. The image input apparatus according to claim 1 further comprising:
    a recording control unit which shifts to the recording mode when an image title is selected by said image title selection unit, records data to be recorded for any of still pictures, binary images, motion pictures of subjects, and voice memos according to the operation of a specific button, and stores the data in said storage unit as a recorded file; and
    a grouping unit which groups the recorded files for each image capture guide list.

16. The image input apparatus according to claim 15, wherein said grouping unit registers the recorded files in a folder or folders for each image capture guide list to group the recorded files.

17. The image input apparatus according to claim 1, wherein
the image capture guide list further includes shooting instruction information that corresponds to each image title and provides an instruction to a user, and
when one of the image titles is selected by said image title selection unit, the contents of the shooting instruction information for the selected image capture guide list is notified.

18. The image input apparatus according to claim 17, wherein the contents of the shooting instruction information are a shooting procedure or an instruction for operations to be carried out after shooting.

19. The image input apparatus according to claim 17, wherein an attribute of the shooting instruction information is any of text, graphics, a voice memo, and a motion picture.

20. The image input apparatus according to claim 1, wherein
the image capture guide list includes at least one of the image titles as targets to be recorded and information to be superposed for this image title, and
when one of these image titles is selected by said selection unit, the mode is switched to the recording mode, and the information to be superposed, for the image title selected from the image capture guide list by said selection unit, is superposed on the image recorded in the recording mode.

21. The image input apparatus according to claim 1, wherein the image capture guide list includes automatic processing instruction information that provides an instruction for automatic processing to be executed after data is recorded, and
when an image title is selected by said image title selection unit, the mode is switched to the recording mode, shooting is performed for each image title according to the operation of a specific button, and the shot image data is processed based on the automatic processing instruction information in the image capture guide list.

22. The image input apparatus according to claim 21, wherein
when the automatic processing instruction information indicates an instruction to combine a plurality of images, the plurality of images recorded for each of the image titles are combined into one.

23. The image input apparatus according to claim 21, wherein
when the automatic processing instruction information indicates an instruction to correct a plurality of images, the plurality of images recorded for each of the image titles are corrected.

24. The image input apparatus according to claim 1, wherein
the image capture guide list further includes automatic processing instruction information that corresponds to each image title and provides instructions for automatic settings of setting conditions when recording a target to be recorded, and/or for automatic processing to be executed after the recording, and
when an image title is selected by said image title selection unit, a mode is switched to the recording mode to execute the automatic settings of setting conditions when recording the target to be recorded, and/or the automatic processing to be executed after the recorded data is recorded based on the contents of the automatic processing instruction information for the image title selected by said image title selection unit.

25. The image input apparatus according to claim 24 further comprising:
communication means through which data communications are performed with the outside, wherein
when the contents of the automatic processing instruction information for the image title selected by said image title selection unit indicate an instruction to send data as an attachment after the data is recorded, the data recorded in the recording mode is attached to e-mail to be sent to a specified destination through said communication means.

26. The image input apparatus according to claim 24 further comprising:
communication means through which data communications are performed with the outside, wherein
when the contents of the automatic processing instruction information for the image title selected by said image title selection unit indicate an instruction to send thumbnail data as an attachment after the data is recorded, thumbnail images for the image data recorded in the recording mode are attached to e-mail to be sent to a specified destination through said communication means.

27. The image input apparatus according to claim 24 further comprising:
communication means through which data communications are performed with the outside, wherein
when the contents of the automatic processing instruction information for the image title selected by said image title selection unit indicate an instruction to send zoomed image data as an attachment after the data is recorded, the image data recorded in the recording mode is changed to a specified size to be attached to e-mail, and the e-mail is sent to a specified destination through said communication means.

28. The image input apparatus according to claim 24 further comprising:
communication means through which data communications are performed with the outside, wherein
when the contents of the automatic processing instruction information for the image title selected by said image title selection unit indicate an instruction to upload data to a home page after the data is recorded, the image data recorded in the recording mode is converted to an HTML file, and the HTML file is uploaded to a specified home page through said communication means.

29. The image input apparatus according to claim 24 further comprising:
communication means through which data communications are performed with the outside, wherein
when the contents of the automatic processing instruction information for the image title selected by said image title selection unit indicate an instruction to upload data to a home page after the data is recorded and notify of a URL address of this home page, the image data recorded in the recording mode is converted to an HTML file, the HTML file is uploaded to a specified home page through said communication means, and the URL address of this home page is also sent to a specified destination through said communication means.

30. The image input apparatus according to claim 24 further comprising:
a memo input unit through which memo information is input, wherein
when the contents of the automatic processing instruction information for the image title selected by said image title selection unit indicate an instruction to input memo information after related data is recorded, the mode is switched to a memo input mode after the data is recorded in the recording mode, and a file of the memo information input through said memo input unit is stored in correlation with the recorded file of the data recorded in the recording mode.

31. The image input apparatus according to claim 24 further comprising:

a memo input unit through which memo information is input, wherein when the contents of the automatic processing instruction information for the image title selected by said image title selection unit indicate an instruction to input memo information after related data is recorded, the mode is switched to the memo input mode after the data is recorded in the recording mode, and the memo information input through said memo input unit is combined with the image data recorded in the recording mode.

32. The image input apparatus according to claim 31, wherein the memo information is provided with text or freehand characters.

33. The image input apparatus according to claim 31, wherein a combining position of the memo information with respect to the recorded image can freely be set.

34. The image input apparatus according to claim 24 further comprising:

a voice memo input unit through which voice memo is input, wherein when the contents of the automatic processing instruction information for the image title selected by said image title selection unit indicate an instruction to input voice memo after related data is recorded, the mode is switched to a voice memo input mode after the data is recorded in the recording mode, and a file of the voice memo input through said voice memo input unit is stored in correlation with the recorded file of the image data recorded in the recording mode.

35. The image input apparatus according to claim 24, wherein when the contents of the automatic processing instruction information for the image title selected by said image title selection unit indicate an instruction to imprint a date on an image to be recorded, the image data is recorded in the recording mode, and then the date is imprinted on this image data.

36. The image input apparatus according to claim 24, wherein when the contents of the automatic processing instruction information for the image title selected by said image title selection unit indicate an instruction to set resolution of an image to be recorded, the resolution for shooting is set according to the setting instruction.

37. The image input apparatus according to claim 24, wherein a superposing position of the information to be superposed with respect to the recorded image can freely be set.

38. The image input apparatus according to claim 24, wherein the image capture guide list further includes model name information, and the automatic processing instruction information is the contents adequate for the model, said apparatus further comprises a determination unit which reads out the model name information of the image capture guide list input through said input unit, and determines whether the model name of its own and the model name specified in the image capture guide list match with each other, and when it is determined by said determination unit that the own model name matches the model name in the image capture guide list, shooting is performed based on the image capture guide list.

* * * * *